(12) United States Patent
Schiffer et al.

(10) Patent No.: US 12,441,762 B2
(45) Date of Patent: Oct. 14, 2025

(54) HEPATITIS C VIRUS NS3/4A PROTEASE INHIBITORS

(71) Applicant: University of Massachusetts, Boston, MA (US)

(72) Inventors: Celia A. Schiffer, Shrewsbury, MA (US); Akbar Ali, Westborough, MA (US); Jacqueto Zephyr, Worcester, MA (US); Ashley N. Matthew, Worcester, MA (US); Nageswara R. Desaboini, Worcester, MA (US)

(73) Assignee: University of Massachusetts, Westborough, MA (US)

( * ) Notice: Subject to any disclaimer, the term of this patent is extended or adjusted under 35 U.S.C. 154(b) by 1019 days.

(21) Appl. No.: 17/607,886

(22) PCT Filed: Jun. 5, 2020

(86) PCT No.: PCT/US2020/036302
§ 371 (c)(1),
(2) Date: Oct. 31, 2021

(87) PCT Pub. No.: WO2020/247736
PCT Pub. Date: Dec. 10, 2020

(65) Prior Publication Data
US 2022/0227806 A1    Jul. 21, 2022

Related U.S. Application Data

(60) Provisional application No. 62/858,924, filed on Jun. 7, 2019.

(51) Int. Cl.
C07K 5/083    (2006.01)
A61K 38/00    (2006.01)
C07K 5/107    (2006.01)

(52) U.S. Cl.
CPC .......... C07K 5/0804 (2013.01); C07K 5/1016 (2013.01); *A61K 38/00* (2013.01)

(58) Field of Classification Search
CPC ....... A61K 38/00; A61K 45/06; C07D 487/04
See application file for complete search history.

(56) References Cited

U.S. PATENT DOCUMENTS

2020/0087265 A1* 3/2020 Schiffer ............. C07K 5/06165

OTHER PUBLICATIONS

Ashley (J. Med. Chem 2017, 60, 5699-5716).*

* cited by examiner

*Primary Examiner* — Pancham Bakshi
(74) *Attorney, Agent, or Firm* — Milstein Zhang & Wu LLC

(57) ABSTRACT

The invention provides novel classes of HCV therapeutics that are orally available, safe and effective HCV NS3/4A protease inhibitors and are less susceptible to drug resistance than existing therapeutics. The invention also relates to pharmaceutical composition of these compounds and methods of preparation and use thereof.

5 Claims, 14 Drawing Sheets

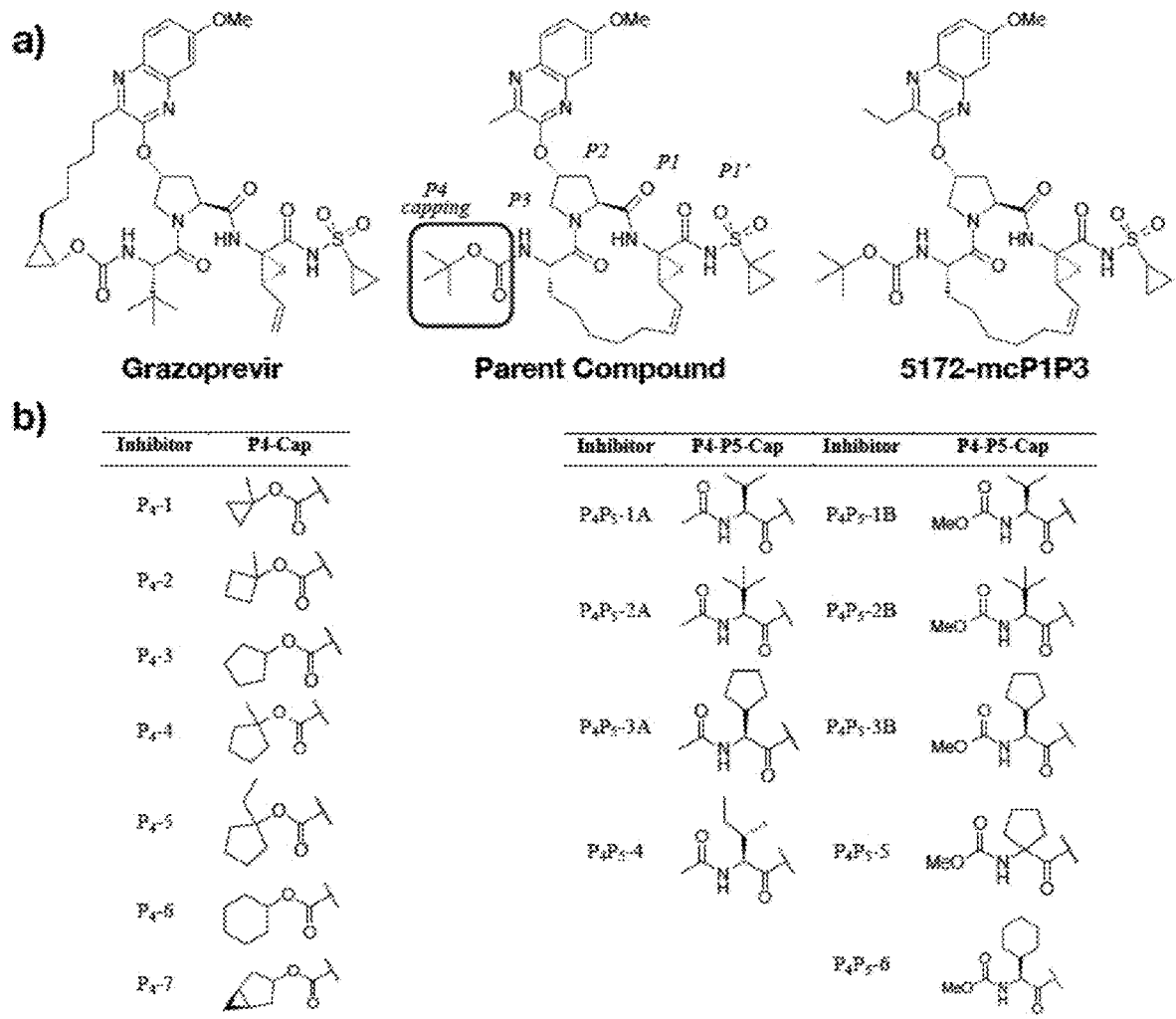

FIG. 1. Chemical structures of designed HCV NS3/4A protease inhibitors.
(a) Grazoprevir (MK-5172) is an FDA-approved PI. Change of the macrocycle location (5172-mcP1P3) and optimization of the P2 quinoxaline moiety led to the parent compound modified in this study. The canonical nomenclature for drug moiety positioning, and the P4 moiety altered are indicated. (b) The inhibitors designed based on the parent compound to 1) optimally fill the S4 pocket by modifying the P4 capping group ($P_4$-1 to $P_4$-7) 2) extend into the SE by incorporating a P4 group with a P5 cap ($P_4P_5$-1A to $P_4P_5$-6).

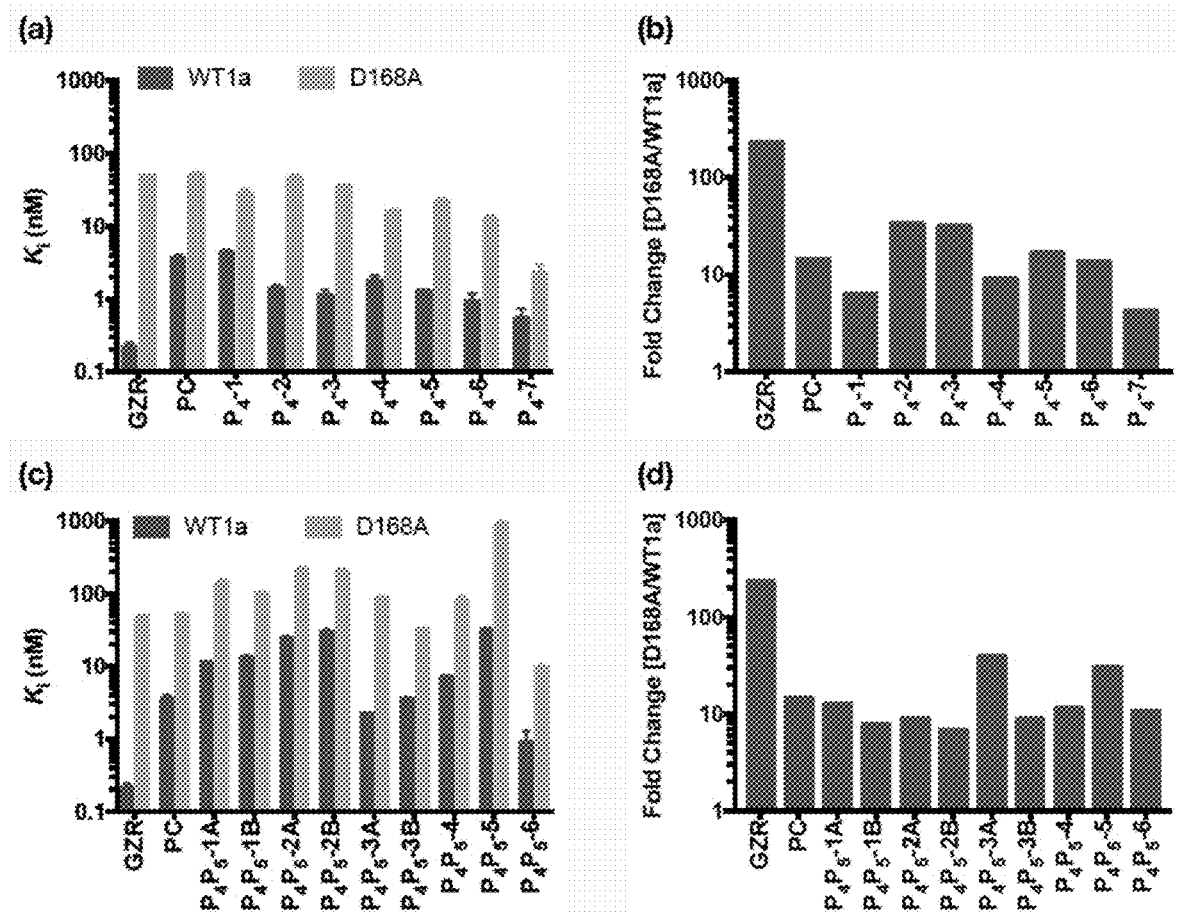

FIG. 2. Resistance profile of inhibitors against WT1a and D168A variant.

(a) Enzyme inhibition constants of the $P_4$-cap inhibitors against wildtype (blue) and D168A (orange) proteases, and (b) fold change of enzyme inhibitory activity against the D168A variant with respect to wildtype NS3/4A protease. (c) Enzyme inhibition constant and (d) fold change of the $P_4$-$P_5$-cap inhibitors. PC and GZR stand for parent compound and grazoprevir, respectively.

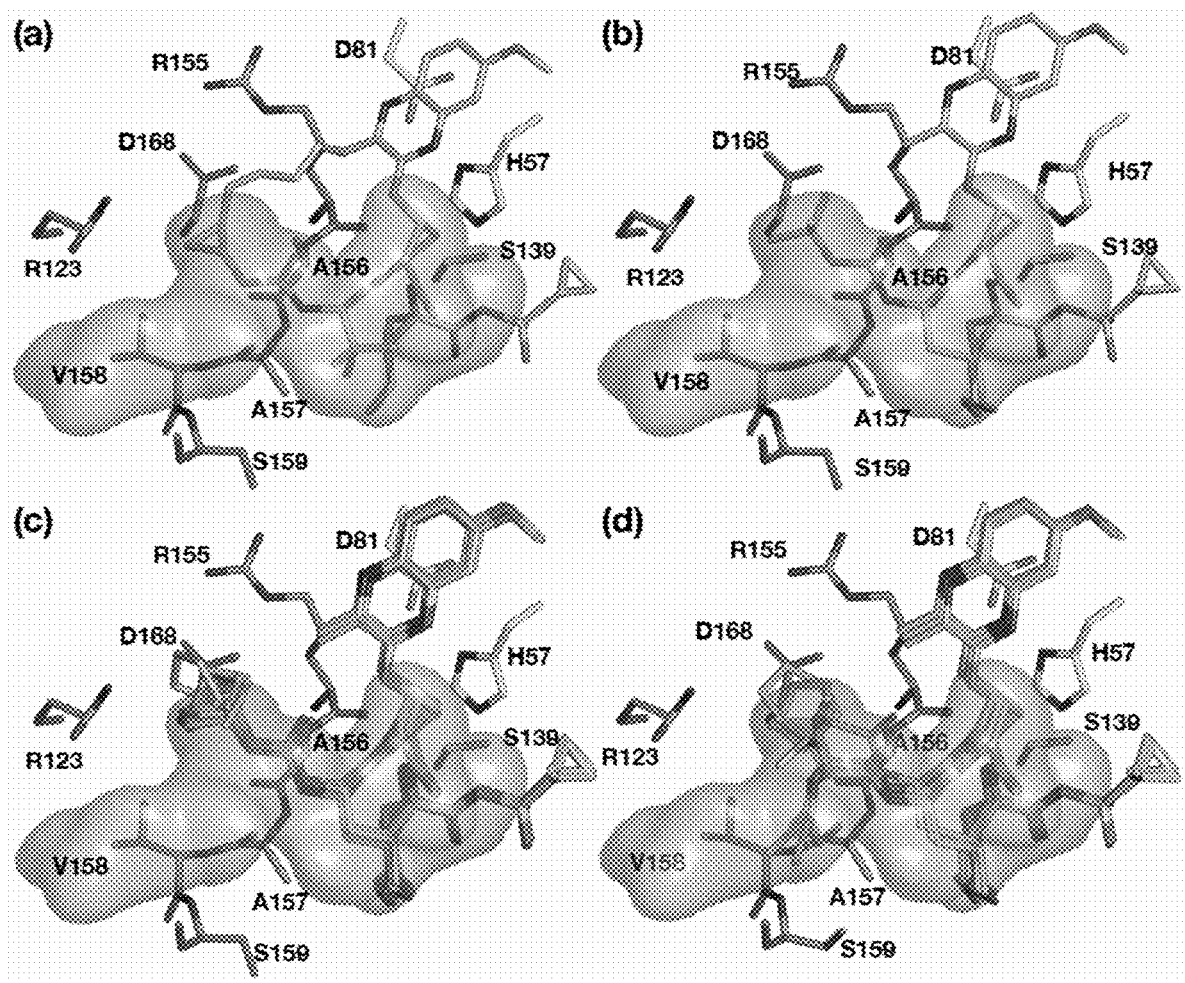

FIG. 3. Fit of NS3/4A protease inhibitors within the substrate envelope.
Inhibitors (a) grazoprevir, (b) parent compound, (c) $P_4$ series ($P_4$-1, $P_4$-2, $P_4$-3, $P_4$-4, $P_4$-5, $P_4$-6, and $P_4$-7) and (d) $P_4P_5$ ($P_4P_5$-2A, $P_4P_5$-2B, $P_4P_5$-4, $P_4P_5$-5, and $P_4P_5$-6) series shown as sticks (orange) in the substrate envelope (blue). The side chains of the catalytic triad and residues surrounding the S4 pocket are shown in the substrate bound conformations as yellow and green sticks, respectively (*R123 has in an alternate conformation in the HCV D168A and $P_4$-5 structure*).

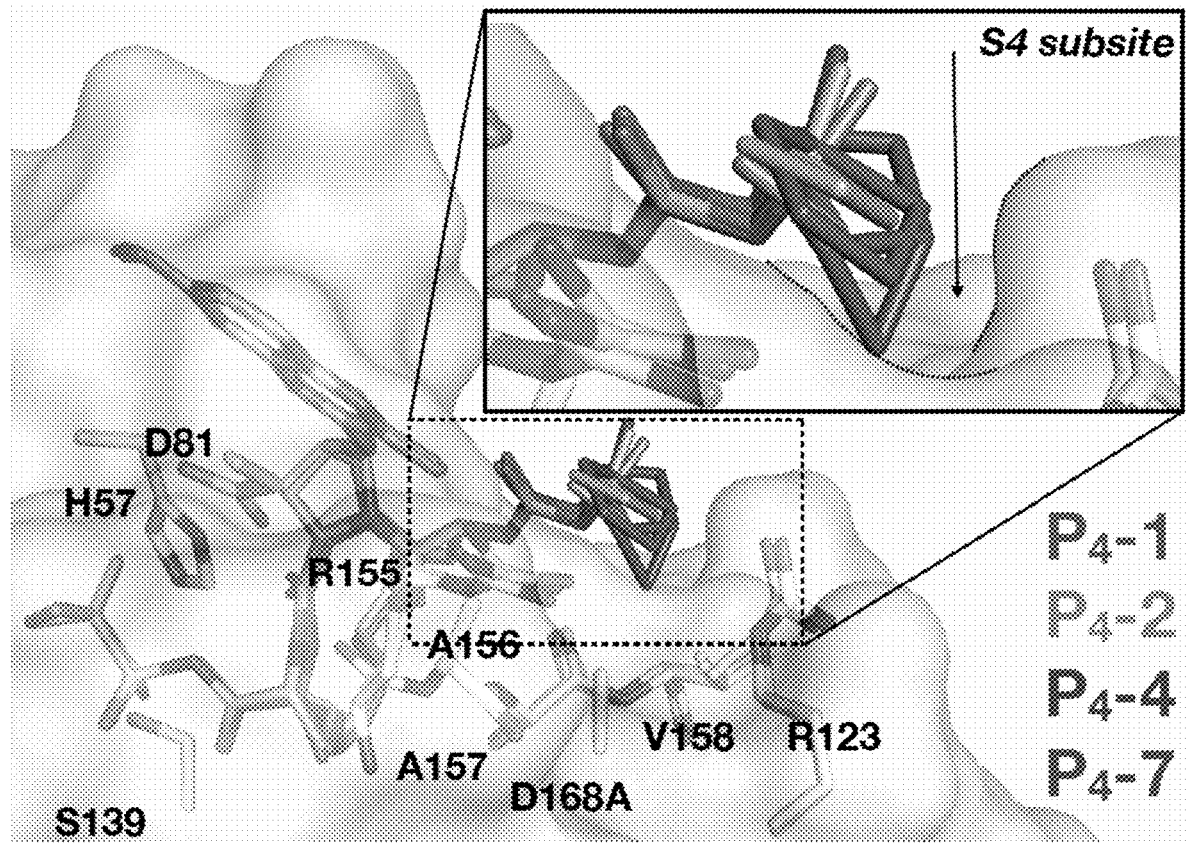

FIG. 4. Filling the S4 subsite of the HCV protease.

Crystal structures of $P_4$-1 (green), $P_4$-2 (cyan), $P_4$-4 (blue), and $P_4$-7 (magenta) bound to D168A HCV protease variant. The protease active site is in surface representation with the residues that make up the S4 pocket in white and the catalytic triad as yellow, both shown as sticks. Ring pucker in addition to van de Waals is needed to optimally fill the S4 subsite

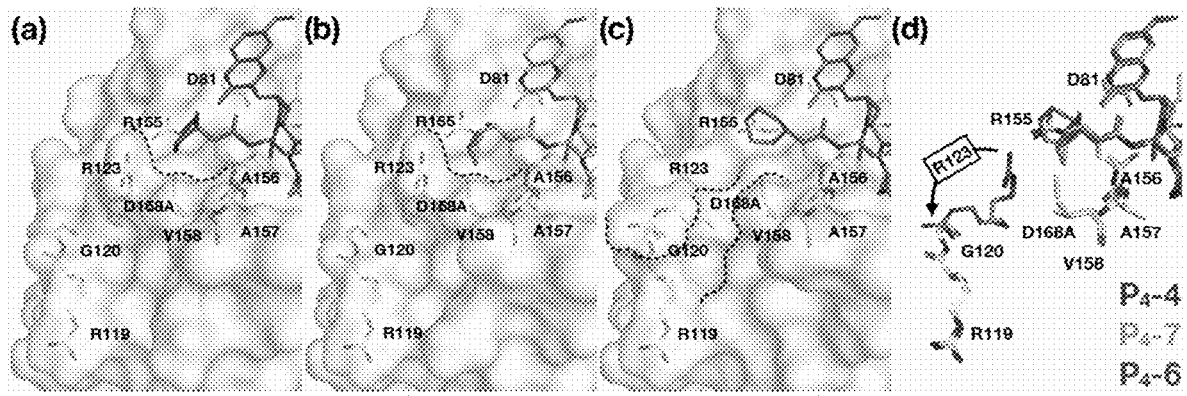

FIG. 5. P₄-6 induces an alternate conformation of R123 thereby reshaping the S4 pocket of HCV NS3/4A protease.

(a) P₄-4, (b) P₄-7, and (c) P₄-6 co-crystal structures in the D168A variant. The protease is in surface representation with the residues that make up the S4 pocket, and arg119 and gly120 in white and the catalytic triad as yellow, both shown as stick. The contour of the S4 pocket is outlined in dotted lines. (d) Superposition of P₄-4 (blue), P₄-7 (orange), and P₄-6 (magenta) with arg123 colored in respective of the inhibitor complex structure.

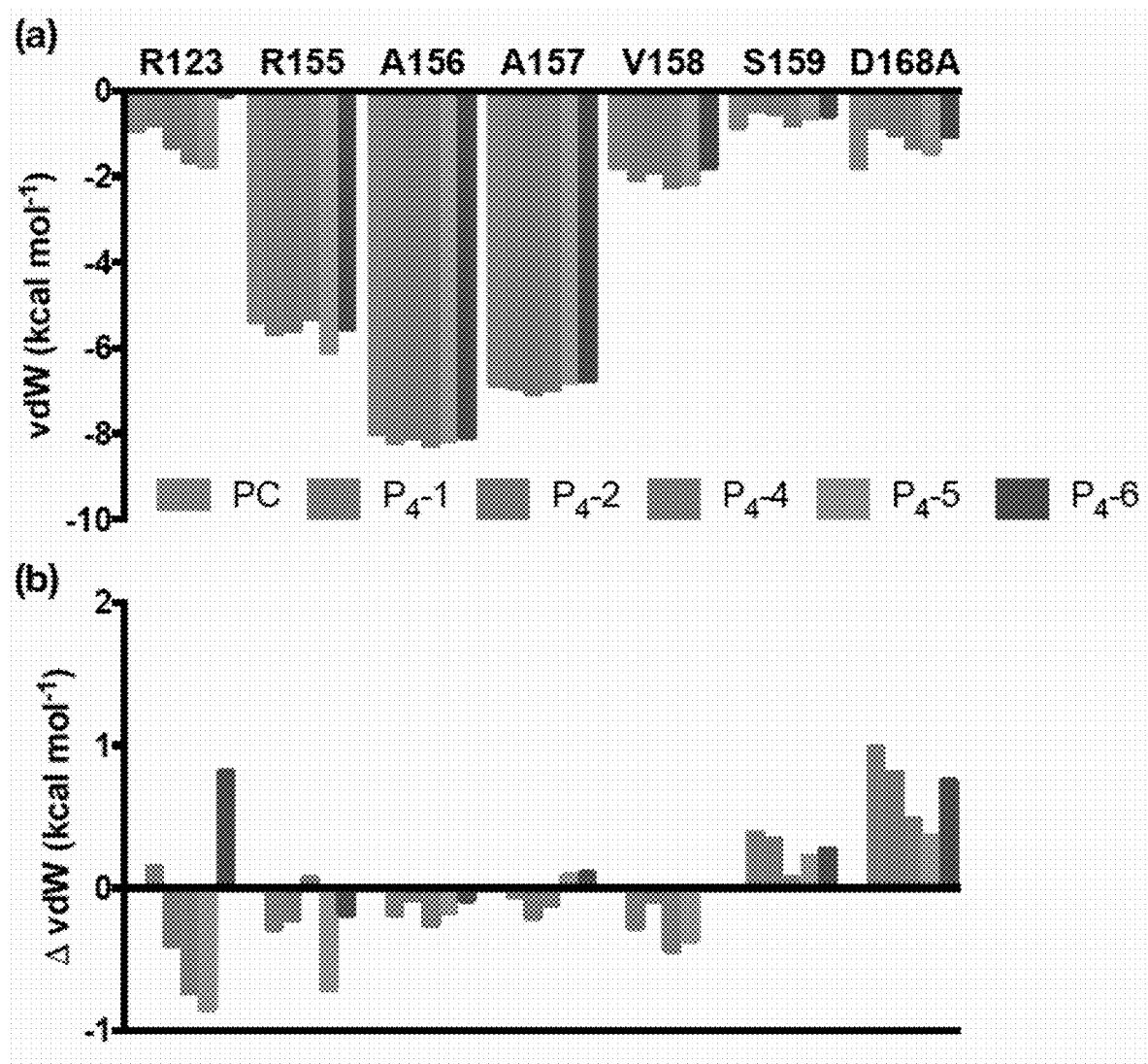

FIG. 6. P4-cap inhibitor interactions with S4 pocket residues of HCV NS3/4A protease. (a) Intermolecular van der Waals (vdW) contact energies for inhibitors with residues forming the S4 pocket in the D168A crystal structures. (b) Change in vdW contacts ($\Delta$vdW) relative to parent compound (PC). PC stands for the parent compounds. Negative values indicate enhanced contacts compared to the parent compound.

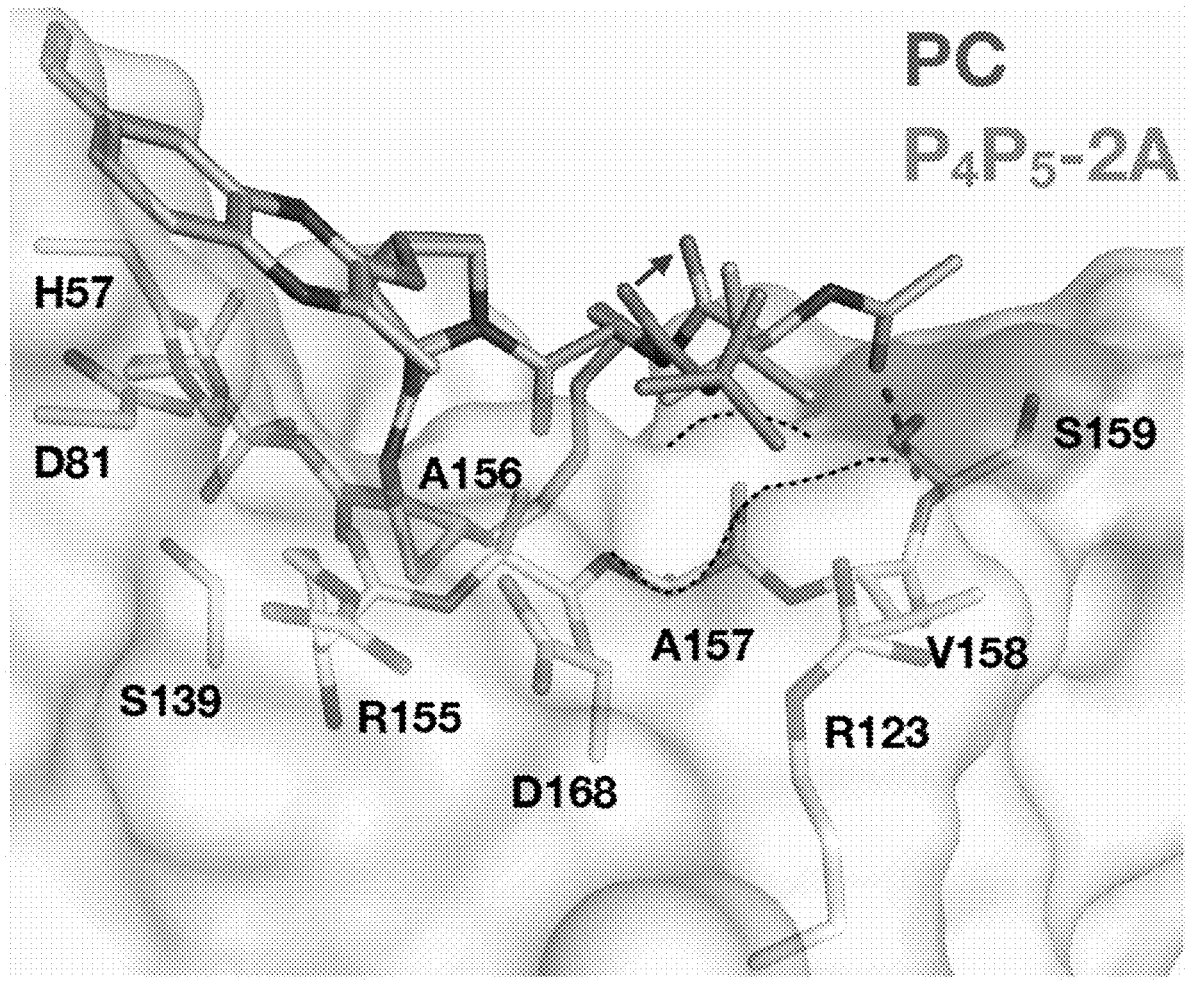

FIG. 7. The P4P5 inhibitors are elevated out of the S4 compared to the P4 inhibitors. Co-crystal structures of the parent compound (PC) (green) and P4P5-2A (cyan) in WT1a protease. The protease is in surface representation, S159 is highlighted in red, with the residues that make up the S4 pocket (white) and the catalytic triad (yellow) are shown as stick and labeled. The contour of the S4 pocket is outlined in black dotted lines. The arrow indicates the displacement of the P4 cap group of the PC relative to the P4 group of P4P5-2A. Hydrogen bond between P4P5-2A and S1159 is shown as gray dashed lines.

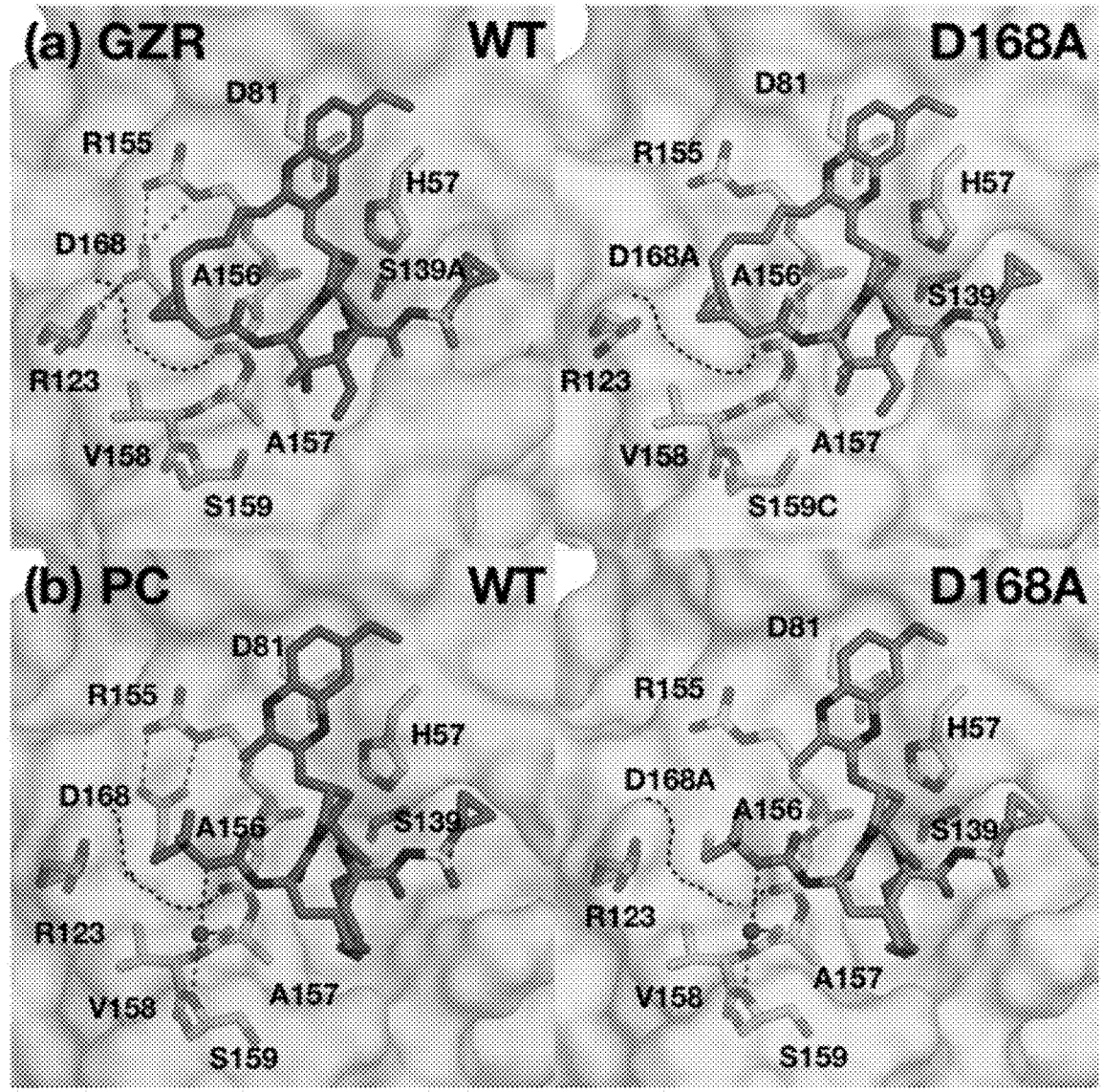

FIG. 8. Binding of grazoprevir and designed PIs to WT and D168A protease active sites. Crystal structures of (a) grazoprevir, (b) parent compounds (c) P4-3 and (d) P4P5-2 bound to wildtype (blue; left) and D168A (orange; right) proteases, respectively. The protease active site is in surface representation with the catalytic triad and S4 subsite residues shown as sticks. Water molecules are shown as non-bonded spheres (red) and hydrogen bonds (gray dashed lines) that stabilize S4 pocket side chains are displayed. Black dashed line outlines the surface of the S4 pocket where the D168A mutation is located.

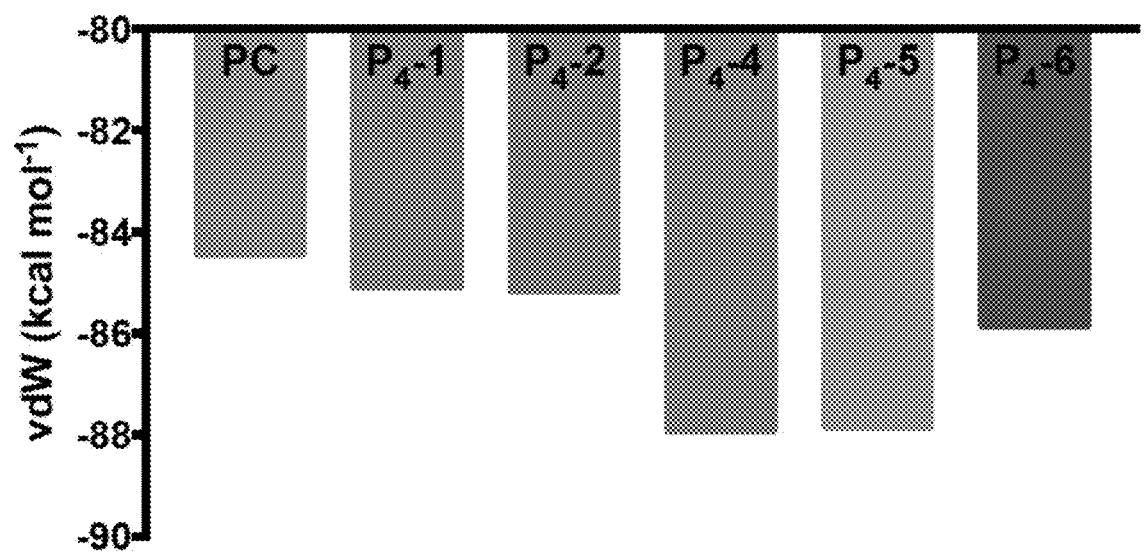
FIG. 9. Total van der Waals of the P4-cap inhibitor with HCV NS3/4A protease.

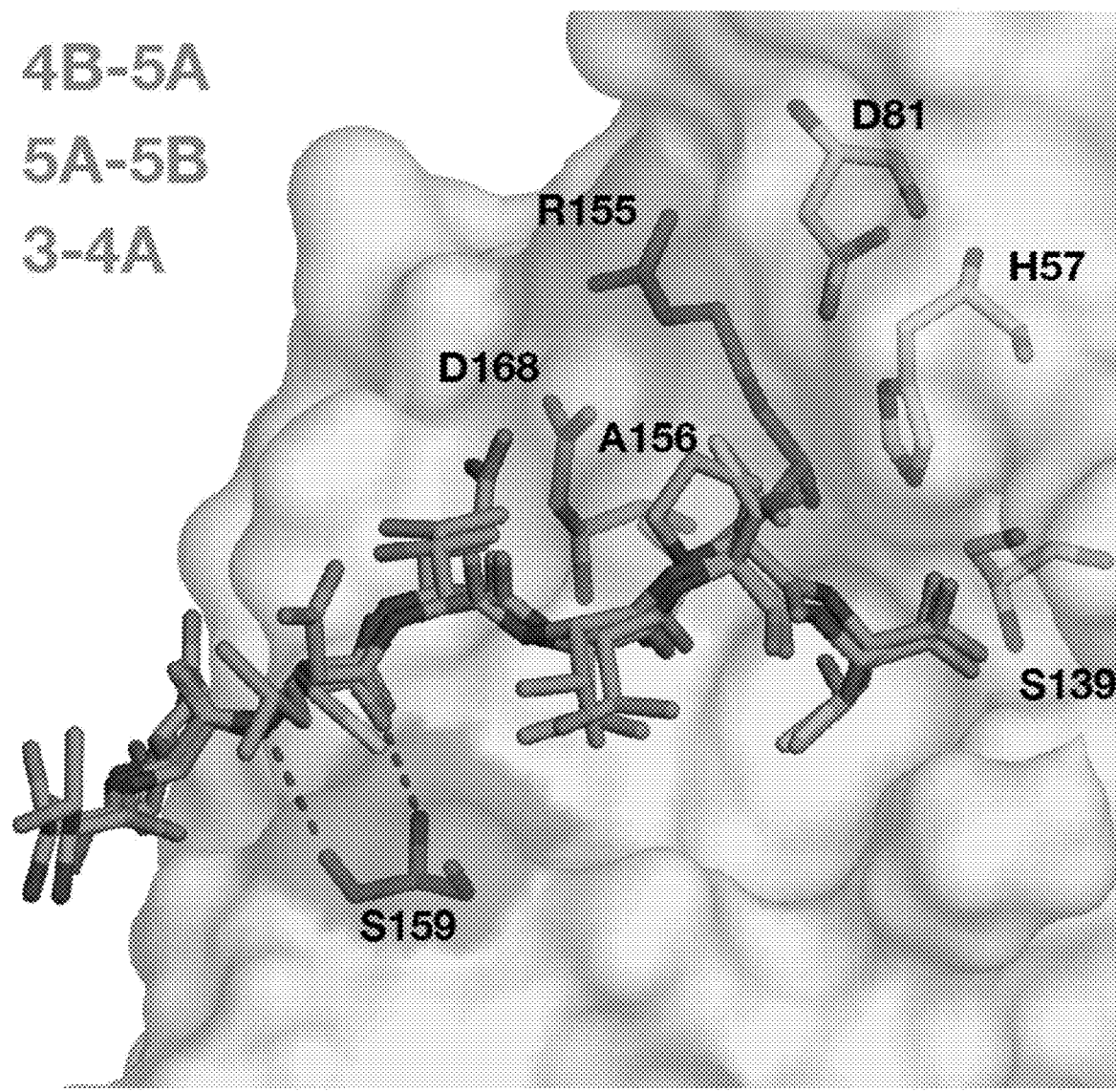
FIG. 10. Substrates form backbone hydrogen bond interaction to S159.
Co-crystal structures of the HCV protease with 4B-5A (3M5N), 5A-5B (3M5O), and 3-4A(1CU1) cleavage sites. The protease is in surface representation, with the catalytic triad (yellow), R155 (purple), D168 (green), A156 (red), and S159 (blue) shown as stick and labeled.

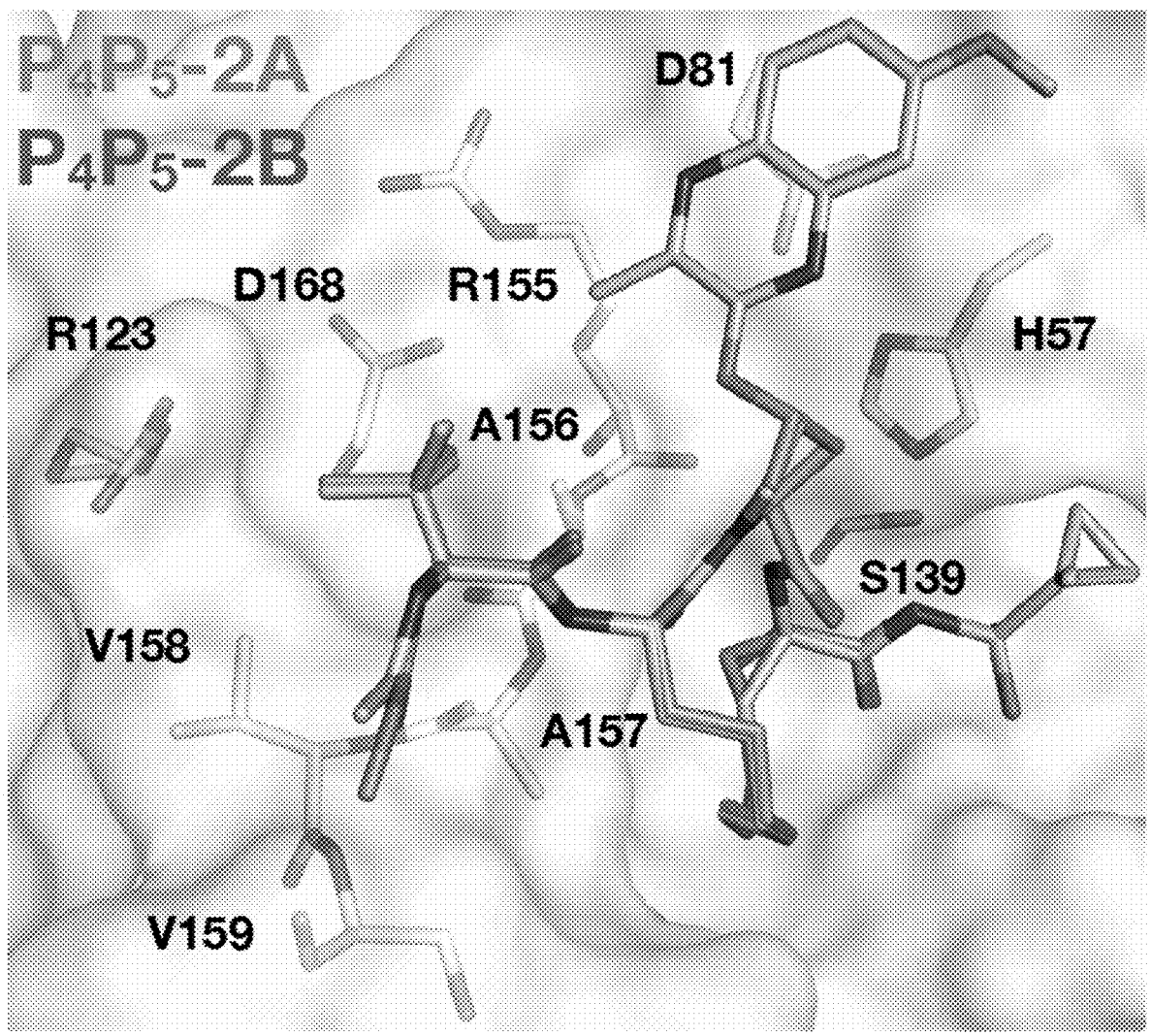
FIG. 11. Acetamide (P₄P₅ A series) and methyl carbamate (P₄P₅ B series) capping group inhibitors have the identical binding mode.
Co-crystal structures of P₄P₅-2A (cyan) and P₄P₅-B (green) in WT1a protease. The protease is in surface representation, with the residues that make up the S4 pocket (white) and the catalytic triad (yellow) are shown as stick and labeled.

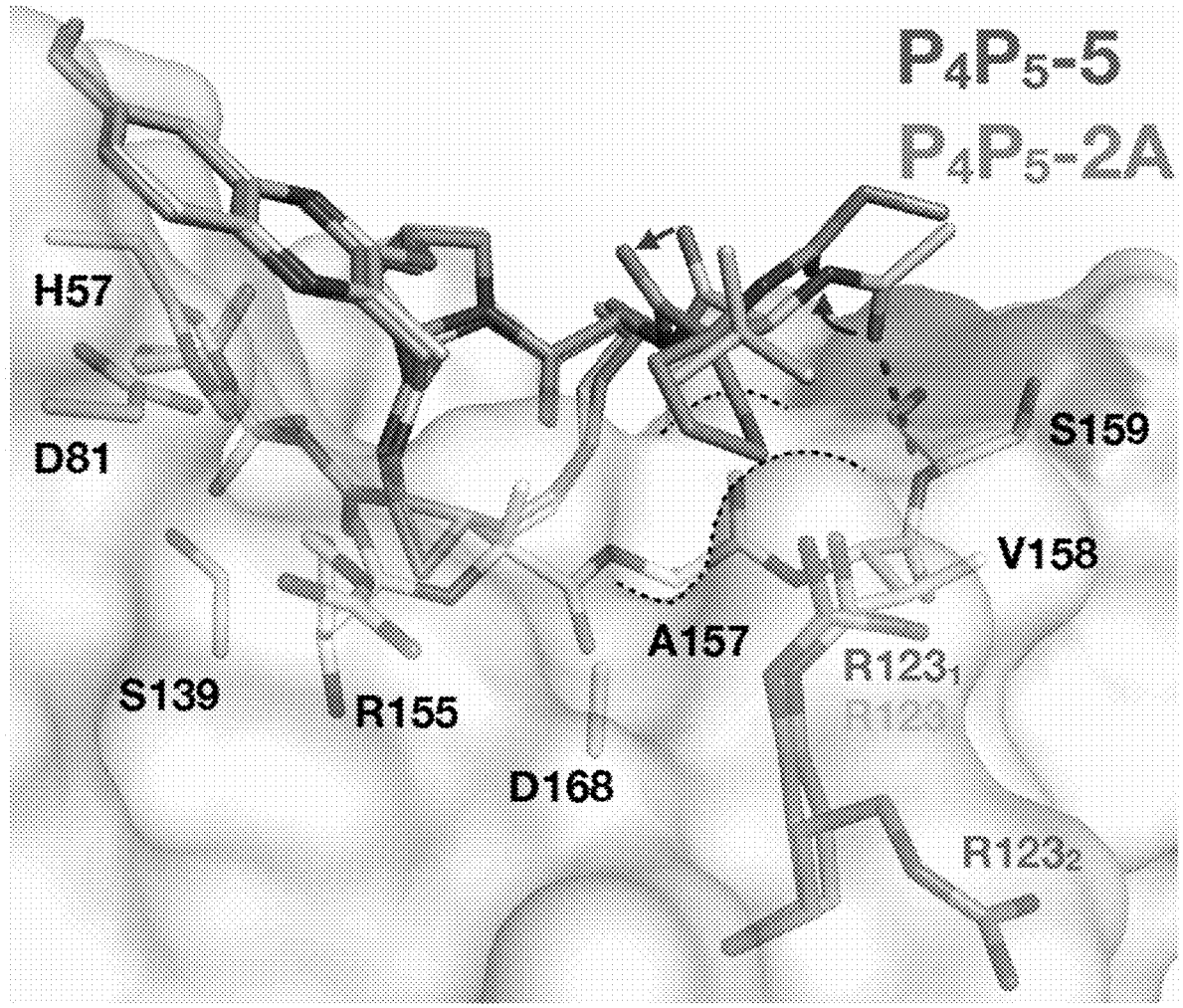

FIG. 12. The capping group P4P5-5 makes no interaction with the protein and loses hydrogen bond with S159.

Co-crystal structures of $P_4P_5$-5 (green) and $P_4P_5$-2A (cyan) in D168A variant. The protease is in surface representation, S159 is highlighted in red, with the residues that make up the S4 pocket (white) the catalytic triad (yellow) are shown as stick and labeled. R123 is in green for the complex structure with $P_4P_5$-5 and in cyan for the $P_4P_5$-2A complex structure. The R123 exits in two conformation in the $P_4P_5$-5 complex structure ($R123_1$ and $R123_2$). The contour of the S4 pocket is outlined in black dotted lines. The arrow indicates the displacement of $P_4P_5$-2A relative to $P_4P_5$-5. The hydrogen bond between $P_4P_5$-2A and S159 is shown as gray dashed lines.

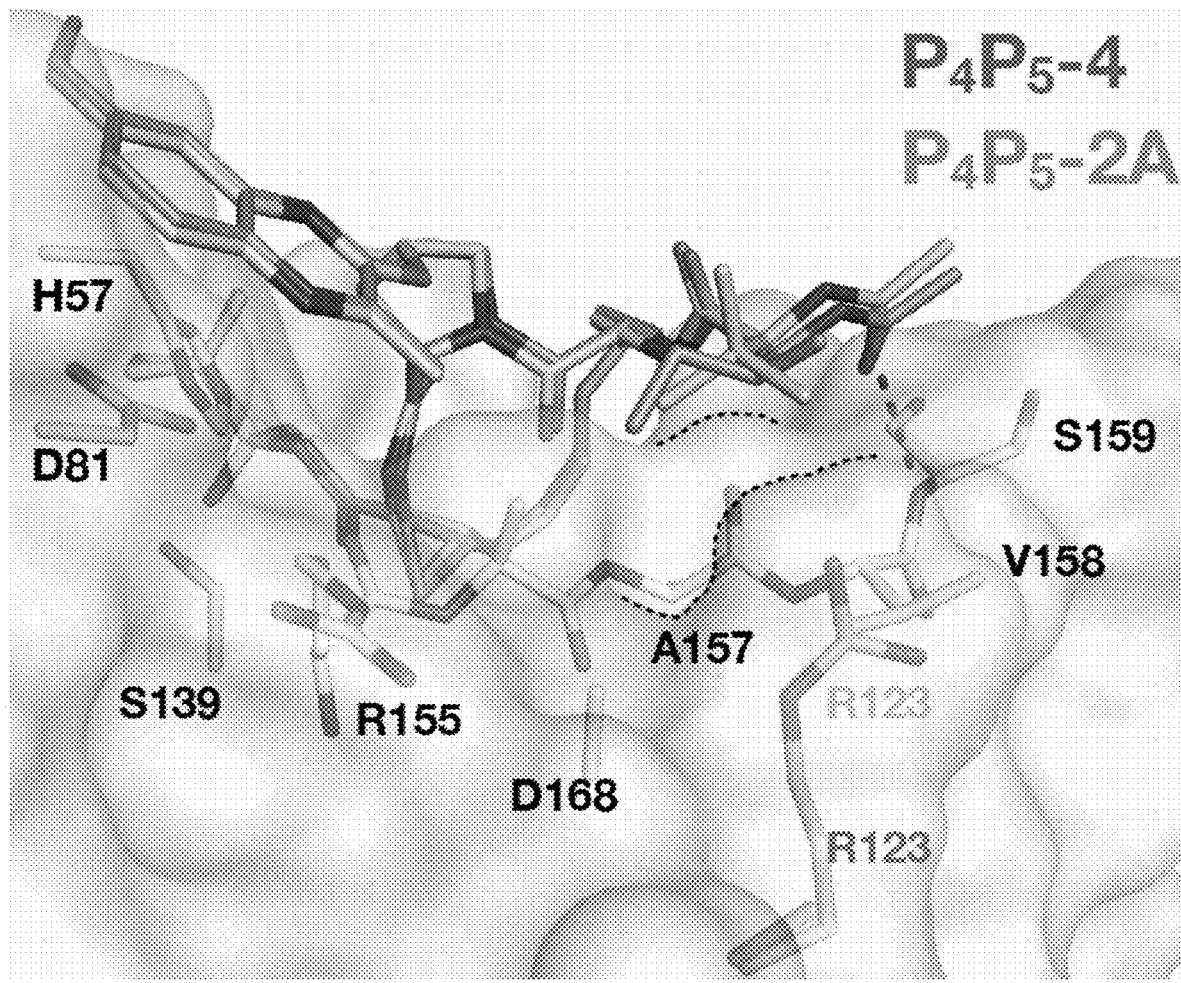

FIG. 13. Towards optimally filling the S4 pocket with $P_4P_5$-4.

Co-crystal structures of $P_4P_5$-4 (green) and $P_4P_5$-2A (cyan) in D168A variant. The protease is in surface representation, S159 is highlighted in red, with the residues that make up the S4 pocket (white) the catalytic triad (yellow) are shown as stick and labeled. R123 is in green for the complex structure with $P_4P_5$-4 (no electron density is seen for the sidechain) and in cyan for the $P_4P_5$-2A complex structures. The contour of the S4 pocket is outlined in black dotted lines. Hydrogen bonds between the P5 cap acetyl group and S159 is shown as gray dashed lines.

HEPATITIS C VIRUS NS3/4A PROTEASE INHIBITORS

PRIORITY CLAIMS AND RELATED APPLICATIONS

This application is the U.S. national phase of and claims priority to PCT/US20/36302, filed Jun. 5, 2020, which claims the benefit of priority from U.S. Provisional Application Ser. No. 62/858,924, filed on Jun. 7, 2019, the entire content of each of which is incorporated herein by reference.

STATEMENT REGARDING FEDERALLY SPONSORED RESEARCH OR DEVELOPMENT

This invention was made with government support under grant numbers AI085051, GM119345 and GM131635 awarded by the National Institutes of Health. The Government has certain rights in the invention.

TECHNICAL FIELDS OF THE INVENTION

The invention generally relates to novel compounds and methods for treating HCV infection. More particularly, the invention relates to novel classes of HCV therapeutics that are orally available, safe and effective HCV NS3/4A protease inhibitors, which are less susceptible to drug resistance than existing therapeutics. The invention also relates to pharmaceutical composition of these compounds and methods of preparation and use thereof.

BACKGROUND OF THE INVENTION

Hepatitis C virus (HCV) is estimated to chronically infect over 71 million people worldwide. The clinical sequelae of HCV infection include chronic liver disease, cirrhosis from prolonged inflammation and hepatocellular carcinoma. Despite advancements in treatment options and outcomes with the development of direct-acting antivirals (DAAs) against essential viral proteins encoded by the HCV genome, drug resistance remains a problem with the rapid emergence of resistance-associated substitutions (RASs) affecting all drug classes. Thus, drugs with increased efficacy and minimized susceptibility to resistance are needed to effectively eradicate HCV infection. (*World Health Organization (WHO). Hepatitis C, Fact Sheet (Updated October* 2017): http://www.who.int/mediacentre/factsheets/fs164/en/, Accessed May 30, 2018; *Guidelines for the screening, care and treatment of persons with chronic hepatitis C infection. Updated version, April* 2016, http://www.who.int/hepatitis/publications/hepatitis-c-guidelines-2016/en/, Accessed May 30, 2018; Asselah, T., et al., *Direct-acting antivirals for the treatment of hepatitis C virus infection: optimizing current IFN-free treatment and future perspectives.* Liver Int., 2016. 36: p. 47-57; Pawlotsky, J. M., *Hepatitis C virus resistance to direct-acting antiviral drugs in interferon-free regimens.* Gastroenterology, 2016. 151(1): p. 70-86; Ng, T. I., et al., *In vitro antiviral activity and resistance profile of the next-generation hepatitis c virus NS3/4A protease inhibitor glecaprevir.* Antimicrob. Agents Chemother. 2017; Zeuzem, S., et al., *Retreatment of HCV with ABT-450 r-ombitasvir and dasabuvir with ribavirin.* N. Engl. J. Med., 2014. 370(17): p. 1604-1614; Sulkowski, M., et al., *Efficacy and safety of 8 weeks versus 12 weeks of treatment with grazoprevir (MK-5172) and elbasvir (MK-8742) with or without ribavirin in patients with hepatitis C virus genotype 1 mono-infection and HIV/hepatitis C virus co-infection (C-WORTHY): a randomised, open-label phase 2 trial.* Lancet, 2015. 385 (9973): p. 1087-1097.)

The NS3/4A protease has been an excellent target for HCV DAAs and a key component of most combination therapies. This essential protease cleaves the HCV polyprotein into functional components necessary for viral replication and maturation. Currently five protease inhibitors (PIs) are FDA approved for the treatment of HCV: simeprevir, paritaprevir, grazoprevir, glecaprevir and voxilaprevir. All these PIs have large heterocyclic P2 moieties that significantly improve potency. (Bartenschlager, R., et al., *Kinetic and structural analyses of hepatitis C virus polyprotein processing.* J. Virol., 1994. 68(8): p. 5045-5055; Rosenquist, Å., et al., *Discovery and development of simeprevir (TMC435), a HCV NS3/4A protease inhibitor.* J. Med. Chem., 2014. 57(5): p. 1673-1693; Pilot-Matias, T., et al., *In vitro and in vivo antiviral activity and resistance profile of the hepatitis C virus NS3/4A protease inhibitor ABT-450.* Antimicrob. Agents Chemother., 2015. 59(2): p. 988-997; Harper, S., et al., *Discovery of MK-5172, a macrocyclic hepatitis C virus NS3/4a protease inhibitor.* ACS Med. Chem. Lett., 2012. 3(4): p. 332-336; Rodriguez-Torres, M., et al., *GS-9857 inpatients with chronic hepatitis C virus genotype 1-4 infection: a randomized, double-blind, dose-ranging phase 1 study.* J. Viral. Hepat., 2016. 23(8): p. 614-622; LaPlante, S. R., et al., *Ligand bioactive conformation plays a critical role in the design of drugs that target the hepatitis C virus NS3 protease.* J. Med. Chem., 2013. 57(5): p. 1777-1789.)

The identity of the P2 moiety strongly influences the inhibitor resistance profile. The P2 moiety of first generation PIs contacts the S2 subsite residues arg155, ala156 and asp168, where the most common RASs occur. Notably, Asp168 has emerged as a key position for resistance conferring substitutions. Substitutions in the protease active site can result in detrimental loss of potency for many PIs. Specifically, Asp168 is a pivotal residue as substitutions at this position often weaken the ability of inhibitors to bind efficiently. Although newer generation inhibitors glecaprevir and voxilaprevir are less susceptible to single Asp168 substitutions, they are still highly susceptible to double substitutions that include changes at Asp168 as well as changes at Ala156 due to their P2-P4 macrocycle. The D168Q polymorphism has rendered HCV genotype 3 "naturally resistant" to most PIs, and Asp168 mutations have emerged in nearly all patients who fail therapy with a PI-containing regimen. Thus, modifications to current PIs to improve potency against Asp168 substitutions can improve pan-genotypic activity and also avoid treatment failure due to resistance-associated substitutions. (Pawlotsky, J. M., *Hepatitis C virus resistance to direct-acting antiviral drugs in interferon-free regimens.* Gastroenterology, 2016. 151(1): p. 70-86; Ng, T. I., et al., *In vitro antiviral activity and resistance profile of the next-generation hepatitis c virus NS3/4A protease inhibitor glecaprevir.* Antimicrob. Agents Chemother., 2017. Romano, K. P., et al., *The molecular basis of drug resistance against hepatitis C virus NS3/4A protease inhibitors.* PLoS Pathog., 2012. 8(7): p. e1002832; Ali, A., et al., *Evaluating the role of macrocycles in the susceptibility of hepatitis C virus NS3/4A protease inhibitors to drug resistance.* ACS Chem. Biol., 2013. 8(7): p. 1469-1478; Soumana, D. I., et al., *Molecular and dynamic mechanism underlying drug resistance in genotype 3 hepatitis C NS3/4A protease.* J. Am. Chem. Soc., 2016. 138(36): p. 11850-11859; Poordad, F., et al., *Glecaprevir/Pibrentasvir* inpatients with hepatitis C virus genotype 1 or 4 and past direct-acting antiviral treatment failure. Hepatology, 2018. 67(4): p. 1253-1260.)

Structurally Asp168 is a critical residue that contributes to an active site electrostatic network necessary for efficient inhibitor binding. High-resolution crystal structures of PIs bound to wildtype and resistant protease variants revealed that disruption of this electrostatic network due to substitutions at Arg155 or Asp168 underlie the mechanism of resistance for most NS3/4A PIs. Drug resistance occurs when the balance between substrate recognition and cleavage is favored over inhibitor binding. The substrate envelope, defines the consensus volume necessary for NS3/4A protease to recognize the viral and host substrate sequences and RASs occur where inhibitors protrude outside the substrate envelope and contact residues of the enzyme that are unessential for substrate recognition. (Romano, K. P., et al., *The molecular basis of drug resistance against hepatitis C virus NS3/4A protease inhibitors*. PLoS Pathog., 2012. 8(7): p. e1002832; O'Meara, J. A., et al., *Molecular mechanism by which a potent hepatitis C virus NS3-NS4A protease inhibitor overcomes emergence of resistance*. J. Biol. Chem., 2013. 288(8): p. 5673-5681; Romano, K. P., et al., *Molecular mechanisms of viral and host cell substrate recognition by hepatitis C virus NS3/4A protease*. J. Virol., 2011. 85(13): p. 6106-6116.)

While protrusion beyond the substrate envelope at the P2 position on the inhibitor scaffold is unavoidable without compromising potency, leveraging evolutionarily constrained residues can circumvent resistance. In the case of grazoprevir (GZR), a P2-P4 macrocyclic inhibitor, the P2 quinoxaline moiety stacks against two residues of the invariant catalytic triad (His57 and Asp81) and minimizes contact with the S2 subsite residues. Mutation of the catalytic triad is not possible while retaining activity, thus decreasing the likelihood of viable resistance. Nevertheless, although the P2-P4 macrocycle of grazoprevir improves inhibitor potency by restricting conformational degrees of freedom, the macrocycle itself protrudes outside the substrate envelope and make contact with non-evolutionary constrained residues causing susceptibility to substitutions in the S2 subsite. Grazoprevir's macrocycle is highly vulnerable to A156T and moderately vulnerable to Asp168 substitutions. Even with these vulnerability to key RASs, given the relatively improved resistance profile and potency of grazoprevir over previous PIs, similar P2-P4 macrocyclic scaffolds have been used in the development of the latest generation of "me-too" inhibitors, glecaprevir and voxilaprevir. (Romano, K. P., et al., *The molecular basis of drug resistance against hepatitis C virus NS3/4A protease inhibitors*. PLoS Pathog., 2012. 8(7): p. e1002832; Soumana, D. I., et al., *Structural and thermodynamic effects of macrocyclization in HCV NS3/4A inhibitor MK-5172*. ACS Chem. Biol., 2016. 11(4): p. 900-909.)

Development of HCV NS3/4A protease inhibitors with pan-genotypic activity and low susceptibility to drug resistance remains challenging but necessary for improving the long-term effectiveness of this drug class. An urgent need exists for improved HCV therapeutics, especially safe and effective HCV NS3/4A protease inhibitors that are also less susceptible to drug resistance than existing therapeutics.

SUMMARY OF THE INVENTION

The invention is based in part on the discovery of orally available, selective and potent and effective HCV NS3/4A protease inhibitors that are less susceptible to drug resistance than currently available drugs. The invention also provides pharmaceutical compositions of these compounds and methods of their preparation and use.

In one aspect, the invention generally relates to a compound having the structural formula (I),

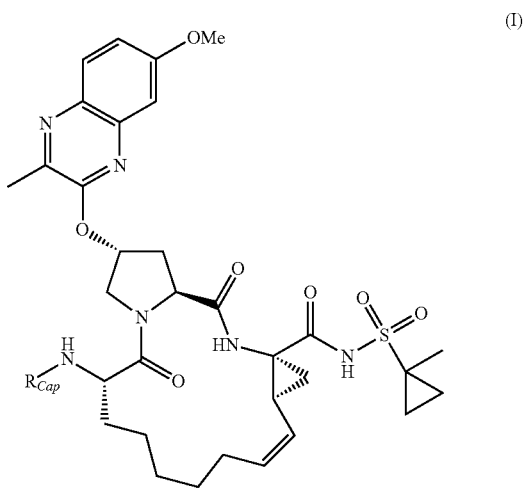

wherein
$R_{Cap}$ is a capping group selected from:

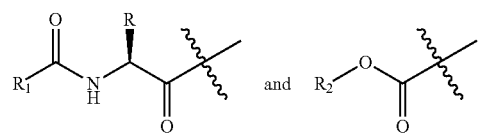

$R_1$ is R' or OR';
$R_2$ is a $C_2$-$C_8$ alkyl group;
R is a $C_2$-$C_8$ alkyl group; and
R' is a $C_1$-$C_3$ alkyl,
or a pharmaceutically acceptable form thereof.

In another aspect, the invention generally relates to a compound having the structural formula (II),

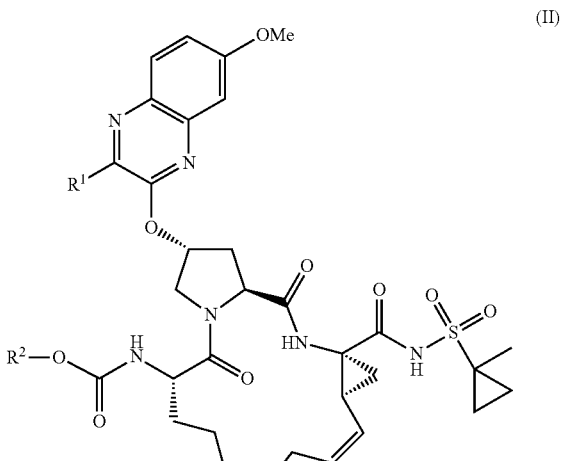

wherein
R$_1$ is CH$_3$ or CF$_3$, and
R$_2$—O is selected from:

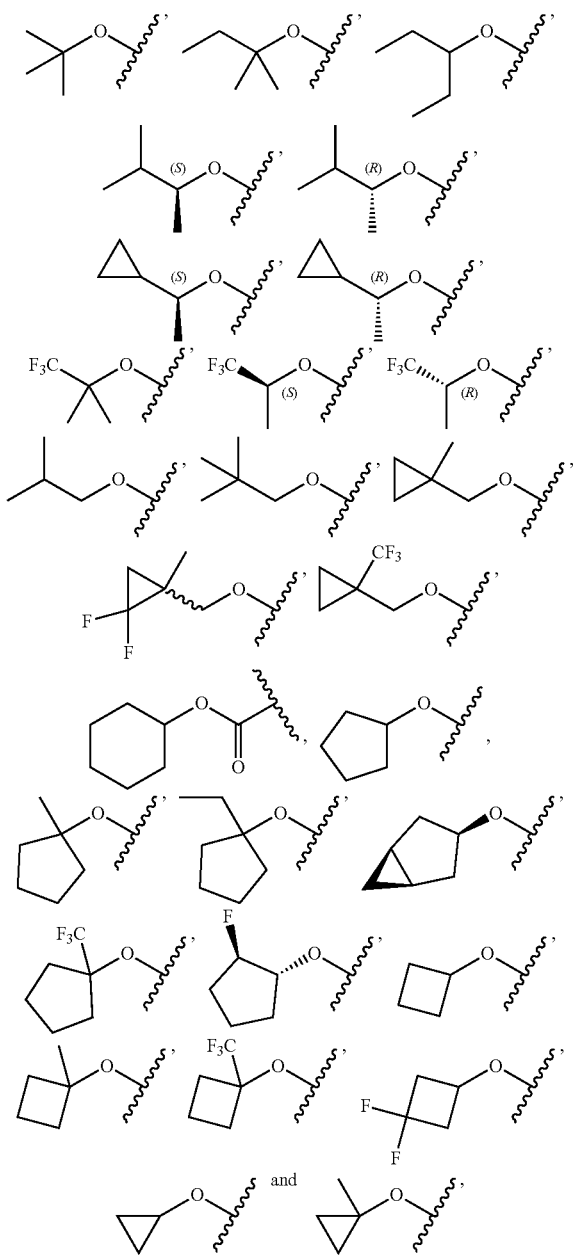

or a pharmaceutically acceptable form thereof.

In yet another aspect, the invention generally relates to a unit dosage form comprising a compound disclosed herein or a pharmaceutical composition disclosed herein.

In yet another aspect, the invention generally relates to a method for treating or reducing HCV infection, or a related disease or disorder, comprising administering to a subject in need thereof a compound disclosed herein, a pharmaceutical composition disclosed herein or a unit dosage form disclosed herein.

In yet another aspect, the invention generally relates to a method for inhibiting or inactivating HCV NS3/4A protease, comprising administering to a subject in need thereof a compound disclosed herein, a pharmaceutical composition disclosed herein or a unit dosage form disclosed herein.

BRIEF DESCRIPTION OF THE DRAWINGS

FIG. 1. Chemical structures of designed HCV NS3/4A protease inhibitors. (a) Grazoprevir (MK-5172) is an FDA-approved PI. Change of the macrocycle location (5172-mcP1P3) and optimization of the P2 quinoxaline moiety led to the parent compound modified in this study. The canonical nomenclature for drug moiety positioning, and the P4 moiety altered are indicated. (b) The inhibitors designed based on the parent compound to 1) optimally fill the S4 pocket by modifying the P4 capping group (P$_4$-1 to P$_4$-7) 2) extend into the SE by incorporating a P4 group with a P5 cap (P$_4$P5-1A to P$_4$P5-6).

FIG. 2. Resistance profile of inhibitors against WT1a and D168A variant. (a) Enzyme inhibition constants of the P$_4$-cap inhibitors against wildtype (blue) and D168A (orange) proteases, and (b) fold change of enzyme inhibitory activity against the D168A variant with respect to wildtype NS3/4A protease. (c) Enzyme inhibition constant and (d) fold change of the P$_4$-P$_5$-cap inhibitors. PC and GZR stand for parent compound and grazoprevir, respectively.

FIG. 3. Fit of NS3/4A protease inhibitors within the substrate envelope. Inhibitors (a) grazoprevir, (b) parent compound, (c) P$_4$ series (P$_4$-1, P$_4$-2, P$_4$-3, P$_4$-4, P$_4$-5, P$_4$-6, and P$_4$-7) and (d) P4P$_5$ (P$_4$P5-2A, P$_4$P5-2B, P$_4$P5-4, P$_4$P5-5, and P$_4$P5-6) series shown as sticks (orange) in the substrate envelope (blue). The side chains of the catalytic triad and residues surrounding the S4 pocket are shown in the substrate bound conformations as yellow and green sticks, respectively (R123 has in an alternate conformation in the HCV D168A and P$_4$-5 structure).

FIG. 4. Filling the S4 subsite of the HCV protease. Crystal structures of P$_4$-1 (green), P$_4$-2 (cyan), P$_4$-4 (blue), and P$_4$-7 (magenta) bound to D168A HCV protease variant. The protease active site is in surface representation with the residues that make up the S4 pocket in white and the catalytic triad as yellow, both shown as sticks. Ring pucker in addition to van de Waals is needed to optimally fill the S4 subsite FIG. 5. P$_4$-6 induces an alternate conformation of R123 thereby reshaping the S4 pocket of HCV NS3/4A protease. (a) P$_4$-4, (b) P$_4$-7, and (c) P$_4$-6 co-crystal structures in the D168A variant. The protease is in surface representation with the residues that make up the S4 pocket, and arg119 and gly120 in white and the catalytic triad as yellow, both shown as stick. The contour of the S4 pocket is outlined in dotted lines. (d) Superposition of P$_4$-4 (blue), P$_4$-7 (orange), and P$_4$-6 (magenta) with arg123 colored in respective of the inhibitor complex structure.

FIG. 6. P4-cap inhibitor interactions with S4 pocket residues of HCV NS3/4A protease. (a) Intermolecular van der Waals (vdW) contact energies for inhibitors with residues forming the S4 pocket in the D168A crystal structures. (b) Change in vdW contacts (ΔvdW) relative to parent compound (PC). PC stands for the parent compounds. Negative values indicate enhanced contacts compared to the parent compound.

FIG. 7. The P$_4$P$_5$ inhibitors are elevated out of the S4 compared to the P$_4$ inhibitors. Co-crystal structures of the parent compound (PC) (green) and P$_4$P5-2A (cyan) in WT1a protease. The protease is in surface representation, with S159 is highlighted in red, with the residues that make up the S4 pocket (white) and the catalytic triad (yellow) are shown as stick and labeled. The contour of the S4 pocket is outlined in black dotted lines. The arrow indicates the displacement of the P4 cap group of the PC relative to the P4 group of P$_4$P5-2A. Hydrogen bond between P$_4$P5-2A and S1159 is shown as gray dashed lines.

FIG. 9. Total van der Waals of the P4-cap inhibitor with HCV NS3/4A protease.

FIG. 10. Substrates form backbone hydrogen bond interaction to S159. Co-crystal structures of the HCV protease with 4B-5A (3M5N), 5A-5B (3M50), and 3-4A(1CU1) cleavage sites. The protease is in surface representation, with the catalytic triad (yellow), R155 (purple), D168 (green), A156 (red), and S159 (blue) shown as stick and labeled.

FIG. 11. Acetamide (P$_4$P$_5$ A series) and methyl carbamate (P$_4$P$_5$ B series) capping group inhibitors have the identical binding mode. Co-crystal structures of P$_4$P5-2A (cyan) and P$_4$P5-B (green) in WT1a protease. The protease is in surface representation, with the residues that make up the S4 pocket (white) and the catalytic triad (yellow) are shown as stick and labeled.

FIG. 12. The capping group P$_4$P5-5 makes no interaction with the protein and loses hydrogen bond with S159. Co-crystal structures of P$_4$P5-5 (green) and P$_4$P5-2A (cyan) in D168A variant. The protease is in surface representation, S159 is highlighted in red, with the residues that make up the S4 pocket (white) the catalytic triad (yellow) are shown as stick and labeled. R123 is in green for the complex structure with P$_4$P5-5 and in cyan for the P$_4$P5-2A complex structure. The R123 exits in two conformation in the P$_4$P5-5 complex structure (R123$_1$ and R123$_2$). The contour of the S4 pocket is outlined in black dotted lines. The arrow indicates the displacement of P$_4$P5-2A relative to P$_4$P5-5. The hydrogen bond between P$_4$P5-2A and S159 is shown as gray dashed lines.

FIG. 13. Towards optimally filling the S4 pocket with P$_4$P5-4. Co-crystal structures of P$_4$P5-4 (green) and P$_4$P5-2A (cyan) in D168A variant. The protease is in surface representation, S159 is highlighted in red, with the residues that make up the S4 pocket (white) the catalytic triad (yellow) are shown as stick and labeled. R123 is in green for the complex structure with P$_4$P5-4 (no electron density is seen for the sidechain) and in cyan for the P$_4$P5-2A complex structures. The contour of the S4 pocket is outlined in black dotted lines. Hydrogen bonds between the P5 cap acetyl group and S159 is shown as gray dashed lines.

DEFINITIONS

Figure 8:
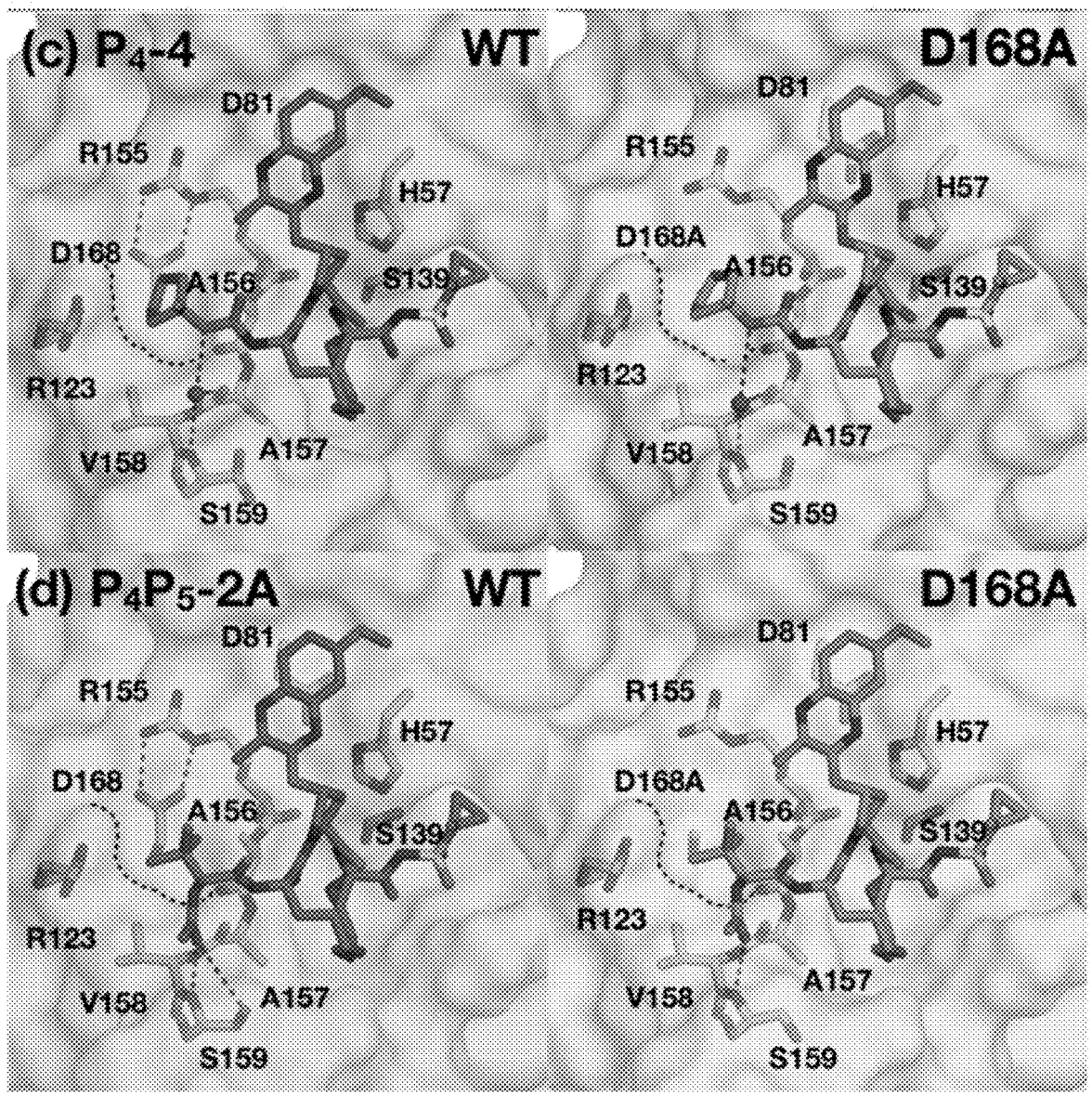
FIG. 8. Binding of grazoprevir and designed PIs to WT and D168A protease active sites. Crystal structures of (a) grazoprevir, (b) parent compounds (c) P$_4$-3 and (d) P$_4$P5-2 bound to wildtype (blue; left) and D168A (orange; right) proteases, respectively. The protease active site is in surface representation with the catalytic triad and S4 subsite residues shown as sticks. Water molecules are shown as non-bonded spheres (red) and hydrogen bonds (gray dashed lines) that stabilize S4 pocket side chains are displayed. Black dashed line outlines the surface of the S4 pocket where the D168A mutation is located.

Unless defined otherwise, all technical and scientific terms used herein have the same meaning as commonly understood by one of ordinary skill in the art to which this invention belongs. General principles of organic chemistry, as well as specific functional moieties and reactivity, are described in "Organic Chemistry", Thomas Sorrell, University Science Books, Sausalito: 1999, and "March's Advanced Organic Chemistry", 5$^{th}$ Ed.: Smith, M. B. and March, J., John Wiley & Sons, New York: 2001, the entire contents of which are hereby incorporated by reference.

Definitions of specific functional groups and chemical terms are described in more detail below. When a range of values is listed, it is intended to encompass each value and sub-range within the range. For example, "C$_{1-6}$ alkyl" is intended to encompass, C$_1$, C$_2$, C$_3$, C$_4$, C$_5$, C$_6$, C$_{1-6}$, C$_{1-5}$, C$_{1-4}$, C$_{1-3}$, C$_{1-2}$, C$_{2-6}$, C$_{2-5}$, C$_{2-4}$, C$_{2-3}$, C$_{3-6}$, C$_{3-5}$, C$_{3-4}$, C$_{4-6}$, C$_{4-5}$, and C$_{5-6}$ alkyl.

As used herein, the term "alkyl" refers to a straight, branched or cyclic hydrocarbon radical consisting solely of carbon and hydrogen atoms, containing no unsaturation, having from one to ten carbon atoms (e.g., C$_{1-10}$ alkyl). Whenever it appears herein, a numerical range such as "1 to 10" refers to each integer in the given range; e.g., "1 to 10 carbon atoms" means that the alkyl group can consist of 1 carbon atom, 2 carbon atoms, 3 carbon atoms, etc., up to and including 10 carbon atoms, although the present definition also covers the occurrence of the term "alkyl" where no numerical range is designated. In some embodiments, "alkyl" can be a C$_{1-6}$ alkyl group. In some embodiments, alkyl groups have 1 to 10, 1 to 8, 1 to 6, or 1 to 3 carbon atoms.

Representative saturated straight chain alkyls include, but are not limited to, -methyl, -ethyl, -n-propyl, -n-butyl, -n-pentyl, and -n-hexyl; while saturated branched alkyls include, but are not limited to, -isopropyl, -sec-butyl, -isobutyl, -tert-butyl, -isopentyl, 2-methylbutyl, 3-methylbutyl, 2-methylpentyl, 3-methylpentyl, 4-methylpentyl, 2-methylhexyl, 3-methylhexyl, 4-methylhexyl, 5-methylhexyl, 2,3-dimethylbutyl, and the like. The alkyl is attached to the parent molecule by a single bond.

Unless stated otherwise in the specification, an alkyl group is optionally substituted by one or more of substituents which independently include: acyl, alkyl, alkenyl, alkynyl, alkoxy, alkylaryl, cycloalkyl, aralkyl, aryl, aryloxy, amino, amido, amidino, imino, azide, carbonate, carbamate, carbonyl, heteroalkyl, heteroaryl, heteroarylalkyl, heterocycloalkyl, hydroxy, cyano, halo (F, Cl, Br, I), haloalkoxy, haloalkyl, ester, ether, mercapto, thio, alkylthio, arylthio, thiocarbonyl, nitro, oxo, phosphate, phosphonate, phosphinate, silyl, sulfinyl, sulfonyl, sulfonamidyl, sulfoxyl, sulfonate, urea, —Si(R$^a$)$_3$, —OR$^a$, —SR$^a$, —OC(O)—R$^a$, —N(R$^a$)$_2$, —C(O)R$_a$, —C(O)OR$^a$, —OC(O)N(R$^a$)$_2$, —C(O)N(R$^a$)$_2$, —N(R$^a$)C(O)OR$^a$, —N(R$^a$)C(O)R$^a$, —N(R$^a$)C(O)N(R$^a$)$_2$, —N(R$^a$)C(NR$^a$)N(R$^a$)$_2$, —N(R$^a$)S(O)$_t$N(R$^a$)$_2$ (where t is 1 or 2), —P(=O)(R$^a$)(R$^a$), or —O—P(=O)(OR$^a$)$_2$ where each R$^a$ is independently hydrogen, alkyl, haloalkyl, carbocyclyl, carbocyclylalkyl, aryl, aralkyl, heterocycloalkyl, heterocycloalkylalkyl, heteroaryl or heteroarylalkyl, and each of these moieties can be optionally substituted as defined herein. In a non-limiting embodiment, a substituted alkyl can be selected from fluoromethyl, difluoromethyl, trifluoromethyl, 2-fluoroethyl, 3-fluoropropyl, hydroxymethyl, 2-hydroxyethyl, 3-hydroxypropyl, benzyl, and phenethyl.

As used herein, a "pharmaceutically acceptable form" of a disclosed compound includes, but is not limited to, pharmaceutically acceptable salts, esters, hydrates, solvates, isomers, prodrugs, and isotopically labeled derivatives thereof. In one embodiment, a "pharmaceutically acceptable form" includes, but is not limited to, pharmaceutically acceptable salts, esters, prodrugs and isotopically labeled derivatives thereof. In some embodiments, a "pharmaceutically acceptable form" includes, but is not limited to, pharmaceutically acceptable isomers and stereoisomers, prodrugs and isotopically labeled derivatives thereof.

In certain embodiments, the pharmaceutically acceptable form is a pharmaceutically acceptable salt. As used herein, the term "pharmaceutically acceptable salt" refers to those salts which are, within the scope of sound medical judgment, suitable for use in contact with the tissues of subjects without undue toxicity, irritation, allergic response and the like, and are commensurate with a reasonable benefit/risk ratio. Pharmaceutically acceptable salts are well known in the art. For example, Berge et al. describes pharmaceutically acceptable salts in detail in J. Pharmaceutical Sciences (1977) 66:1-19. Pharmaceutically acceptable salts of the compounds provided herein include those derived from suitable inorganic and organic acids and bases. Examples of pharmaceutically acceptable, nontoxic acid addition salts are salts of an amino group formed with inorganic acids such as hydrochloric acid, hydrobromic acid, phosphoric acid, sulfuric acid and perchloric acid or with organic acids such as acetic acid, oxalic acid, maleic acid, tartaric acid, citric acid, succinic acid or malonic acid or by using other methods used in the art such as ion exchange. Other pharmaceutically acceptable salts include adipate, alginate, ascorbate, aspartate, benzenesulfonate, besylate, benzoate, bisulfate, borate, butyrate, camphorate, camphorsulfonate, citrate, cyclopentanepropionate, digluconate, dodecylsulfate, ethanesulfonate, formate, fumarate, glucoheptonate, glycerophosphate, gluconate, hemisulfate, heptanoate, hexanoate, hydroiodide, 2-hydroxy-ethanesulfonate, lactobionate, lactate, laurate, lauryl sulfate, malate, maleate, malonate, methanesulfonate, 2-naphthalenesulfonate, nicotinate, nitrate, oleate, oxalate, palmitate, pamoate, pectinate, persulfate, 3-phenylpropionate, phosphate, picrate, pivalate, propionate, stearate, succinate, sulfate, tartrate, thiocyanate, p-toluenesulfonate, undecanoate, valerate salts, and the like. In some embodiments, organic acids from which salts can be derived include, for example, acetic acid, propionic acid, glycolic acid, pyruvic acid, oxalic acid, lactic acid, trifluoracetic acid, maleic acid, malonic acid, succinic acid, fumaric acid, tartaric acid, citric acid, benzoic acid, cinnamic acid, mandelic acid, methanesulfonic acid, ethanesulfonic acid, p-toluenesulfonic acid, salicylic acid, and the like.

The salts can be prepared in situ during the isolation and purification of the disclosed compounds, or separately, such as by reacting the free base or free acid of a parent compound with a suitable base or acid, respectively. Pharmaceutically acceptable salts derived from appropriate bases include alkali metal, alkaline earth metal, ammonium and $N^+(C_{1-4}alkyl)_4$ salts. Representative alkali or alkaline earth metal salts include sodium, lithium, potassium, calcium, magnesium, iron, zinc, copper, manganese, aluminum, and the like. Further pharmaceutically acceptable salts include, when appropriate, nontoxic ammonium, quaternary ammonium, and amine cations formed using counterions such as halide, hydroxide, carboxylate, sulfate, phosphate, nitrate, lower alkyl sulfonate and aryl sulfonate. Organic bases from which salts can be derived include, for example, primary, secondary, and tertiary amines, substituted amines, including naturally occurring substituted amines, cyclic amines, basic ion exchange resins, and the like, such as isopropylamine, trimethylamine, diethylamine, triethylamine, tripropylamine, and ethanolamine. In some embodiments, the pharmaceutically acceptable base addition salt can be chosen from ammonium, potassium, sodium, calcium, and magnesium salts.

In certain embodiments, the pharmaceutically acceptable form is a "solvate" (e.g., a hydrate). As used herein, the term "solvate" refers to compounds that further include a stoichiometric or non-stoichiometric amount of solvent bound by non-covalent intermolecular forces. The solvate can be of a disclosed compound or a pharmaceutically acceptable salt thereof. Where the solvent is water, the solvate is a "hydrate". Pharmaceutically acceptable solvates and hydrates are complexes that, for example, can include 1 to about 100, or 1 to about 10, or 1 to about 2, about 3 or about 4, solvent or water molecules. It will be understood that the term "compound" as used herein encompasses the compound and solvates of the compound, as well as mixtures thereof.

In certain embodiments, the pharmaceutically acceptable form is a prodrug. As used herein, the term "prodrug" (or "pro-drug") refers to compounds that are transformed in vivo to yield a disclosed compound or a pharmaceutically acceptable form of the compound. A prodrug can be inactive when administered to a subject, but is converted in vivo to an active compound, for example, by hydrolysis (e.g., hydrolysis in blood). In certain cases, a prodrug has improved physical and/or delivery properties over the parent compound. Prodrugs can increase the bioavailability of the compound when administered to a subject (e.g., by permitting enhanced absorption into the blood following oral administration) or which enhance delivery to a biological compartment of interest (e.g., the brain or lymphatic system) relative to the parent compound. Exemplary prodrugs include derivatives of a disclosed compound with enhanced aqueous solubility or active transport through the gut membrane, relative to the parent compound.

The prodrug compound often offers advantages of solubility, tissue compatibility or delayed release in a mammalian organism (see, e.g., Bundgard, H., *Design of Prodrugs* (1985), pp. 7-9, 21-24 (Elsevier, Amsterdam). A discussion of prodrugs is provided in Higuchi, T., et al., "Pro-drugs as Novel Delivery Systems," *A.C.S. Symposium Series*, Vol. 14, and in *Bioreversible Carriers in Drug Design*, ed. Edward B. Roche, American Pharmaceutical Association and Pergamon Press, 1987, both of which are incorporated in full by reference herein. Exemplary advantages of a prodrug can include, but are not limited to, its physical properties, such as enhanced water solubility for parenteral administration at physiological pH compared to the parent compound, or it can enhance absorption from the digestive tract, or it can enhance drug stability for long-term storage.

As used herein, the term "pharmaceutically acceptable" excipient, carrier, or diluent refers to a pharmaceutically acceptable material, composition or vehicle, such as a liquid or solid filler, diluent, excipient, solvent or encapsulating material, involved in carrying or transporting the subject pharmaceutical agent from one organ, or portion of the body, to another organ, or portion of the body. Each carrier must be "acceptable" in the sense of being compatible with the other ingredients of the formulation and not injurious to the patient. Some examples of materials which can serve as pharmaceutically-acceptable carriers include: sugars, such as lactose, glucose and sucrose; starches, such as corn starch and potato starch; cellulose, and its derivatives, such as sodium carboxymethyl cellulose, ethyl cellulose and cellulose acetate; powdered tragacanth; malt; gelatin; talc; excipients, such as cocoa butter and suppository waxes; oils, such as peanut oil, cottonseed oil, safflower oil, sesame oil, olive oil, corn oil and soybean oil; glycols, such as propylene glycol; polyols, such as glycerin, sorbitol, mannitol and polyethylene glycol; esters, such as ethyl oleate and ethyl laurate; agar; buffering agents, such as magnesium hydroxide and aluminum hydroxide; alginic acid; pyrogen-free water; isotonic saline; Ringer's solution; ethyl alcohol;

phosphate buffer solutions; and other non-toxic compatible substances employed in pharmaceutical formulations. Wetting agents, emulsifiers and lubricants, such as sodium lauryl sulfate, magnesium stearate, and polyethylene oxide-polypropylene oxide copolymer as well as coloring agents, release agents, coating agents, sweetening, flavoring and perfuming agents, preservatives and antioxidants can also be present in the compositions.

As used herein, the terms "isolated" or "purified" refer to a material that is substantially or essentially free from components that normally accompany it in its native state. Purity and homogeneity are typically determined using analytical chemistry techniques such as polyacrylamide gel electrophoresis or high-performance liquid chromatography.

DETAILED DESCRIPTION OF THE INVENTION

The invention provides novel, orally available, selective and potent HCV therapeutics that are safe and effective HCV NS3/4A protease inhibitors and are less susceptible to drug resistance than currently available drugs. The invention also provides pharmaceutical compositions of these compounds and methods of their preparation and use.

More particularly, novel series of inhibitors are disclosed herein, which were designed and developed using the substrate envelope model that retain potency against GT1a WT and D168A resistant variant to avoid drug resistance. Starting with 5172-mcP1P3 a series of $P_4$-cap and $P_4P5$-cap inhibitors were made. While existing HCV PI's mainly span the P1'-P4 positions, we leverage a conserved region of the substrate envelope that is virtually untapped and incorporate two sets of modifications extending the inhibitors into the P4-P5 positions. (Özen, A., W. Sherman, and C. A. Schiffer, *Improving the resistance profile of hepatitis C NS3/4A inhibitors: dynamic substrate envelope guided design*. J. Chem. Theory Comput., 2013. 9(12): p. 5693-5705.) The inhibitors designed to fit within the substrate envelope had a flatter binding profile against D168A compared to FDA-approved drug grazoprevir. Notably, the $P_4$ series designed to optimally fill the S4 pocket were more potent compared to the $P_4P_5$ equivalent against both GT1a WT and the D168A variant. Thus substrate-envelope-guided design has been successfully incorporated in the drug design process to provide inhibitors that are potent and less susceptible to resistance. Exemplary inhibitors disclosed here showed a 20-fold greater potency compared to grazoprevir against the D168A mutation, a highly resistant variant that is commonly observed in patients who fail combination therapy.

Drug resistance is a major obstacle in the design of inhibitors that remain active against rapidly evolving drug targets. As is the case with HCV, the emergence of resistance due to low fidelity of the NS5B RdRp leads to a heterogeneous population of viral species in the infected patient. Thus, to combat resistance, exploiting evolutionarily conserved regions in the protease active site is one strategy that may provide more "resistance-proof" inhibitors. The substrate envelope model offers a guide in structure-based drug design allowing inhibitors to mimic substrates and avoid interactions with residues that are unessential in substrate processing. Protrusion out of the envelope while filling an active site cavity can cause vulnerability to resistance mutations. In this study, we demonstrate that the substrate envelope can successfully guide the design of inhibitors with improved resistance profiles and potency against the pivotal D168A drug resistant variant in HCV protease.

To lose the vulnerability of the P2-P4 macrocycle of grazoprevir we replaced it with a P1-P3 macrocycle previously used in danoprevir to obtain inhibitors that can avoid resistance while retaining potency. The first inhibitor in this series was, 5172-mcP1P3, which was less susceptible to single site RASs, particularly A156T and the crystal structure validated that the P2 quinoxaline binding mode of grazoprevir was retained. (Harper, S., et al., *Discovery of MK-5172, a macrocyclic hepatitis C virus NS3/4a protease inhibitor*. ACS Med. Chem. Lett., 2012. 3(4): p. 332-336; Ali, A., et al., *Evaluating the role of macrocycles in the susceptibility of hepatitis C virus NS3/4A protease inhibitors to drug resistance*. ACS Chem. Biol., 2013. 8(7): p. 1469-1478; Soumana, D. I., et al., *Structural and thermodynamic effects of macrocyclization in HCV NS3/4A inhibitor MK-5172*. ACS Chem. Biol., 2016. 11(4): p. 900-909.)

Further modifications at the 3-position of the quinoxaline moiety of the 5172-mcP1P3 scaffold revealed that maintaining activity against resistant variants required limited contact with S2 subsite residues. The resulting inhibitor (FIG. 1) achieved a flatter resistance profile and avoided susceptibility to A156T. While this was a key proof-of-principle that fitting within the substrate envelope was critical to maintaining a flat profile against resistance, our objective is to regain potency while maintaining the flat profile. (Özen, A., W. Sherman, and C. A. Schiffer, *Improving the resistance profile of hepatitis C NS3/4A inhibitors: dynamic substrate envelope guided design*. J. Chem. Theory Comput., 2013. 9(12): p. 5693-5705.)

To optimize interaction in the S4 pocket, we designed novel PIs with increasingly hydrophobic and bulky P4 cap groups ($P_4$ series) or a P4 modified amino acid with either an acetamide group ($P_4P_5$ A series) or a methyl carbamate group ($P_4P_5$ B series) P5 cap. Previous structure-activity relationship studies of P4 capping groups on the asunaprevir scaffold have led to the development of more potent PIs with improved pharmacokinetic profiles. (Sun, L. Q., et al., *Discovery of a Potent Acyclic, Tripeptidic, Acyl Sulfonamide Inhibitor of Hepatitis C Virus NS3 Protease as a Back-up to Asunaprevir with the Potential for Once-Daily Dosing*. J Med Chem, 2016. 59(17): p. 8042-60.) However, previous inhibitors were not designed based on the grazoprevir scaffold nor in the context of the substrate envelope, and were only tested for activity against wildtype protease not resistant variants. Both classes of our novel substrate envelope guided inhibitors had much better resistance profiles compared to grazoprevir. Moreover, the binding affinity of $P_4$P5-6 and $P_4$-7 are comparable to grazoprevir against WT.

The $P_4P_5$ inhibitors extended into the substrate envelope did not optimally fill the S4 pocket, causing a frustrated pocket that cannot be filled by water, a protein side chain or the inhibitor, which is further destabilized in the D168A substitution. As a result, the $P_4P_5$ inhibitors were less potent relative to the parent compound or the FDA-approved grazoprevir. The molecular mechanism underlying relatively low potency and resistance resembles cavity-creating mutations that destabilize protein structures. (Eriksson, A. E., et al., *Response of a protein structure to cavity-creating mutations and its relation to the hydrophobic effect*. Science, 1992. 255(5041): p. 178-183.) Unsolvated nonpolar cavities can be unfavorable for ligand binding as well, and targeted to significantly increase ligand affinity. (Krimmer, S. G., et al., *How Nothing Boosts Affinity: Hydrophobic Ligand Binding to the Virtually Vacated S1' Pocket of Thermolysin*. J Am Chem Soc, 2017. 139(30): p. 10419-10431.) For better potency, $P_4P_5$ inhibitors would need to incorporate D-form amino acids in the P4 position to direct the sidechain into the S4 pocket. Employing a bump-and-hole principle to increase steric complementarity between the ligand and target is common in structure based drug design. However, often solvation of the empty pocket or creation of an enclosed cavity, and the substrate envelope model, is not taken into account in the design process. Thus, to increase potency and resistance profile simultaneously, we propose a substrate envelope guided approach to optimally fill active site pockets.

In contrast to the $P_4P_5$ series, the $P_4$ inhibitors adequately fill the S4 pocket, with the exception of $P_4$-6 which changes the architecture of the pocket by inducing an alternate conformation of R123. We found that modifications to the P4 capping group can stabilize the mutated S4 pocket in D168A protease. More importantly, all the $P_4$ inhibitors had better potency against D168A protease than grazoprevir, and much better potency against WT and D168A compared to the parent compound. Thus, we were able to successfully regain potency sacrificed by moving the P2-P4 macrocycle to the P1-P3 position, while decreasing the susceptibility to resistant variants. The fit of the inhibitor in the substrate envelope and optimal filling of the S4 pocket is necessary to avoid resistance and improve potency.

While older generation HCV PIs were susceptible to single-site resistant substitutions at R155K, A156T and D168A, all within the S4 subsite, the most recent FDA-approved PIs are less susceptible to R155K. Grazoprevir, with a P2 quinoxaline that binds on the catalytic residues His57 and Asp81, provides an inhibitor scaffold that is not susceptible to R155K substitutions due to limited interactions with this residue. Three (Grazoprevir, voxilaprevir, and Glecaprevir) of the seven HCV PIs currently on the market, share a very similar P2-P4 macrocycle scaffold, and are highly susceptible to A156T substitution due to steric clash with the macrocycle. (Ng, T. I., et al., *In vitro antiviral activity and resistance profile of the next-generation hepatitis c virus NS3/4A protease inhibitor glecaprevir*. Antimicrob. Agents Chemother., 2017; Romano, K. P., et al., *The molecular basis of drug resistance against hepatitis C virus NS3/4A protease inhibitors*. PLoS Pathog., 2012. 8(7): p. e1002832; Ali, A., et al., *Evaluating the role of macrocycles in the susceptibility of hepatitis C virus NS3/4A protease inhibitors to drug resistance*. ACS Chem. Biol., 2013. 8(7): p. 1469-1478; Romano, K. P., et al., *Molecular mechanisms of viral and host cell substrate recognition by hepatitis C virus NS3/4A protease*. J. Virol., 2011. 85(13): p. 6106-6116; Soumana, D. I., et al., *Structural and thermodynamic effects of macrocyclization in HCV NS3/4A inhibitor MK-5172*. ACS Chem. Biol., 2016. 11(4): p. 900-909.)

Previously we demonstrated that moving grazoprevir's P2-P4 macrocycle to the P1-P3 position led to the development of analogs that have reduced susceptibility to R155K and A156T substitutions but were still susceptible to D168A. (Matthew, A. N., et al., *Hepatitis c virus NS3/4A protease inhibitors incorporating flexible P2 quinoxalines target drug resistant viral variants*. J. Med. Chem., 2017. 60(13): p. 5699-5716.)

In this study, we have demonstrated that further optimization of t5172-mcP1P3 in conserved regions of the substrate envelope, specifically the P4 region, is a viable strategy to improve both resistance profiles and potency to resistant variants beyond that of existing FDA inhibitors.

In a quickly evolving drug targets having inhibitors that binds with high potency to the wildtype form of the target is not sufficient, inhibiting resistance-associated substitutions within the target is necessary. Leveraging evolutionarily conserved regions of the target, especially the substrate-binding interactions, is critical to design such inhibitors. The substrate envelope model provides a rational and broadly applicable design strategy toward this goal, for the identification of inhibitors that are more robust against drug resistant variants.

Thus, in one aspect, the invention generally relates to a compound having the structural formula (I), (I)

wherein $R_{cap}$ is a capping group selected from:

$R_1$ is R' or OR';

$R_2$ is a $C_2$-$C_8$ alkyl group;

R is a $C_2$-$C_8$ alkyl group; and

R' is a $C_1$-$C_3$ alkyl, or a pharmaceutically acceptable form thereof.

In certain embodiments, $R_{cap}$ is

In certain embodiments, $R_{cap}$ is

In certain embodiments, the structural formula (I$_a$):

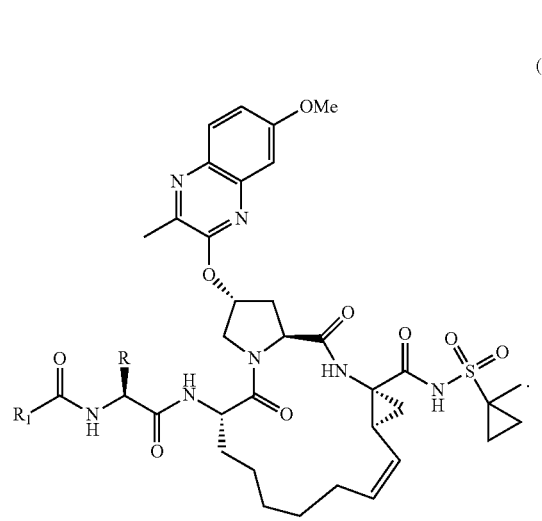

(I$_a$)

In certain embodiments, R$_1$ is methyl.
In certain embodiments, R$_1$ is O-methyl.
In certain embodiments, R is a C$_3$-C$_6$ alkyl group. In certain embodiments, R comprises a C$_3$-C$_6$ cyclic alkyl group. In certain embodiments, R comprises a branched C$_3$-C$_6$ alkyl group.

In certain embodiments, the compound has the structural formula (I$_b$)

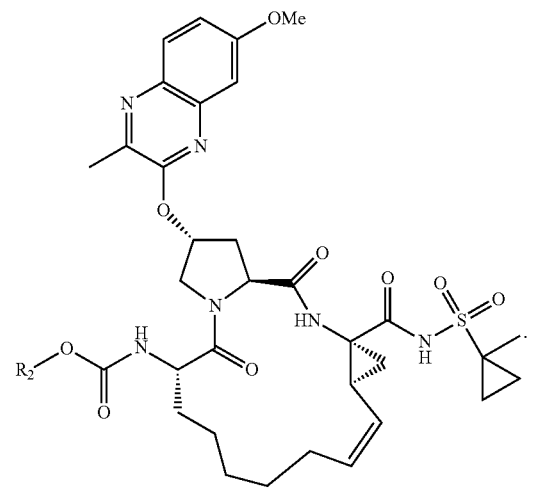

(I$_b$)

In certain embodiments, R$_2$ is a C$_4$-C$_6$ alkyl group.
In certain embodiments, R$_2$ comprises a C$_3$-C$_6$ cyclic alkyl group.
In certain embodiments, R$_2$ comprises a branched C$_3$-C$_6$ alkyl group.
In certain embodiments, R$_{cap}$ is selected from:

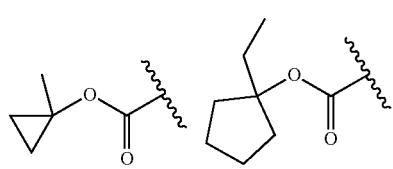

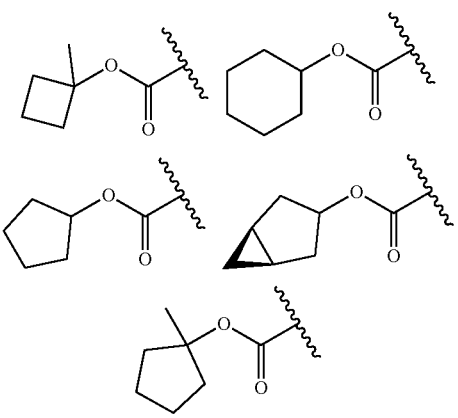

-continued

In certain embodiments, R$_{cap}$ is selected from.

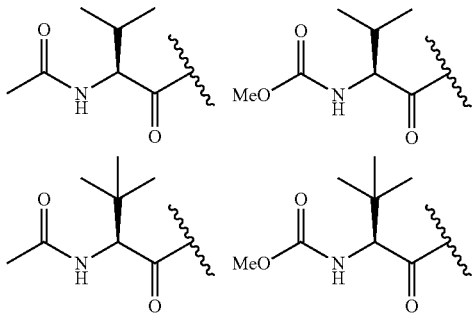

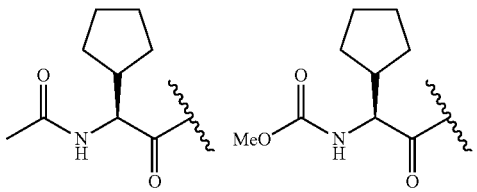

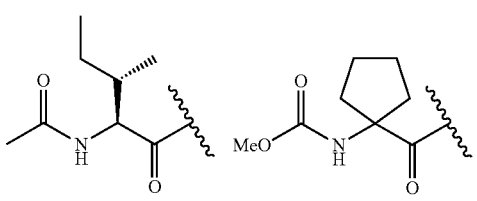

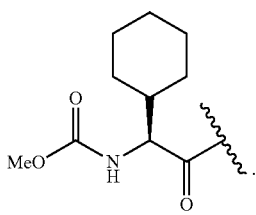

In another aspect, the invention generally relates to a compound having the structural formula (II), (II)
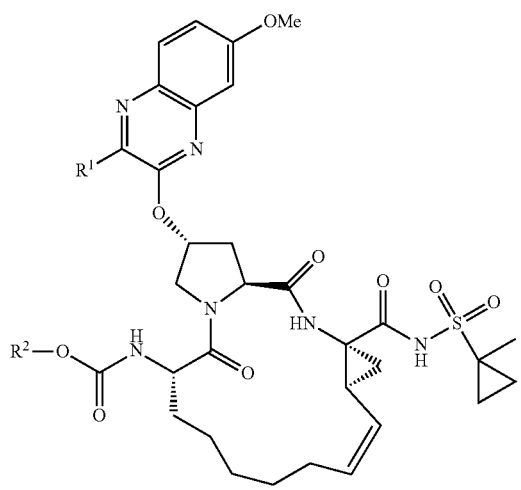
wherein
R₁ is CH₃ or CF₃, and
R₂—O is selected from:
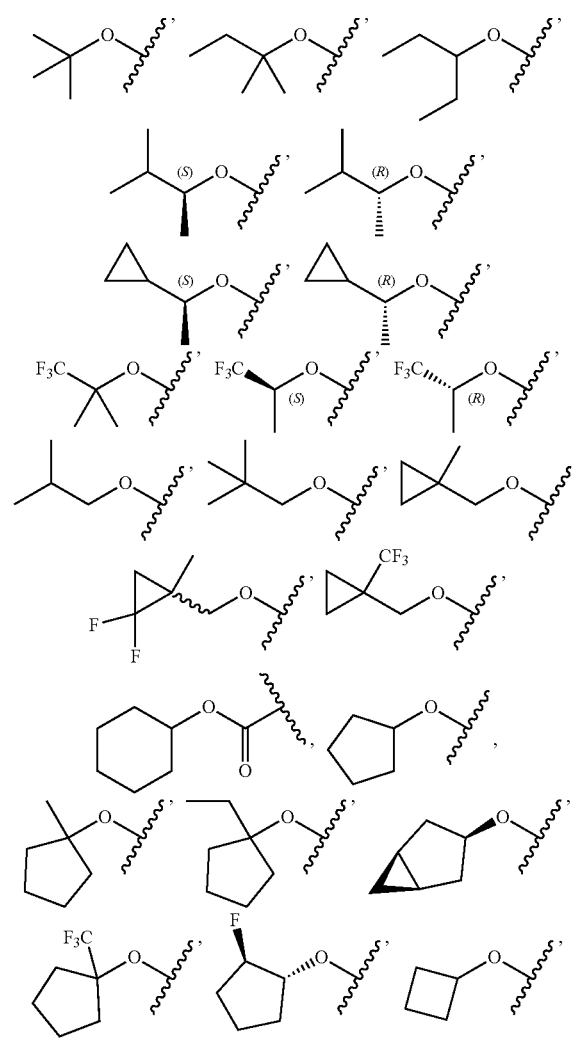
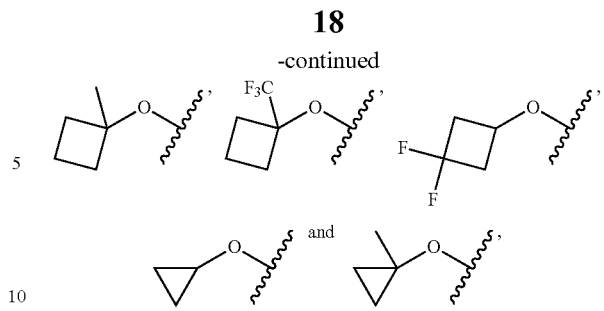
or a pharmaceutically acceptable form thereof.
In certain embodiments, R₁ is CH₃ and R₂—O is selected from:
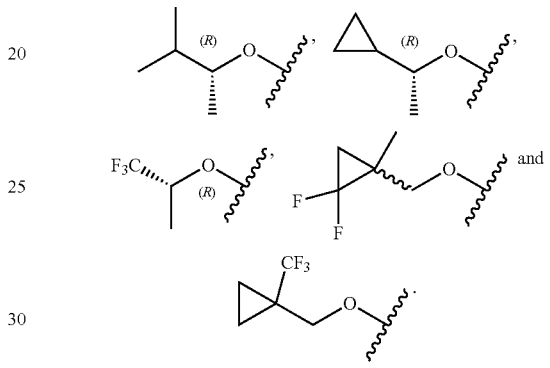
In certain embodiments, R₁ is CF₃ and R₂—O is selected from:
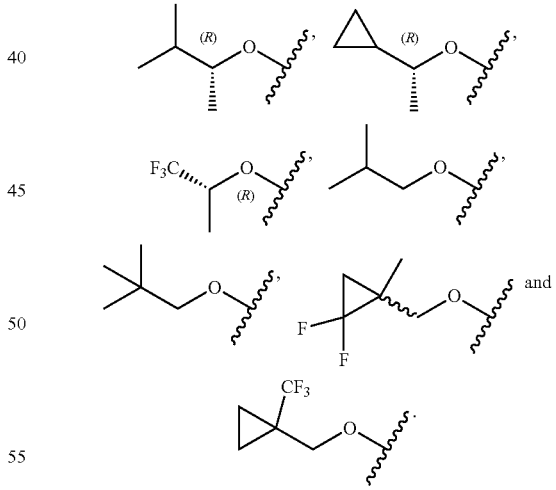
In certain embodiments, R₁ is CH₃ and R₂—O is selected from:
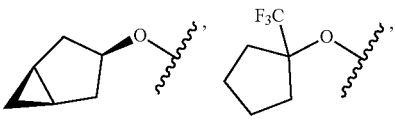

-continued

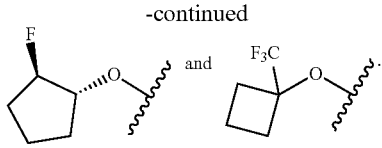

In certain embodiments, $R_1$ is $CF_3$ and $R_2$—O is selected from:

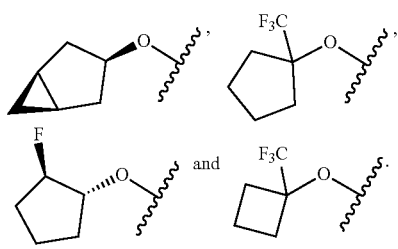

In certain embodiments, the pharmaceutical composition is effective to treat or reduce an HCV infection. In certain embodiments, the HCV infection is a Genotype 1 (GT1) a genotype 3 (GT3) infection.

In certain embodiments, the pharmaceutical composition is effective to treat or reduce HCV infection comprising D168A mutation.

In yet another aspect, the invention generally relates to a unit dosage form comprising a compound disclosed herein or a pharmaceutical composition disclosed herein.

In certain embodiments, the unit dosage is in the form of a tablet or capsule suitable for oral administration.

In yet another aspect, the invention generally relates to a method for treating or reducing HCV infection, or a related disease or disorder, comprising administering to a subject in need thereof a compound disclosed herein, a pharmaceutical composition disclosed herein or a unit dosage form disclosed herein.

In yet another aspect, the invention generally relates to a method for inhibiting or inactivating HCV NS3/4A protease, comprising administering to a subject in need thereof a compound disclosed herein, a pharmaceutical composition disclosed herein or a unit dosage form disclosed herein.

In certain embodiments of the method, the HCV infection is caused by Genotype 1 (GT1) or genotype 3 (GT3).

In certain embodiments of the method, the HCV infection comprises D168A mutation.

In certain embodiments of the method, the subject is administered one or more other antiviral agents, for example, polymerase inhibitors.

In certain embodiments of the method, the HCV NS3/4A protease is a wild-type protease.

In certain embodiments of the method, the HCV NS3/4A protease is a mutant variant of the wild-type protease.

In certain embodiments of the method, the subject does not develop resistance to the compound.

Certain compounds of the present invention may exist in particular geometric or stereoisomeric forms. The present invention contemplates all such compounds, including cis- and trans-isomers, R- and S-enantiomers, diastereomers, (D)-isomers, (L)-isomers, the racemic mixtures thereof, and other mixtures thereof, as falling within the scope of the invention. Additional asymmetric carbon atoms may be present in a substituent such as an alkyl group. All such isomers, as well as mixtures thereof, are intended to be included in this invention.

Isomeric mixtures containing any of a variety of isomer ratios may be utilized in accordance with the present invention. For example, where only two isomers are combined, mixtures containing 50:50, 60:40, 70:30, 80:20, 90:10, 95:5, 96:4, 97:3, 98:2, 99:1, or 100:0 isomer ratios are contemplated by the present invention. Those of ordinary skill in the art will readily appreciate that analogous ratios are contemplated for more complex isomer mixtures.

If, for instance, a particular enantiomer of a compound of the present invention is desired, it may be prepared by asymmetric synthesis, or by derivation with a chiral auxiliary, where the resulting diastereomeric mixture is separated and the auxiliary group cleaved to provide the pure desired enantiomers. Alternatively, where the molecule contains a basic functional group, such as amino, or an acidic functional group, such as carboxyl, diastereomeric salts are formed with an appropriate optically-active acid or base, followed by resolution of the diastereomers thus formed by fractional crystallization or chromatographic methods well known in the art, and subsequent recovery of the pure enantiomers.

Solvates and polymorphs of the compounds of the invention are also contemplated herein. Solvates of the compounds of the present invention include, for example, hydrates.

Isotopically-labeled compounds are also within the scope of the present disclosure. As used herein, an "isotopically-labeled compound" refers to a presently disclosed compound including pharmaceutical salts and prodrugs thereof, each as described herein, in which one or more atoms are replaced by an atom having an atomic mass or mass number different from the atomic mass or mass number usually found in nature. Examples of isotopes that can be incorporated into compounds presently disclosed include isotopes of hydrogen, carbon, nitrogen, oxygen, phosphorous, fluorine and chlorine, such as $^2H$, $^3H$, $^{13}C$, $^{14}C$, $^{15}N$, $^{18}O$, $^{17}O$, $^{31}P$, $^{32}P$, $^{35}S$, $^{18}F$, and $^{36}Cl$, respectively.

By isotopically-labeling the presently disclosed compounds, the compounds may be useful in drug and/or substrate tissue distribution assays. Tritiated ($^3H$) and carbon-14 ($^{14}C$) labeled compounds are particularly preferred for their ease of preparation and detectability. Further, substitution with heavier isotopes such as deuterium ($^2H$) can afford certain therapeutic advantages resulting from greater metabolic stability, for example increased in vivo half-life or reduced dosage requirements and, hence, may be preferred in some circumstances. Isotopically labeled compounds presently disclosed, including pharmaceutical salts, esters, and prodrugs thereof, can be prepared by any means known in the art.

Further, substitution of normally abundant hydrogen ($^1H$) with heavier isotopes such as deuterium can afford certain therapeutic advantages, e.g., resulting from improved absorption, distribution, metabolism and/or excretion (ADIE) properties, creating drugs with improved efficacy, safety, and/or tolerability. Benefits may also be obtained from replacement of normally abundant $^{12}C$ with $^{13}C$. (See, WO 2007/005643, WO 2007/005644, WO 2007/016361, and WO 2007/016431.)

Stereoisomers (e.g., cis and trans isomers) and all optical isomers of a presently disclosed compound (e.g., R and S enantiomers), as well as racemic, diastereomeric and other mixtures of such isomers are within the scope of the present disclosure.

Compounds of the present invention are, subsequent to their preparation, preferably isolated and purified to obtain a composition containing an amount by weight equal to or greater than 95% ("substantially pure"), which is then used or formulated as described herein. In certain embodiments, the compounds of the present invention are more than 99% pure. Solvates and polymorphs of the compounds of the invention are also contemplated herein. Solvates of the compounds of the present invention include, for example, hydrates.

Any appropriate route of administration can be employed, for example, parenteral, intravenous, subcutaneous, intramuscular, intraventricular, intracorporeal, intraperitoneal, rectal, or oral administration. Most suitable means of administration for a particular patient will depend on the nature and severity of the disease or condition being treated or the nature of the therapy being used and on the nature of the active compound.

Solid dosage forms for oral administration include capsules, tablets, pills, powders, and granules. In such solid dosage forms, the compounds described herein or derivatives thereof are admixed with at least one inert customary excipient (or carrier) such as sodium citrate or dicalcium phosphate or (i) fillers or extenders, as for example, starches, lactose, sucrose, glucose, mannitol, and silicic acid, (ii) binders, as for example, carboxymethylcellulose, alignates, gelatin, polyvinylpyrrolidone, sucrose, and acacia, (iii) humectants, as for example, glycerol, (iv) disintegrating agents, as for example, agar-agar, calcium carbonate, potato or tapioca starch, alginic acid, certain complex silicates, and sodium carbonate, (v) solution retarders, as for example, paraffin, (vi) absorption accelerators, as for example, quaternary ammonium compounds, (vii) wetting agents, as for example, cetyl alcohol, and glycerol monostearate, (viii) adsorbents, as for example, kaolin and bentonite, and (ix) lubricants, as for example, talc, calcium stearate, magnesium stearate, solid polyethylene glycols, sodium lauryl sulfate, or mixtures thereof. In the case of capsules, tablets, and pills, the dosage forms may also comprise buffering agents. Solid compositions of a similar type may also be employed as fillers in soft and hard-filled gelatin capsules using such excipients as lactose or milk sugar as well as high molecular weight polyethyleneglycols, and the like. Solid dosage forms such as tablets, dragees, capsules, pills, and granules can be prepared with coatings and shells, such as enteric coatings and others known in the art.

Liquid dosage forms for oral administration include pharmaceutically acceptable emulsions, solutions, suspensions, syrups, and elixirs. In addition to the active compounds, the liquid dosage forms may contain inert diluents commonly used in the art, such as water or other solvents, solubilizing agents, and emulsifiers, such as for example, ethyl alcohol, isopropyl alcohol, ethyl carbonate, ethyl acetate, benzyl alcohol, benzyl benzoate, propyleneglycol, 1,3-butyleneglycol, dimethylformamide, oils, in particular, cottonseed oil, groundnut oil, corn germ oil, olive oil, castor oil, sesame oil, glycerol, tetrahydrofurfuryl alcohol, polyethyleneglycols, and fatty acid esters of sorbitan, or mixtures of these substances, and the like. Besides such inert diluents, the composition can also include additional agents, such as wetting, emulsifying, suspending, sweetening, flavoring, or perfuming agents.

Materials, compositions, and components disclosed herein can be used for, can be used in conjunction with, can be used in preparation for, or are products of the disclosed methods and compositions. It is understood that when combinations, subsets, interactions, groups, etc. of these materials are disclosed that while specific reference of each various individual and collective combinations and permutations of these compounds may not be explicitly disclosed, each is specifically contemplated and described herein. For example, if a method is disclosed and discussed and a number of modifications that can be made to a number of molecules including in the method are discussed, each and every combination and permutation of the method, and the modifications that are possible are specifically contemplated unless specifically indicated to the contrary. Likewise, any subset or combination of these is also specifically contemplated and disclosed. This concept applies to all aspects of this disclosure including, but not limited to, steps in methods using the disclosed compositions. Thus, if there are a variety of additional steps that can be performed, it is understood that each of these additional steps can be performed with any specific method steps or combination of method steps of the disclosed methods, and that each such combination or subset of combinations is specifically contemplated and should be considered disclosed.

If, for instance, a particular enantiomer of a compound of the present invention is desired, it may be prepared by asymmetric synthesis, or by derivation with a chiral auxiliary, where the resulting diastereomeric mixture is separated and the auxiliary group cleaved to provide the pure desired enantiomers. Alternatively, where the molecule contains a basic functional group, such as amino, or an acidic functional group, such as carboxyl, diastereomeric salts are formed with an appropriate optically-active acid or base, followed by resolution of the diastereomers thus formed by fractional crystallization or chromatographic methods well known in the art, and subsequent recovery of the pure enantiomers.

EXAMPLES

To avoid resistance, drugs must be potent to both WT and resistant forms of the target, i.e. have a flat profile against resistance. We previously demonstrated that 5172-mcP1P3 had a flatter resistance profile than grazoprevir, but unfortunately lost potency against the WT protease. Here, we elaborate on this "parent" compound by first filling the S4 pocket and extending into the S5 pocket, all under the restraints of the substrate envelope with the goal to gain potency and avoid resistance. The S4 pocket is mostly nonpolar and can accommodate both hydrophobic and hydrophobic side chains in natural HCV substrates. However, prior structure-activity relationship (SAR) studies on macrocyclic and peptidic scaffolds show that hydrophobic moieties are associated with higher potencies. (Matthew, A. N., et al., *Hepatitis c virus NS3/4A protease inhibitors incorporating flexible P2 quinoxalines target drug resistant viral variants*. J. Med. Chem., 2017. 60(13): p. 5699-5716; Lin, C., *HCV NS3-4A serine protease*. Hepatitis C viruses: genomes and molecular biology, 2006. 52: p. 55; Sun, L.-Q., et al., *Discovery of a Potent Acyclic, Tripeptidic, Acyl Sulfonamide Inhibitor of Hepatitis C Virus NS3 Protease as a Back-up to Asunaprevir with the Potential for Once-Daily Dosing*. Journal of Medicinal Chemistry, 2016. 59(17): p. 8042-8060; Sun, D X., et al., *P4 cap modified tetrapeptidyl α-ketoamides as potent HCV NS3 protease inhibitors*. Bioorganic & Medicinal Chemistry Letters, 2004. 14(16): p. 4333-4338; Perni, R. B., et al., *Inhibitors of hepatitis C virus NS3-4A protease 1. Non-Charged tetrapeptide variants*. Bioorganic & Medicinal Chemistry Letters, 2003. 13(22): p. 4059-4063; Llinis-Brunet, M., et al., *Highly potent and selective peptide-based inhibitors of the hepatitis C virus serine protease: towards smaller inhibitors*. Bioorganic & Medicinal Chemistry Letters, 2000. 10(20): p. 2267-2270; Ingallinella, P., et al., *Potent Peptide Inhibitors of Human*

*Hepatitis C Virus NS3 Protease Are Obtained by Optimizing the Cleavage Products.* Biochemistry, 1998. 37(25): p. 8906-8914; Steinkuhler, C., et al., *Product Inhibition of the Hepatitis C Virus NS3 Protease.* Biochemistry, 1998. 37(25): p. 8899-8905.)

We designed two series of inhibitors, one focusing on optimally filling the S4 pocket ($P_4$ series) and the other extending into the S5 pocket with two different capping groups acetamide ($P_4P_5$ A series) or methyl carbamate ($P_4P_5$ B series) (FIG. 1).

Specifically, to optimally fill the S4 pocket we synthesized a series of inhibitors modifying the P4 capping group of the parent compound with hydrophobic moieties of increasing size. To tap into the unleveraged part of the substrate envelope we synthesized a set of compounds with a full hydrophobic P4 group and a P5 capping group. In total, we synthesized 16 inhibitors, seven towards optimally filling the S4 pocket, and nine that extend into the S5 pocket with either an acetamide group (the $P_4P_5$ A series) or a methyl carbamate group (the $P_4P_5$ B series) as the capping group (FIG. 1) (see Methods). For all the inhibitors, the potency against the HCV NS3/4A genotype 1a (GT1a) and the D168A variants were measured and when feasible their corresponding crystal structures determined to elucidate the structural basis for the alterations in potency (Table S2). Van der Waals (vdWs) calculations and molecular dynamics simulations (MDs) were also ran on the structures to understand the conformational dynamics of the inhibitors protein complexes.

Our most potent inhibitors from either series were more potent than grazoprevir or parent compound toward the highly resistant D168A variant that causes potency loss for all PIs tested including grazoprevir (FIGS. 2 *a* and *c*). (Ali, A., et al., *Evaluating the role of macrocycles in the susceptibility of hepatitis C virus NS3/4A protease inhibitors to drug resistance.* ACS Chem. Biol., 2013. 8(7): p. 1469-1478; Matthew, A. N., et al., *Hepatitis c virus NS3/4A protease inhibitors incorporating flexible P2 quinoxalines target drug resistant viral variants.* J. Med. Chem., 2017. 60(13): p. 5699-5716.) Moreover, all our compounds had a flatter resistance profile compared to grazoprevir. Since our best inhibitors has similar potency towards WT as grazoprevir, we've shown that the SE model is a tool to design inhibitors that are potent to both WT and resistance variants. Overall, the $P_4$ series were more potent than the $P_4P_5$ A and B series against both WT and D168A. While all PIs showed reduced potency against the D168A variant relative to WT protease in the enzyme inhibition assay, the fold losses were much smaller for all the designed inhibitors compared to grazoprevir. Furthermore, grazoprevir is susceptible to the D168A variant losing over 230-fold in potency, while all the inhibitors designed to fit within the substrate envelope lost much less potency, only 4-30-fold for both $P_4P_5$ and $P_4$ series (FIGS. 2 *b* and *d*). The most potent inhibitor from the $P_4$ series, $P_4$-7, has similar potency to grazoprevir against WT and is 20-fold more potent towards the D168A variant. From the $P_4P_5$ series, $P_4P_5$-6 is the most potent, although less potent compared to grazoprevir towards WT, it is however 5-fold more potent towards D168A. Generally, acetamide ($P_4P_5$ A series) or methyl carbamate ($P_4P_5$ B series) as a capping group did not cause significant changes in the potency. The exception is the $P_4P_5$-3 group of inhibitors where the methyl carbamate capping group causes a 3-fold increase in potency. Overall the substrate-envelope-guided inhibitor design strategy used here succeeded in yielding inhibitors with flatter resistance profiles, producing compounds with picomolar potency to WT and reduced susceptibility to drug resistance.

Structure Determination of Protease-Inhibitor Complexes

Crystal structures of select inhibitors bound to WT and D168A proteases were determined to elucidate the molecular basis for the observed resistance profiles of the inhibitors and evaluate if the inhibitors fit within the substrate envelope as designed (Table S2). A total of twelve new co-crystal structures with resolutions ranging from 1.6-2.1 Å were determined for this study. Seven crystal structures of all the $P_4$ series with the D168A and $P_4$-4 with WT were solved. Five crystal structures of the $P_4P_5$ series, $P_4P_5$-2B and $P_4P_5$-2A with WT, and $P_4P_5$-2A, $P_4P_5$-4 and, $P_4P_5$-5 with D168A. All structures were analyzed in comparison with previously determined crystal structures of the parent compound (PDB ID: 5VOJ for WT) and grazoprevir (PDB IDs: 3SUD for WT and 3SUF for D168A, respectively). (Romano, K. P., et al., *The molecular basis of drug resistance against hepatitis C virus NS3/4A protease inhibitors.* PLoS Pathog., 2012. 8(7): p. e1002832; Matthew, A. N., et al., *Hepatitis c virus NS3/4A protease inhibitors incorporating flexible P2 quinoxalines target drug resistant viral variants.* J. Med. Chem., 2017. 60(13): p. 5699-5716.)

The binding mode of all of the designed inhibitors was very similar to the parent compound and grazoprevir. The P2 quinoxaline maintained the t-t stacking interaction with catalytic His57 residue irrespective of modifications at the P4 and P5 positions as expected (FIG. 3). In fact, changes in the binding mode occurred only at the positions that were modified, with the P3-P1' positions of the ligand relatively unchanged. Differences in hydrogen bonding and hydrophobic packing were observed in the S4 and S5 pockets where modifications to the inhibitor were made.

Designing Inhibitors to Fit within the Substrate Envelope

Grazoprevir, although potent, protrudes from the substrate envelope making this inhibitor highly susceptible to drug resistance mutations especially at Ala156 and Asp168 due to the positioning of the P2-P4 macrocycle and P4 moiety (FIG. 3*a*) (Ref #16). Modification of the macrocycle location and the P2 position led to the parent compound, which fits better in the substrate envelope (FIG. 3*b*) (Ref #25). The crystal structures of parent compound bound to wildtype protease and the additional fourteen inhibitor-wildtype protease structures superimpose extremely well. Both inhibitor series, $P_4$ (FIG. 3*c*) and $P_4P_5$(FIG. 3*d*) fit within the substrate envelope with two exceptions; The P4 cyclohexyl capping group for $P_4$-6, and the P5 capping group of $P_4P_5$-5. The $P_4P_5$ series clearly leverage unexplored space within the substrate envelope compared to GZR and the parent compound.

Enhanced Packing Inside the S4 Pocket Increases Potency Against D168A $P_4$ Affinity: WT To optimally fill the S4 pocket we systematically increase the size of the cyclic P4 capping moieties from 1-methyl cyclopropyl to cyclohexyl and included a bicyclic capping group, bicyclo[3.1.0]hexyl to further increase interactions with the S4 pocket. Compare to the parent compound, the 1-methyl cyclopropyl, $P_4$-1 inhibitor did not show improvement in potency against WT (FIG. 2*a* and Table S1). However, increasing the cyclic ring system by one carbon, $P_4$-2 lead to a 4-fold increase in towards WT. Further increase in the hydrophobic nature of the P4 capping group to a cyclopentyl ring ($P_4$-3) and incorporating 1-methyl ($P_4$-4) and 1-ethyl ($P_4$-5) modifications did not significantly improve the potency further compared to $P_4$-2 for the WT neither did a cyclohexyl moiety ($P_4$-6). The bicyclic capping group ($P_4$-7) however did improve the potency by ~3-fold compared $P_4$-2 against WT.

$P_4$ Affinity: D168A

To understand how the $P_4$ inhibitors perform against resistant variants we measured the binding affinity against D168A. The $P_4$ inhibitors resistance display a different behavior against D168A compared to WT. $P_4$-1 show a ~2-fold increase potency compared to the parent compound, which is lost when one more carbon is added to the cyclic ring ($P_4$-2). However, increasing the cyclic ring system lead to a ~3-fold increase potency for both the cyclopentyl ($P_4$-3, $P_4$-4 and, $P_4$-5) and, the cyclohexyl ($P_4$-6) capping groups. The bicyclic capping group ($P_4$-7) lead to a dramatic 26-fold increase in potency compared to the parent compound against D168A.

$P_4$ Structural Analysis

To understand the molecular basis for the potency differences observed for the $P_4$ inhibitors, we crystallize all the inhibitors with either WT ($P_4$-3), or D168A ($P_4$-2, $P_4$-4, and $P_4$-5), or both ($P_4$-6, $P_4$-4) (Table S2). The loss of potency from $P_4$-1 to $P_4$-2 is due to a frustrated pocket created when the P4 capping is does not fill the hydrophobic S4 pocket. $P_4$-1 is able to fit in the S4 pocket better than $P_4$-2 because of the small cyclopropyl ring size, while the cyclobutyl ring of $P_4$-2 is slightly elevated out of the pocket. $P_4$-4, although containing a larger 5-membered cyclic P4 capping group, is able to fit optimally within the S4 pocket. The ring pucker available to the cyclopentyl group allows for the perfect orientation towards the base of the S4 pocket (FIG. 4). To leverage the pucker of the cyclopentyl group, $P_4$-7, with the fused ring system was designed to further optimally fill the in the S4. Surprisingly, $P_4$-6 with the cyclohexyl capping group has a binding mode that differs from all the $P_4$ inhibitors with smaller P4 caps. $P_4$-6 reshapes the S4 pocket by inducing an alternate conformation of arg123(FIG. 5*a-d*). The alternate conformation of arg123 exposes a new groove within the protein. Inhibitors with a cyclopentyl ($P_4$-3) or 1-methylcyclopentyl ($P_4$-4) bound to WT and D168A respectively, did not induce the alternate arg123 conformation.

$P_4$ Van Der Waals

To quantitatively understand the slight but significant differences we observe in the crystal structures, we calculated van der Waals (vdW) contact energies ran molecular dynamics simulations (MDs). All the $P_4$ inhibitors, except for $P_4$-6, enhanced total vdW contacts compared to the parent compound (FIG. S1). The gained vdW contacts for the $P_4$ inhibitors are from contacting other residues that construct the S4 pocket including val158, ala157, ala156, and arg155, and with the exception of $P_4$-6, arg123 (FIG. 6). More importantly, all the $P_4$ inhibitors lost vdW contacts with resistance associated substitution D168A.

The $P_4$ inhibitors that gain additional vdW contacts with arg123 form a hydrophobic patch and stabilize the arginine in a specific conformation (conformation 1). While, the cyclohexyl of $P_4$-6 are too bulky to fit within the S4 pocket and therefore pushes arg123 into an alternate conformation (conformation 2) (FIG. 5*d*). The alternate conformation of arg123 has been observed in previous crystal structures of the WT GT1a protease with macrocyclic and peptidomimetic inhibitors (PDB: 3KEE and 3SUF) and the D168A variant with danoprevir (PDB: 1W3C).

$P_4P_5$ Affinity WT and D168A

In addition to filling the S4 pocket by optimizing the P4 capping, we also design a series of inhibitors with a full P4 amino acid and a P5 cap group to extend further within the substrate envelope. Generally, the $P_4P_5$ inhibitors are less potent than the $P_4$ series against both WT and D168A. Also, the capping group acetamide ($P_4P_5$ A series) or methyl carbamate ($P_4P_5$ B series) did not cause a significant against WT. We first synthesized the $P_4P_5$ inhibitor with a valine amino acid ($P_4P5$-1A and 1B) at the P4 position, then increased the P4 group to isoleucine ($P_4P5$-4) and tert-leucine ($P_4P5$-2A and 2B). We also included cyclic P4 unnatural amino acids, $P_4P5$-3A and 3B, $P_4P5$-5, and $P_4P5$-6. Generally, the inhibitors with linear aliphatic P4 group were generally less potent compared to inhibitors containing cyclic moieties against both WT and D168A. Increasing the size of the P4 amino acid from valine to tert-leucine lead to a ~2-fold loss in potency against both WT and D168A, while an isoleucine moiety has similar potency as the valine for WT and is twice as potent against D168A. $P_4P5$-6, with the cyclohexylglycine P4 amino acid is the most potent inhibitor in this series followed by $P_4P5$-3A and 3B with the cyclopentylglycine amino acid, against both WT and D168A. For the cyclopentylglycine containing inhibitors $P_4P5$-3A and 3B, the acetamide group (3A) ~3-fold less potent than the methyl carbamate group (3B). Generally, the $P_4P_5$ inhibitors lose at ~10-fold potency due to the D168A which is similar to the parent compound, except for the cycloleucine containing inhibitor, $P_4P5$-5, which has a 30-fold loss and is the least potent against WT and D168A.

$P_4P_5$ Structural Analysis

To understand the molecular basis for the potency differences observed for the $P_4P5$ inhibitors, we crystallize $P_4P5$-2A and $P_4P5$-2B with WT, and $P_4P5$-2A, $P_4P5$-4, and $P_4P5$-5 with D168A (Table S2). The P5 capping group of the $P_4P_5$ inhibitors elevate the P4 group out of the S4 pocket relative to the comparative $P_4$ inhibitor to avoid steric clash with ser159. Therefore, $P_4P5$ inhibitors create an frustrated S4 pocket which is responsible for the loss in potency compared to the P4 series, despite forming an additional backbone hydrogen bond with ser159 (FIG. 7). Extending pass, the S4 pocket is associated with a penalty cost to binding, and may explain why all FDA-approved HCV protease drugs, past and current, have not extend further than the S4 pocket. Although, the carbonyl of the natural substrates form identical hydrogen bonding interaction with ser159 (FIG. S2). The identical binding mode of acetamide ($P_4P_5$ A series) and methyl carbamate ($P_4P_5$ B series) containing compounds may explain the similar potency observed against WT for the two inhibitor classes (FIG. S3). The least potent inhibitor in both series, $P_4P5$-5, binds deep in the S4 pocket with the cyclopental group. However, the pucker associated with the cyclopentyl ring points the P5 capping group away from the protein as compared to the that of $P_4P5$-2A (FIG. S4). In fact, the P5 capping group of $P_4P5$-5 losses the hydrogen bond with ser159 and makes no interaction with the protein. Of the inhibitors contains acyclic P4 amino acids, $P_4P5$-4 is significantly more potent against both WT and D168A. The potency of $P_4P5$-4 relative to $P_4P5$-1A or $P_4P5$-2A is due to the additional unbranched methyl group of the isoleucine P4 group of $P_4P5$-4 pointing directly towards the S4 pocket (FIG. S5).

Inhibitors Potency Due to D168A

To investigate the molecular basis of reduced potency of the inhibitors against D168A as opposed to WT, crystal structures of grazoprevir, the parent compound, $P_4$-3, and $P_4P5$-2A bound to WT and D168A proteases were analyzed. Similar to grazoprevir, loss in potency appears to be due to the disruption of the electrostatic network involving arg155 as a result of the D168A substitution (FIG. 8*a-d*). (Romano, K. P., et al., *The molecular basis of drug resistance against* hepatitis C virus NS3/4A protease inhibitors. PLoS Pathog., 2012. 8(7): p. e1002832.) The overall structure of the inhibitors bound to D168A is very similar to this to WT protease. The sidechain of ser159 appears to be dynamic in both WT and D168A structures, the serine hydroxyl points towards the protein in some structures and in other points towards the inhibitor. Although, the $P_4P_5$ inhibitors have the potential to gain an addition hydrogen bond with the hydroxyl of ser159 when pointing towards the inhibitor.

Experimental

Inhibitor Synthesis

Grazoprevir, parent compound and substrate envelope designed analogs were synthesized in-house using previously reported methods (Scheme 1). Grazoprevir was prepared following a reported synthetic method. The parent compound and analogs were synthesized using our convergent reaction sequence as previously described, with minor modifications. (Harper, S., et al., *Discovery of MK-5172, a macrocyclic hepatitis C virus NS3/4a protease inhibitor.* ACS Med. Chem. Lett., 2012. 3(4): p. 332-336; Ali, A., et al., *Evaluating the role of macrocycles in the susceptibility of hepatitis C virus NS3/4A protease inhibitors to drug resistance.* ACS Chem. Biol., 2013. 8(7): p. 1469-1478)

Expression and Purification of NS3/4A Constructs

The HCV GT1a NS3/4A protease gene described in the Bristol Myers Squibb patent was synthesized by GenScript and cloned into a PET28a expression vector. Cys159 was mutated to a serine residue to prevent disulfide bond formation and facilitate crystallization. The D168A gene was engineered using the site-directed mutagenesis protocol from Stratagene. Protein expression and purification were carried out as previously described. (Wittekind, M., et al., *Modified forms of hepatitis C NS3 protease for facilitating inhibitor screening and structural studies of protease-inhibitor complexes.* 2002: United States of America; Romano, K. P., et al., *The molecular basis of drug resistance against hepatitis C virus NS3/4A protease inhibitors.* PLoS Pathog., 2012. 8(7): p. e1002832.)

Briefly, transformed *Escherichia coli* BL21(DE3) cells were grown in TB media containing 30 μg/mL of kanamycin antibiotic at 37° C. After reaching an $OD_{600}$ of 0.7, cultures were induced with 1 mM IPTG and harvested after 3 h of expression. Cells were pelleted by centrifugation, resuspended in resuspension buffer (RB) [50 mM phosphate buffer, 500 mM NaCl, 10% glycerol, 2 mM 1-ME, pH 7.5] and frozen at −80° C. for storage.

Cell pellets were thawed and lysed via cell disruptor (Microfluidics Inc.) two times to ensure sufficient DNA shearing. Lysate was centrifuged at 19,000 rpm, for 25 min at 4° C. The soluble fraction was applied to a nickel column (Qiagen) pre-equilibrated with RB. The beads and soluble fraction were incubated at 4° C. for 1.5 h and the lysate was allowed to flow through. Beads were washed with RB supplemented with 20 mM imidazole and eluted with RB supplemented with 200 mM imidazole. The eluent was dialyzed overnight (MWCO 10 kD) to remove the imidazole, and the His-tag was simultaneously removed with thrombin treatment. The eluate was judged >90% pure by polyacrylamide gel electrophoresis, concentrated, flash frozen, and stored at −80° C.

Correction for the Inner Filter Effect

The inner filter effect (IFE) for the NS3/4A protease substrate was determined using a previously described method. (Liu, Y., et al., *Use of a fluorescence plate reader for measuring kinetic parameters with innerfilter effect correction.* Anal. Biochem., 1999. 267(2): p. 331-335.) Briefly, fluorescence end-point readings were taken for substrate concentrations between 0 μM and 20 μM. Afterward, free 5-FAM fluorophore was added to a final concentration of 25 μM to each substrate concentration and a second round of fluorescence end-point readings was taken. The fluorescence of free 5-FAM was determined by subtracting the first fluorescence end point reading from the second round of readings. IFE corrections were then calculated by dividing the free 5-FAM florescence at each substrate concentration by the free 5-FAM florescence at zero substrate.

Determination of Michaelis-Menten ($K_m$) Constant $K_m$ constants for GT1 and D168A protease were previously determined. (Ali, A., et al., *Evaluating the role of macrocycles in the susceptibility of hepatitis C virus NS3/4A protease inhibitors to drug resistance.* ACS Chem. Biol., 2013. 8(7): p. 1469-1478.) Briefly, a 20 μM concentration of substrate [Ac-DE-Dap(QXL520)-EE-Abu-γ-[COO]AS-C (5-FAMsp)-NH2](AnaSpec) was serially diluted into assay buffer [50 mM Tris, 5% glycerol, 10 mM DTT, 0.6 mM LDAO, and 4% dimethyl sulfoxide] and proteolysis was initiated by rapid injection of 10 μL protease (final concentration 20 nM) in a reaction volume of 60 μL. The fluorescence output from the substrate cleavage product was measured kinetically using an EnVision plate reader (Perkin-Elmer) with excitation wavelength at 485 nm and emission at 530 nm. Inner filter effect corrections were applied to the initial velocities ($V_o$) at each substrate concentration. $V_o$ versus substrate concentration graphs were globally fit to the Michaelis-Menten equation to obtain the $K_m$ value.

Enzyme Inhibition Assays

For each assay, 2 nM of NS3/4A protease (GT1a and D168A) was pre-incubated at room temperature for 1 h with increasing concentration of inhibitors in assay buffer (50 mM Tris, 5% glycerol, 10 mM DTT, 0.6 mM LDAO, and 4% dimethyl sulfoxide, pH 7.5). Inhibition assays were performed in non-binding surface 96-well black half-area plates (Corning) in a reaction volume of 60 μL. The proteolytic reaction was initiated by the injection of 5 μL of HCV NS3/4A protease substrate (AnaSpec), to a final concentration of 200 nM and kinetically monitored using a Perkin Elmer EnVision plate reader (excitation at 485 nm, emission at 530 nm). Three independent data sets were collected for each inhibitor with each protease construct. Each inhibitor titration included at least 12 inhibitor concentration points, which were globally fit to the Morrison equation to obtain the Ki value.

Crystallization and Structure Determination

Protein expression and purification were carried out as previously described. (Romano, K. P., et al., *The molecular basis of drug resistance against hepatitis C virus NS3/4A protease inhibitors.* PLoS Pathog., 2012. 8(7): p. e1002832.) Briefly, the Ni-NTA purified WT1a protein was thawed, concentrated to 3 mg/mL, and loaded on a HiLoad Superdex75 16/60 column equilibrated with gel filtration buffer (25 mM MES, 500 mM NaCl, 10% glycerol, and 2 mM DTT, pH 6.5). The protease fractions were pooled and concentrated to 25 mg/mL with an Amicon Ultra-15 10 kDa filter unit (Millipore). The concentrated samples were incubated for 1 h with 3:1 molar excess of inhibitor. Diffraction-quality crystals were obtained overnight by mixing equal volumes of concentrated protein solution with precipitant solution (20-26% PEG-3350, 0.1 M sodium MES buffer, 1-4% ammonium sulfate, pH 6.5) at RT or 15° C. in 24-well VDX hanging drop trays. Crystals were harvested and data was collected at 100 K. Cryogenic conditions contained the precipitant solution supplemented with 15% glycerol or ethylene glycol.

X-ray diffraction data were collected in-house using our Rigaku X-ray system with a Saturn 944 detector. All datasets were processed using HKL-3000. Structures were solved by molecular replacement using PHASER. Model building and refinement were performed using Coot and PHENIX, respectively. The final structures were evaluated with Mol-Probity prior to deposition in the PDB. To limit the possibility of model bias throughout the refinement process, 5% of the data were reserved for the free R-value calculation. Structure analysis, superposition and figure generation were done using PyMOL. (Otwinowski, Z. and W. Minor, *Processing of X-ray diffraction data collected in oscillation mode*. Methods Enzymol., 1997. 276: p. 307-326; McCoy, A. J., et al., *Phaser crystallographic software*. J. Appl. Crystallogr., 2007. 40(Pt 4): p. 658-674; Emsley, P. and K. Cowtan, *Coot: model-building tools for molecular graphics*. Acta Crystallogr. D Biol. Crystallogr., 2004. 60(Pt 12 Pt 1): p. 2126-2132; Adams, P. D., et al., *PHENIX: a comprehensive Python-based system for macromolecular structure solution*. Acta Crystallogr. D Biol. Crystallogr., 2010. 66(2): p. 213-221; Davis, I. W., et al., *MolProbity: all-atom contacts and structure validation for proteins and nucleic acids*. Nucl. Acids Res., 2007. 35(suppl 2): p. W375-W383; Brunger, A. T., *Free R value: a novel statistical quantity for assessing the accuracy of crystal structures*. Nature, 1992. 355(6359): p. 472-475; *PyMOL: The PyMOL Molecular Graphics System*, Version 1.8, Schrödinger, LLC.) -ray data collection and crystallographic refinement statistics are presented in Table S1.

Construction of HCV Substrate Envelope

The HCV substrate envelope was computed using a method previously described. (Romano, K. P., et al., *The molecular basis of drug resistance against hepatitis C virus NS3/4A protease inhibitors*. PLoS Pathog., 2012. 8(7): p. e1002832.) The HCV viral substrates representing the product complex 3-4A (residues 626-631 of full-length HCV PDB ID: 1CU1), 4B/5A (chain D, PDB ID: 3M5N) and 5A/5B (chain A, PDB ID: 3M50) were used to construct the envelope. All structure were aligned in PyMOL using the Cα atoms of protease residues 137-139 and 154-160. Following superposition of all structures, Gaussian object maps at a contour of 0.5 were generated for each cleavage product in PyMOL. (Romano, K. P., et al., *The molecular basis of drug resistance against hepatitis C virus NS3/4A protease inhibitors*. PLoS Pathog., 2012. 8(7): p. e1002832; Yao, N., et al., *Molecular views of viral polyprotein processing revealed by the crystal structure of the hepatitis C virus bifunctional protease-helicase*. Structure, 1999. 7(11): p. 1353-1363.)

Three consensus maps were generated representing the minimum volume occupied by any 2 viral substrates. The four consensus maps were summed together to generate the final substrate envelope representing the shared van der Waals volume of the viral substrates.

TABLE S1.

Inhibitory activity against GT1a HCV NS3/4A and D168A proteases with fold changes with respect to GT1a wild-type

| Inhibitor | Ki (nM) (Fold Change) | |
|---|---|---|
| | GT1a WT | D168A |
| $P_4P_5$-1A | 11.1 ± 0.5 | 141.0 ± 18.0 (13) |
| $P_4P_5$-1B | 13.0 ± 0.8 | 102.0 ± 6.8 (8) |
| $P_4P_5$-2A | 23.9 ± 1.7 | 215.0 ± 16.0 (9) |
| $P_4P_5$-2B | 29.5 ± 1.9 | 201.0 ± 15.0 (8) |
| $P_4P_5$-3A | 2.23 ± 0.07 | 87.3 ±+04.4 (39) |
| $P_4P_5$-3B | 3.54 ± 0.13 | 31.6 ± 2.1 (9) |
| $P_4P_5$-4 | 7.10 ± 0.24 | 81.0±+011.0 (11) |
| $P_4P_5$-5 | 31.0 ± 2.74 | 931.0 ± 70.0 (30) |
| $P_4P_5$-6 | 0.91 ± 0.38 | 9.68 ± 0.64 (11) |
| $P_4$-1 | 4.44 ± 0.30 | 27.9 ± 4.1 (6) |
| $P_4$-2 | 1.40 ± 0.13 | 46.4 ± 3.4 (33) |
| $P_4$-3 | 1.13 ± 0.22 | 36.0 ± 1.8 (32) |
| $P_4$-4 | 1.78 ± 0.30 | 16.0 ± 1.2 (9) |
| $P_4$-5 | 1.29 ± 0.05 | 21.7 ± 2.3 (17) |
| $P_4$-6 | 0.94 ± 0.25 | 12.7 ± 1.2 (14) |
| $P_4$-7 | 0.54 ± 0.20 | 2.30 ± 0.7 (4) |
| Parent Compound (PC) | 3.60 ± 0.44 | 52.0 ± 2.4 (14) |
| Grazoprevir (GZR) | 49.1 ± 1.6 | 0.21 ± 0.03 (234) |

TABLE S2

X-ray data collection and crystallographic refinement statistics.

| | WT $P_4P_5$-2B | WT $P_4P_5$-2A | WT $P_4$-3 | WT $P_4$-4 | D168A $P_4P_5$-2A |
|---|---|---|---|---|---|
| PDB ID: | 6DIQ | 6DIR | 6DIT | 6DIU | 6DIV |
| Resolution | 1.58 Å | 1.75 Å | 1.79 Å | 1.87 Å | 1.83 Å |
| Space group | $P2_12_12_1$ | $P2_12_12_1$ | $P2_12_12_1$ | $P2_12_12_1$ | $P2_12_12_1$ |
| Molecules in AU[a] | 1 | 1 | 1 | 1 | 1 |
| Cell dimensions: | | | | | |
| a (Å) | 55.5 | 55.1 | 55.3 | 55.1 | 55.5 |
| b (Å) | 58.5 | 59.8 | 58.6 | 59.6 | 58.7 |
| c (Å) | 59.9 | 58.5 | 59.8 | 58.5 | 60.0 |

TABLE S2-continued

X-ray data collection and crystallographic refinement statistics.

| | | | | | |
|---|---|---|---|---|---|
| β (°) | 90 | 90 | 90 | 90 | 90 |
| Completeness (%) | 91.3 | 97.0 | 98.1 | 97.4 | 98.1 |
| Total reflections | 250177 | 119548 | 118729 | 110776 | 115996 |
| Unique reflections | 25037 | 19508 | 18610 | 16126 | 17556 |
| Average I/σ | 7.9 | 8.8 | 14.5 | 12.7 | 12.8 |
| Redundancy | 10 | 6.1 | 6.4 | 6.9 | 6.6 |
| $R_{sym}$ (%)[b] | 5.7 (15.2) | 4.3 (18.3) | 7.1 (28.4) | 6.3 (19.6) | 7.0 (21.6) |
| RMSD[c] in: | | | | | |
| Bond lengths (Å) | 0.007 | 0.009 | 0.004 | 0.02 | 0.006 |
| Bond angles (°) | 1.0 | 1.3 | 0.8 | 0.6 | 1.1 |
| $R_{factor}$ (%)[d] | 15.1 | 14.6 | 18.2 | 18.3 | 16.1 |
| $R_{free}$ (%)[e] | 18.3 | 19.3 | 22.9 | 23.3 | 19.4 |

| | D168A $P_4P_5$-4 | D168A $P_4$-4 | D168A $P_4$-5 | D168A $P_4$-1 | D168A $P_4$-2 | D168A $P_4P_5$-5 | D168A $P_4$-6 | D168A $P_4$-7 | D168A $P_4P_6$-6 |
|---|---|---|---|---|---|---|---|---|---|
| PDB ID: | | | | | | | | | |
| Resolution | 2.10 Å | 1.89 Å | 2.05 Å | 1.89 Å | 1.86 Å | 1.87 Å | 1.90 Å | 2.14 Å | 2.28 Å |
| Space group | P2₁2₁2₁ | P2₁2₁2₁ | P2₁2₁2₁ | P2₁2₁2₁ | P2₁2₁2₁ | P2₁2₁2₁ | P2₁2₁2₁ | P2₁2₁2₁ | P2₁2₁2₁ |
| Molecules in AU[a] | 1 | 1 | 1 | 1 | 1 | 1 | 1 | 1 | 1 |
| Cell dimensions: | | | | | | | | | |
| a (Å) | 54.4 | 54.4 | 55.2 | 54.9 | 55.2 | 54.2 | 54.1 | 55.2 | 54.8 |
| b (Å) | 59.6 | 58.5 | 58.5 | 58.6 | 58.7 | 58.6 | 58.6 | 58.7 | 59.6 |
| c (Å) | 58.6 | 60.0 | 59.7 | 59.9 | 59.8 | 59.7 | 59.9 | 60.0 | 58.6 |
| β (°) | 90 | 90 | 90 | 90 | 90 | 90 | 90 | 90 | 90 |
| Completeness (%) | 99.1 | 98.6 | 99.1 | 99.7 | 99.5 | 98.1 | 95.7 | 99.9 | 99.8 |
| Total reflections | 77900 | 104473 | 73797 | 109214 | 113571 | 110082 | 104326 | 77445 | 53741 |
| Unique reflections | 11513 | 15695 | 12209 | 15981 | 16808 | 15984 | 14973 | 11259 | 9233 |
| Average I/σ | 21.8 | 17.1 | 20.7 | 16.3 | 14.3 | 10.0 | 14.6 | 11.8 | 26.2 |
| Redundancy | 6.7 | 6.6 | 6.0 | 6.8 | 6.8 | 6.9 | 7.0 | 6.9 | 5.8 |
| $R_{sym}$ (%)[b] | 11.9 (40.1) | 8.5 (36.6) | 9.1 (34.8) | 9.5 (28.2) | 7.0 (28.7) | 5.7 (19.3) | 9.5 (36.7) | 7.4 (17.9) | 11.9 (50.0) |
| RMSD[c] in: | | | | | | | | | |
| Bond lengths (Å) | 0.002 | 0.005 | 0.01 | 0.009 | 0.006 | 0.01 | 0.01 | 0.002 | 0.03 |
| Bond angles (°) | 0.76 | 1.1 | 0.7 | 1.2 | 1.2 | 1.3 | 1.3 | 0.7 | 0.8 |
| $R_{factor}$ (%)[d] | 18.2 | 16.4 | 17.7 | 16.0 | 15.8 | 15.2 | 16.9 | 17.4 | 19.3 |
| $R_{free}$ (%)[e] | 21.4 | 20.1 | 21.5 | 19.8 | 17.5 | 19.1 | 20.9 | 20.6 | 23.5 |

[a] AU asymmetric unit.
[b] $R_{sym} = \Sigma | I - <I>|/\Sigma I$, where I = observed intensity, <I> = average intensity over symmetry equivalent; values in parentheses are for the highest resolution shell.
[c] RMSD root mean square deviation.
[d] $R_{factor} = \Sigma || F_o | - |F_c||/\Sigma|F_o|$.
[e] $R_{free}$ was calculated from 5% of reflections, chosen randomly, which were omitted from the refinement process.

Example 1

All reactions were performed in oven-dried round bottomed flasks fitted with rubber septa under argon atmosphere, unless otherwise noted. All reagents and solvents, including anhydrous solvents, were purchased from commercial sources and used as received. Flash column chromatography was performed on an ISCO CombiFlash instrument using RediSep Gold columns. Thin-layer chromatography (TLC) was performed using silica gel (60 F-254) coated aluminum plates (EMD Millipore), and spots were visualized by exposure to ultraviolet light (UV), exposure to iodine adsorbed on silica gel, and/or exposure to an acidic solution of p-anisaldehyde followed by brief heating. $^1$H NMR and $^{13}$C NMR spectra were acquired on a Bruker Avance III HD 500 MHz NMR instrument. Chemical shifts are reported in ppm (δ scale) with the residual solvent signal used as reference and coupling constant (J) values are reported in hertz (Hz). Data are presented as follows: chemical shift, multiplicity (s=singlet, d=doublet, dd=doublet of doublet, t=triplet, q=quartet, m=multiplet, br s=broad singlet), coupling constant in Hz, and integration. High-resolution mass spectra (HRMS) were recorded on a Thermo Scientific Orbitrap Velos Pro mass spectrometer coupled with a Thermo Scientific Accela 1250 UPLC and an autosampler using electrospray ionization (ESI) in the positive mode.

Scheme 1. Synthesis of HCV NS3/4A protease inhibitors
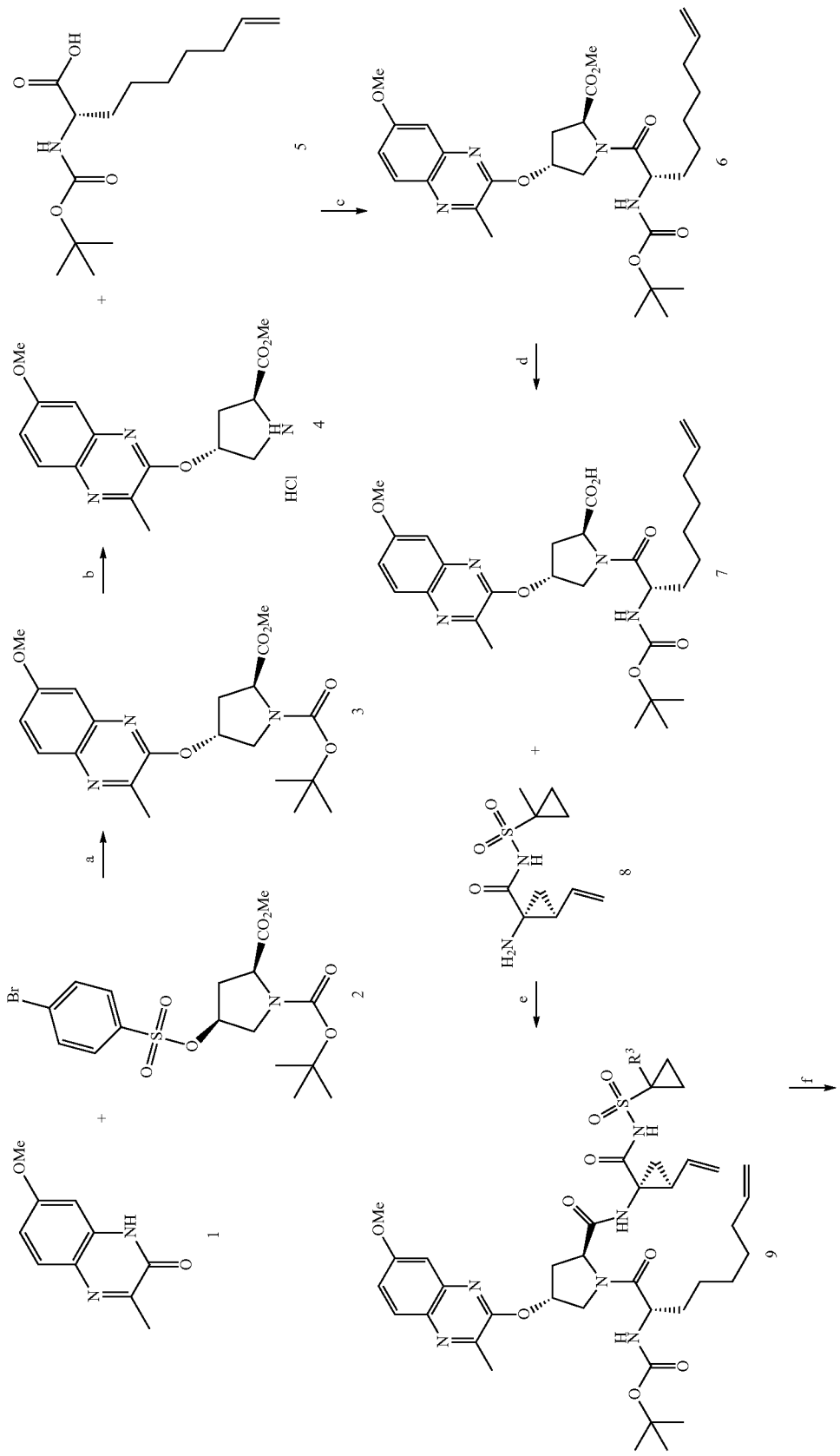

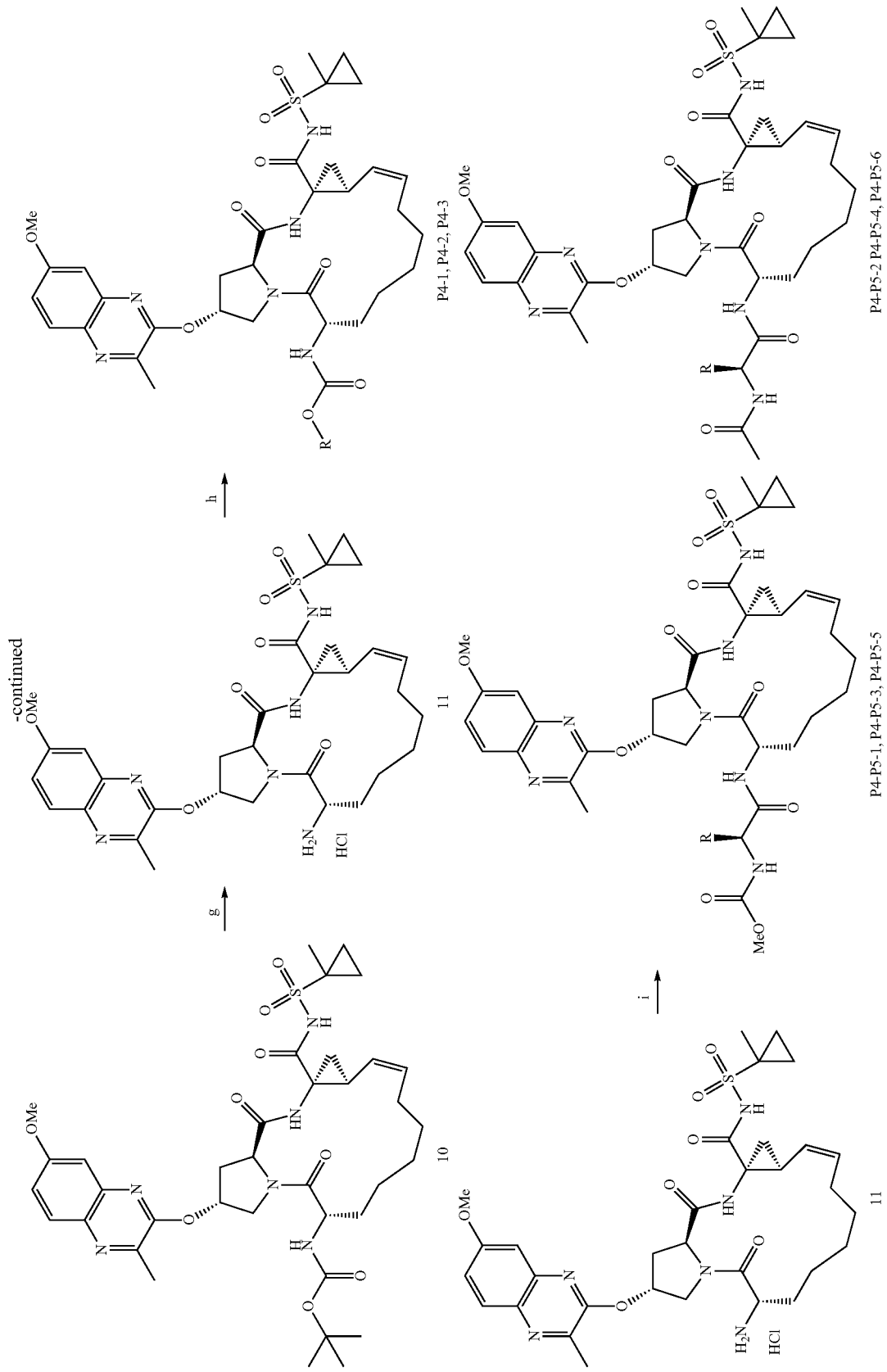

1-(Tert-Butyl) 2-methyl (2S,4R)-4-((7-methoxy-3-methylquinoxalin-2-yl)oxy)pyrrolidine-1,2-dicarboxylate (3)

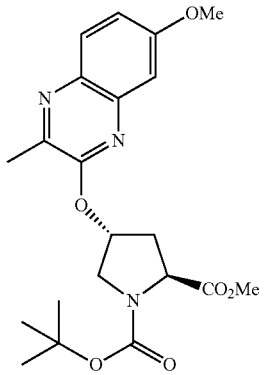 [SMILES: COC(=O)[C@@H]1C[C@@H](Oc2nc3cc(OC)ccc3nc2C)CN1C(=O)OC(C)(C)C]

A solution of 7-methoxy-3-methylquinoxalin-2(1H)-one 1 (6.2 g, 32.6 mmol) in anhydrous NMP (100 mL) was treated with $Cs_2CO_3$ (16.0 g, 49.0 mmol). After stirring the reaction mixture at room temperature for 15 min, activated cis-hydroxyproline derivative 2 (14.0 g, 30.2 mmol) was added in one portion. The reaction mixture was heated to 55° C., stirred for 4 h, and then another portion of activated cis-hydroxyproline 2 (1.0 g, 2.15 mmol) was added. The resulting reaction mixture was stirred at 55° C. for additional 2 h, cooled to room temperature, quenched with aqueous 1 N HCl solution (250 mL), and extracted with EtOAc (400 mL). The organic fraction was washed successively with saturated aqueous $NaHCO_3$ and NaCl (250 mL each), dried ($Na_2SO_4$), filtered, and evaporated under reduced pressure. The residue was purified by flash column chromatography (RediSep Gold column, 2×80 g, gradient elution with 0-60% EtOAc/hexanes) to provide 3 (10.0 g, 74%) as a white foamy solid. $^1$H NMR (500 MHz, $CDCl_3$) (mixture of rotamers, major rotamer) δ 7.80 (d, J=9.0 Hz, 1H), 7.17 (dd, J=9.0, 3.0 Hz, 1H), 7.11 (d, J=2.5 Hz, 1H), 5.71 (br s, 1H), 4.48 (t, J=8.0 Hz, 1H), 3.99-3.91 (m, 4H), 3.87 (d, J=12.5 Hz, 1H), 3.78 (s, 3H), 2.67-2.58 (m, 1H), 2.56 (s, 3H), 2.43-2.37 (m, 1H), 1.43 (s, 9H) ppm; $^{13}$C NMR (125 MHz, $CDCl_3$) δ 173.36, 160.24, 155.51, 153.81, 144.60, 141.04, 134.22, 128.95, 118.63, 105.95, 80.54, 73.59, 58.20, 55.68, 52.48, 52.20, 36.70, 28.26, 19.93 ppm; HRMS (ESI) m/z: [M+H]$^+$ calcd for $C_{21}H_{28}N_3O_6$, 418.1973; found 418.1976.

Methyl (2S,4R)-1-((S)-2-((tert-butoxycarbonyl)amino)non-8-enoyl)-4-((7-methoxy-3-methylquinoxalin-2-yl)oxy)pyrrolidine-2-carboxylate (6)

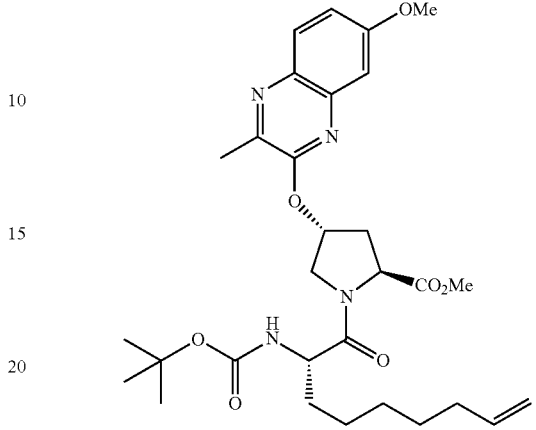

A solution of ester 3 (10.0 g, 24.0 mmol) in anhydrous $CH_2Cl_2$ (50 mL) was treated with a solution of 4 N HCl in 1,4-dioxane (100 mL). After stirring the reaction mixture at room temperature for 3 h, solvents were evaporated under reduced pressure, and the residue was dried under high vacuum. The pale-yellow solid was triturated with diethyl ether (3×25 mL) and dried under high vacuum to yield the amine salt 4 (8.5 g, 100%) as an off-white powder. A mixture of amine salt 4 (8.5 g, 24.0 mmol) and (S)-2-((tert-butoxycarbonyl)amino)non-8-enoic acid 5 (6.70 g, 24.7 mmol) in anhydrous DMF (110 mL) was treated with DIEA (19.2 mL, 110 mmol) and HATU (14.1 g, 37.1 mmol). The resulting reaction mixture was stirred at room temperature for 4 h, then diluted with EtOAc (500 mL), and washed successively with aqueous 0.5 N HCl, saturated aqueous $NaHCO_3$, and saturated aqueous NaCl (300 mL each). The organic portion was dried ($Na_2SO_4$), filtered, and evaporated under reduced pressure. The residue was purified by flash column chromatography (RediSep Gold column, 2×80 g, gradient elution with 0-60% EtOAc/hexanes) to provide 6 (10.9 g, 80%) as a white foamy solid. $^1$H NMR (500 MHz, $CDCl_3$) (mixture of rotamers, major rotamer) δ 7.81 (d, J=9.0 Hz, 1H), 7.18 (dd, J=9.0, 2.5 Hz, 1H), 7.12 (d, J=2.5 Hz, 1H), 5.84-5.75 (m, 2H), 5.21 (d, J=8.5 Hz, 1H), 5.01-4.92 (m, 2H), 4.75 (t, J=8.0 Hz, 1H), 4.38 (q, J=7.5 Hz, 1H), 4.18 (d, J=11.5 Hz, 1H), 4.06 (dd, J=12.0, 4.5 Hz, 1H), 3.94 (s, 3H), 3.77 (s, 3H), 2.69-2.64 (m, 1H), 2.54 (s, 3H), 2.41-2.35 (m, 1H), 2.04 (app q, J=7.0 Hz, 2H), 1.80-1.75 (m, 1H), 1.63-1.55 (m, 1H), 1.46-1.24 (m, 15H) ppm; $^{13}$C NMR (125 MHz, $CDCl_3$) δ 172.13, 171.78, 160.27, 155.40, 155.27, 144.62, 140.89, 138.96, 134.39, 129.03, 118.73, 114.35, 105.99, 79.61, 74.30, 57.97, 55.66, 52.67, 52.43, 51.83, 34.94, 33.65, 32.66, 28.91, 28.74, 28.25, 24.68, 19.87 ppm; HRMS (ESI) m/z: [M+H]$^+$ calcd for $C_{30}H_{43}N_4O_7$, 571.3126; found 571.3128.

Tert-Butyl ((S)-1-((2S,4R)-4-((7-methoxy-3-methylquinoxalin-2-yl)oxy)-2-(((1R,2S)-1-(((1-methylcyclopropyl)sulfonyl)carbamoyl)-2-vinylcyclopropyl)carbamoyl)pyrrolidin-1-yl)-1-oxonon-8-en-2-yl)carbamate (9)

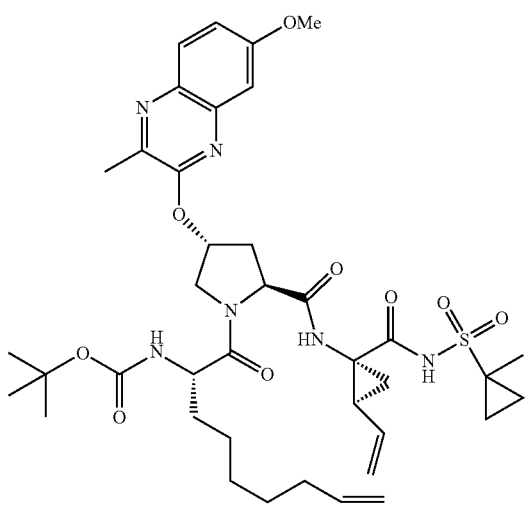 [SMILES: C=CCCCCC[C@H](NC(=O)OC(C)(C)C)C(=O)N1C[C@H](Oc2nc3cc(OC)ccc3nc2C)C[C@H]1C(=O)N[C@]1(C(=O)NS(=O)(=O)C2(C)CC2)C[C@H]1C=C]

A solution of ester 6 (6.0 g, 10.5 mmol) in THF-H$_2$O mixture (1:1, 150 mL) was treated with LiOH·H$_2$O (1.55 g, 36.9 mmol). The resulting reaction mixture was stirred at room temperature for 24 h. The reaction mixture was cooled to ~5° C., acidified to a pH of 2.0 by slow addition of aqueous 0.25 N HCl (~ 200 mL), and extracted with EtOAc (2×400 mL). The organic portions were washed separately with saturated aqueous NaCl (200 ml), dried (Na$_2$SO$_4$), filtered, and evaporated under reduced pressure. The gummy residue was dissolved in CHCl$_3$ (50 mL), concentrated under reduced pressure, and the residue was dried under high vacuum overnight to yield the acid 7 (5.80 g, 99%) as a white solid.

A mixture of acid 7 (5.57 g, 10.0 mmol) and amine salt 8 (3.10 g, 11.0 mmol) in anhydrous DMF (100 mL) was treated with DIEA (6.70 mL, 40.5 mmol) and HATU (5.70 g, 15.0 mmol). The resulting reaction mixture was stirred at room temperature for 2.5 h, then diluted with EtOAc (400 mL) and washed successively with aqueous 0.5 N HCl, saturated aqueous NaHCO$_3$, and saturated aqueous NaCl (250 mL each). The organic portion was dried (Na$_2$SO$_4$), filtered, and evaporated under reduced pressure. The residue was purified by flash column chromatography (RediSep Gold column, 2×80 g, gradient elution with 20-90% EtOAc/hexanes) to provide the bis-olefin compound 9 (6.50 g, 83%) as a white solid. $^1$H NMR (400 MHz, CDCl$_3$) δ 10.02 (s, 1H), 7.81 (d, J=8.8 Hz, 1H), 7.18 (dd, J=8.8, 2.8 Hz, 1H), 7.13 (d, J=2.8 Hz, 1H), 7.11 (s, 1H), 5.88 (br s, 1H), 5.82-5.72 (m, 2H), 5.42 (d, J=9.2 Hz, 1H), 5.26 (d, J=17.2 Hz, 1H), 5.14 (d, J=11.6 Hz, 1H), 5.00-4.90 (m, 2H), 4.50 (t, J=8.4 Hz, 1H), 4.39-4.33 (m, 1H), 4.18 (d, J=11.6 Hz, 1H), 4.02 (dd, J=11.6, 4.0 Hz, 1H), 3.93 (s, 3H), 2.58-2.50 (m, 5H), 2.10 (q, J=8.4 Hz, 1H), 2.05-1.98 (m, 3H), 1.73-1.58 (m, 4H), 1.49 (s, 3H), 1.44-1.24 (m, 16H), 0.92-0.86 (m, 1H), 0.84-0.78 (m, 1H); $^{13}$C NMR (100 MHz, CDCl$_3$) δ 173.65, 172.52, 167.55, 160.31, 155.70, 155.16, 144.41, 140.87, 138.83, 134.33, 132.61, 128.96, 118.87, 118.54, 114.41, 105.96, 79.73, 74.59, 60.30, 55.67, 53.15, 52.37, 41.73, 36.56, 35.16, 34.25, 33.62, 32.24, 28.71, 28.67, 28.26, 25.31, 23.42, 19.84, 18.37, 14.27, 13.26 ppm; HRMS (ESI) m/z: [M+H]$^+$ calcd for C$_{39}$H$_{55}$N$_6$O$_9$S, 783.3746; found 783.3734.

Tert-Butyl ((2R,6S,13aS,14aR,16aS,Z)-2-((7-methoxy-3-methylquinoxalin-2-yl)oxy)-14a-(((1-methylcyclopropyl)sulfonyl)carbamoyl)-5,16-dioxo-1,2,3,5,6,7,8,9,10,11,13a,14,14a,15,16,16a-hexadecahydrocyclopropa[e]pyrrolo[1,2-a][1,4]diazacyclopentadecin-6-yl)carbamate (10)

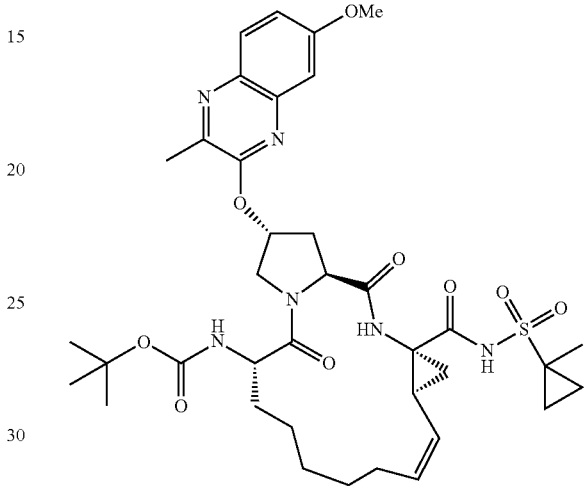

A degassed solution of bis-olefin 9 (6.20 g, 7.92 mmol) in 1,2-DCE (1600 mL) was heated to 50° C. under argon, then Zhan 1b catalyst (0.50 g, 0.68 mmol) was added in two portions over 10 min. The resulting reaction mixture was heated to 70° C. and stirred for 6 h. The reaction mixture was cooled to room temperature and solvents were evaporated under reduced pressure. The residue was purified by flash column chromatography (RediSep Gold column, 2×80 g, gradient elution with 20-90% EtOAc/hexanes) to yield the P1-P3 macrocyclic product 10 (4.20 g, 70%) as an off-white solid. $^1$H NMR (400 MHz, CDCl$_3$) δ 10.16 (s, 1H), 7.82 (d, J=9.2 Hz, 1H), 7.19-7.16 (m, 2H), 6.92 (s, 1H), 5.88 (br s, 1H), 5.69 (q, J=9.2 Hz, 1H), 5.12 (d, J=7.6 Hz, 1H), 4.99 (t, J=8.8 Hz, 1H), 4.61 (t, J=8.0 Hz, 1H), 4.51 (d, J=11.2 Hz, 1H), 4.28-4.22 (m, 1H), 4.03 (dd, J=11.2, 4.0 Hz, 1H), 3.95 (s, 3H), 2.70-2.50 (m, 6H), 2.31 (q, J=8.8 Hz, 1H), 1.92-1.66 (m, 4H), 1.60-1.20 (m, 21H), 0.85-0.78 (m, 2H) ppm; $^{13}$C NMR (100 MHz, CDCl$_3$) δ 177.16, 173.33, 166.94, 160.33, 155.32, 155.04, 144.46, 141.03, 134.20, 136.25, 128.66, 124.89, 118.93, 105.98, 79.85, 74.88, 59.46, 55.72, 53.08, 51.97, 44.73, 36.43, 34.61, 32.72, 29.65, 28.15, 27.06, 26.07, 22.21, 20.96, 19.71, 18.17, 14.51, 12.51 ppm; HRMS (ESI) m/z: [M+H]$^+$ calcd for C$_{37}$H$_{51}$N$_6$O$_9$S, 755.3433; found 755.3404. Anal. HPLC: t$_R$ 13.57 min, purity 99%.

(2R,6S,13aS,14aR,16aS,Z)-6-Amino-2-((7-methoxy-3-methylquinoxalin-2-yl)oxy)-N-((1-methylcyclopropyl)sulfonyl)-5,16-dioxo-1,2,3,6,7,8,9,10,11,13a,14,15,16,16a-tetradecahydrocyclopropa[e]pyrrolo[1,2-a][1,4]diazacyclopentadecine-14a(5H)-carboxamide hydrochloride (11)

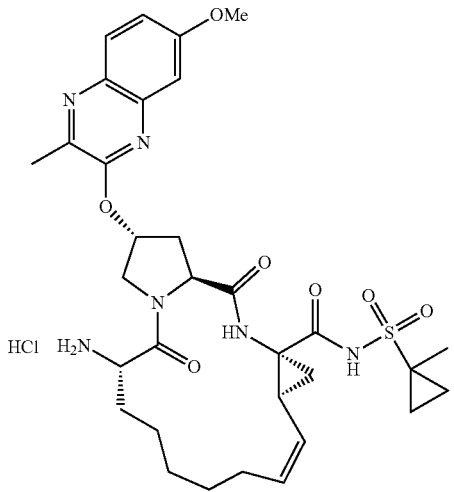

A solution of compound 10 (3.25 g, 4.31 mmol) in anhydrous CH₂CL₂ (15 mL) was treated with a solution of 4 N HCl in 1,4-dioxane (50 mL). The reaction mixture was stirred at room temperature for 3 h, concentrated under reduced pressure, and the residue was dried under high vacuum. The residue was triturated with diethyl ether (40 mL), and the solid was filtered, washed with Et₂O (2×15 mL), and dried under high vacuum to yield the amine salt 11 (2.90 g, 98%) as an off-white solid.

1-Methylcyclopentyl ((2R,6S,13aS,14aR,16aS,Z)-2-((7-methoxy-3-methylquinoxalin-2-yl)oxy)-14a-(((1-methylcyclopropyl)sulfonyl)carbamoyl)-5,16-dioxo-1,2,3,5,6,7,8,9,10,11,13a,14,14a,15,16,16a-hexadecahydrocyclopropa[e]pyrrolo[1,2-a][1,4]diazacyclopentadecin-6-yl)carbamate (P4-3)

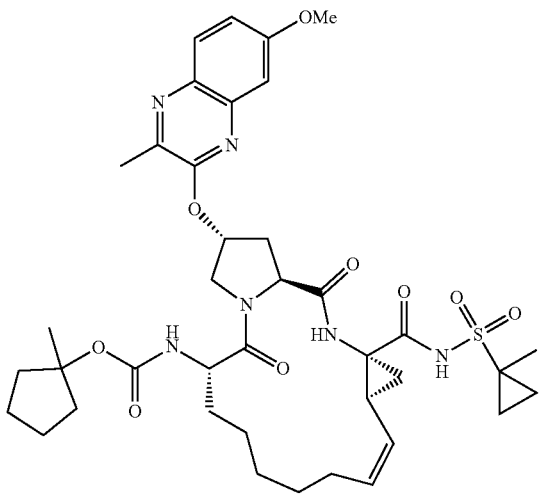 [SMILES: COc1ccc2nc(C)c(O[C@@H]3C[C@H]4C(=O)N[C@]5(C(=O)NS(=O)(=O)C6(C)CC6)C[C@H]5/C=C\CCCCC[C@H](NC(=O)OC5(C)CCCC5)C(=O)N4C3)nc2c1]

The same procedure was used as described above for compound P4-1. A mixture of amine salt 11 (0.25 g, 0.36 mmol) was treated with DIEA (0.45 mL, 2.58 mmol) and 1-methylcyclopentyl (4-nitrophenyl) carbonate (0.098 g, 0.37 mmol) to provide the target compound P4-3 (0.24 g, 85%) as a white solid. ¹H NMR (500 MHz, CDCl₃) δ 10.13 (s, 1H), 7.79 (d, J=10.0 Hz, 1H), 7.18-7.16 (m, 2H), 6.87 (s, 1H), 5.89 (br s, 1H), 5.70 (q, J=9.0 Hz, 1H), 5.12 (d, J=7.5 Hz, 1H), 5.00 (t, J=9.0 Hz, 1H), 4.61 (t, J=7.5 Hz, 1H), 4.50 (d, J=11.5 Hz, 1H), 4.28 (t, J=8.0 Hz, 1H), 4.04 (dd, J=11.0, 4.0 Hz, 1H), 3.95 (s, 3H), 2.69-2.50 (m, 6H), 2.31 (q, J=8.5 Hz, 1H), 1.93-1.76 (m, 6H), 1.65-1.25 (m, 21H), 0.85-0.79 (m, 2H) ppm; ¹³C NMR (125 MHz, CDCl₃) δ 177.11, 173.33, 166.90, 160.27, 155.31, 155.20, 144.50, 140.98, 136.24, 134.31, 128.89, 124.92, 118.78, 106.03, 89.54, 74.79, 59.47, 55.72, 53.11, 52.03, 44.75, 39.28, 39.08, 36.47, 34.61, 32.79, 29.71, 27.11, 27.06, 26.09, 24.59, 23.77, 22.26, 21.00, 19.86, 18.20, 14.52, 12.57 ppm; HRMS (ESI) m/z: [M+H]⁺ calcd for $C_{39}H_{53}N_6O_9S^+$, 781.3589; found 781.3570.

1-Ethylcyclopentyl ((2R,6S,13aS,14aR,16aS, Z)-2-((7-methoxy-3-methylquinoxalin-2-yl) oxy)-14a-(((1-methylcyclopropyl) sulfonyl) carbamoyl)-5,16-dioxo-1,2,3,5,6,7,8,9,10,11,13a,14,14a,15,16,16a-hexadecahydrocyclopropa[e]pyrrolo[1,2-a][1,4]diazacyclopentadecin-6-yl) carbamate (NR01-97)

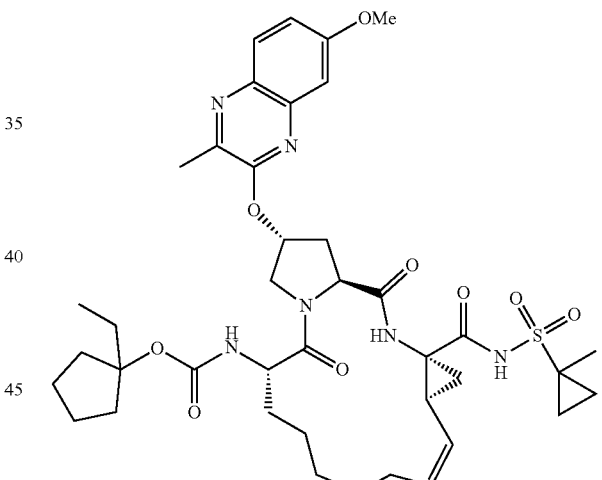

The same procedure was used as described above for compound AJ-71. A mixture of amine salt 11 (0.120 g, 0.17 mmol) was treated with DIEA (0.210 mL, 1.21 mmol) and 1-ethylcyclopentyl (4-nitrophenyl) carbonate (0.050 g, 0.18 mmol) to provide the target compound NR01-97 (0.110 g, 76%) as a white solid. ¹H NMR (500 MHz, CDCl₃) δ 10.12 (s, 1H), 7.84 (d, J=9.5 Hz, 1H), 7.22-7.16 (m, 2H), 6.86 (s, 1H), 5.89 (br s, 1H), 5.70 (q, J=8.5 Hz, 1H), 5.15 (d, J=7.5 Hz, 1H), 4.99 (t, J=9.0 Hz, 1H), 4.62 (t, J=7.5 Hz, 1H), 4.52 (d, J=11.0 Hz, 1H), 4.27 (t, J=7.5 Hz, 1H), 4.04 (dd, J=11.5, 4.0 Hz, 1H), 3.95 (s, 3H), 2.74-2.52 (m, 6H), 2.31 (q, J=8.5 Hz, 1H), 1.93-1.67 (m, 6H), 1.63-1.23 (m, 20H), 0.87-0.79 (m, 2H), 0.76 (t, J=7.5 Hz, 3H) ppm; ¹³C NMR (125 MHz, CDCl₃) δ 177.20, 173.50, 166.98, 160.57, 155.48, 155.25, 144.50, 141.24, 136.37, 128.65, 125.06, 119.17, 106.18, 93.17, 75.09, 59.56, 55.88, 53.21, 52.18, 44.90, 38.76, 37.33, 37.32, 36.61, 34.74, 32.94, 30.25, 29.85, 27.20, 26.20, 24.14, 22.42, 21.13, 19.72, 18.34, 14.66, 12.71, 8.90 ppm; HRMS (ESI) m/z: [M+H]$^+$ calcd for $C_{40}H_{55}N_6O_9S$, 795.3746; found 795.3714.

1-Methylcyclopropyl ((2R,6S,13aS,14aR,16aS,Z)-2-((7-methoxy-3-methylquinoxalin-2-yl)oxy)-14a-(((1-methylcyclopropyl)sulfonyl)carbamoyl)-5,16-dioxo-1,2,3,5,6,7,8,9,10,11,13a,14,14a,15,16,16a-hexadecahydrocyclopropa[e]pyrrolo[1,2-a][1,4]diazacyclopentadecin-6-yl)carbamate (NR02-24)

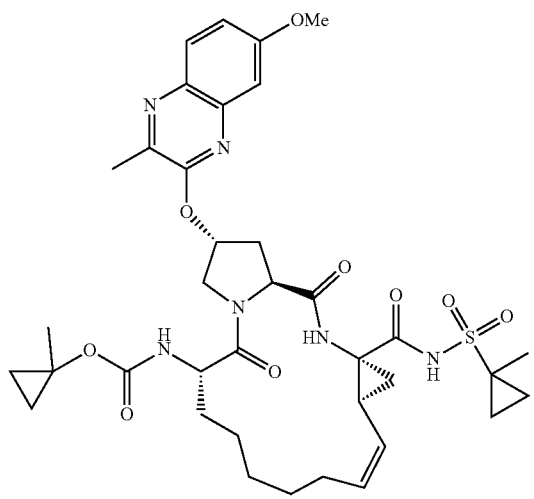 [SMILES: COc1ccc2nc(C)c(O[C@@H]3C[C@H]4C(=O)N[C@]5(C(=O)NS(=O)(=O)C6(C)CC6)C[C@H]5/C=C\CCCCC[C@H](NC(=O)OC5(C)CC5)C(=O)N4C3)nc2c1]

The same procedure was used as described above for compound AJ-71. A mixture of amine salt 11 (0.2 g, 0.29 mmol) was treated with DIEA (0.354 mL, 2.02 mmol) and 1-methylcyclopropyl (4-nitrophenyl) carbonate (0.076 g, 0.32 mmol) to provide the target compound NR02-24 (0.190 g, 83%) as a white solid. $^1$H NMR (500 MHz, CDCl$_3$) δ 10.16 (s, 1H), 7.79 (d, J=9.5 Hz, 1H), 7.22-7.15 (m, 2H), 7.03 (s, 1H), 5.91 (br s, 1H), 5.68 (q, J=8.5 Hz, 1H), 5.29 (d, J=4.5 Hz, 1H), 4.98 (t, J=9.5 Hz, 1H), 4.61 (t, J=8.0 Hz, 1H), 4.46 (d, J=11.5 Hz, 1H), 4.30 (t, J=7.5 Hz, 1H), 4.06 (dd, J=11.5, 4.0 Hz, 1H), 3.94 (s, 3H), 2.57-2.50 (m, 6H), 2.30 (q, J=9.0 Hz, 1H), 1.95-1.69 (m, 5H), 1.62-1.52 (m, 1H), 1.50-1.23 (m, 13H), 0.86-0.78 (m, 2H), 0.77-0.70 (m, 2H), 0.55-0.48 (m, 2H) ppm; $^{13}$C NMR (125 MHz, CDCl$_3$) δ 177.30, 173.01, 167.15, 160.43, 155.52, 155.45, 144.68, 141.14, 136.30, 128.90, 125.00, 118.97, 106.18, 74.88, 59.57, 56.76, 55.86, 53.18, 52.27, 44.79, 38.74, 36.60, 34.76, 32.75, 29.78, 27.31, 27.18, 26.25, 22.29, 21.47, 20.95, 19.93, 18.31, 14.62, 13.04, 12.90, 12.67 ppm; HRMS (ESI) m/z: [M+H]$^+$ calcd for $C_{37}H_{49}N_6O_9S$, 753.3276; found 753.3248.

1-Methylcyclobutyl ((2R,6S,13aS,14aR,16aS,Z)-2-((7-methoxy-3-methylquinoxalin-2-yl)oxy)-14a-(((1-methylcyclopropyl)sulfonyl)carbamoyl)-5,16-dioxo-1,2,3,5,6,7,8,9,10,11,13a,14,14a,15,16,16a-hexadecahydrocyclopropa[e]pyrrolo[1,2-a][1,4]diazacyclopentadecin-6-yl)carbamate (NR02-61)

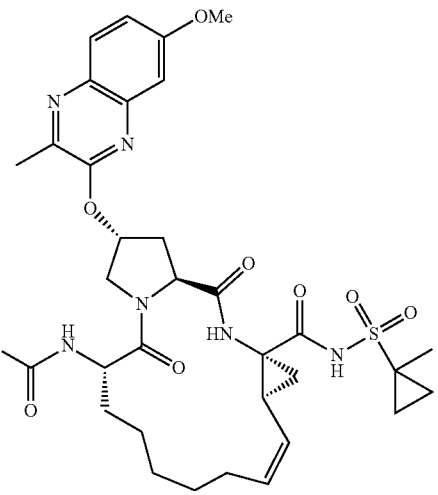

The same procedure was used as described above for compound AJ-71. A mixture of amine salt 11 (0.150 g, 0.22 mmol) was treated with DIEA (0.266 mL, 1.52 mmol) and 1-methylcyclobutyl (4-nitrophenyl) carbonate (0.060 g, 0.24 mmol) to provide the target compound NR02-61 (0.140 g, 80%) as a white solid. $^1$H NMR (500 MHz, CDCl$_3$) δ 10.13 (s, 1H), 7.80 (d, J=9.5 Hz, 1H), 7.20-7.16 (m, 2H), 6.90 (s, 1H), 5.89 (br s, 1H), 5.70 (q, J=8.5 Hz, 1H), 5.21 (d, J=7.5 Hz, 1H), 5.00 (t, J=9.5 Hz, 1H), 4.61 (t, J=7.5 Hz, 1H), 4.46 (d, J=11.5 Hz, 1H), 4.28 (t, J=7.5 Hz, 1H), 4.04 (dd, J=11.0, 3.5 Hz, 1H), 3.95 (s, 3H), 2.73-2.49 (m, 6H), 2.31 (q, J=9.0 Hz, 1H), 2.15 (q, J=9.0 Hz, 2H), 1.99-1.77 (m, 6H), 1.75-1.24 (m, 17H), 0.85-0.79 (m, 2H) ppm; $^{13}$C NMR (125 MHz, CDCl$_3$) δ 177.22, 173.30, 167.03, 160.40, 155.42, 154.61, 144.69, 141.10, 136.33, 134.42, 129.01, 125.04, 118.94, 106.16, 79.63, 74.88, 59.58, 55.86, 53.23, 52.14, 44.86, 38.75, 36.60, 35.39, 34.74, 32.91, 29.85, 27.29, 27.18, 26.22, 23.58, 22.37, 21.07, 20.00, 18.34, 14.65, 13.69, 12.71 ppm; HRMS (ESI) m/z: [M+H]$^+$ calcd for $C_{38}H_{51}N_6O_9S$, 767.3433; found 767.3406.

45

Cyclohexyl ((2R,6S,13aS,14aR,16aS,Z)-2-((7-methoxy-3-methylquinoxalin-2-yl)oxy)-14a-(((1-methylcyclopropyl)sulfonyl)carbamoyl)-5,16-dioxo-1,2,3,5,6,7,8,9,10,11,13a,14,14a,15,16,16a-hexadecahydrocyclopropa[e]pyrrolo[1,2-a][1,4]diazacyclopentadecin-6-yl)carbamate (NR03-67)

46

(1R,3R,5S)-bicyclo[3.1.0]hexan-3-yl ((2R,6S,13aS,14aR,16aS,Z)-2-((7-methoxy-3-methylquinoxalin-2-yl)oxy)-14a-(((1-methylcyclopropyl)sulfonyl)carbamoyl)-5,16-dioxo-1,2,3,5,6,7,8,9,10,11,13a,14,14a,15,16,16a-hexadecahydrocyclopropa[e]pyrrolo[1,2-a][1,4]diazacyclopentadecin-6-yl)carbamate (NR03-77)

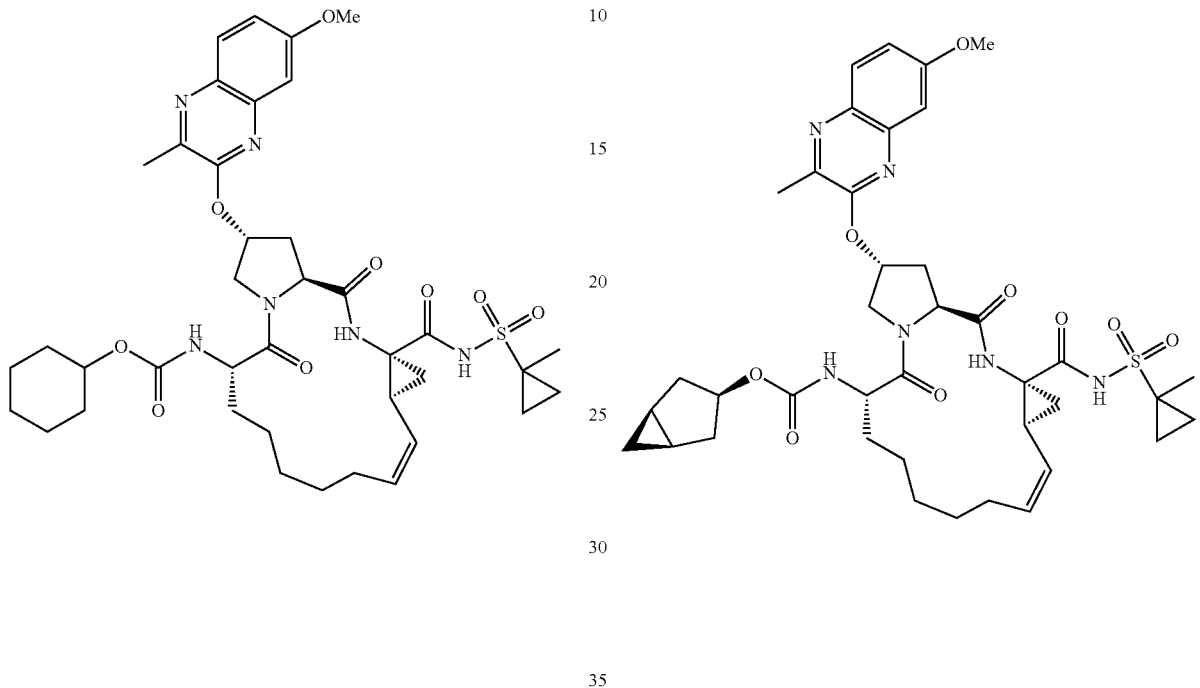

The same procedure was used as described above for compound AJ-71. A mixture of amine salt 11 (0.100 g, 0.15 mmol) was treated with DIEA (0.2 mL, 1.02 mmol) and 1 cyclohexyl (4-nitrophenyl) carbonate (0.043 g, 0.16 mmol) to provide the target compound NR03-67 (0.105 g, 88%) as a white solid. $^1$H NMR (500 MHz, CDCl$_3$) δ 10.13 (s, 1H), 7.80 (d, J=9.5 Hz, 1H), 7.22-7.16 (m, 2H), 6.86 (s, 1H), 5.91 (br s, 1H), 5.71 (q, J=8.5 Hz, 1H), 5.25 (d, J=7.5 Hz, 1H), 5.01 (t, J=9.5 Hz, 1H), 4.61 (t, J=7.5 Hz, 1H), 4.46 (d, J=11.0 Hz, 1H), 4.43-4.34 (m, 1H), 4.30 (t, J=7.5 Hz, 1H), 4.05 (dd, J=11.0, 4.0 Hz, 1H), 3.95 (s, 3H), 2.73-2.66 (m, 1H), 2.64-2.49 (m, 5H), 2.31 (q, J=8.5 Hz, 1H), 2.15 (q, J=9.0 Hz, 2H), 1.95-1.55 (m, 9H), 1.54-1.22 (m, 15H), 0.86-0.79 (m, 2H) ppm; $^{13}$C NMR (125 MHz, CDCl$_3$) δ 177.26, 173.27, 166.98, 160.40, 155.59, 155.48, 144.81, 141.11, 136.32, 134.45, 129.04, 125.05, 118.91, 106.17, 74.84, 73.83, 59.64, 55.86, 53.18, 52.41, 44.89, 38.76, 36.60, 34.67, 32.74, 32.10, 32.04, 29.86, 27.28, 27.17, 26.20, 25.43, 23.94, 22.41, 21.12, 19.94, 18.35, 14.64, 12.72 ppm; HRMS (ESI) m/z: [M+H]$^+$ calcd for C$_{39}$H$_{53}$N$_6$O$_9$S, 781.3589; found 781.3565.

The same procedure was used as described above for compound AJ-71. A mixture of amine salt 11 (0.120 g, 0.174 mmol) was treated with DIEA (0.226 mL, 1.22 mmol) and (1R,3R,5S)-bicyclo [3.1.0] hexan-3-yl (4-nitrophenyl) carbonate (0.050 g, 0.192 mmol) to provide the target compound NR03-77 (0.120 g, 85%) as a white solid. $^1$H NMR (500 MHz, CDCl$_3$) δ 10.11 (s, 1H), 7.80 (d, J=10.0 Hz, 1H), 7.22-7.16 (m, 2H), 6.83 (s, 1H), 5.91 (br s, 1H), 5.70 (q, J=8.5 Hz, 1H), 5.14 (d, J=7.0 Hz, 1H), 5.00 (t, J=9.5 Hz, 1H), 4.93 (t, J=6.5 Hz, 1H), 4.61 (t, J=7.5 Hz, 1H), 4.41 (d, J=11.0 Hz, 1H), 4.29 (t, J=8.0 Hz, 1H), 4.04 (dd, J=11.0, 3.5 Hz, 1H), 3.95 (s, 3H), 2.77-2.53 (m, 1H), 2.52-2.48 (m, 5H), 2.30 (q, J=9.0 Hz, 1H), 2.10-1.72 (m, 6H), 1.71-1.20 (m, 16H), 0.87-0.79 (m, 2H), 0.42 (dd, J=12.5, 8.0 Hz, 1H), 0.26 (d, J=4.0 Hz, 1H), ppm; $^{13}$C NMR (125 MHz, CDCl$_3$) δ 177.21, 173.16, 167.01, 160.40, 155.46, 155.43, 144.82, 141.10, 136.31, 134.47, 129.02, 125.04, 118.93, 106.18, 74.81, 59.63, 55.85, 53.21, 52.36, 44.85, 36.60, 35.80, 34.69, 32.76, 29.84, 27.32, 27.14, 26.20, 22.36, 21.16, 19.99, 18.35, 16.83, 14.62, 12.71, 10.57 ppm; HRMS (ESI) m/z: [M+H]$^+$ calcd for C$_{39}$H$_{51}$N$_6$O$_9$S, 779.3433; found 779.3411.

(2R,6S,13aS,14aR,16aS,Z)-6-((S)-2-Acetamido-3,3-dimethylbutanamido)-2-((7-methoxy-3-methylquinoxalin-2-yl)oxy)-N-((1-methylcyclopropyl)sulfonyl)-5,16-dioxo-1,2,3,6,7,8,9,10,11,13a,14,15,16,16a-tetradecahydrocyclopropa[e]pyrrolo[1,2-a][1,4]diazacyclopentadecine-14a(5H)-carboxamide (P4-P5-2)

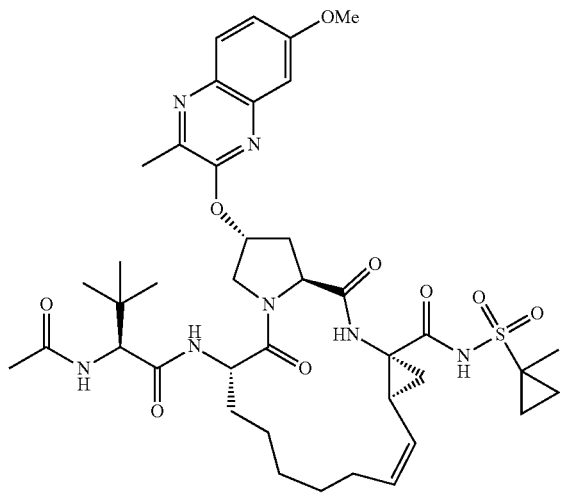 [SMILES: COc1ccc2nc(C)c(O[C@@H]3C[C@H]4C(=O)N[C@]5(C(=O)NS(=O)(=O)C6(C)CC6)C[C@H]5/C=C\CCCCC[C@H](NC(=O)[C@@H](NC(C)=O)C(C)(C)C)C(=O)N4C3)nc2c1]

A mixture of amine salt 11 (0.31 g, 0.45 mmol) and N-Ac-Tle-OH (0.10 g, 0.58 mmol) in anhydrous DMF (8 mL) was treated with DIEA (0.60 mL, 3.50 mmol) and HATU (0.35 g, 0.92 mmol). The resulting reaction mixture was stirred at room temperature for 5 h, then diluted with EtOAc (100 mL), and washed successively with aqueous 0.5 N HCl, saturated aqueous NaHCO$_3$, and saturated aqueous NaCl (75 mL each). The organic portion was dried (Na$_2$SO$_4$), filtered, and evaporated under reduced pressure. The residue was purified by flash column chromatography (RediSep Gold column, 12 g, gradient elution with 80-100% EtOAc/hexanes) to provide P4-P5-2 (0.28 g, 77%) as a white solid. $^1$H NMR (500 MHz, CD$_3$OD) δ 7.76 (d, J=9.0 Hz, 1H), 7.26 (d, J=2.5 Hz, 1H), 7.21 (dd, J=9.0, 3.0 Hz, 1H), 5.95 (br s, 1H), 5.70 (q, J=8.5 Hz, 1H), 5.05 (t, J=9.0 Hz, 1H), 4.68 (dd, J=9.0, 7.5 Hz, 1H), 4.63 (d, J=11.5 Hz, 1H), 4.44 (dd, J=11.5, 3.0 Hz, 1H), 4.13-4.09 (m, 2H), 3.94 (s, 3H), 2.73-2.63 (m, 2H), 2.57-2.46 (m, 5H), 2.00-1.93 (m, 1H), 1.91-1.83 (m, 4H), 1.72 (dd, J=8.5, 5.5 Hz, 1H), 1.64-1.36 (m, 13H), 1.33-1.26 (m, 1H), 0.90-0.84 (m, 2H), 0.74 (s, 9H) ppm; $^{13}$C NMR (125 MHz, CD$_3$OD) δ 179.38, 173.54, 172.91, 171.70, 169.52, 162.05, 156.98, 146.05, 142.68, 136.89, 134.86, 129.27, 126.45, 119.79, 107.34, 76.88, 61.43, 60.87, 56.26, 54.47, 52.16, 45.36, 37.59, 36.09, 35.30, 33.27, 30.92, 28.65, 28.23, 27.87, 27.04, 23.29, 22.37, 21.75, 19.91, 18.43, 14.57, 13.01 ppm; HRMS (ESI) m/z: [M+H]$^+$ calcd for C$_{40}$H$_{56}$N$_7$O$_9$S$^+$, 810.3855; found 810.3836.

(2R,6S,13aS,14aR,16aS,Z)-6-((S)-2-Acetamido-3-methylbutanamido)-2-((7-methoxy-3-methylquinoxalin-2-yl)oxy)-N-((1-methylcyclopropyl)sulfonyl)-5,16-dioxo-1,2,3,6,7,8,9,10,11,13a,14,15,16,16a-tetradecahydrocyclopropa[e]pyrrolo[1,2-a][1,4]diazacyclopentadecine-14a(5H)-carboxamide (P4-P5-4)

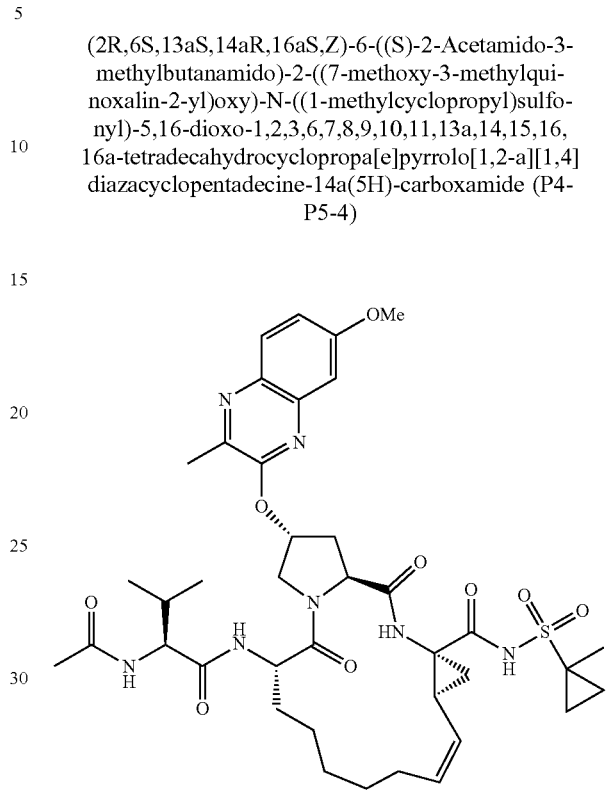

The same procedure was used as described above for compound P4-P5-2. A mixture of amine salt 11 (0.25 g, 0.36 mmol) and N-Ac-Val-OH (0.075 g, 0.47 mmol) was treated with DIEA (0.50 mL, 2.87 mmol) and HATU (0.30 g, 0.79 mmol) to provide the target compound P4-P5-4 (0.30 g, 80%) as a white solid. $^1$H NMR (500 MHz, CD$_3$OD) δ 7.76 (d, J=9.0 Hz, 1H), 7.26 (d, J=3.0 Hz, 1H), 7.20 (dd, J=9.5, 3.0 Hz, 1H), 5.98 (br s, 1H), 5.69 (q, J=9.0 Hz, 1H), 5.05 (t, J=9.0 Hz, 1H), 4.68 (t, J=9.0 Hz, 1H), 4.60 (d, J=12.0 Hz, 1H), 4.42 (dd, J=11.5, 3.0 Hz, 1H), 4.09 (dd, J=11.5, 4.0, Hz, 1H), 4.05 (d, J=7.5 Hz, 1H), 3.93 (s, 3H), 2.72-2.62 (m, 2H), 2.58-2.52 (m, 1H), 2.50 (s, 3H), 2.43 (q, J=8.5 Hz, 1H), 1.97-1.81 (m, 6H), 1.72 (dd, J=8.5, 5.5 Hz, 1H), 1.64-1.29 (m, 14H), 0.90-0.84 (m, 2H), 0.79 (t, J=7.5 Hz, 6H) ppm; $^{13}$C NMR (125 MHz, CD$_3$OD) δ 179.28, 173.79, 173.16, 172.76, 169.47, 162.01, 157.02, 146.26, 142.65, 136.85, 134.82, 129.24, 126.43, 119.75, 107.33, 76.70, 60.78, 59.49, 56.26, 54.41, 52.42, 45.29, 37.59, 35.96, 33.29, 32.07, 31.00, 28.60, 28.35, 27.82, 23.21, 22.37, 21.78, 19.80, 19.71, 18.68, 18.43, 14.57, 13.02 ppm; HRMS (ESI) m/z: [M+H]$^+$ calcd for C$_{39}$H$_{54}$N$_7$O$_9$S$^+$, 796.3698; found 796.3679.

(2R,6S,13aS,14aR,16aS,Z)-6-((2S,3S)-2-acetamido-3-methylpentanamido)-2-((7-methoxy-3-methylquinoxalin-2-yl)oxy)-N-((1-methylcyclopropyl)sulfonyl)-5,16-dioxo-1,2,3,6,7,8,9,10,11,13a,14,15,16,16a-tetradecahydrocyclopropa[e]pyrrolo[1,2-a][1,4]diazacyclopentadecine-t4a(5H)-carboxamide (P4-P5-6)

Methyl ((S)-1-(((2R,6S,13aS,14aR,16aS,Z)-2-((7-methoxy-3-methylquinoxalin-2-yl)oxy)-14a-(((1-methylcyclopropyl)sulfonyl)carbamoyl)-5,16-dioxo-1,2,3,5,6,7,8,9,10,11,13a,14,14a,15,16,16a-hexadecahydrocyclopropa[e]pyrrolo[1,2-a][1,4]diazacyclopentadecin-6-yl)amino)-3,3-dimethyl-1-oxobutan-2-yl)carbamate (P4-P5-1)

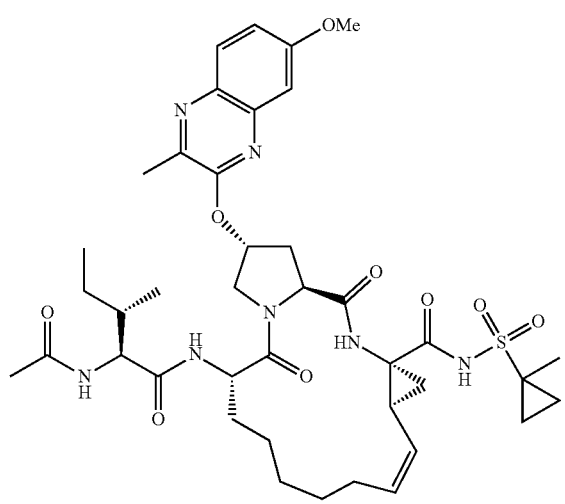 [SMILES: CC[C@H](C)[C@H](NC(C)=O)C(=O)N[C@H]1CCCCC/C=C\[C@@H]2C[C@@]2(C(=O)NS(=O)(=O)C2(C)CC2)NC(=O)[C@@H]2C[C@@H](Oc3nc4cc(OC)ccc4nc3C)CN2C1=O]

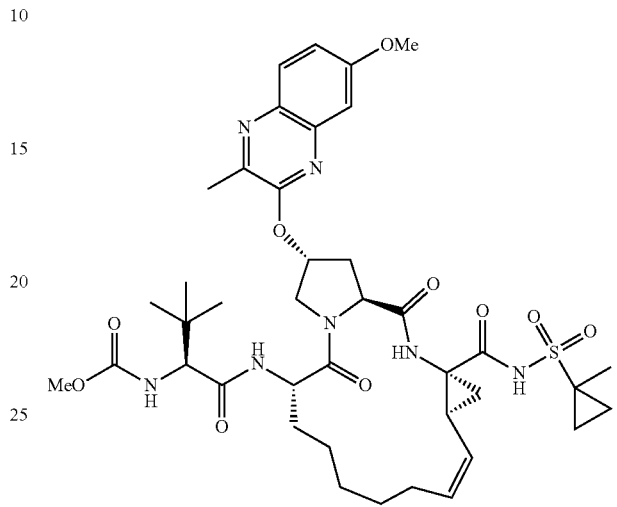

The same procedure was used as described above for compound P4-P5-2. A mixture of amine salt AJ-63 (0.15 g, 0.22 mmol) and N-Ac-Ile-OH (0.061 g, 0.35 mmol) was treated with DIEA (0.23 mL, 1.4 mmol) and HATU (0.21 g, 0.55 mmol) to provide the target compound P4-P5-6 (0.10 g, 56%) as a white solid. $^1$H NMR (500 MHz, CD$_3$OD) δ 8.15 (d, J=7.0 Hz, 1H), 7.77-7.73 (m, 2H), 7.25 (d, J=2.5 Hz, 1H), 7.20 (dd, J=9.0, 2.5 Hz, 1H), 5.98 (br s, 1H), 5.70 (q, J=8.5 Hz, 1H), 5.05 (t, J=9.0 Hz, 1H), 4.67 (t, J=8.5 Hz, 1H), 4.62 (d, J=12.0 Hz, 1H), 4.44-4.40 (m, 1H), 4.11-4.05 (m, 2H), 3.93 (s, 3H), 2.71-2.62 (m, 2H), 2.58-2.50 (m, 4H), 2.43 (q, J=8.5 Hz, 1H), 1.99-1.84 (m, 5H), 1.73 (dd, J=8.0, 5.5 Hz, 1H), 1.64-1.25 (m, 15H), 1.09-1.00 (m, 1H), 0.90-0.84 (m, 2H), 0.82 (t, J=7.5 Hz, 3H), 0.73 (d, J=7.0 Hz, 3H) ppm; $^{13}$C NMR (125 MHz, CD$_3$OD) δ 179.32, 173.67, 173.04, 172.90, 169.48, 162.00, 157.02, 146.25, 142.65, 136.84, 134.81, 129.23, 126.43, 119.74, 107.33, 76.71, 60.75, 58.56, 56.27, 54.38, 52.43, 45.31, 38.16, 37.59, 35.97, 33.21, 31.01, 28.61, 28.32, 27.81, 25.96, 23.23, 22.36, 21.75, 19.80, 18.44, 15.87, 14.57, 13.01, 11.29 ppm; HRMS (ESI) m/z: [M+H]$^+$ calcd for C$_{40}$H$_{56}$N$_7$O$_9$S$^+$, 810.3855; found 810.3832.

The same procedure was used as described above for compound P4-P5-2. A mixture of amine salt 11 (0.25 g, 0.36 mmol) and methoxycarbonyl-L-tert-leucine (0.093 g, 0.48 mmol) was treated with DIEA (0.50 mL, 2.87 mmol) and HATU (0.30 g, 0.79 mmol) to provide the target compound P4-P5-1 (0.25 g, 84%) as a white solid. $^1$H NMR (500 MHz, CDCl$_3$) δ 10.22 (s, 1H), 8.64 (br s, 1H), 8.04 (d, J=8.5 Hz, 1H), 7.77 (d, J=9.0 Hz, 1H), 7.20-7.16 (m, 2H), 5.89 (br s, 1H), 5.68 (q, J=8.5 Hz, 1H), 5.48 (d, J=10.0 Hz, 1H), 4.96-4.91 (m, 2H), 4.70 (t, J=8.0 Hz, 1H), 4.43 (d, J=12.0 Hz, 1H), 4.19 (dd, J=11.5, 4.0 Hz, 1H), 3.95 (s, 3H), 3.86 (d, J=10.0 Hz, 1H), 3.63 (s, 3H), 2.78-2.63 (m, 3H), 2.45 (s, 3H), 2.10 (q, J=8.5 Hz, 2H), 1.85-1.70 (m, 3H), 1.50-1.13 (m, 11H), 0.98 (dd, J=10.4, 6.0 Hz, 1H), 0.83-0.77 (m, 2H), 0.65 (s, 9H) ppm; $^{13}$C NMR (125 MHz, CDCl$_3$) δ 176.65, 172.94, 169.36, 166.94, 160.56, 157.69, 155.14, 143.75, 141.13, 136.92, 134.45, 128.99, 124.90, 119.23, 106.12, 75.10, 62.27, 59.25, 55.87, 54.13, 53.24, 50.35, 44.09, 36.64, 35.40, 35.10, 34.38, 28.74, 27.56, 27.50, 26.73, 26.52, 22.89, 19.92, 19.80, 18.31, 14.57, 12.73 ppm; HRMS (ESI) m/z: [M+H]$^+$ calcd for C$_{40}$H$_{56}$N$_7$O$_{10}$S$^+$, 826.3804; found 826.3778.

51

Methyl ((S)-1-(((2R,6S,13aS,14aR,16aS,Z)-2-((7-methoxy-3-methylquinoxalin-2-yl)oxy)-14a-(((1-methylcyclopropyl)sulfonyl)carbamoyl)-5,16-dioxo-1,2,3,5,6,7,8,9,10,11,13a,14,14a,15,16,16a-hexadecahydrocyclopropa[e]pyrrolo[1,2-a][1,4]diazacyclopentadecin-6-yl)amino)-3-methyl-1-oxobutan-2-yl)carbamate (P4-P5-3)

52

Methyl ((S)-1-cyclopentyl-2-(((2R,6S,13aS,14aR,16aS,Z)-2-((7-methoxy-3-methylquinoxalin-2-yl)oxy)-14a-(((1-methylcyclopropyl)sulfonyl)carbamoyl)-5,16-dioxo-1,2,3,5,6,7,8,9,10,11,13a,14,14a,15,16,16a-hexadecahydrocyclopropa[e]pyrrolo[1,2-a][1,4]diazacyclopentadecin-6-yl)amino)-2-oxoethyl)carbamate (P4-P5-5)

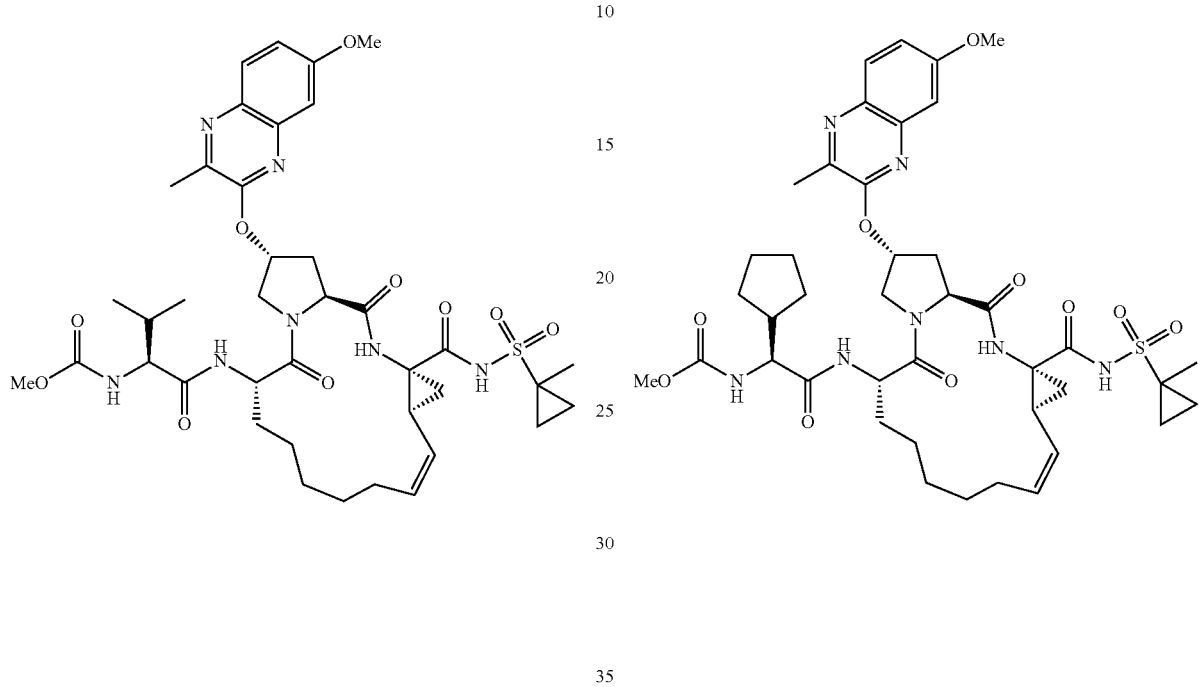

The same procedure was used as described above for compound P4-P5-2. A mixture of amine salt 11 (0.25 g, 0.36 mmol) and methoxycarbonyl-L-valine (0.085 g, 0.48 mmol) was treated with DIEA (0.50 mL, 2.87 mmol) and HATU (0.30 g, 0.79 mmol) to provide the target compound P4-P5-3 (0.24 g, 82%) as a white solid. $^1$H NMR (500 MHz, CDCl$_3$) δ 10.25 (s, 1H), 8.71 (br s, 1H), 8.43 (br s, 1H), 7.80 (d, J=9.5 Hz, 1H), 7.21-7.18 (m, 2H), 5.95 (br s, 1H), 5.72 (q, J=8.5 Hz, 1H), 5.48 (d, J=9.5 Hz, 1H), 4.98-4.89 (m, 2H), 4.67 (t, J=8.0 Hz, 1H), 4.45 (d, J=11.5 Hz, 1H), 4.25 (dd, J=9.5, 4.5 Hz, 1H), 4.19 (dd, J=11.5, 4.0 Hz, 1H), 3.95 (s, 3H), 3.64 (s, 3H), 2.80-2.65 (m, 3H), 2.43 (s, 3H), 2.21 (q, J=8.5 Hz, 1H), 2.14-2.07 (m, 1H), 1.87-1.65 (m, 3H), 1.58-1.36 (m, 10H), 1.31-1.17 (m, 2H), 1.01 (dd, J=9.0, 5.5 Hz, 1H), 0.82-0.77 (m, 5H), 0.67 (d, J=7.0 Hz, 3H) ppm; $^{13}$C NMR (125 MHz, CDCl$_3$) δ 177.09, 173.68, 170.18, 167.08, 160.67, 157.98, 155.22, 143.79, 141.16, 136.88, 134.23, 128.91, 124.87, 119.39, 106.12, 75.07, 59.56, 58.46, 55.90, 54.14, 53.30, 50.23, 44.37, 36.61, 35.53, 34.69, 32.78, 28.66, 27.71, 27.51, 26.90, 22.39, 20.06, 19.72, 19.61, 18.35, 16.70, 14.72, 12.72 ppm; HRMS (ESI) m/z: [M+H]$^+$ calcd for C$_{39}$H$_{54}$N$_7$O$_{10}$S$^+$, 812.3647; found 812.3624.

The same procedure was used as described above for compound P4-P5-2. A mixture of amine salt 11 (0.25 g, 0.36 mmol) and methoxycarbonyl-L-cyclopentylglycine (0.096 g, 0.48 mmol) was treated with DIEA (0.50 mL, 2.87 mmol) and HATU (0.30 g, 0.79 mmol) to provide the target compound P4-P5-5 (0.25 g, 83%) as a white solid. $^1$H NMR (500 MHz, CDCl$_3$) δ 10.26 (s, 1H), 8.73 (br s, 1H), 8.40 (br s, 1H), 7.79 (d, J=10.0 Hz, 1H), 7.20-7.18 (m, 2H), 5.96 (br s, 1H), 5.71 (q, J=9.0 Hz, 1H), 5.52 (d, J=9.5 Hz, 1H), 4.97-4.89 (m, 2H), 4.68 (t, J=8.0 Hz, 1H), 4.43 (d, J=11.5 Hz, 1H), 4.37 (dd, J=9.5, 5.0 Hz, 1H), 4.21 (dd, J=11.5, 4.5 Hz, 1H), 3.95 (s, 3H), 3.64 (s, 3H), 2.72-2.67 (m, 2H), 2.47 (s, 3H), 2.17 (q, J=8.5 Hz, 1H), 2.09-2.04 (m, 1H), 1.96-1.74 (m, 4H), 1.54-1.32 (m, 20H), 1.03 (dd, J=9.0, 6.0 Hz, 1H), 0.84-0.79 (m, 2H) ppm; $^{13}$C NMR (125 MHz, CDCl$_3$) δ 177.12, 173.43, 170.61, 167.07, 160.58, 157.94, 155.27, 143.87, 141.14, 136.86, 134.47, 129.03, 124.86, 119.25, 106.14, 75.04, 59.37, 56.26, 55.90, 54.03, 53.26, 50.27, 44.28, 43.56, 36.61, 35.45, 34.67, 29.39, 28.74, 27.65, 27.51, 26.80, 25.57, 25.37, 22.41, 19.65, 18.33, 14.68, 12.71 ppm; HRMS (ESI) m/z: [M+H]$^+$ calcd for C$_{41}$H$_{56}$N$_7$O$_{10}$S$^+$, 838.3804; found 838.3774.

53

(2R,6S,13aS,14aR,16aS, Z)-6-((S)-2-acetamido-2-cyclopentylacetamido)-2-((7-methoxy-3-methylquinoxalin-2-yl)oxy)-N-((1-methylcyclopropyl)sulfonyl)-5,16-dioxo-1,2,3,6,7,8,9,10,11,13a,14,15,16,16a-tetradecahydrocyclopropa[e]pyrrolo[1,2-a][1,4]diazacyclopentadecine-14a(5H)-carboxamide (AJ-68)

54

Methyl (1-(((2R,6S,13aS,14aR,16aS,Z)-2-((7-methoxy-3-methylquinoxalin-2-yl)oxy)-14a-(((1-methylcyclopropyl)sulfonyl)carbamoyl)-5,16-dioxo-1,2,3,5,6,7,8,9,10,11,13a,14,14a,15,16,16a-hexadecahydrocyclopropa[e]pyrrolo[1,2-a][1,4]diazacyclopentadecin-6-yl)carbamoyl)cyclopentyl)carbamate (WK-25)

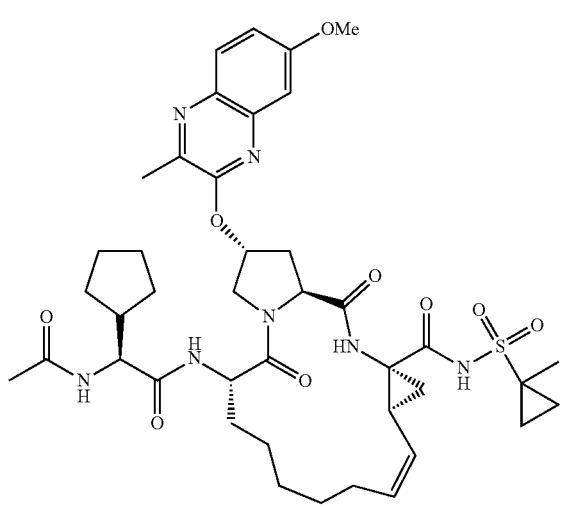 [SMILES: COc1ccc2nc(C)c(O[C@@H]3C[C@H]4C(=O)N[C@]5(C(=O)NS(=O)(=O)C6(C)CC6)C[C@H]5/C=C\CCCCC[C@H](NC(=O)[C@@H](NC(C)=O)C5CCCC5)C(=O)N4C3)nc2c1]

The same procedure was used as described above for compound P4-P5-2. A mixture of amine salt 11 (0.25 g, 0.36 mmol) and N-Ac-cyclopentylglycine (0.075 g, 0.47 mmol) was treated with DIEA (0.50 mL, 2.87 mmol) and HATU (0.30 g, 0.79 mmol) to provide the target compound AJ-68 (0.30 g, 80%) as a white solid. $^1$H NMR (500 MHz, CD$_3$OD) δ 7.76 (d, J=9.5 Hz, 1H), 7.27 (d, J=3.0 Hz, 1H), 7.21 (dd, J=9.0, 3.0 Hz, 1H), 5.99 (br s, 1H), 5.70 (q, J=8.5 Hz, 1H), 5.05 (t, J=9.0 Hz, 1H), 4.66 (t, J=8.5 Hz, 1H), 4.61 (d, J=11.5 Hz, 1H), 4.40 (dd, J=11.0, 2.5 Hz, 1H), 4.10 (dd, J=11.5, 3.5, Hz, 1H), 4.03 (d, J=9.0 Hz, 1H), 3.94 (s, 3H), 2.70-2.62 (m, 2H), 2.58-2.51 (m, 4H), 2.44 (q, J=9.0 Hz, 1H), 1.99-1.85 (m, 6H), 1.73 (dd, J=8.0, 5.5 Hz, 1H), 1.68-1.16 (m, 22H), 0.90-0.84 (m, 2H) ppm; $^{13}$C NMR (125 MHz, CD$_3$OD) δ 179.36, 173.69, 173.28, 173.01, 169.51, 162.04, 157.06, 146.26, 142.70, 136.84, 134.84, 129.25, 126.46, 119.76, 107.35, 76.72, 60.76, 58.21, 56.27, 54.37, 52.44, 45.32, 43.48, 37.60, 35.98, 33.18, 31.02, 30.19, 30.17, 28.62, 28.31, 27.83, 26.14, 25.77, 23.24, 22.30, 21.74, 19.77, 18.44, 14.57, 13.01 ppm; HRMS (ESI) m/z: [M+H]$^+$ calcd for C$_{41}$H$_{56}$N$_7$O$_9$S$^+$, 822.3855; found 822.3836.

The same procedure was used as described above for compound P4-P5-2. A mixture of amine salt 11 (0.25 g, 0.36 mmol) and methoxycarbonyl-L-cycloleucine (0.089 g, 0.48 mmol) was treated with DIEA (0.50 mL, 2.87 mmol) and HATU (0.30 g, 0.79 mmol) to provide the target compound WK-25 (0.20 g, 67%) as a white solid. $^1$H NMR (500 MHz, CDCl$_3$) δ 10.41 (s, 1H), 8.08 (br s, 1H), 7.77 (d, J=9.0 Hz, 1H), 7.18-7.15 (m, 2H), 6.86 (d, J=7.0 Hz, 1H), 5.96 (br s, 1H), 5.71 (q, J=9.0 Hz, 1H), 5.50 (br s, 1H), 5.00 (t, J=9.5 Hz, 1H), 4.62 (t, J=7.5 Hz, 1H), 4.53 (br s, 1H), 4.36 (d, J=11.5 Hz, 1H), 4.14 (dd, J=11.0, 4.5 Hz, 1H), 3.93 (s, 3H), 3.61 (s, 3H), 2.75-2.69 (m, 1H), 2.62-2.55 (m, 1H), 2.51-2.46 (m, 4H), 2.14 (q, J=8.5 Hz, 2H), 1.96-1.45 (m, 18H), 1.40-1.23 (m, 5H), 0.86-0.81 (m, 2H) ppm; $^{13}$C NMR (125 MHz, CDCl$_3$) δ 176.93, 173.94, 173.00, 167.34, 160.42, 156.24, 155.38, 144.41, 141.11, 136.43, 134.46, 129.00, 125.24, 119.00, 106.17, 74.75, 67.04, 59.33, 55.86, 52.96, 52.32, 51.64, 44.48, 38.73, 37.91, 36.61, 36.18, 34.62, 32.23, 29.81, 27.82, 27.22, 26.04, 24.22, 22.67, 19.93, 18.24, 14.76, 12.63 ppm; HRMS (ESI) m/z: [M+H]$^+$ calcd for C$_{40}$H$_{54}$N$_7$O$_{10}$S$^+$, 824.3647; found 824.3618.

Methyl ((S)-1-cyclohexyl-2-(((2R,6S,13aS,14aR,16aS,Z)-2-((7-methoxy-3-methylquinoxalin-2-yl)oxy)-14a-(((1-methylcyclopropyl)sulfonyl)carbamoyl)-5,16-dioxo-1,2,3,5,6,7,8,9,10,11,13a,14,14a,15,16,16a-hexadecahydrocyclopropa[e]pyrrolo[1,2-a][1,4]diazacyclopentadecin-6-yl)amino)-2-oxoethyl)carbamate (NR03-68)

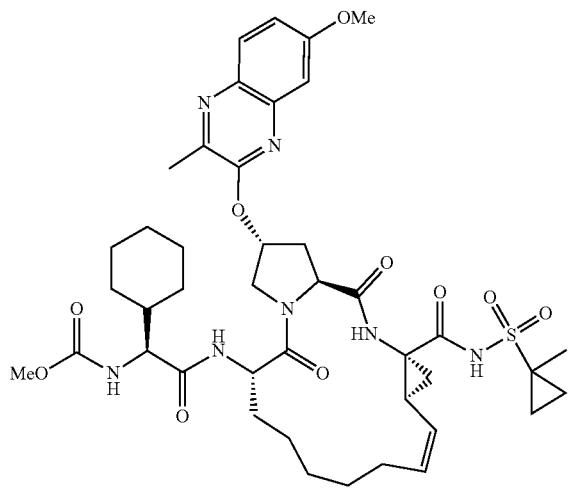 [SMILES: COC(=O)N[C@H](C(=O)N[C@H]1CCCCC/C=C\[C@@H]2C[C@@]2(C(=O)NS(=O)(=O)C2(C)CC2)NC(=O)[C@@H]2C[C@@H](Oc3nc4cc(OC)ccc4nc3C)CN2C1=O)C1CCCCC1]

The same procedure was used as described above for compound P4-P5-2. A mixture of amine salt 11 (0.120 g, 0.170 mmol) and (S)-2-cyclohexyl-2-((methoxycarbonyl)amino) acetic acid (0.057 g, 0.26 mmol) was treated with DIEA (0.253 mL, 1.36 mmol) and HATU (0.143 g, 0.374 mmol) to provide the target compound NR03-68 (0.132 g, 84%) as a white solid. $^1$H NMR (500 MHz, CDCl$_3$) δ 10.21 (s, 1H), 8.32 (br s, 1H), 7.91 (br s, 1H), 7.80 (d, J=9.5 Hz, 1H), 7.21-7.18 (m, 2H), 5.96 (br s, 1H), 5.66 (q, J=9.0 Hz, 1H), 5.35 (d, J=9.5 Hz, 1H), 4.95 (t, J=8.5 Hz, 1H), 4.84 (t, J=8.5 Hz, 1H), 4.72 (t, J=7.5 Hz, 1H), 4.45 (d, J=11.0 Hz, 1H), 4.19 (dd, J=11.5, 4.0 Hz, 1H), 4.11 (dd, J=9.0, 6.0 Hz, 1H), 3.96 (s, 3H), 3.65 (s, 3H), 2.76-2.62 (m, 3H), 2.49 (s, 3H), 2.12 (q, J=8.5 Hz, 1H), 2.05-1.95 (m, 1H), 1.86-1.74 (m, 3H), 1.70-1.34 (m, 16H), 1.27-0.79 (m, 9H) ppm; $^{13}$C NMR (125 MHz, CDCl$_3$) δ 177.01, 173.07, 170.57, 166.98, 160.55, 157.60, 155.31, 144.15, 141.18, 136.96, 134.49, 129.06, 124.86, 119.17, 106.17, 74.91, 59.19, 59.10, 55.91, 53.90, 53.03, 50.78, 44.36, 41.54, 38.75, 36.65, 35.19, 34.32, 29.88, 29.19, 27.90, 27.47, 27.41, 26.45, 26.07, 26.01, 25.86, 22.62, 20.06, 19.89, 18.33, 14.63, 12.77 ppm; HRMS (ESI) m/z: [M+H]$^+$ calcd for C$_{42}$H$_{58}$N$_7$O$_{10}$S, 852.3960; found 852.3935.

Example 2

The P1-P3 macrocyclic NS3/4A protease inhibitors with flexible P2 quinoxaline moieties were synthesized using the reaction sequence outlined in Scheme 2. The key tert-butoxycarbonyl (Boc)-protected P2 intermediates 1a-b were prepared from the corresponding 3-substituted quinoxalin-2-ones by a cesium carbonate-mediated nucleophilic substation reaction with the activated cis-hydroxyproline derivative as described previously (Matthew et al., 2017). The target macrocyclic inhibitors were assembled from the P2 intermediates 1a-d using a sequence of deprotection and peptide coupling steps followed by the ring-closing metathesis (RCM) reaction. Briefly, removal of the Boc group in 1a-d using 4 N HCl in 1,4-dioxane provided the amine salts 2a-d, which were coupled with the (S)-2-((tert-butoxycarbonyl)amino)non-8-enoic acid 3 in the presence of HATU and diisopropylethylamine (DIEA) in DMF to yield the P2-P3 ester intermediates 4a-d. The esters 4a-d were treated with LiOH·H$_2$O in a mixture of tetrahydrofuran and water to afford the carboxylic acids 5a-d. The required P1-P1' acylsulfonamide intermediates 6 and 7 were prepared following reported methods (Wang et al., 2006) (Rudd et al., 2015) and were reacted with the P2-P3 acid intermediates 5a-d under HATU/DIEA coupling conditions to provide the bis-olefin intermediates 8b-d and 9a. Finally, cyclization of the bis-olefin intermediates was accomplished using a highly efficient RCM catalyst Zhan Catalyst-1B and provided the target inhibitors 11b-d (5172-mcP1P3, AM-07, and MG-28, respectively) and 12a (JZ01-15). Details of experimental procedures and characterization data for intermediates and final compounds have been reported previously (Matthew et al., 2017).

TABLE 1

Inhibitory activity against wild-type HCV NS3/4A protease and drug-resistant variants

| Inhibitor | P4-Cap | Ki (nM) WT (GT1a) | D168A | GT3 | Inhibitor | P4-Cap | Ki (nM) WT (GT1a) | D168A | GT3 |
|---|---|---|---|---|---|---|---|---|---|
| JZ01-15 | tBuO- | 3.60 ± 0.44 | 52 ± 2.4 | 119 ± 18 | CH-24 | tBuO- | 5.77 ± 1.78 | 118 ± 13 | 231 ± 74 |
| | | | | | NR02-47 | | 2.67 ± 0.23 | 15.1 ± 1.0 | |
| | | | | | NR02-52 | | 4.60 ± 0.66 | 20.9 ± 2.1 | |
| NR01-99 | (S) | 1.91 ± 0.30 | 21.7 ± 2.3 | | NR01-101 | (S) | 6.10 ± 0.57 | 26.2 ± 2.3 | 447 ± 25 |
| NR01-119 | (R) | 1.52 ± 0.02 | 23.9 ± 3.5 | | NR01-121 | (R) | 2.96 ± 0.22 | 10.4 ± 0.9 | |
| NR02-25 | (S) | 1.84 ± 0.12 | 31.9 ± 1.8 | | NR02-33 | (S) | 10.4 ± 0.94 | 54.4 ± 3.7 | 412 ± 21 |
| NR02-26 | (R) | 1.501 ± 0.06 | 23.5 ± 1.3 | | NR02-34 | (R) | 11.8 ± 1.4 | 26.2 ± 0.6 | |
| AJ-71 | F₃C- | 2.56 ± 0.44 | 39 ± 2.9 | | NR01-129 | F₃C- | 3.60 ± 0.30 | 15.5 ± 1.8 | |

TABLE 1-continued

Inhibitory activity against wild-type HCV NS3/4A protease and drug-resistant variants

| Inhibitor | P4-Cap | Ki (nM) WT (GT1a) | D168A | GT3 | Inhibitor | P4-Cap | Ki (nM) WT (GT1a) | D168A | GT3 |
|---|---|---|---|---|---|---|---|---|---|
| NR02-23 | F$_3$C—(S)—O– | 0.74 ± 0.20 | 40 ± 6 | | NR02-32 | F$_3$C—(S)—O– | 7.69 ± 0.89 | 44.6 ± 7.3 | 580 ± 50 |
| NR01-145 | F$_3$C—(R)—O– | 1.10 ± 0.10 | 8 ± 1 | 122 ± 11 | NR01-147 | F$_3$C—(R)—O– | 2.80 ± 0.70 | 17.0 ± 2.4 | |
| | | | | | NR02-41 | isobutyl-O– | 4.01 ± 0.46 | 14.9 ± 1.4 | |
| | | | | | NR02-48 | neopentyl-O– | 2.94 ± 0.14 | 13.0 ± 1.6 | |
| NR01-115 | (methylcyclopropyl)-CH$_2$-O– | 0.65 ± 0.2 | 21.6 ± 1.7 | | NR01-117 | (methylcyclopropyl)-CH$_2$-O– | 2.89 ± 0.19 | 18.6 ± 2.0 | |
| NR02-55 | (difluoromethylcyclopropyl)-CH$_2$-O– | 3.1 ± 0.3 | 4.7 ± 0.5 | 100 ± 12 | NR02-56 | (difluoromethylcyclopropyl)-CH$_2$-O– | 2.10 ± 0.50 | 7.1 ± 0.9 | 336 ± 47 |
| NR02-49 | (CF$_3$-cyclopropyl)-CH$_2$-O– | 0.9 ± 0.1 | 27.4 ± 1.2 | | NR02-50 | (CF$_3$-cyclopropyl)-CH$_2$-O– | 3.46 ± 0.26 | 39.5 ± 5.1 | |
| Grazoprevir (MK-5172) | | 0.21 ± 0.03 | 49 ± 1.6 | 30 ± 1.9 | | | | | |
| Glecaprevir (ABT-493) | | 0.05 ± 0.004 | 90 ± 6 | 0.5 ± 0.1 | | | | | |

TABLE 2

Inhibitory activity against wild-type HCV NS3/4A protease and drug-resistant variants

| Inhibitor | P4-Cap | WT (GT1a) | D168A | GT3 | Inhibitor | P4-Cap | WT (GT1a) | D168A | GT3 |
|---|---|---|---|---|---|---|---|---|---|
| | | Ki (nM) | | | | | Ki (nM) | | |
| JZ01-15 | tBuO | 3.60 ± 0.44 | 52 ± 2.4 | 119 ± 18 | CH-24 | tBuO | 5.77 ± 1.78 | 118 ± 13 | 231 ± 74 |
| NR03-67 | cyclohexyl ester | 0.94 ± 0.25 | 12.7 ± 1.2 | 145 ± 7 | | | | | |
| JZ01-19 | cyclopentyl-O | 1.13 ± 0.22 | 36 ± 1.8 | 121 ± 16 | CH-30 | cyclopentyl-O | 8.14 ± 2.37 | 110 ± 14 | 433 ± 206 |
| AJ-74 | 1-Me-cyclopentyl-O | 1.78 ± 0.30 | 16 ± 1.2 | 151 ± 11 | NR02-15 | 1-Me-cyclopentyl-O | 0.9 ± 0.1 | 11.8 ± 1.8 | 161 ± 13 |
| NR01-97 | 1-Et-cyclopentyl-O | 1.29 ± 0.05 | 21.7 ± 2.3 | | | | | | |
| NR03-77 | bicyclic-O | 0.54 ± 0.2 | 2.3 ± 0.7 | 38.6 ± 1.5 | NR04-49 | bicyclic-O | | XXX | 170 ± 13 |
| NR02-60 | 1-CF₃-cyclopentyl-O | 1.30 ± 0.20 | 8.1 ± 1.5 | 104 ± 7 | NR04-01 | 1-CF₃-cyclopentyl-O | 5.66 ± 0.50 | 20.4 ± 0.9 | 414 ± 23 |
| NR02-08 | F-cyclopentyl-O | 2.30 ± 0.20 | 16 ± 1 | 216 ± 32 | NR02-09 | F-cyclopentyl-O | 8.0 ± 1.8 | 18.9 ± 3.6 | |

TABLE 2-continued

Inhibitory activity against wild-type HCV NS3/4A protease and drug-resistant variants

| Inhibitor | P4-Cap | WT (GT1a) Ki (nM) | D168A Ki (nM) | GT3 | Inhibitor | P4-Cap | WT (GT1a) Ki (nM) | D168A Ki (nM) | GT3 |
|---|---|---|---|---|---|---|---|---|---|
| NR01-127 | cyclobutyl-O | 0.30 ± 0.20 | 52.4 ± 9.0 | | NR01-95 | cyclobutyl-O | 8.53 ± 0.87 | 29.5 ± 1.8 | |
| NR02-61 | methyl-cyclobutyl-O | 1.40 ± 0.13 | 46.4 ± 3.4 | | NR02-62 | methyl-cyclobutyl-O | 4.86 ± 0.39 | 20.7 ± 0.7 | 283 ± 21 |
| NR02-58 | F$_3$C-cyclobutyl-O | 1.50 ± 0.20 | 11.3 ± 2.0 | 96 ± 17 | NR02-59 | F$_3$C-cyclobutyl-O | 2.0 ± 0.20 | 12.2 ± 1.1 | 133 ± 25 |
| NR01-149 | F,F-cyclobutyl-O | 0.62 ± 0.30 | 26 ± 1 | | NR01-151 | F,F-cyclobutyl-O | 10.9 ± 1.10 | 43.2 ± 6.3 | |
| | | | | | NR02-46 | cyclopropyl-O | 13.6 ± 0.90 | 67.5 ± 3.9 | 522 ± 25 |
| NR02-24 | cyclopropyl-O | 4.44 ± 0.30 | 27.9 ± 4.1 | | NR02-31 | cyclopropyl-O | 11.4 ± 0.84 | 41.3 ± 7.3 | |
| Grazoprevir (MK-5172) | | 0.21 ± 0.03 | 49 ± 1.6 | 30 ± 1.9 | | | | | |
| Glecaprevir (ABT-493) | | 0.05 ± 0.004 | 90 ± 6 | 0.5 ± 0.1 | | | | | |

Experimental

General. All reactions were performed in oven-dried round-bottom flasks fitted with rubber septa under argon atmosphere unless otherwise noted. All reagents and solvents, including anhydrous solvents, were purchased from commercial sources and used as received. Flash column chromatography was performed on an automated Teledyne ISCO CombiFlash Rf+ system equipped with a UV-vis detector using disposable Redisep Gold high performance silica gel columns or was performed manually using silica gel (230-400 mesh, EMD Millipore). Thin-layer chromatography (TLC) was performed using silica gel (60 F$_{254}$) coated aluminum plates (EMD Millipore), and spots were visualized by exposure to ultraviolet light (UV), exposure to iodine adsorbed on silica gel, and/or staining with alcohol solutions of phosphomolybdic acid (PMA) and ninhydrin followed by brief heating. $^1$H NMR and $^{13}$C NMR spectra were acquired on a Bruker Avance III HD 500 MHz NMR instrument. Chemical shifts are reported in ppm (δ scale)

with the residual solvent signal used as a reference and coupling constant (J) values are reported in hertz (Hz). Data are presented as follows: chemical shift, multiplicity (s=singlet, d=doublet, dd=doublet of doublet, dd=doublet of triplet, t=triplet, m=multiplet, br s=broad singlet), coupling constant in Hz, and integration. High-resolution mass spectra (HRMS) were recorded on a Thermo Scientific Orbitrap Velos Pro mass spectrometer coupled with a Thermo Scientific Accela 1250 UPLC and an autosampler using electrospray ionization (ESI) in the positive mode. The purity of final compounds was determined by analytical HPLC and was found to be >95% pure. HPLC was performed on a Agilent 1200 system equipped with a multiple wavelength detector and a manual injector under the following conditions: column, Phenomenex Hypersil-BDS-5u-C18 (5 m, 4.6 mm×250 mm, 130 Å); solvent A, $H_2O$ containing 0.10% trifluoroacetic acid (TFA); solvent B, $CH_3CN$ containing 0.1% TFA; gradient, 20% B to 100% B over 15 min followed by 100% B over 5 min; injection volume, 20 μL; flow rate, 1 mL/min. The wavelengths of detection were 254 nm and 280 nm. Retention times and purity data for each target compound are provided in the Experimental Section.

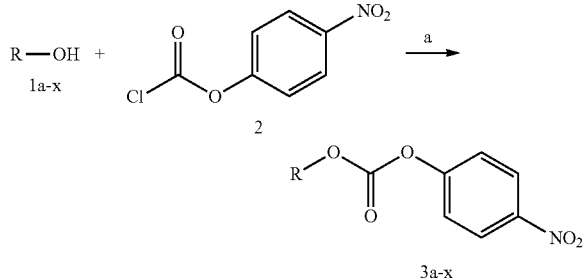

Reagents and Conditions: (a) Pyridine, 0° C. to RT, RT 48 h.

Scheme 3. Synthesis of HCV NS3/4A protease inhibitors
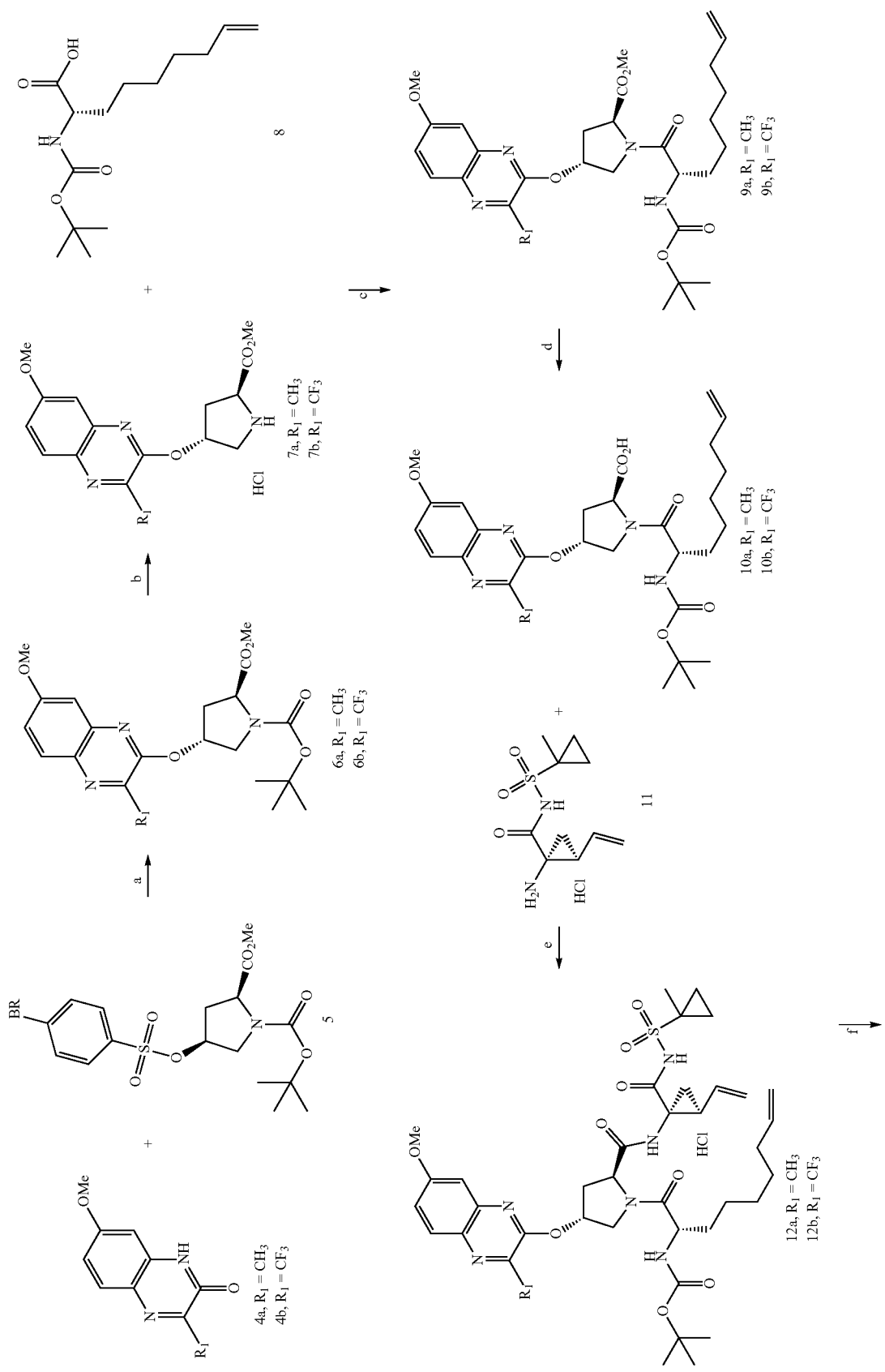

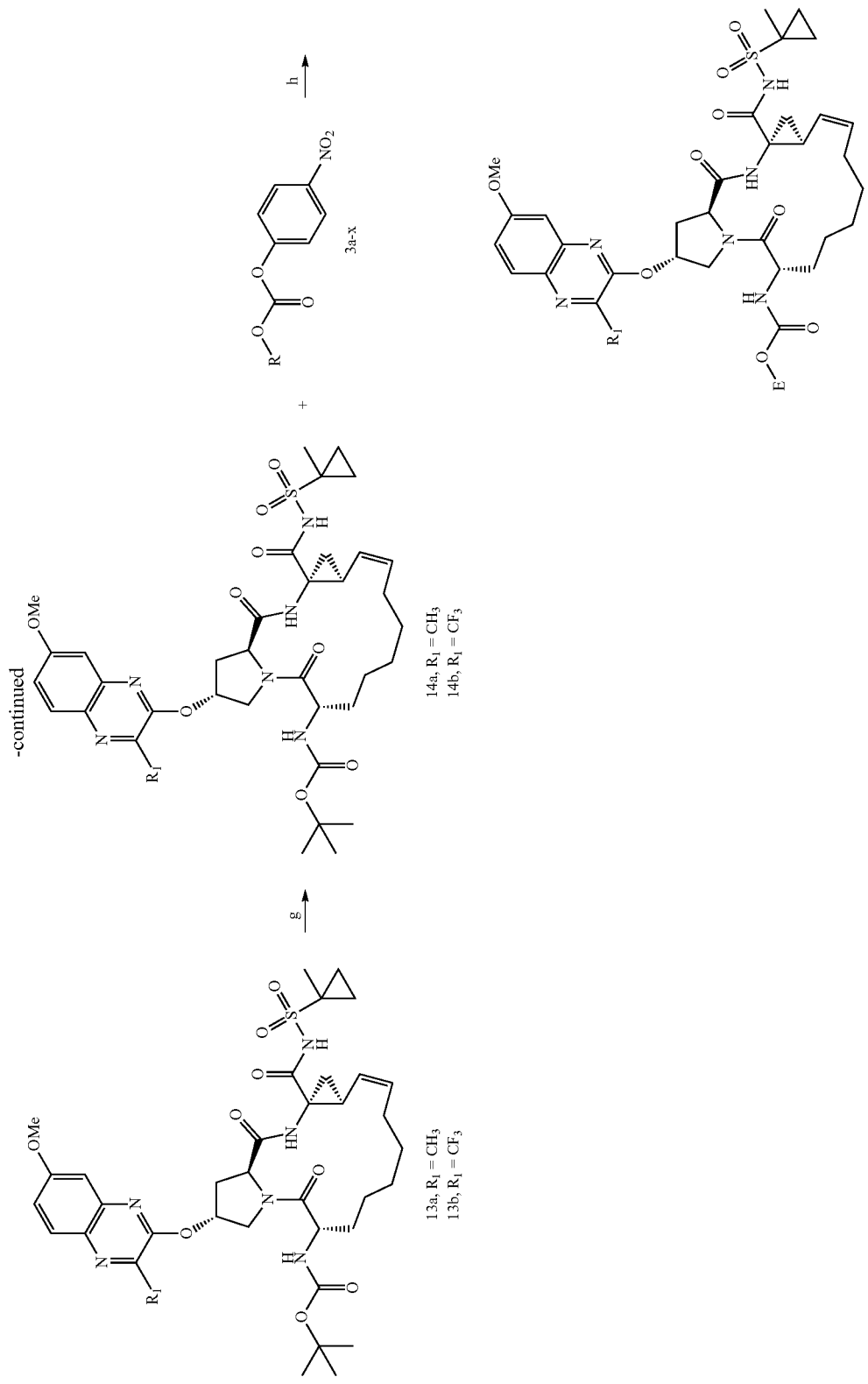
Reagents and Conditions:
(a) Cs$_2$CO$_3$, NMP, 55 °C., 6 h;
(b) 4N HCl in dioxane, CH$_2$Cl$_2$, RT, 3 h;
(c) HATU, DIEA, DMF, RT, 4 h;
(d) LiOH·H$_2$O, THF, H$_2$O, RT, 24 h;
(e) HATU, DIEA, DMF, RT, 2 h;
(f) Zhan 1b catalyst 1,2-DCE, 70° C., 6 h;
(g) 4 N HCl in dioxane, RT, 3 h;
(h) alcohol-(4-nitrophenyl)carbonate, DIEA, CH$_3$CN, RT, 36 h.

1-(tert-Butyl) 2-methyl (2S,4R)-4-((7-methoxy-3-methylquinoxalin-2-yl) oxy) pyrolidine-1,2-dicarboxylate (AJ-60)

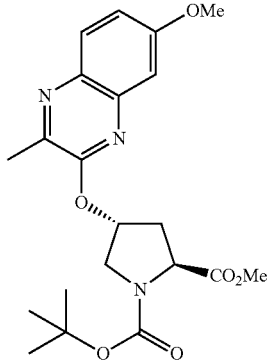 [SMILES: COC(=O)[C@@H]1C[C@@H](Oc2nc3cc(OC)ccc3nc2C)CN1C(=O)OC(C)(C)C]

A solution of 7-methoxy-3-methylquinoxalin-2(1H)-one (6.2 g, 32.6 mmol) in anhydrous NMP (100 mL) was treated with Cs$_2$CO$_3$ (16.0 g, 49.0 mmol). After stirring the reaction mixture at room temperature for 15 min, activated cis-hydroxyproline derivative (14.0 g, 30.2 mmol) was added in one portion. The reaction mixture was heated to 55° C., stirred for 4 h, and then another portion of activated cis-hydroxyproline (1.0 g, 2.15 mmol) was added. The resulting reaction mixture was stirred at 55° C. for additional 2 h, cooled to room temperature, quenched with aqueous 1 N HCl solution (250 mL), and extracted with EtOAc (400 mL). The organic fraction was washed successively with saturated aqueous NaHCO$_3$ and NaCl (250 mL each), dried (Na$_2$SO$_4$), filtered, and evaporated under reduced pressure. The residue was purified by flash column chromatography (RediSep Gold column, 2×80 g, gradient elution with 0-60% EtOAc/hexanes) to provide AJ-60 (10.0 g, 74%) as a white foamy solid. $^1$H NMR (500 MHz, CDCl$_3$) (mixture of rotamers, major rotamer) δ 7.80 (d, J=9.0 Hz, 1H), 7.17 (dd, J=9.0, 3.0 Hz, 1H), 7.11 (d, J=2.5 Hz, 1H), 5.71 (br s, 1H), 4.48 (t, J=8.0 Hz, 1H), 3.99-3.91 (m, 4H), 3.87 (d, J=12.5 Hz, 1H), 3.78 (s, 3H), 2.67-2.58 (m, 1H), 2.56 (s, 3H), 2.43-2.37 (m, 1H), 1.43 (s, 9H) ppm; $^{13}$C NMR (125 MHz, CDCl$_3$) δ 173.36, 160.24, 155.51, 153.81, 144.60, 141.04, 134.22, 128.95, 118.63, 105.95, 80.54, 73.59, 58.20, 55.68, 52.48, 52.20, 36.70, 28.26, 19.93 ppm; HRMS (ESI) m/z: [M+H]$^+$ calcd for C$_{21}$H$_{28}$N$_3$O$_6$, 418.1973; found 418.1976.

1-(tert-Butyl) 2-methyl (2S,4R)-4-((7-methoxy-3-(trifluoromethyl) quinoxalin-2-yl) oxy) pyrrolidine-1,2-dicarboxylate (NR01-19)

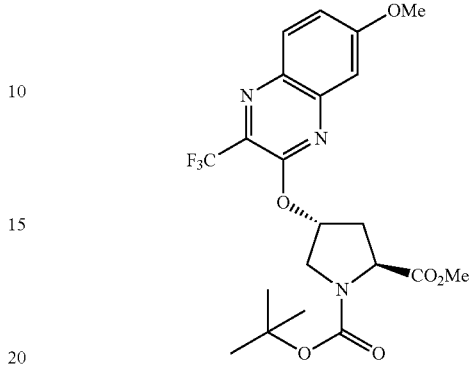

The same procedure was used as described above for compound AJ-60. 7-Methoxy-3-(trifluoromethyl) quinoxalin-2(1H)-one (4.76 g, 19.5 mmol) in NMP (65 mL) was treated with Cs$_2$CO$_3$ (9.80 g, 30.0 mmol) and proline derivative 3 (9.0 g, 19.3 mmol) to provide NR01-19 (6.50 g, 71%) as a pale-yellow foamy solid. $^1$H NMR (500 MHz, CDCl$_3$) (mixture of rotamers, major rotamer) δ 7.77 (d, J=9.0 Hz, 1H), 7.48-7.43 (m, 2H), 5.76 (br s, 1H), 4.50 (t, J=8.0 Hz, 1H), 3.97-3.91 (m, 5H), 3.78 (s, 3H), 2.69-2.64 (m, 1H), 2.41-2.34 (m, 1H), 1.42 (s, 9H) ppm; $^{13}$C NMR (125 MHz, CDCl$_3$) δ 173.43, 159.58, 153.98, 152.11, 138.39, 137.22, 127.99, 125.73, 120.70 (q, J=273.4 Hz), 107.64, 80.69, 74.62, 58.27, 56.02, 52.32, 52.11, 36.70, 28.34 ppm; $^{19}$F NMR (470 MHz, CDCl$_3$) δ −67.73 ppm; HRMS (ESI) m/z: [M+H]$^+$ calcd for C$_{21}$H$_{25}$F$_3$N$_3$O$_6$, 472.1690; found, 472.1689.

Methyl (2S,4R)-1-((S)-2-((tert-butoxycarbonyl) amino) non-8-enoyl)-4-((7-methoxy-3-methylquinoxalin-2-yl) oxy) pyrrolidine-2-carboxylate (AJ-64)

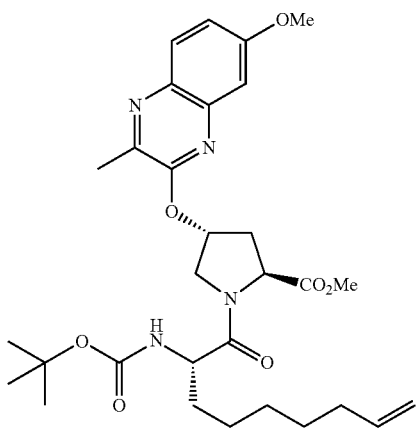 [SMILES: C=CCCCCC[C@H](NC(=O)OC(C)(C)C)C(=O)N1C[C@H](Oc2nc3cc(OC)ccc3nc2C)C[C@H]1C(=O)OC]

A solution of ester AJ-60 (10.0 g, 24.0 mmol) in anhydrous CH$_2$Cl$_2$ (50 mL) was treated with a solution of 4 N HCl in 1,4-dioxane (100 mL). After stirring the reaction mixture at room temperature for 3 h, solvents were evaporated under reduced pressure, and the residue was dried under high vacuum. The pale-yellow solid was triturated with diethyl ether (3×25 mL) and dried under high vacuum to yield the amine salt AJ-62 (8.5 g, 100%) as an off-white powder.

A mixture of amine salt AJ-62 (8.5 g, 24.0 mmol) and (S)-2-((tert-butoxycarbonyl) amino) non-8-enoic acid (6.70 g, 24.7 mmol) in anhydrous DMF (110 mL) was treated with DIEA (19.2 mL, 110 mmol) and HATU (14.1 g, 37.1 mmol). The resulting reaction mixture was stirred at room temperature for 4 h, then diluted with EtOAc (500 mL), and washed successively with aqueous 0.5 N HCl, saturated aqueous NaHCO$_3$, and saturated aqueous NaCl (300 mL each). The organic portion was dried (Na$_2$SO$_4$), filtered, and evaporated under reduced pressure. The residue was purified by flash column chromatography (RediSep Gold column, 2×80 g, gradient elution with 0-60% EtOAc/hexanes) to provide AJ-64 (10.9 g, 80%) as a white foamy solid. $^1$H NMR (500 MHz, CDCl$_3$) (mixture of rotamers, major rotamer) δ 7.81 (d, J=9.0 Hz, 1H), 7.18 (dd, J=9.0, 2.5 Hz, 1H), 7.12 (d, J=2.5 Hz, 1H), 5.84-5.75 (m, 2H), 5.21 (d, J=8.5 Hz, 1H), 5.01-4.92 (m, 2H), 4.75 (t, J=8.0 Hz, 1H), 4.38 (q, J=7.5 Hz, 1H), 4.18 (d, J=11.5 Hz, 1H), 4.06 (dd, J=12.0, 4.5 Hz, 1H), 3.94 (s, 3H), 3.77 (s, 3H), 2.69-2.64 (m, 1H), 2.54 (s, 3H), 2.41-2.35 (m, 1H), 2.04 (app q, J=7.0 Hz, 2H), 1.80-1.75 (m, 1H), 1.63-1.55 (m, 1H), 1.46-1.24 (m, 15H) ppm; $^{13}$C NMR (125 MHz, CDCl$_3$) δ 172.13, 171.78, 160.27, 155.40, 155.27, 144.62, 140.89, 138.96, 134.39, 129.03, 118.73, 114.35, 105.99, 79.61, 74.30, 57.97, 55.66, 52.67, 52.43, 51.83, 34.94, 33.65, 32.66, 28.91, 28.74, 28.25, 24.68, 19.87 ppm; HRMS(ESI) m/z: [M+H]$^+$ calcd for C$_{30}$H$_{43}$N$_4$O$_7$, 571.3126; found 571.3128.

Methyl (2S,4R)-1-((S)-2-((tert-butoxycarbonyl) amino) non-8-enoyl)-4-((7-methoxy-3-(trifluoromethyl) quinoxalin-2-yl) oxy) pyrrolidine-2-carboxylate (NR01-65)

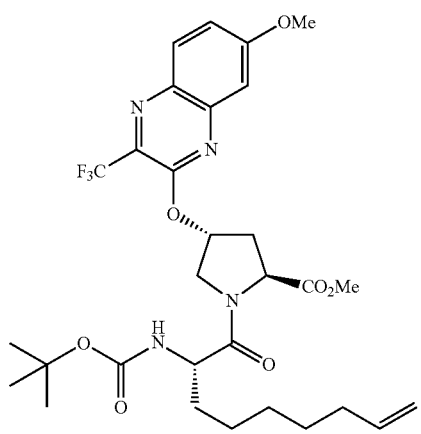 [SMILES: C=CCCCCC[C@H](NC(=O)OC(C)(C)C)C(=O)N1C[C@H](Oc2nc3cc(OC)ccc3nc2C(F)(F)F)C[C@H]1C(=O)OC]

The same procedure was used as described above for compound AJ-64. Compound NR01-19 (6.0 g, 12.7 mmol) was treated with 4 N HCl (40 mL) to afford amine salt NR01-29 (5.10 g, 12.5 mmol), which was coupled with acid (3.80 g, 14.0 mmol) using DIEA (9.25 mL, 56.0 mmol) and HATU (7.60 g, 20.0 mmol) to provide NR01-65 (6.40 g, 81%) as a pale-yellow foamy solid. $^1$H NMR (500 MHz, CDCl$_3$) (mixture of rotamers, major rotamer) δ 7.78 (d, J=9.0 Hz, 1H), 7.48 (dd, J=9.0, 2.5 Hz, 1H), 7.44 (d, J=2.5 Hz, 1H), 5.86 (br s, 1H), 5.84-5.78 (m, 1H), 5.18 (d, J=9.0 Hz, 1H), 5.01-4.92 (m, 2H), 4.75 (t, J=8.0 Hz, 1H), 4.35 (q, J=7.5 Hz, 1H), 4.19 (d, J=12.0 Hz, 1H), 4.08 (dd, J=11.5, 4.5 Hz, 1H), 3.95 (s, 3H), 3.78 (s, 3H), 2.70-2.65 (m, 1H), 2.41-2.35 (m, 1H), 2.04 (app q, J=7.0 Hz, 2H), 1.80-1.75 (m, 1H), 1.60-1.54 (m, 1H), 1.45-1.28 (m, 15H) ppm; $^{13}$C NMR (125 MHz, CDCl$_3$). 172.10, 171.60, 159.99, 155.37, 151.78, 138.98, 138.41, 136.93, 134.40 (q, J=36.3 Hz), 127.85, 125.66, 120.53 (q, J=273.4 Hz), 114.33, 107.54, 79.58, 75.05, 57.83, 55.91, 52.44, 52.33, 51.75, 34.77, 33.65, 32.70, 28.91, 28.73, 28.18, 24.70 ppm; $^{19}$F NMR (470 MHz, CDCl3) δ −67.73 ppm; HRMS (ESI) m/z: [M+H]$^+$ calcd for C$_{30}$H$_{40}$F$_3$N$_4$O$_7$, 625.2844; found, 625.2844.

tert-Butyl ((S)-1-((2S,4R)-4-((7-methoxy-3-methylquinoxalin-2-yl) oxy)-2-(((1R,2S)-1-(((1-methylcyclopropyl) sulfonyl) carbamoyl)-2-vinylcyclopropyl) carbamoyl)pyrrolidine-1-yl)-1-oxonon-8-en-2-yl) carbamate (AJ-81)

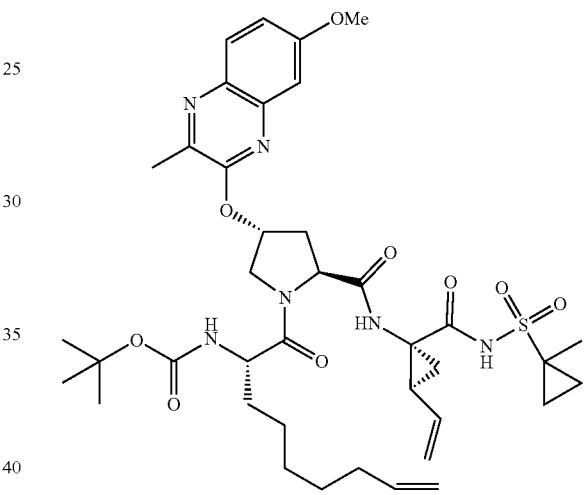

A solution of ester AJ-64 (6.0 g, 10.5 mmol) in THF-H$_2$O mixture (1:1, 150 mL) was treated with LiOH·H$_2$O (1.55 g, 36.9 mmol). The resulting reaction mixture was stirred at room temperature for 24 h. The reaction mixture was cooled to ~5° C., acidified to a pH of 2.0 by slow addition of aqueous 0.25 N HCl (~ 200 mL), and extracted with EtOAc (2×400 mL). The organic portions were washed separately with saturated aqueous NaCl (200 ml), dried (Na$_2$SO$_4$), filtered, and evaporated under reduced pressure. The gummy residue was dissolved in CHCl$_3$ (50 mL), concentrated under reduced pressure, and the residue was dried under high vacuum overnight to yield the acid AJ-77 (5.80 g, 99%) as a white solid.

A mixture of acid AJ-77 (5.57 g, 10.0 mmol) and amine salt NR01-73 (3.10 g, 11.0 mmol) in anhydrous DMF (100 mL) was treated with DIEA (6.70 mL, 40.5 mmol) and HATU (5.70 g, 15.0 mmol). The resulting reaction mixture was stirred at room temperature for 2.5 h, then diluted with EtOAc (400 mL) and washed successively with aqueous 0.5 N HCl, saturated aqueous NaHCO$_3$, and saturated aqueous NaCl (250 mL each). The organic portion was dried (Na$_2$SO$_4$), filtered, and evaporated under reduced pressure. The residue was purified by flash column chromatography (RediSep Gold column, 2×80 g, gradient elution with 20-90% EtOAc/hexanes) to provide the bis-olefin compound AJ-81 (6.50 g, 83%) as a white solid. $^1$H NMR (400 MHz, CDCl$_3$) δ 10.02 (s, 1H), 7.81 (d, J=8.8 Hz, 1H), 7.18 (dd, J=8.8, 2.8 Hz, 1H), 7.13 (d, J=2.8 Hz, 1H), 7.11 (s, 1H), 5.88 (br s, 1H), 5.82-5.72 (m, 2H), 5.42 (d, J=9.2 Hz, 1H), 5.26 (d, J=17.2 Hz, 1H), 5.14 (d, J=11.6 Hz, 1H), 5.00-4.90 (m, 2H), 4.50 (t, J=8.4 Hz, 1H), 4.39-4.33 (m, 1H), 4.18 (d, J=11.6 Hz, 1H), 4.02 (dd, J=11.6, 4.0 Hz, 1H), 3.93 (s, 3H), 2.58-2.50 (m, 5H), 2.10 (q, J=8.4 Hz, 1H), 2.05-1.98 (m, 3H), 1.73-1.58 (m, 4H), 1.49 (s, 3H), 1.44-1.24 (m, 16H), 0.92-0.86 (m, 1H), 0.84-0.78 (m, 1H) ppm; $^{13}$C NMR (100 MHz, CDCl$_3$). 173.65, 172.52, 167.55, 160.31, 155.70, 155.16, 144.41, 140.87, 138.83, 134.33, 132.61, 128.96, 118.87, 118.54, 114.41, 105.96, 79.73, 74.59, 60.30, 55.67, 53.15, 52.37, 41.73, 36.56, 35.16, 34.25, 33.62, 32.24, 28.71, 28.67, 28.26, 25.31, 23.42, 19.84, 18.37, 14.27, 13.26 ppm; HRMS (ESI) m/z: [M+H]$^+$ calcd for C$_{39}$H$_{55}$N$_6$O$_9$S, 783.3746; found 783.3734.

tert-Butyl ((S)-1-((2S,4R)-4-((7-methoxy-3-(trifluoromethyl) quinoxalin-2-yl) oxy)-2-(((1R,2S)-1-(((1-methylcyclopropyl) sulfonyl) carbamoyl)-2-vinylcyclopropyl) carbamoyl) pyrrolidin-1-yl)-1-oxonon-8-en-2-yl) carbamate (NR01-77)

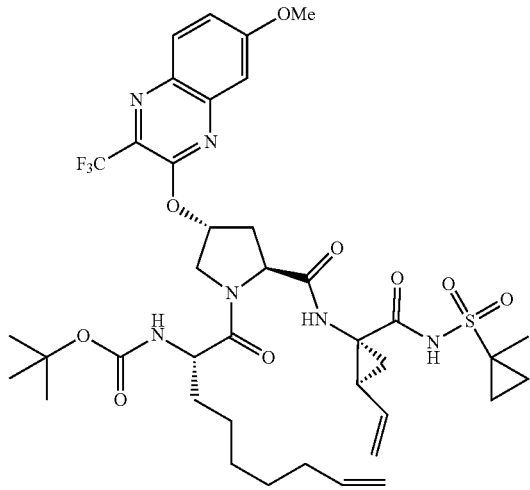 [SMILES: C=CCCCCC[C@H](NC(=O)OC(C)(C)C)C(=O)N1C[C@H](Oc2nc3cc(OC)ccc3nc2C(F)(F)F)C[C@H]1C(=O)N[C@]1(C(=O)NS(=O)(=O)C2(C)CC2)C[C@H]1C=C]

The same procedure was used as described above for compound AJ-81. Compound NR01-65 (8.14 g, 13.0 mmol) was treated with LiOH·H$_2$O (1.915 g, 45.6 mmol). to afford acid as a white solid NR01-71 (7.5 g, 12.5 mmol), which was coupled with amine salt NR01-73 (3.910 g, 13.9 mmol) using DIEA (8.62 mL, 49.2 mmol) and HATU (7.310 g, 19.2 mmol) to provide the bis-olefin compound NR01-77 (8.10 g, 79%) as a white solid. $^1$H NMR (500 MHz, CDCl$_3$) δ 10.01 (s, 1H), 7.80 (d, J=9.2 Hz, 1H), 7.49 (dd, J=9.2, 2.8 Hz, 1H), 7.45 (d, J=2.8 Hz, 1H), 7.01 (s, 1H), 5.93 (br s, 1H), 5.86-5.71 (m, 2H), 5.33 (d, J=8.8 Hz, 1H), 5.28 (d, J=15.8 Hz, 1H), 5.15 (d, J=11.4 Hz, 1H), 5.00-4.91 (m, 2H), 4.53-4.41 (m, 1H), 4.32 (td, J=8.8, 4.8 Hz, 1H), 4.21 (d, J=12.0 Hz, 1H), 4.02 (dd, J=11.9, 3.9 Hz, 1H), 3.95 (s, 3H), 2.78-2.43 (m, 2H), 2.14 (q, J=8.8 Hz, 1H), 2.05-2.01 (m, 3H), 1.78-1.55 (m, 4H), 1.49 (s, 3H), 1.47-1.23 (m, 16H), 0.91-0.80 (m, 2H) ppm; $^{13}$C NMR (125 MHz, CDCl$_3$) δ 173.87, 172.37, 167.59, 159.77, 155.79, 151.77, 139.04, 138.61, 137.06, 134.42 (q, J=36.0 Hz), 132.76, 128.02, 125.92, 120.75 (d, J=275.3 Hz), 118.67, 114.52, 107.67, 79.84, 75.50, 60.48, 56.06, 53.01, 52.53, 41.90, 36.73, 35.37, 34.32, 33.78, 32.42, 28.84, 28.81, 28.34, 25.48, 23.61, 18.55, 14.35, 13.52 ppm; $^{19}$F NMR (470 MHz, CDCl$_3$) δ −67.63 ppm; HRMS (ESI) m/z: [M+H]$^+$ calcd for C$_{39}$H$_{52}$F$_3$N$_6$O$_9$S, 837.3463; found 837.3433.

tert-Butyl ((2R,6S,13aS,14aR,16aS, Z)-2-((7-methoxy-3-methylquinoxalin-2-yl) oxy)-14a-(((1-methylcyclopropyl) sulfonyl) carbamoyl)-5,16-dioxo-1,2,3,5,6,7,8,9,10,11,13a,14,14a,15,16,16a-hexadecahydrocyclopropa[e]pyrrolo[1,2-a] [1,4] diazacyclopentadecin-6-yl) carbamate (NR01-89)

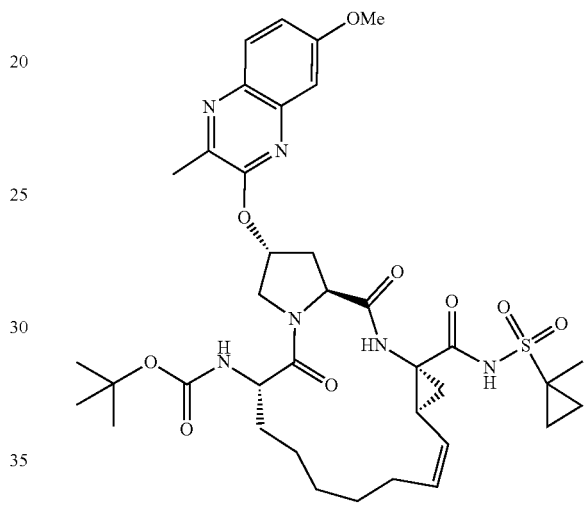

A degassed solution of bis-olefin AJ-81 (6.20 g, 7.92 mmol) in 1,2-DCE (1600 mL) was heated to 50° C. under argon, then Zhan 1b catalyst (0.50 g, 0.68 mmol) was added in two portions over 10 min. The resulting reaction mixture was heated to 70° C. and stirred for 6 h. The reaction mixture was cooled to room temperature and solvents were evaporated under reduced pressure. The residue was purified by flash column chromatography (RediSep Gold column, 2×80 g, gradient elution with 20-90% EtOAc/hexanes) to yield the P1-P3 macrocyclic product NR01-89 (4.20 g, 70%) as an off-white solid. $^1$H NMR (400 MHz, CDCl$_3$) δ 10.16 (s, 1H), 7.82 (d, J=9.2 Hz, 1H), 7.19-7.16 (m, 2H), 6.92 (s, 1H), 5.88 (br s, 1H), 5.69 (q, J=9.2 Hz, 1H), 5.12 (d, J=7.6 Hz, 1H), 4.99 (t, J=8.8 Hz, 1H), 4.61 (t, J=8.0 Hz, 1H), 4.51 (d, J=11.2 Hz, 1H), 4.28-4.22 (m, 1H), 4.03 (dd, J=11.2, 4.0 Hz, 1H), 3.95 (s, 3H), 2.70-2.50 (m, 6H), 2.31 (q, J=8.8 Hz, 1H), 1.92-1.66 (m, 4H), 1.60-1.20 (m, 21H), 0.85-0.78 (m, 2H) ppm; $^{13}$C NMR (100 MHz, CDCl$_3$) δ 177.16, 173.33, 166.94, 160.33, 155.32, 155.04, 144.46, 141.03, 134.20, 136.25, 128.66, 124.89, 118.93, 105.98, 79.85, 74.88, 59.46, 55.72, 53.08, 51.97, 44.73, 36.43, 34.61, 32.72, 29.65, 28.15, 27.06, 26.07, 22.21, 20.96, 19.71, 18.17, 14.51, 12.51 ppm; HRMS (ESI) m/z: [M+H]$^+$ calcd for C$_{37}$H$_{51}$N$_6$O$_9$S, 755.3433; found 755.3404; Anal. HPLC: t$_R$ 13.57 min, purity 99%.

tert-Butyl ((2R,6S,13aS,14aR,16aS, Z)-2-((7-methoxy-3-(trifluoromethyl) quinoxalin-2-yl) oxy)-14a-(((1-methylcyclopropyl) sulfonyl) carbamoyl)-5,16-dioxo-1,2,3,5,6,7,8,9,10,11,13a,14,14a,15,16,16a-hexadecahydrocyclopropa[e]pyrrolo[1,2-a] [1,4] diazacyclopentadecin-6-yl) carbamate (NR01-79)

(2R,6S,13aS,14aR,16aS, Z)-6-Amino-2-((7-methoxy-3-methylquinoxalin-2-yl) oxy)-N-((1-methylcyclopropyl) sulfonyl)-5,16-dioxo-1,2,3,6,7,8,9,10,11,13a,14,15,16,16a-tetradecahydrocyclopropa[e]pyrrolo[1,2-a] [1,4] diazacyclopentadecine-14a(5H)-carboxamide hydrochloride (NR01-91)

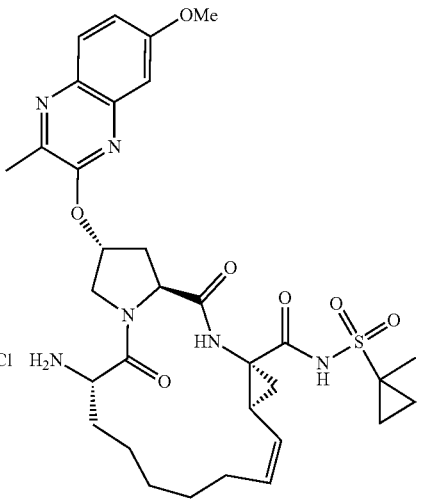

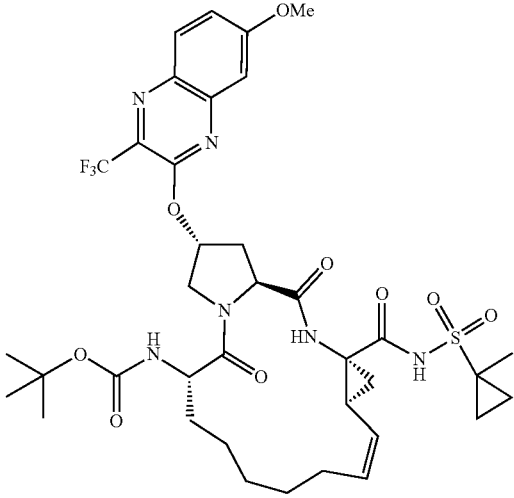 [SMILES: COc1ccc2nc(C(F)(F)F)c(O[C@@H]3C[C@H]4C(=O)N[C@]5(C(=O)NS(=O)(=O)C6(C)CC6)C[C@H]5/C=C\CCCCC[C@H](NC(=O)OC(C)(C)C)C(=O)N4C3)nc2c1]

A solution of compound NR01-89 (3.25 g, 4.31 mmol) in anhydrous CH$_2$Cl$_2$ (15 mL) was treated with a solution of 4 N HCl in 1,4-dioxane (50 mL). The reaction mixture was stirred at room temperature for 3 h, concentrated under reduced pressure, and the residue was dried under high vacuum. The residue was triturated with diethyl ether (40 mL), and the solid was filtered, washed with Et$_2$O (2×15 mL), and dried under high vacuum to yield the amine salt NR01-91 (2.90 g, 98%) as an off-white solid.

(2R,6S,13aS,14aR,16aS, Z)-6-Amino-2-((7-methoxy-3-(trifluoromethyl) quinoxalin-2-yl) oxy)-N-((1-methylcyclopropyl) sulfonyl)-5,16-dioxo-1,2,3,6,7,8,9,10,11,13a,14,15,16,16a-tetradecahydrocyclopropa[e]pyrrolo[1,2-a] [1,4] diazacyclopentadecine-14a(5H)-carboxamide hydrochloride (NR01-87)

The same procedure was used as described above for compound NR01-89. Bis-olefin NR01-77 (7.20 g, 8.6 mmol) was treated with Zhan 1B catalyst (0.694 g, 0.95 mmol) in 1,2-DCE (1500 mL) to afford the P1-P3 macrocyclic product NR01-79 (5.10 g, 73%) as an off-white solid. $^1$H NMR (400 MHz, CDCl$_3$) δ 10.15 (s, 1H), 7.83 (d, J=9.2 Hz, 1H), 7.48 (dd, J=9.2, 2.8 Hz, 1H), 7.42 (d, J=2.8 Hz, 1H), 6.90 (s, 1H), 5.91 (br s, 1H), 5.70 (q, J=9.2 Hz, 1H), 5.14 (d, J=7.6 Hz, 1H), 5.00 (t, J=9.2 Hz, 1H), 4.62-4.55 (m, 2H), 4.24-4.18 (m, 1H), 4.02 (dd, J=11.6, 3.6 Hz, 1H), 3.94 (s, 3H), 2.71-2.51 (m, 3H), 2.33 (q, J=8.4 Hz, 1H), 1.93-1.75 (m, 4H), 1.56-1.18 (m, 21H), 0.85-0.78 (m, 2H) ppm; $^{13}$C NMR (100 MHz, CDCl$_3$) δ 177.30, 173.46, 167.15, 159.68, 155.16, 152.01, 138.50, 137.23, 136.50, 134.60 (q, J=36.0 Hz), 128.23, 125.79, 125.19, 120.83 (d, J=274.0 Hz), 107.65, 80.01, 75.79, 59.70, 56.12, 52.97, 52.08, 45.03, 36.65, 34.86, 33.06, 29.81, 28.26, 27.31, 27.24, 26.32, 22.47, 21.21, 18.42, 14.73, 12.77 ppm; $^{19}$F NMR (470 MHz, CDCl$_3$) δ −67.77 ppm; HRMS (ESI) m/z: [M+H]$^+$ calcd for C$_{37}$H$_{48}$F$_3$N$_6$O$_9$S, 809.3150; found, 809.3129; Anal. HPLC: t$_R$ 15.23 min, purity 99%.

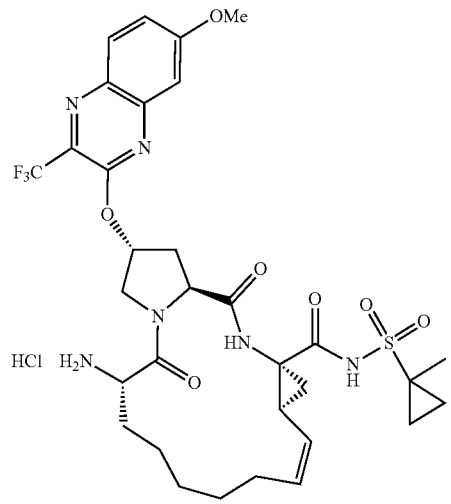 [SMILES: Cl ; COc1ccc2nc(C(F)(F)F)c(O[C@@H]3C[C@H]4C(=O)N[C@]5(C(=O)NS(=O)(=O)C6(C)CC6)C[C@H]5/C=C\CCCCC[C@H](N)C(=O)N4C3)nc2c1]

A solution of compound NR01-79 (5.10 g, 6.85 mmol) in anhydrous $CH_2Cl_2$ (20 mL) was treated with a solution of 4 N HCl in 1,4-dioxane (70 mL). The reaction mixture was stirred at room temperature for 3 h, concentrated under reduced pressure, and the residue was dried under high vacuum. The residue was triturated with diethyl ether (40 mL), and the solid was filtered, washed with $Et_2O$ (2×20 mL), and dried under high vacuum to yield the amine salt NR01-87 (4.5 g, 96%) as an off-white solid.

(S)-1-Cyclopropylethyl (4-nitrophenyl) carbonate (NR02-21)

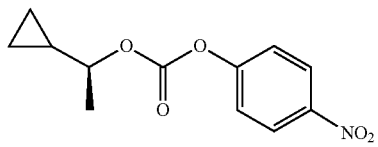

A solution of (1S)-1-cyclopropyl ethan-1-ol (0.250 g, 2.90 mmol) in dichloromethane (30 mL) was cooled to 0° C. and treated with pyridine (0.976 mL, 11.95 mmol). After 10 min, solid 4-Nitrobenzene chloroformate (1.172 g, 5.8 mmol) was added in one portion. The resulting reaction mixture warmed to room temperature and stirred for 48 hours. Solvents were evaporated under reduced pressure; pyridine was removed by azeotrope with heptane's (50 mL). The residue was dried under high vacuumed for 4 h. The solid residue was triturated with EtOAc-Hexanes mixture (1:1, 50 mL) and the mixture was stirred at room temperature for 10 min, solvents were carefully decanted; this process was repeated three times. Combined solution was evaporated to dryness. The residue was purified by flash column chromatography (RediSep Gold column, 40 g, gradient elution with 0-35% EtOAc/hexanes) to provide NR02-21 (0.550 g, 75%) as a white solid. $^1H$ NMR (500 MHz, $CDCl_3$) δ 8.29-8.25 (m, 2H), 7.41-7.38 (m, 2H), 4.29 (dq, J=8.5, 6.0 Hz, 1H), 1.46 (d, J=6.5 Hz, 3H), 1.17-1.09 (m, 1H), 0.67-0.59 (m, 2H), 0.55-0.50 (m, 1H), 0.35-0.30 (m, 1H) ppm; $^{13}C$ NMR (125 MHz, $CDCl_3$) δ 155.86, 152.32, 145.39, 125.39, 121.92, 82.31, 19.76, 16.27, 4.14, 2.76 ppm; HRMS (ESI) m/z: [M+H]$^+$ calcd for $C_{12}H_{14}NO_5$, 252.0866; found 252.0865.

(R)-1-Cyclopropylethyl (4-nitrophenyl) carbonate (NR02-22)

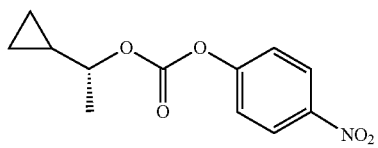

The same procedure was used as described above for compound NR02-21. A mixture of (1R)-1-cyclopropyl ethan-1-ol (0.250 g, 2.90 mmol) and 4-Nitrobenzene chloroformate (1.172 g, 5.8 mmol) was treated with pyridine (0.976 mL, 11.95 mmol) to provide the target compound NR02-22 (0.560 g, 77%) as a white solid. $^1H$ NMR (500 MHz, $CDCl_3$) δ 8.29-8.25 (m, 2H), 7.41-7.37 (m, 2H), 4.29 (dq, J=8.5, 6.0 Hz, 1H), 1.46 (d, J=6.5 Hz, 3H), 1.17-1.09 (m, 1H), 0.67-0.59 (m, 2H), 0.56-0.50 (m, 1H), 0.35-0.28 (m, 1H) ppm; $^{13}C$ NMR (125 MHz, $CDCl_3$) δ 155.86, 152.32, 145.39, 125.39, 121.93, 82.32, 19.76, 16.27, 4.14, 2.77 ppm; HRMS (ESI) m/z: [M+H]$^+$ calcd for $C_{12}H_{14}NO_5$, 252.0866; found 252.0864.

(1R,2R)-2-Fluorocyclopentyl (4-nitrophenyl) carbonate (NR02-07)

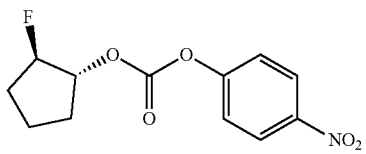 [SMILES: O=C(Oc1ccc([N+](=O)[O-])cc1)O[C@@H]1CCC[C@H]1F]

The same procedure was used as described above for compound NR02-21. A mixture of (1R,2R)-2-fluorocyclopentan-1-ol (0.250 g, 2.38 mmol) and 4-Nitrobenzene chloroformate (0.961 g, 4.76 mmol) was treated with pyridine (0.8 mL, 9.8 mmol) to provide the target compound NR02-07 (0.550 g, 85%) as a white solid. $^1H$ NMR (500 MHz, $CDCl_3$) δ 8.31-8.26 (m, 2H), 7.41-7.37 (m, 2H), 5.26-5.08 (m, 2H), 2.32-2.22 (m, 1H), 2.13-1.82 (m, 5H) ppm; $^{13}C$ NMR (125 MHz, $CDCl_3$) δ 155.51, 151.85, 145.60, 125.49, 121.84, 97.06 (d, J=176.2 Hz), 83.93 (d, J=31.2 Hz), 30.69 (d, J=22.5 Hz), 29.86, 21.30 ppm; $^{19}F$ NMR (470 MHz, $CDCl_3$) δ -181.53 ppm; HRMS (ESI) m/z: [M+H]$^+$ calcd for $C_{12}H_{13}FNO_5$, 270.0772; found 270.0770.

(S)-4-Nitrophenyl (1,1,1-trifluoropropan-2-yl) carbonate (NR02-19)

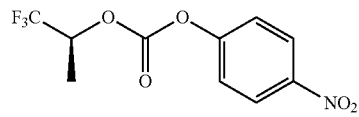 [SMILES: C[C@H](OC(=O)Oc1ccc([N+](=O)[O-])cc1)C(F)(F)F]

The same procedure was used as described above for compound NR02-21. A mixture of (S)-1,1,1-trifluoropropan-2-ol (0.250 g, 2.19 mmol) and 4-Nitrobenzene chloroformate (0.890 g, 4.76 mmol) was treated with pyridine (0.720 mL, 9.8 mmol) to provide the target compound NR02-19 (0.4 g, 65%) as a white solid. $^1H$ NMR (500 MHz, $CDCl_3$) δ 8.32-8.28 (m, 2H), 7.44-7.40 (m, 2H), 5.29-5.20 (m, 1H), 1.57 (d, J=6.5 Hz, 3H) ppm; $^{13}C$ NMR (125 MHz, $CDCl_3$) δ 155.18, 151.50, 145.87, 125.58, 123.45 (q, J=277.5 Hz), 121.79, 72.02 (q, J=33.7 Hz), 13.55 (d, J=1.2 Hz) ppm; $^{19}F$ NMR (470 MHz, $CDCl_3$) δ -78.83 ppm; HRMS (ESI) m/z: [M+H]$^+$ calcd for $C_{10}H_9F_3NO_5$, 280.0427; found 280.0425.

1-Methylcyclopropyl (4-nitrophenyl) carbonate (NR02-20)

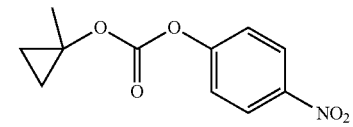 [SMILES: CC1(OC(=O)Oc2ccc([N+](=O)[O-])cc2)CC1]

The same procedure was used as described above for compound NR02-21. A mixture of 1-methylcyclopropan-1-ol (0.5 g, 6.93 mmol) and 4-Nitrobenzene chloroformate (2.80 g, 13.9 mmol) was treated with pyridine (2.26 mL, 27.7 mmol) to provide the target compound NR02-20 (1.3 g, 79%) as a white solid. $^1$H NMR (500 MHz, CDCl$_3$) δ 8.29-8.24 (m, 2H), 7.39-7.36 (m, 2H), 1.65 (s, 3H), 1.09-1.05 (m, 2H), 0.77-0.73 (m, 2H) ppm; $^{13}$C NMR (125 MHz, CDCl$_3$) δ 155.60, 152.08, 145.43, 125.39, 121.86, 60.83, 20.66, 13.04 ppm; HRMS (ESI) m/z: [M+H]$^+$ calcd for C$_{11}$H$_{12}$NO$_5$, 238.0710; found 238.0707.

1-Ethylcyclopentyl (4-nitrophenyl) carbonate (NR02-37)

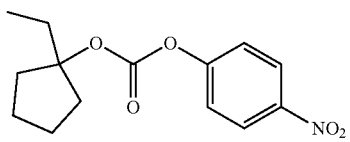 [SMILES: CCC1(OC(=O)Oc2ccc([N+](=O)[O-])cc2)CCCC1]

The same procedure was used as described above for compound NR02-21. A mixture of 1-ethylcyclopentan-1-ol (0.5 g, 4.34 mmol) and 4-Nitrobenzene chloroformate (1.75 g, 8.68 mmol) was treated with pyridine (1.42 mL, 17.4 mmol) to provide the target compound NR02-37 (1.0 g, 81%) as a white solid. $^1$H NMR (500 MHz, CDCl$_3$) δ 8.28-8.24 (m, 2H), 7.38-7.33 (m, 2H), 2.25-2.18 (m, 2H), 2.05 (q, J=7.5 Hz, 2H), 1.85-1.63 (m, 6H), 0.98 (t, J=7.5 Hz, 3H) ppm; $^{13}$C NMR (125 MHz, CDCl$_3$) δ 155.91, 150.74, 145.28, 125.35, 122.02, 98.37, 37.00, 29.59, 24.11, 8.91 ppm; HRMS (ESI) m/z: [M+H]$^+$ calcd for C$_{14}$H$_{18}$NO$_5$, 280.1179; found 280.1183.

(1-Methylcyclopropyl)methyl (4-nitrophenyl) carbonate (NR01-105)

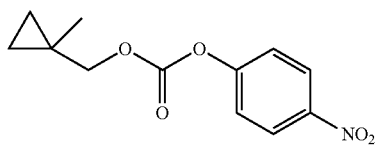 [SMILES: CC1(COC(=O)Oc2ccc([N+](=O)[O-])cc2)CC1]

The same procedure was used as described above for compound NR02-21. A mixture of (1-methylcyclopropyl)methanol (0.5 g, 5.80 mmol) and 4-Nitrobenzene chloroformate (2.34 g, 11.6 mmol) was treated with pyridine (1.84 mL, 23.2 mmol) to provide the target compound NR01-105 (1.2 g, 82%) as a white solid. $^1$H NMR (500 MHz, CDCl$_3$) δ 8.30-8.26 (m, 2H), 7.41-7.37 (m, 2H), 4.09 (s, 2H), 1.22 (s, 3H), 0.58 (t, J=6.0 Hz, 2H), 0.47 (t, J=6.0 Hz, 2H) ppm; $^{13}$C NMR (125 MHz, CDCl$_3$). 155.80, 152.86, 145.48, 125.443 121.93, 77.84, 20.88, 15.37, 11.68 ppm; HRMS (ESI) m/z: [M+H]$^+$ calcd for C$_{12}$H$_{14}$NO$_5$ 252.0866; found 252.0865.

(R)-3-Methylbutan-2-yl (4-nitrophenyl) carbonate (NR01-111)

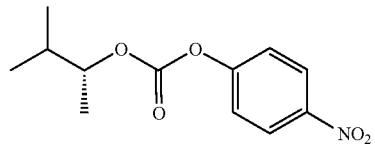 [SMILES: CC(C)[C@@H](C)OC(=O)Oc1ccc([N+](=O)[O-])cc1]

The same procedure was used as described above for compound NR02-21. A mixture of (R)-3-methylbutan-2-ol (0.450 g, 5.67 mmol) and 4-Nitrobenzene chloroformate (2.06 g, 11.3 mmol) was treated with pyridine (1.75 mL, 22.6 mmol) to provide the target compound NR01-111 (1.05 g, 80%) as a white solid. $^1$H NMR (500 MHz, CDCl$_3$) δ 8.29-8.26 (m, 2H), 7.40-7.37 (m, 2H), 4.72 (p, J=6.0 Hz, 1H), 1.98-1.90 (m, 1H), 1.33 (d, J=6.0 Hz, 3H), 0.99 (dd, J=6.5, 2.5 Hz, 6H) ppm; $^{13}$C NMR (125 MHz, CDCl$_3$) δ 155.87, 152.37, 145.40, 125.40, 121.95, 81.93, 32.80, 18.05, 17.96, 16.57 ppm; HRMS (ESI) m/z: [M+H]$^+$ calcd for C$_{12}$H$_{16}$NO$_5$, 254.1023; found 254.1020.

(R)-4-Nitrophenyl (1,1,1-trifluoropropan-2-yl) carbonate (NR01-133)

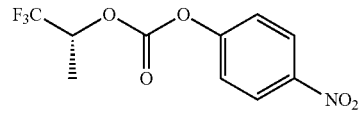 [SMILES: C[C@@H](OC(=O)Oc1ccc([N+](=O)[O-])cc1)C(F)(F)F]

The same procedure was used as described above for compound NR02-21. A mixture of (R)-1,1,1-trifluoropropan-2-ol (0.3 g, 2.63 mmol) and 4-Nitrobenzene chloroformate (1.06 g, 5.26 mmol) was treated with pyridine (0.90 mL, 10.50 mmol) to provide the target compound NR01-133 (0.660 g, 86%) as a white solid. $^1$H NMR (500 MHz, CDCl$_3$) δ 8.32-8.28 (m, 2H), 7.43-7.39 (m, 2H), 5.28-5.20 (m, 1H), 1.57 (d, J=7.0 Hz, 3H) ppm; $^{13}$C NMR (125 MHz, CDCl$_3$) δ 155.18, 151.50, 145.86, 125.57, 123.46 (q, J=278.7 Hz), 121.79, 72.02 (q, J=33.7 Hz), 13.54 (d, J=2.5 Hz) ppm; $^{19}$F NMR (470 MHz, CDCl$_3$) δ −78.83 ppm; HRMS (ESI) m/z: [M+H]$^+$ calcd for C$_{10}$H$_9$F$_3$NO$_5$, 280.0427; found 280.0425.

3,3-Difluorocyclobutyl (4-nitrophenyl) carbonate (NR01-139)

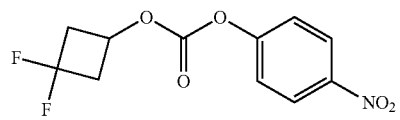 [SMILES: O=C(Oc1ccc([N+](=O)[O-])cc1)OC1CC(F)(F)C1]

The same procedure was used as described above for compound NR02-21. A mixture of 3,3-difluorocyclobutan-1-ol (0.5 g, 4.63 mmol) and 4-Nitrobenzene chloroformate (1.87 g, 9.26 mmol) was treated with pyridine (1.5 mL, 18.50 mmol) to provide the target compound NR01-139 (1.0 g, 79%) as a white solid. $^1$H NMR (500 MHz, CDCl$_3$) δ 8.31-8.27 (m, 2H), 7.41-7.37 (m, 2H), 5.08-5.00 (m, 1H), 3.18-3.08 (m, 2H), 2.91-2.80 (m, 2H) ppm; $^{13}$C NMR (125

MHz, CDCl$_3$) δ 155.27, 151.81, 145.74, 125.54, 121.81, 117.47 (dd, J=280.0, 267.5 Hz), 63.57 (dd, J=17.5, 8.8 Hz), 43.16 (t, J=22.5 Hz) ppm; $^{19}$F NMR (470 MHz, CDCl$_3$) δ −85.22 (d, J=202.1 Hz), −97.03 (d, J=202.1 Hz) ppm; HRMS (ESI) m/z: [M+H]$^+$ calcd for C$_{11}$H$_{10}$F$_2$NO$_5$, 274.0522; found 274.0519.

(S)-3-Methylbutan-2-yl (4-nitrophenyl) carbonate (AM-26)

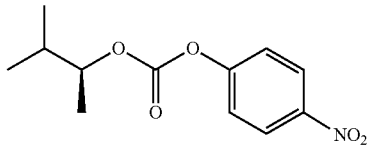 [SMILES: CC(C)[C@H](C)OC(=O)Oc1ccc([N+](=O)[O-])cc1]

The same procedure was used as described above for compound NR02-21. A mixture of (S)-3-methylbutan-2-ol (0.450 g, 5.67 mmol) and 4-Nitrobenzene chloroformate (2.06 g, 11.3 mmol) was treated with pyridine (1.75 mL, 22.6 mmol) to provide the target compound AM-26 (1.05 g, 81%) as a white solid. $^1$H NMR (500 MHz, CDCl$_3$) δ 8.29-8.26 (m, 2H), 7.40-7.36 (m, 2H), 4.72 (p, J=6.5 Hz, 1H), 1.99-1.90 (m, 1H), 1.33 (d, J=6.5 Hz, 3H), 0.99 (dd, J=7.0, 3.0 Hz, 6H) ppm; $^{13}$C NMR (125 MHz, CDCl$_3$) δ 155.87, 152.37, 145.40, 125.40, 121.95, 81.92, 32.80, 18.05, 17.96, 16.57 ppm; HRMS (ESI) m/z: [M+H]$^+$ calcd for C$_{12}$H$_{16}$NO$_5$, 254.1023; found 254.1018.

1-Methylcyclopentyl (4-nitrophenyl) carbonate (AJ-72)

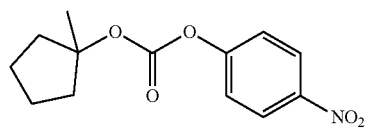

The same procedure was used as described above for compound NR02-21. A mixture of 1-methylcyclopentan-1-ol (0.750 g, 7.50 mmol) and 4-Nitrobenzene chloroformate (3.10 g, 15.4 mmol) was treated with pyridine (2.50 mL, 30.9 mmol) to provide the target compound AJ-72 (1.4 g, 70%) as a white solid. $^1$H NMR (500 MHz, CDCl$_3$) δ 8.28-8.24 (m, 2H), 7.38-7.35 (m, 2H), 2.26-2.20 (m, 2H), 1.85-1.64 (m, 6H), 1.67 (s, 3H) ppm; $^{13}$C NMR (125 MHz, CDCl$_3$) δ 155.87, 150.97, 145.27, 125.33, 122.01, 94.71, 38.96, 23.98, 23.92 ppm; HRMS (ESI) m/z: [M+H]$^+$ calcd for C$_{13}$H$_{16}$NO$_5$, 266.1023; found 266.1233.

Cyclobutyl (4-nitrophenyl) carbonate (AJ-75)

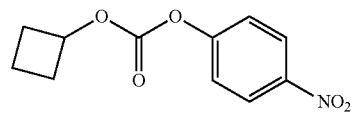 [SMILES: O=C(Oc1ccc([N+](=O)[O-])cc1)OC1CCC1]

The same procedure was used as described above for compound NR02-21. A mixture of cyclobutanol (0.72 g, 10.0 mmol) and 4-Nitrobenzene chloroformate (4.0 g, 20.0 mmol) was treated with pyridine (3.25 mL, 40.2 mmol) to provide the target compound AJ-75 (1.5 g, 63%) as a white solid. $^1$H NMR (500 MHz, CDCl$_3$) δ 8.29-8.25 (m, 2H), 7.40-7.35 (m, 2H), 5.10-5.02 (m, 1H), 2.48-2.40 (m, 2H), 2.38-2.22 (m, 2H), 1.93-1.84 (m, 1H), 1.71-1.61 (m, 1H) ppm; $^{13}$C NMR (125 MHz, CDCl$_3$). 155.66, 151.61, 145.47, 125.41, 121.91, 73.26, 30.13, 13.14 ppm; HRMS (ESI) m/z: [M+H]$^+$ calcd for C$_{11}$H$_{12}$NO$_5$, 238.0710; found 238.0708.

4-Nitrophenyl (1,1,1-trifluoro-2-methylpropan-2-yl) carbonate (AJ-69)

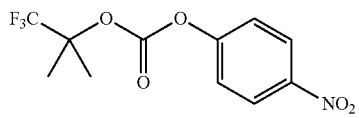 [SMILES: CC(C)(OC(=O)Oc1ccc([N+](=O)[O-])cc1)C(F)(F)F]

The same procedure was used as described above for compound NR02-21. A mixture of 1,1,1-trifluoro-2-methylpropan-2-ol (0.5 g, 3.9 mmol) and 4-Nitrobenzene chloroformate (1.57 g, 7.8 mmol) was treated with pyridine (1.06 mL, 13.0 mmol) to provide the target compound AJ-69 (0.35 g, 31%) as a white solid. $^1$H NMR (500 MHz, CDCl$_3$) δ 8.31-8.27 (m, 2H), 7.41-7.37 (m, 2H), 1.79 (s, 3H), 1.78 (s, 3H) ppm; $^{13}$C NMR (125 MHz, CDCl$_3$) δ 155.20, 149.67, 145.69, 125.48, 124.44 (q, J=281.2 Hz), 121.93, 83.09 (q, J=30.0 Hz), 19.15, 19.14 ppm; $^{19}$F NMR (470 MHz, CDCl$_3$) δ −83.36 ppm; HRMS (ESI) m/z: [M+H]$^+$ calcd for C$_{11}$H$_{11}$F$_3$NO$_5$, 294.0584; found 294.0580.

Cyclopropyl (4-nitrophenyl) carbonate (NR02-42)

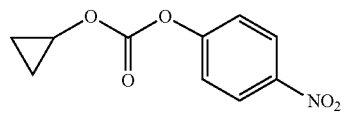 [SMILES: O=C(Oc1ccc([N+](=O)[O-])cc1)OC1CC1]

The same procedure was used as described above for compound NR02-21. A mixture of cyclopropanol (0.50 g, 8.60 mmol) and 4-Nitrobenzene chloroformate (3.46 g, 17.2 mmol) was treated with pyridine (2.79 mL, 34.4 mmol) to provide the target compound NR02-42 (1.6 g, 83%) as a white solid. $^1$H NMR (500 MHz, CDCl$_3$) δ 8.30-8.25 (m, 2H), 7.40-7.36 (m, 2H), 4.28 (tt, J=6.5, 3.5 Hz, 1H), 0.92-0.88 (m, 2H), 0.87-0.81 (m, 2H) ppm; $^{13}$C NMR (125 MHz, CDCl$_3$) δ 155.53, 153.05, 145.53, 125.44, 121.85, 53.41, 5.34 ppm; HRMS (ESI) m/z: [M+H]$^+$ calcd for C$_{10}$H$_{10}$NO$_5$, 224.0553; found 224.0552.

4-Nitrophenyl tert-pentyl carbonate (NR02-43)

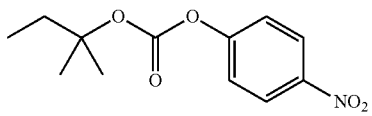 [SMILES: CCC(C)(C)OC(=O)Oc1ccc([N+](=O)[O-])cc1]

The same procedure was used as described above for compound NR02-21. A mixture of 2-methylbutan-2-ol (0.50 g, 5.67 mmol) and 4-Nitrobenzene chloroformate (2.3 g, 11.3 mmol) was treated with pyridine (1.85 mL, 22.6 mmol) to provide the target compound NR02-43 (1.3 g, 90%) as a white solid. $^1$H NMR (500 MHz, CDCl$_3$) δ 8.28-8.24 (m, 2H), 7.37-7.33 (m, 2H), 1.87 (q, J=7.5 Hz, 2H), 1.53 (s, 6H), 0.97 (t, J=7.5 Hz, 3H) ppm; $^{13}$C NMR (125 MHz, CDCl$_3$) δ 155.88, 150.59, 145.26, 125.32, 122.05, 87.55, 33.26, 25.16, 8.37 ppm; HRMS (ESI) m/z: [M+H]$^+$ calcd for C$_{12}$H$_{16}$NO$_5$, 254.1023; found 254.1021.

4-Nitrophenyl pentan-3-yl carbonate (NR02-44)

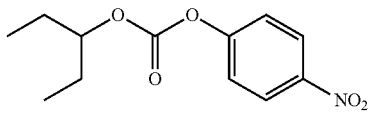 [SMILES: CCC(CC)OC(=O)Oc1ccc([N+](=O)[O-])cc1]

The same procedure was used as described above for compound NR02-21. A mixture of pentan-3-ol (0.50 g, 5.67 mmol) and 4-Nitrobenzene chloroformate (2.3 g, 11.3 mmol) was treated with pyridine (1.85 mL, 22.6 mmol) to provide the target compound NR02-44 (1.2 g, 83%) as a white solid. $^1$H NMR (500 MHz, CDCl$_3$) δ 8.29-8.25 (m, 2H), 7.40-7.36 (m, 2H), 4.72 (p, J=6.5 Hz, 1H), 1.75-1.69 (m, 4H), 0.98 (t, J=7.5 Hz, 6H) ppm; $^{13}$C NMR (125 MHz, CDCl$_3$) δ 155.89, 152.59, 145.37, 125.38, 121.91, 83.56, 26.38, 9.57 ppm; HRMS (ESI) m/z: [M+H]$^+$ calcd for C$_{12}$H$_{16}$NO$_5$, 254.1023; found 254.1022.

4-Nitrophenyl ((1-(trifluoromethyl)cyclopropyl) methyl) carbonate (NR02-45)

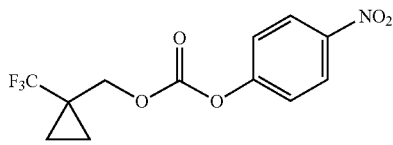 [SMILES: O=C(OCC1(C(F)(F)F)CC1)Oc1ccc([N+](=O)[O-])cc1]

The same procedure was used as described above for compound NR02-21. A mixture of (1-(trifluoromethyl) cyclopropyl) methanol (0.250 g, 1.80 mmol) and 4-Nitrobenzene chloroformate (0.720 g, 3.56 mmol) was treated with pyridine (0.582 mL, 7.13 mmol) to provide the target compound NR02-45 (0.5 g, 90%) as a white solid. $^1$H NMR (500 MHz, CDCl$_3$) δ 8.31-8.27 (m, 2H), 7.41-7.37 (m, 2H), 4.40 (s, 2H), 1.23-1.20 (m, 2H), 0.97-0.93 (m, 2H) ppm; $^{13}$C NMR (125 MHz, CDCl$_3$) δ 155.51, 152.49, 145.66, 126.21 (q, J=272.5 Hz), 125.48, 121.90, 69.91, 22.83 (q, J=33.7 Hz), 8.58 (d, J=1.2 Hz) ppm; $^{19}$F NMR (470 MHz, CDCl$_3$) δ −69.80 ppm; HRMS (ESI) m/z: [M+H]$^+$ calcd for C$_{12}$H$_{11}$F$_3$NO$_5$, 306.0584; found 306.0584.

(2,2-Difluoro-1-methylcyclopropyl)methyl (4-nitrophenyl) carbonate (NR02-51)

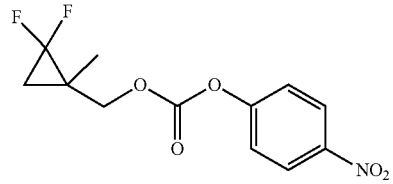 [SMILES: CC1(COC(=O)Oc2ccc([N+](=O)[O-])cc2)CC1(F)F]

The same procedure was used as described above for compound NR02-21. A mixture of (2,2-difluoro-1-methylcyclopropyl) methanol (0.250 g, 2.05 mmol) and 4-Nitrobenzene chloroformate (0.828 g, 4.76 mmol) was treated with pyridine (0.668 mL, 9.8 mmol) to provide the target compound NR02-51 (0.530 g, 90%) as a white solid. $^1$H NMR (500 MHz, CDCl$_3$) δ 8.31-8.27 (m, 2H), 7.42-7.38 (m, 2H), 4.40 (ddd, J=11.5, 2.5, 1.5 Hz, 1H), 4.24 (dd, J=11.5, 2.0 Hz, 1H), 1.42 (ddd, J=13.0, 8.0, 5.0 Hz, 1H), 1.38 (dd, J=2.5, 1.5 Hz, 3H), 1.23 (ddd, J=11.5, 8.0, 5.0 Hz, 1H) ppm; $^{13}$C NMR (125 MHz, CDCl$_3$) δ 155.55, 152.58, 145.63, 125.49, 121.87, 114.69 (t, J=285.0 Hz), 70.49 (d, J=7.5 Hz), 25.28 (dd, J=11.2, 10.0 Hz), 21.29 (t, J=11.2 Hz), 14.85 (d, J=5.0 Hz) ppm; $^{19}$F NMR (470 MHz, CDCl$_3$) δ −138.76 (q, J=159.3 Hz) ppm; HRMS (ESI) m/z: [M+H]$^+$ calcd for C$_{12}$H$_{12}$F$_2$NO$_5$, 288.0678; found 288.0677.

4-Nitrophenyl (1-(trifluoromethyl)cyclopentyl) carbonate (NR02-53)

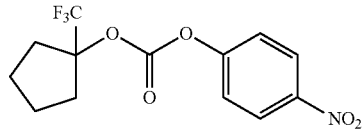 [SMILES: O=C(Oc1ccc([N+](=O)[O-])cc1)OC1(C(F)(F)F)CCCC1]

The same procedure was used as described above for compound NR02-21. A mixture of 1-(trifluoromethyl) cyclopentan-1-ol (0.250 g, 1.62 mmol) and 4-Nitrobenzene chloroformate (0.660 g, 3.26 mmol) was treated with pyridine (0.530 mL, 6.48 mmol) to provide the target compound NR02-53 (0.450 g, 86%) as a white solid. $^1$H NMR (500 MHz, CDCl$_3$) δ 8.31-8.27 (m, 2H), 7.41-7.37 (m, 2H), 2.41-2.34 (m, 2H), 2.28-2.21 (m, 2H), 2.08-1.99 (m, 2H), 1.81-1.72 (m, 2H) ppm; $^{13}$C NMR (125 MHz, CDCl$_3$) δ 155.26, 149.89, 145.68, 125.48, 125.20 (q, J=280.0 Hz), 121.94, 92.43 (q, J=30.0 Hz), 32.98, 25.55 ppm; $^{19}$F NMR (470 MHz, CDCl$_3$) δ −79.93 ppm; HRMS (ESI) m/z: [M+H]$^+$ calcd for C$_{13}$H$_{13}$F$_3$NO$_5$, 320.0740; found 320.0737.

4-Nitrophenyl (1-(trifluoromethyl)cyclobutyl) carbonate (NR02-54)

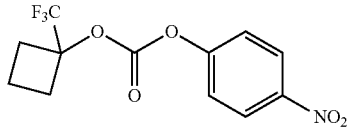 [SMILES: O=C(Oc1ccc([N+](=O)[O-])cc1)OC1(C(F)(F)F)CCC1]

The same procedure was used as described above for compound NR02-21. A mixture of 1-(trifluoromethyl)cyclobutan-1-ol (0.250 g, 1.79 mmol) and 4-Nitrobenzene chloroformate (0.723 g, 3.58 mmol) was treated with pyridine (0.59 mL, 7.14 mmol) to provide the target compound NR02-54 (0.440 g, 80%) as a white solid. $^1$H NMR (500 MHz, CDCl$_3$) δ 8.31-8.27 (m, 2H), 7.42-7.39 (m, 2H), 2.88-2.79 (m, 2H), 2.70-2.63 (m, 2H), 2.10-2.00 (m, 1H), 1.98-1.90 (m, 1H) ppm; $^{13}$C NMR (125 MHz, CDCl$_3$) δ 155.18, 149.84, 145.73, 125.50, 124.57 (q, J=280.0 Hz), 121.87, 81.37 (q, J=33.7 Hz), 28.62, 28.61, 13.21 ppm; $^{19}$F NMR (470 MHz, CDCl$_3$) δ −82.44 ppm; HRMS (ESI) m/z: [M+H]$^+$ calcd for C$_{12}$H$_{11}$F$_3$NO$_5$, 306.0584; found 306.0579.

1-Methylcyclobutyl (4-nitrophenyl) carbonate (NR02-57)

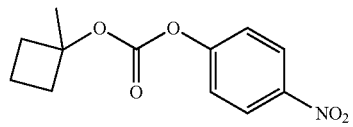 [SMILES: CC1(OC(=O)Oc2ccc([N+](=O)[O-])cc2)CCC1]

The same procedure was used as described above for compound NR02-21. A mixture of 1-methylcyclobutan-1-ol (0.250 g, 2.90 mmol) and 4-Nitrobenzene chloroformate (1.17 g, 5.8 mmol) was treated with pyridine (0.95 mL, 11.6 mmol) to provide the target compound NR02-57 (0.530 g, 73%) as a white solid. $^1$H NMR (500 MHz, CDCl$_3$) δ 8.29-8.24 (m, 2H), 7.40-7.35 (m, 2H), 2.50-2.41 (m, 2H), 2.23-2.17 (m, 2H), 1.93-1.85 (m, 1H), 1.75-1.64 (m, 1H), 1.65 (s, 3H) ppm; $^{13}$C NMR (125 MHz, CDCl$_3$) δ 155.73, 150.44, 145.33, 125.35, 121.94, 83.55, 35.03, 22.88, 13.30 ppm; HRMS (ESI) m/z: [M+H]$^+$ calcd for C$_{12}$H$_{14}$NO$_5$, 252.0866; found 252.0859.

Cyclohexyl (4-nitrophenyl) carbonate (NR03-66)

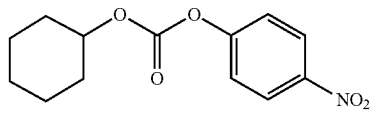 [SMILES: O=C(Oc1ccc([N+](=O)[O-])cc1)OC1CCCCC1]

The same procedure was used as described above for compound NR02-21. A mixture of cyclohexanol (1.0 g, 10.0 mmol) and 4-Nitrobenzene chloroformate (4.04 g, 20.0 mmol) was treated with pyridine (3.32 mL, 41.1 mmol) to provide the target compound NR03-66 (1.6 g, 60%) as a white solid. $^1$H NMR (500 MHz, CDCl$_3$) δ 8.29-8.25 (m, 2H), 7.40-7.36 (m, 2H), 4.79-4.72 (m, 1H), 2.04-1.96 (m, 2H), 1.84-1.76 (m, 2H), 1.63-1.54 (m, 3H), 1.46-1.36 (m, 2H), 1.35-1.26 (m, 1H) ppm; $^{13}$C NMR (125 MHz, CDCl$_3$) δ 155.84, 152.00, 145.39, 125.39, 121.94, 78.88, 31.50, 25.23, 23.66 ppm; HRMS (ESI) m/z: [M+Na]$^+$ calcd for C$_{13}$H$_{15}$NO$_5$Na, 288.0842; found 288.0843.

(1R,3r,5S)-Bicyclo[3.1.0]hexan-3-yl (4-nitrophenyl) carbonate (NR03-75)

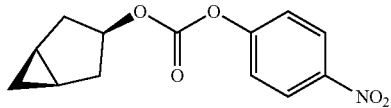 [SMILES: O=C(Oc1ccc([N+](=O)[O-])cc1)O[C@@H]1C[C@@H]2C[C@@H]2C1]

The same procedure was used as described above for compound NR02-21. A mixture of (1R,3r,5S)-bicyclo[3.1.0]hexan-3-ol (0.250 g, 2.55 mmol) and 4-Nitrobenzene chloroformate (1.030 g, 5.1 mmol) was treated with pyridine (0.860 mL, 10.5 mmol) to provide the target compound NR03-75 (0.180 g, 27%) as a white solid. $^1$H NMR (500 MHz, CDCl$_3$) δ 8.29-8.24 (m, 2H), 7.38-7.33 (m, 2H), 5.24 (t, J=6.5 Hz, 1H), 2.32-2.23 (m, 2H), 2.03 (d, J=15.0 Hz, 2H), 1.40-1.34 (m, 2H), 0.59-0.53 (m, 1H), 0.42 (q, J=4.0 Hz, 1H) ppm; $^{13}$C NMR (125 MHz, CDCl$_3$) δ 155.75, 152.02, 145.41, 125.39, 121.93, 82.51, 35.73, 16.76, 10.59 ppm; HRMS (ESI) m/z: [M+Na]$^+$ calcd for C$_{13}$H$_{13}$NO$_5$Na, 286.0686; found 286.0686.

1,1,1-Trifluoro-2-methylpropan-2-yl ((2R,6S,13aS,14aR,16aS,Z)-2-((7-methoxy-3-methylquinoxalin-2-yl)oxy)-14a-(((1-methylcyclopropyl)sulfonyl)carbamoyl)-5,16-dioxo-1,2,3,5,6,7,8,9,10,11,13a,14,14a,15,16,16a-hexadecahydrocyclopropa[e]pyrrolo[1,2-a][1,4]diazacyclopentadecin-6-yl)carbamate (AJ-71)

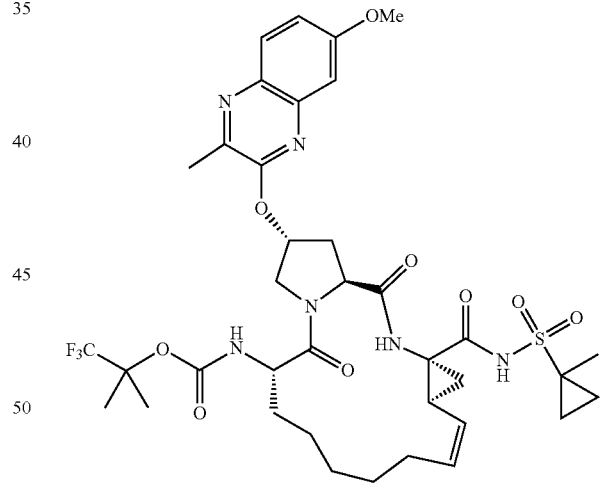

A solution of the amine salt NR01-91 (0.25 g, 0.36 mmol) in anhydrous CH$_3$CN (10 mL) was treated with DIEA (0.45 mL, 2.58 mmol) and 4-nitrophenyl (1,1,1-trifluoro-2-methylpropan-2-yl) carbonate (0.110 g, 0.37 mmol). The resulting reaction mixture was stirred at room temperature for 24 h, then concentrated under reduced pressure and dried under high vacuum. The residue was purified by flash column chromatography (RediSep Gold column, 24 g, gradient elution with 10-90% EtOAc/hexanes) to provide the target compound AJ-71 (0.28 g, 96%) as a white solid. $^1$H NMR (500 MHz, CDCl$_3$) δ 10.16 (s, 1H), 7.79 (d, J=10.0 Hz, 1H), 7.19-7.16 (m, 2H), 7.03 (s, 1H), 5.87 (br s, 1H), 5.72-5.64 (m, 2H), 4.97 (t, J=9.5 Hz, 1H), 4.61 (t, J=8.0 Hz, 1H), 4.48

(d, J=11.5 Hz, 1H), 4.26-4.22 (m, 1H), 4.02 (dd, J=11.5, 4.0 Hz, 1H), 3.94 (s, 3H), 2.66-2.63 (m, 2H), 2.59-2.50 (m, 4H), 2.30 (q, J=9.0 Hz, 1H), 1.89-1.73 (m, 4H), 1.60-1.22 (m, 18H), 0.84-0.80 (m, 2H) ppm; $^{13}$C NMR (125 MHz, CDCl$_3$). 177.28, 172.28, 167.14, 160.43, 155.40, 153.35, 141.61, 141.10, 136.42, 134.39, 129.01, 125.05 (q, J=281.0 Hz), 124.97, 118.94, 106.16, 79.78 (q, J=29.3 Hz), 74.99, 59.70, 55.84, 53.27, 52.28, 44.81, 36.60, 34.82, 32.66, 29.62, 27.27, 27.21, 26.28, 22.20, 20.94, 19.88, 19.49, 19.43, 18.29, 14.64, 12.68 ppm; HRMS (ESI) m/z: [M+H]$^+$ calcd for C$_{37}$H$_{48}$F$_3$N$_6$O$_9$S$^+$, 809.3150; found 809.3128; Anal. HPLC: t$_R$ 12.08 min, purity 100%.

1-Methylcyclopentyl ((2R,6S,13aS,14aR,16aS, Z)-2-((7-methoxy-3-methylquinoxalin-2-yl) oxy)-14a-(((1-methylcyclopropyl) sulfonyl) carbamoyl)-5,16-dioxo-1,2,3,5,6,7,8,9,10,11,13a,14,14a,15,16, 16a-hexadecahydrocyclopropa[e]pyrrolo[1,2-a][1,4] diazacyclopentadecin-6-yl) carbamate (AJ-74)

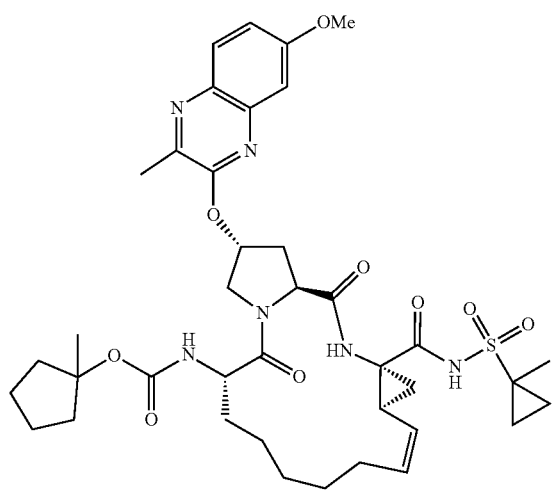 [SMILES: COc1ccc2nc(C)c(O[C@@H]3C[C@H]4C(=O)N[C@]5(C(=O)NS(=O)(=O)C6(C)CC6)C[C@H]5/C=C\CCCCC[C@H](NC(=O)OC5(C)CCCC5)C(=O)N4C3)nc2c1]

The same procedure was used as described above for compound AJ-71. A mixture of amine salt NR01-91 (0.25 g, 0.36 mmol) was treated with DIEA (0.45 mL, 2.58 mmol) and 1-methylcyclopentyl (4-nitrophenyl) carbonate (0.098 g, 0.37 mmol) to provide the target compound AJ-74 (0.24 g, 85%) as a white solid. $^1$H NMR (500 MHz, CDCl$_3$) δ 10.13 (s, 1H), 7.79 (d, J=10.0 Hz, 1H), 7.18-7.16 (m, 2H), 6.87 (s, 1H), 5.89 (br s, 1H), 5.70 (q, J=9.0 Hz, 1H), 5.12 (d, J=7.5 Hz, 1H), 5.00 (t, J=9.0 Hz, 1H), 4.61 (t, J=7.5 Hz, 1H), 4.50 (d, J=11.5 Hz, 1H), 4.28 (t, J=8.0 Hz, 1H), 4.04 (dd, J=11.0, 4.0 Hz, 1H), 3.95 (s, 3H), 2.69-2.50 (m, 6H), 2.31 (q, J=8.5 Hz, 1H), 1.93-1.76 (m, 6H), 1.65-1.25 (m, 21H), 0.85-0.79 (m, 2H) ppm; $^{13}$C NMR (125 MHz, CDCl$_3$) δ 177.11, 173.33, 166.90, 160.27, 155.31, 155.20, 144.50, 140.98, 136.24, 134.31, 128.89, 124.92, 118.78, 106.03, 89.54, 74.79, 59.47, 55.72, 53.11, 52.03, 44.75, 39.28, 39.08, 36.47, 34.61, 32.79, 29.71, 27.11, 27.06, 26.09, 24.59, 23.77, 22.26, 21.00, 19.86, 18.20, 14.52, 12.57 ppm; HRMS (ESI) m/z: [M+H]$^+$ calcd for C$_{39}$H$_{53}$N$_6$O$_9$S$^+$, 781.3589; found 781.3570; Anal. HPLC: t$_R$ 12.57 min, purity 100%.

1-Ethylcyclopentyl ((2R,6S,13aS,14aR,16aS, Z)-2-((7-methoxy-3-methylquinoxalin-2-yl) oxy)-14a-(((1-methylcyclopropyl) sulfonyl) carbamoyl)-5,16-dioxo-1,2,3,5,6,7,8,9,10,11,13a,14,14a,15,16,16a-hexadecahydrocyclopropa[e]pyrrolo[1,2-a][1,4] diazacyclopentadecin-6-yl) carbamate (NR01-97)

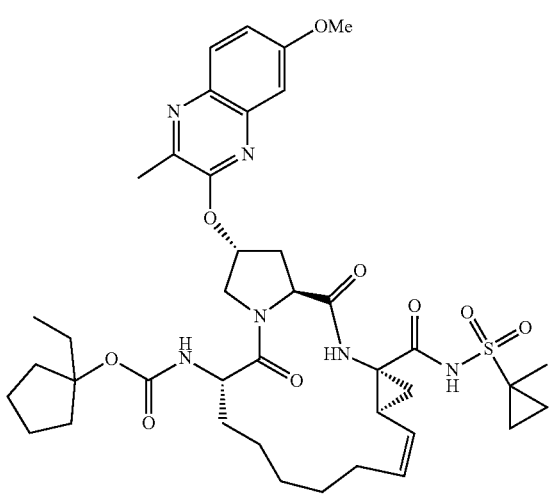 [SMILES: CCC1(OC(=O)N[C@H]2CCCCC/C=C\[C@@H]3C[C@@]3(C(=O)NS(=O)(=O)C3(C)CC3)NC(=O)[C@@H]3C[C@@H](Oc4nc5cc(OC)ccc5nc4C)CN3C2=O)CCCC1]

The same procedure was used as described above for compound AJ-71. A mixture of amine salt NR01-91 (0.120 g, 0.17 mmol) was treated with DIEA (0.210 mL, 1.21 mmol) and 1-ethylcyclopentyl (4-nitrophenyl) carbonate (0.050 g, 0.18 mmol) to provide the target compound NR01-97 (0.110 g, 76%) as a white solid. $^1$H NMR (500 MHz, CDCl$_3$) δ 10.12 (s, 1H), 7.85-7.83 (d, J=9.6 Hz, 1H), 7.19 (dd, J=4.7, 2.2 Hz, 2H), 6.86 (s, 1H), 5.89 (br s, 1H), 5.70 (dd, J=18.2, 8.7 Hz, 1H), 5.15 (d, J=7.3 Hz, 1H), 5.05-4.94 (m, 1H), 4.61 (t, J=7.7 Hz, 1H), 4.52 (d, J=11.4 Hz, 1H), 4.29-4.25 (m, 1H), 4.04 (dd, J=11.3, 3.8 Hz, 1H), 3.95 (s, 3H), 2.84-2.67 (m, 2H), 2.66-2.50 (m, 3H), 2.31 (q, J=8.7 Hz, 1H), 1.93-1.67 (m, 8H), 1.68-1.22 (m, 19H), 0.90-0.79 (m, 2H), 0.76 (t, J=7.4 Hz, 3H) ppm; $^{13}$C NMR (125 MHz, CDCl$_3$) δ 177.21, 173.51, 166.99, 160.58, 155.49, 155.26, 144.50, 141.24, 136.38, 128.66, 125.06, 119.17, 106.18, 93.18, 75.09, 59.56, 55.89, 53.56, 53.22, 52.18, 44.90, 38.76, 37.34, 37.32, 36.61, 34.74, 32.94, 31.58, 30.25, 29.85, 27.21, 26.21, 24.14, 22.42, 21.13, 19.72, 18.34, 14.67, 12.71, 8.90 ppm; HRMS (ESI) m/z: [M+H]$^+$ calcd for C$_{40}$H$_{55}$N$_6$O$_9$S, 795.3746; found 795.3714; Anal. HPLC: t$_R$ 13.38 min, purity 98%.

91

(S)-3-Methylbutan-2-yl ((2R,6S,13aS,14aR,16aS,Z)-2-((7-methoxy-3-methylquinoxalin-2-yl)oxy)-14a-(((1-methylcyclopropyl)sulfonyl)carbamoyl)-5,16-dioxo-1,2,3,5,6,7,8,9,10,11,13a,14,14a,15,16,16a-hexadecahydrocyclopropa[e]pyrrolo[1,2-a][1,4]diazacyclopentadecin-6-yl)carbamate (NR01-99)

92

(1-Methylcyclopropyl)methyl ((2R,6S,13aS,14aR,16aS,Z)-2-((7-methoxy-3-methylquinoxalin-2-yl)oxy)-14a-(((1-methylcyclopropyl)sulfonyl)carbamoyl)-5,16-dioxo-1,2,3,5,6,7,8,9,10,11,13a,14,14a,15,16,16a-hexadecahydrocyclopropa[e] pyrrolo[1,2-a][1,4]diazacyclopentadecin-6-yl)carbamate (NR01-115)

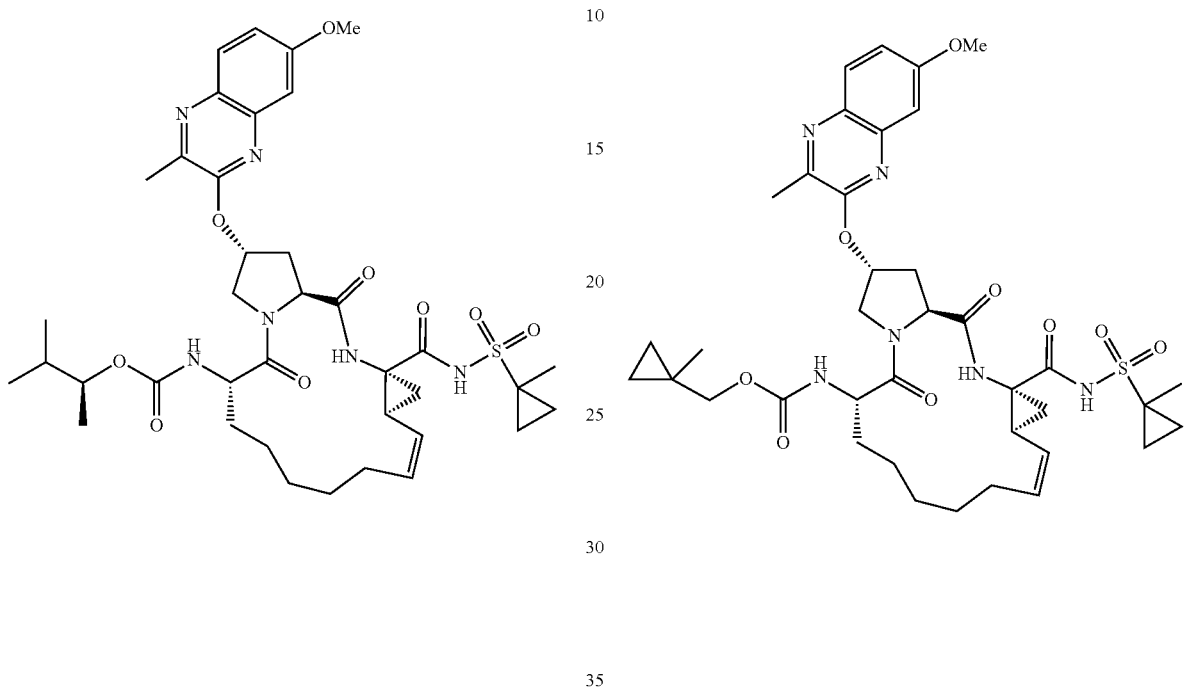

The same procedure was used as described above for compound AJ-71. A mixture of amine salt NR01-91 (0.2 g, 0.29 mmol) was treated with DIEA (0.360 mL, 2.03 mmol) and (S)-3-methylbutan-2-yl (4-nitrophenyl) carbonate (0.081 g, 0.32 mmol) to provide the target compound NR01-99 (0.2 g, 85%) as a white solid. $^1$H NMR (500 MHz, CDCl$_3$) δ 10.14 (s, 1H), 7.80 (d, J=10.0 Hz, 1H), 7.22-7.14 (m, 2H), 6.93 (s, 1H), 5.92 (br s, 1H), 5.69 (q, J=8.5 Hz, 1H), 5.23 (d, J=7.5 Hz, 1H), 5.00 (t, J=9.5 Hz, 1H), 4.62 (t, J=7.5 Hz, 1H), 4.44 (d, J=11.5 Hz, 1H), 4.40 (t, J=6.0 Hz, 1H), 4.32 (t, J=7.5 Hz, 1H), 4.05 (dd, J=11.0, 4.0 Hz, 1H), 3.94 (s, 3H), 2.74-2.64 (m, 1H), 2.63-2.48 (m, 5H), 2.30 (q, J=9.0 Hz, 1H), 1.94-1.75 (m, 4H), 1.73-1.25 (m, 13H), 1.05 (d, J=6.0 Hz, 3H), 0.84-0.75 (m, 7H), 0.63-0.60 (m, 1H) ppm; $^{13}$C NMR (125 MHz, CDCl$_3$) δ 177.29, 173.24, 167.10, 160.45, 155.92, 155.47, 144.72, 141.15, 136.32, 134.26, 128.89, 125.02, 118.99, 106.18, 76.25, 74.89, 59.57, 55.86, 53.21, 52.39, 44.82, 36.60, 34.71, 32.86, 32.77, 29.83, 27.33, 27.17, 26.23, 22.35, 21.04, 19.86, 18.32, 18.06, 17.95, 16.87, 14.63, 12.69 ppm; HRMS (ESI) m/z: [M+H]$^+$ calcd for C$_{38}$H$_{53}$N$_6$O$_9$S, 769.3589; found 769.3553; Anal. HPLC: t$_R$ 12.16 min, purity 99.6%.

The same procedure was used as described above for compound AJ-71. A mixture of amine salt NR01-91 (0.2 g, 0.29 mmol) was treated with DIEA (0.360 mL, 2.03 mmol) and (1-methylcyclopropyl) methyl (4-nitrophenyl) carbonate (0.080 g, 0.32 mmol) to provide the target compound NR01-115 (0.180 g, 77%) as a white solid. $^1$H NMR (500 MHz, CDCl$_3$) δ 10.14 (s, 1H), 7.81 (d, J=10.0 Hz, 1H), 7.21-7.16 (m, 2H), 6.98 (s, 1H), 5.92 (br s, 1H), 5.70 (q, J=9.0 Hz, 1H), 5.40 (d, J=7.5 Hz, 1H), 5.00 (t, J=9.5 Hz, 1H), 4.63 (t, J=8.0 Hz, 1H), 4.40 (d, J=11.5 Hz, 1H), 4.33 (t, J=7.0 Hz, 1H), 4.06 (dd, J=11.5, 4.0 Hz, 1H), 3.95 (s, 3H), 3.69 (s, 2H), 2.72-2.65 (m, 1H), 2.63-2.49 (m, 5H), 2.31 (q, J=8.5 Hz, 1H), 1.95-1.57 (m, 6H), 1.53-1.26 (m, 10H), 1.03 (s, 3H), 0.86-0.79 (m, 2H), 0.40-0.33 (m, 2H), 0.32-0.26 (m, 2H) ppm; $^{13}$C NMR (125 MHz, CDCl$_3$) δ 177.26, 173.06, 167.07, 160.56, 156.18, 155.48, 144.60, 141.20, 136.30, 134.26, 128.71, 125.02, 119.16, 106.18, 74.97, 73.12, 59.60, 55.88, 53.21, 52.46, 44.82, 38.75, 36.61, 34.71, 32.74, 29.81, 27.37, 27.18, 26.23, 22.35, 20.96, 19.72, 18.33, 15.42, 14.64, 12.70, 11.42, 11.33 ppm; HRMS (ESI) m/z: [M+H]$^+$ calcd for C$_{38}$H$_{51}$N$_6$O$_9$S, 767.3433; found 767.3405; Anal. HPLC: t$_R$ 11.55 min, purity 100%.

93

(R)-3-Methylbutan-2-yl ((2R,6S,13aS,14aR,16aS,Z)-2-((7-methoxy-3-methylquinoxalin-2-yl)oxy)-14a-(((1-methylcyclopropyl)sulfonyl)carbamoyl)-5,16-dioxo-1,2,3,5,6,7,8,9,10,11,13a,14,14a,15,16,16a-hexadecahydrocyclopropa[e]pyrrolo[1,2-a][1,4]diazacyclopentadecin-6-yl)carbamate (NR01-119)

94

Cyclobutyl ((2R,6S,13aS,14aR,16aS,Z)-2-((7-methoxy-3-methylquinoxalin-2-yl)oxy)-14a-(((1-methylcyclopropyl)sulfonyl)carbamoyl)-5,16-dioxo-1,2,3,5,6,7,8,9,10,11,13a,14,14a,15,16,16a-hexadecahydrocyclopropa[e]pyrrolo[1,2-a][1,4]diazacyclopentadecin-6-yl)carbamate (NR01-127)

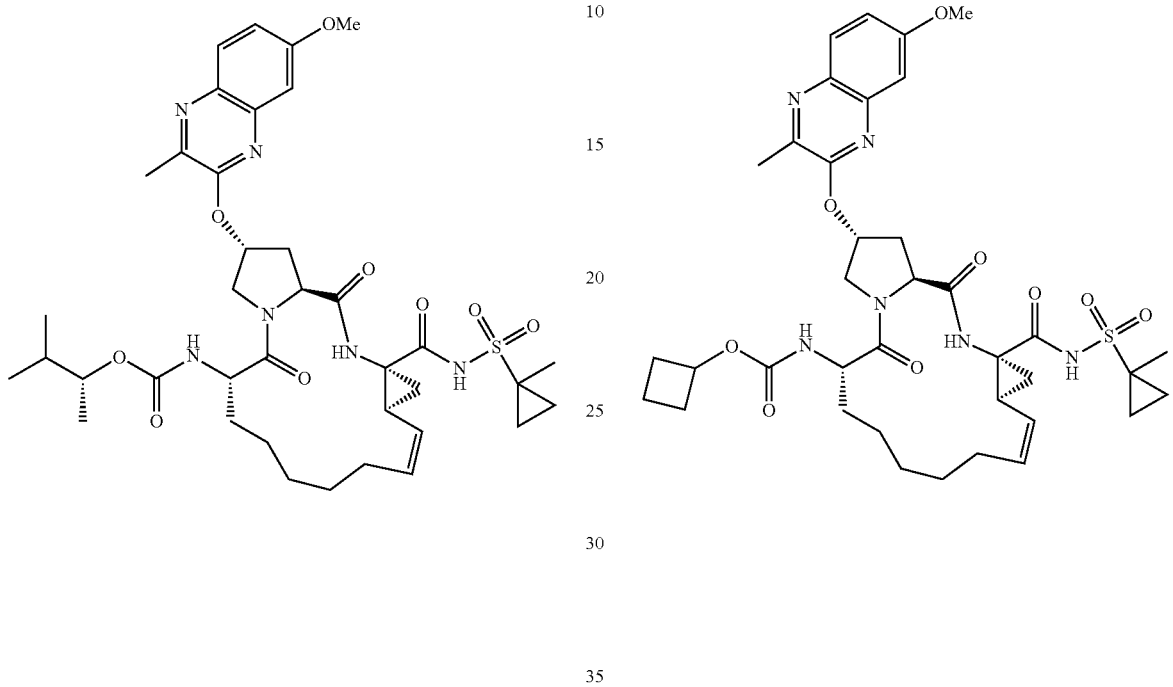

The same procedure was used as described above for compound AJ-71. A mixture of amine salt NR01-91 (0.2 g, 0.29 mmol) was treated with DIEA (0.360 mL, 2.03 mmol) and (R)-3-methylbutan-2-yl (4-nitrophenyl) carbonate (0.081 g, 0.32 mmol) to provide the target compound NR01-119 (0.210 g, 90%) as a white solid. $^1$H NMR (500 MHz, CDCl$_3$) δ 10.13 (s, 1H), 7.80 (d, J=10.0 Hz, 1H), 7.22-7.16 (m, 2H), 6.89 (s, 1H), 5.92 (br s, 1H), 5.70 (q, J=8.5 Hz, 1H), 5.27 (d, J=7.5 Hz, 1H), 5.00 (t, J=9.5 Hz, 1H), 4.61 (t, J=7.5 Hz, 1H), 4.44 (d, J=11.5 Hz, 1H), 4.41 (t, J=6.0 Hz, 1H), 4.34 (t, J=7.5 Hz, 1H), 4.06 (dd, J=11.0, 4.0 Hz, 1H), 3.95 (s, 3H), 2.73-2.65 (m, 1H), 2.63-2.49 (m, 5H), 2.31 (q, J=9.0 Hz, 1H), 1.95-1.76 (m, 4H), 1.71-1.26 (m, 13H), 1.03 (d, J=6.0 Hz, 3H), 0.88-0.76 (m, 8H) ppm; $^{13}$C NMR (125 MHz, CDCl$_3$) δ 177.23, 173.20, 167.03, 160.45, 155.88, 155.46, 144.69, 141.15, 136.34, 134.31, 128.94, 125.03, 118.99, 106.17, 76.34, 74.88, 59.56, 55.87, 53.21, 52.38, 44.84, 38.75, 36.60, 34.70, 32.83, 29.84, 27.31, 27.18, 26.21, 22.41, 21.06, 19.88, 18.33, 18.13, 17.96, 16.74, 14.64, 12.71 ppm; HRMS (ESI) m/z: [M+H]$^+$ calcd for C$_{38}$H$_{53}$N$_6$O$_9$S, 769.3589; found 769.3561; Anal. HPLC: t$_R$ 11.96 min, purity 99.6%.

The same procedure was used as described above for compound AJ-71. A mixture of amine salt NR01-91 (0.2 g, 0.29 mmol) was treated with DIEA (0.360 mL, 2.03 mmol) and cyclobutyl (4-nitrophenyl) carbonate (0.076 g, 0.32 mmol) to provide the target compound NR01-127 (0.190 g, 83%) as a white solid. $^1$H NMR (500 MHz, CDCl$_3$) δ 10.17 (s, 1H), 7.81 (d, J=9.5 Hz, 1H), 7.21-7.17 (m, 2H), 7.07 (s, 1H), 5.91 (br s, 1H), 5.69 (q, J=8.0 Hz, 1H), 5.39 (d, J=7.5 Hz, 1H), 4.98 (t, J=9.5 Hz, 1H), 4.72 (p, J=7.5 Hz, 1H), 4.62 (t, J=7.5 Hz, 1H), 4.40 (d, J=11.0 Hz, 1H), 4.30 (t, J=7.5 Hz, 1H), 4.05 (dd, J=11.5, 4.0 Hz, 1H), 3.94 (s, 3H), 2.73-2.64 (m, 1H), 2.63-2.47 (m, 5H), 2.30 (q, J=8.5 Hz, 1H), 2.24-2.13 (m, 2H), 1.99-1.65 (m, 8H), 1.62-1.26 (m, 12H), 0.85-0.78 (m, 2H) ppm; $^{13}$C NMR (125 MHz, CDCl$_3$) δ 177.31, 173.00, 167.12, 160.49, 155.46, 155.23, 144.68, 141.16, 136.28, 134.18, 128.83, 125.01, 119.06, 106.18, 74.89, 69.26, 59.59, 55.87, 53.18, 52.30, 44.80, 36.60, 34.72, 32.69, 30.59, 30.40, 29.79, 27.36, 27.18, 26.24, 22.31, 20.93, 19.83, 18.32, 14.63, 13.25, 12.68 ppm; HRMS (ESI) m/z: [M+H]$^+$ calcd for C$_{37}$H$_{49}$N$_6$O$_9$S, 753.3276; found 753.3248; Anal. HPLC: t$_R$ 11.07 min, purity 99.4%.

(R)-1,1,1-Trifluoropropan-2-yl ((2R,6S,13aS,14aR,16aS,Z)-2-((7-methoxy-3-methylquinoxalin-2-yl)oxy)-14a-(((1-methylcyclopropyl)sulfonyl)carbamoyl)-5,16-dioxo-1,2,3,5,6,7,8,9,10,11,13a,14,14a,15,16,16a-hexadecahydrocyclopropa[e]pyrrolo[1,2-a][1,4]diazacyclopentadecin-6-yl)carbamate (NR01-145)

3,3-Difluorocyclobutyl ((2R,6S,13aS,14aR,16aS,Z)-2-((7-methoxy-3-methylquinoxalin-2-yl)oxy)-14a-(((1-methylcyclopropyl)sulfonyl)carbamoyl)-5,16-dioxo-1,2,3,5,6,7,8,9,10,11,13a,14,14a,15,16,16a-hexadecahydrocyclopropa[e]pyrrolo[1,2-a][1,4]diazacyclopentadecin-6-yl)carbamate (NR01-149)

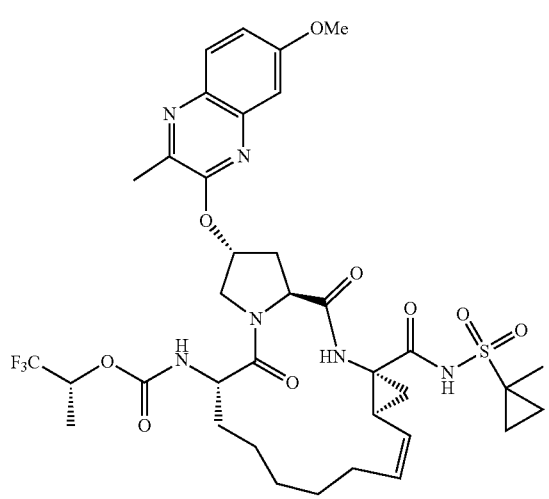 [SMILES: COc1ccc2nc(C)c(O[C@@H]3C[C@H]4C(=O)N[C@]5(C(=O)NS(=O)(=O)C6(C)CC6)C[C@H]5/C=C\CCCCC[C@H](NC(=O)O[C@H](C)C(F)(F)F)C(=O)N4C3)nc2c1]

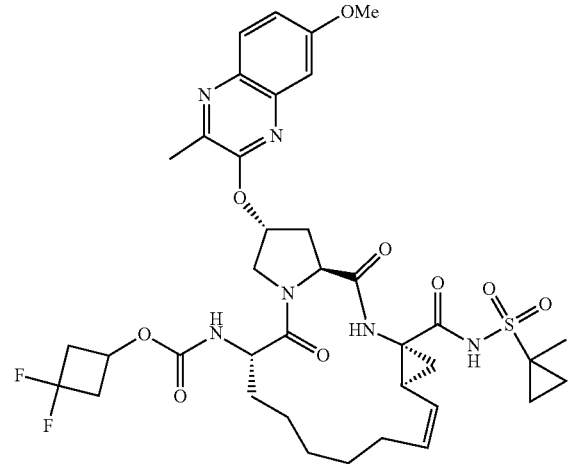 [SMILES: COc1ccc2nc(C)c(O[C@@H]3C[C@H]4C(=O)N[C@]5(C(=O)NS(=O)(=O)C6(C)CC6)C[C@H]5/C=C\CCCCC[C@H](NC(=O)OC5CC(F)(F)C5)C(=O)N4C3)nc2c1]

The same procedure was used as described above for compound AJ-71. A mixture of amine salt NR01-91 (0.2 g, 0.29 mmol) was treated with DIEA (0.360 mL, 2.03 mmol) and (R)-4-nitrophenyl (1,1,1-trifluoropropan-2-yl) carbonate (0.089 g, 0.32 mmol) to provide the target compound NR01-145 (0.2 g, 82%) as a white solid. $^1$H NMR (500 MHz, CDCl$_3$) δ 10.15 (s, 1H), 7.87 (d, J=9.0 Hz, 1H), 7.23-7.18 (m, 2H), 7.08 (s, 1H), 5.92 (br s, 1H), 5.76-5.64 (m, 2H), 5.02-4.93 (m, 2H), 4.64 (t, J=8.0 Hz, 1H), 4.40 (d, J=11.5 Hz, 1H), 4.36-4.29 (m, 1H), 4.05 (dd, J=11.5, 4.0 Hz, 1H), 3.95 (s, 3H), 2.72-2.60 (m, 2H), 2.58-2.48 (m, 4H), 2.29 (q, J=9.0 Hz, 1H), 1.94-1.73 (m, 5H), 1.64-1.57 (m, 1H), 1.52-1.25 (m, 13H), 0.85-0.79 (m, 2H) ppm; $^{13}$C NMR (125 MHz, CDCl$_3$) δ 177.16, 172.34, 167.05, 160.68, 155.50, 153.92, 144.57, 141.25, 136.31, 128.52, 125.00, 124.08 (q, J=278.7 Hz), 119.33, 106.18, 75.09, 67.92 (q, J=33.7 Hz), 59.63, 55.90, 53.22, 52.59, 44.77, 38.76, 36.61, 34.73, 32.55, 29.67, 27.37, 27.16, 26.23, 22.28, 20.83, 19.41, 18.31, 14.64, 13.80, 12.72 ppm; $^{19}$F NMR (470 MHz, CDCl$_3$) δ −78.88 ppm; HRMS (ESI) m/z: [M+H]$^+$ calcd for C$_{36}$H$_{46}$F$_3$N$_6$O$_9$S, 795.2994; found 795.2958; Anal. HPLC: t$_R$ 11.31 min, purity 1000.

The same procedure was used as described above for compound AJ-71. A mixture of amine salt NR01-91 (0.2 g, 0.29 mmol) was treated with DIEA (0.360 mL, 2.03 mmol) and 3,3-difluorocyclobutyl (4-nitrophenyl) carbonate (0.087 g, 0.32 mmol) to provide the target compound NR01-149 (0.210 g, 87N) as a white solid. $^1$H NMR (500 MHz, CDCl$_3$) δ 10.14 (s, 1H), 7.81 (d, J=8.5 Hz, 1H), 7.21-7.16 (m, 2H), 6.98 (s, 1H), 5.90 (br s, 1H), 5.70 (q, J=8.5 Hz, 1H), 5.37 (d, J=7.0 Hz, 1H), 4.98 (t, J=9.5 Hz, 1H), 4.71-4.64 (m, 1H), 4.63 (t, J=8.0 Hz, 1H), 4.36 (d, J=11.0 Hz, 1H), 4.29 (t, J=7.5 Hz, 1H), 4.04 (dd, J=11.5, 4.5 Hz, 1H), 3.94 (s, 3H), 2.95-2.79 (m, 2H), 2.69-2.44 (m, 8H), 2.28 (q, J=8.5 Hz, 1H), 1.95-1.55 (m, 6H), 1.52-1.26 (m, 10H), 0.86-0.79 (m, 2H) ppm; $^{13}$C NMR (125 MHz, CDCl$_3$) δ 177.20, 172.59, 167.08, 160.47, 155.41, 154.79, 144.67, 141.12, 136.28, 134.35, 128.99, 124.98, 119.02, 118.15 (dd, J=280.0, 268.7 Hz), 106.18, 74.85, 59.63, 59.61 (dd, J=17.5, 5.0 Hz), 55.85, 53.22, 52.43, 44.77, 43.20 (dd, J=23.5, 8.6 Hz), 38.75, 36.62, 34.75, 32.60, 29.84, 27.42, 27.11, 26.22, 22.25, 21.01, 19.90, 18.31, 14.65, 12.68 ppm; $^{19}$F NMR (470 MHz, CDCl$_3$) δ −85.03 (d, J=199.9 Hz), −96.80 (d, J=199.9 Hz) ppm; HRMS (ESI) m/z: [M+H]$^+$ calcd for C$_{37}$H$_{47}$F$_2$N$_6$O$_9$S, 789.3088; found 789.3054; Anal. HPLC: t$_R$ 10.74 min, purity 99.8%.

97

(1R,2R)-2-Fluorocyclopentyl ((2R,6S,13aS,14aR, 16aS,Z)-2-((7-methoxy-3-methylquinoxalin-2-yl)oxy)-14a-(((1-methylcyclopropyl)sulfonyl)carbamoyl)-5,16-di oxo-1,2,3,5,6,7,8,9,10,11,13a,14,14a,15,16,16a-hexadecahydrocyclopropa[e]pyrrolo [1,2-a][1,4]diazacyclopentadecin-6-yl)carbamate (NR02-08)

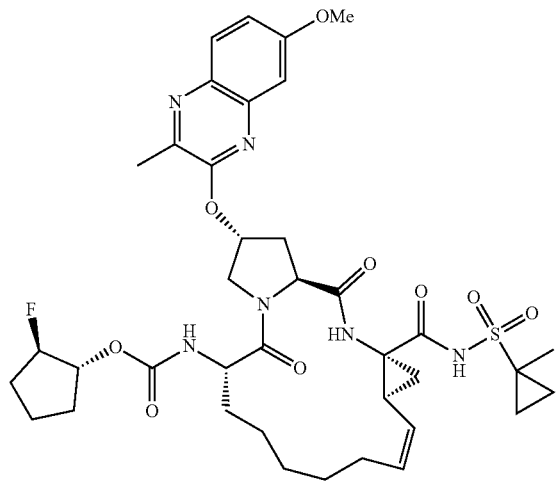 [SMILES: COc1ccc2nc(C)c(O[C@@H]3C[C@H]4C(=O)N[C@]5(C(=O)NS(=O)(=O)C6(C)CC6)C[C@H]5/C=C\CCCCC[C@H](NC(=O)O[C@@H]5CCC[C@H]5F)C(=O)N4C3)nc2c1]

The same procedure was used as described above for compound AJ-71. A mixture of amine salt NR01-91 (0.2 g, 0.29 mmol) was treated with DIEA (0.360 mL, 2.03 mmol) and (1R,2R)-2-fluorocyclopentyl (4-nitrophenyl) carbonate (0.086 g, 0.32 mmol) to provide the target compound NR02-08 (0.190 g, 79%) as a white solid. $^1$H NMR (500 MHz, CDCl$_3$) δ 10.11 (s, 1H), 7.88 (d, J=9.0 Hz, 1H), 7.22-7.18 (m, 2H), 6.88 (s, 1H), 5.93 (br s, 1H), 5.71 (q, J=8.0 Hz, 1H), 5.23 (d, J=7.5 Hz, 1H), 5.00 (t, J=9.5 Hz, 1H), 4.93-4.77 (m, 2H), 4.63 (t, J=7.5 Hz, 1H), 4.40 (d, J=11.5 Hz, 1H), 4.31 (t, J=7.5 Hz, 1H), 4.06 (dd, J=11.5, 4.0 Hz, 1H), 3.95 (s, 3H), 2.75-2.67 (m, 1H), 2.65-2.49 (m, 5H), 2.29 (q, J=8.5 Hz, 1H), 2.02-1.27 (m, 22H), 0.86-0.78 (m, 2H) ppm; $^{13}$C NMR (125 MHz, CDCl$_3$) δ 177.16, 172.92, 166.94, 160.68, 155.53, 155.01, 144.59, 141.25, 136.30, 128.53, 125.00, 119.33, 106.19, 97.56 (d, J=176.2 Hz), 79.81 (d, J=30.0 Hz), 75.02, 59.61, 55.91, 53.18, 52.50, 44.84, 38.32, 36.62, 34.68, 32.66, 30.64 (d, J=21.2 Hz), 29.97, 29.86, 27.36, 27.13, 26.20, 22.30, 21.26, 21.05, 19.53, 18.33, 14.65, 12.73 ppm; $^{19}$F NMR (470 MHz, CDCl$_3$) δ −181.06 ppm; HRMS (ESI) m/z: [M+H]$^+$ calcd for C$_{38}$H$_{50}$FN$_6$O$_9$S, 785.3339; found 785.3305; Anal. HPLC: $t_R$ 11.14 min, purity 98.7%.

98

(2,2-Difluoro-1-methylcyclopropyl)methyl ((2R,6S, 13aS,14aR,16aS,Z)-2-((7-methoxy-3-methylquinoxalin-2-yl)oxy)-14a-(((1-methylcyclopropyl)sulfonyl)carbamoyl)-5,16-dioxo-1,2,3,5,6,7,8,9,10,11,13a,14,14a,15,16,16a-hexadecahydrocyclopropa[e]pyrrolo[1,2-a][1,4]diazacyclopentadecin-6-yl)carbamate (NR02-55)

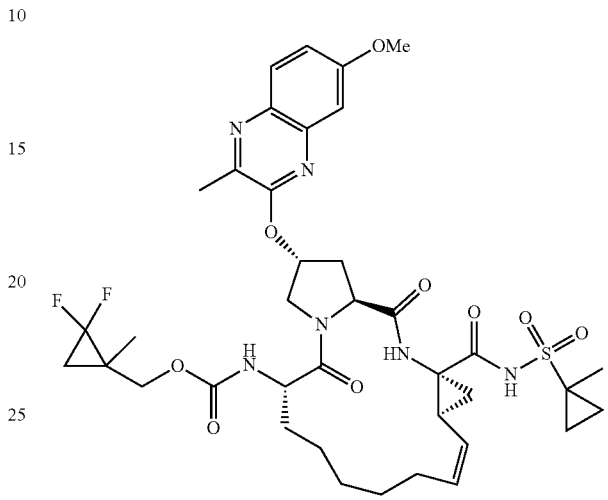

The same procedure was used as described above for compound AJ-71. A mixture of amine salt NR01-91 (0.150 g, 0.22 mmol) was treated with DIEA (0.270 mL, 1.52 mmol) and (2,2-difluoro-1-methylcyclopropyl) methyl (4-nitrophenyl) carbonate (0.069 g, 0.24 mmol) to provide the target compound NR02-55 (0.130 g, 71%) as a white solid. $^1$H NMR (500 MHz, CDCl$_3$) δ 10.14 (s, 0.5H), 10.13 (s, 0.5H), 7.82 (d, J=9.8 Hz, 1H), 7.22-7.16 (m, 2H), 6.98 (s, 0.5H), 6.95 (s, 0.5H), 5.91 (br s, 1H), 5.75-5.66 (m, 1H), 5.49 (d, J=7.6 Hz, 0.5H), 5.45 (d, J=7.4 Hz, 0.5H), 5.02-4.95 (m, 1H), 4.63 (t, J=7.8 Hz, 1H), 4.44-4.36 (m, 1H), 4.32 (td, J=9.8, 3.4 Hz, 1H), 4.13-4.03 (m, 2H), 3.95 (s, 3H), 3.76 (t, J=11.8 Hz, 1H), 2.82-2.59 (m, 2H), 2.61-2.47 (m, 4H), 2.30 (q, J=8.5 Hz, 1H), 1.97-1.58 (m, 6H), 1.58-1.20 (m, 11H), 1.18-1.13 (m, 3H), 1.09-1.00 (m, 1H), 0.86-0.78 (m, 2H) ppm; $^{13}$C NMR (125 MHz, CDCl$_3$) δ 177.24 (177.21), 172.83, 167.05, 160.58 (160.54), 155.63 (155.57), 155.48 (155.46), 144.68 (144.54), 141.19, 136.33 (136.30), 128.77, 125.02 (124.99), 119.20 (119.13), 106.19, 74.97, 66.21, 59.63, 55.88, 53.24, 52.51, 44.82 (44.81), 38.76, 36.61, 34.73, 32.72 (32.68), 29.81 (29.80), 27.40 (27.37), 27.16, 26.23, 25.77-25.37 (m), 22.31 (22.30), 21.23-20.77 (m), 19.72, 18.32, 14.87-14.72 (m), 14.65, 12.70 ppm; $^{19}$F NMR (470 MHz, CDCl$_3$) δ −138.85 (dd, J=25.7, 7.4 Hz) ppm; HRMS (ESI) m/z: [M+H]$^+$ calcd for C$_{38}$H$_{49}$F$_2$N$_6$O$_9$S, 803.3244; found 803.3206; Anal. HPLC: $t_R$ 13.57 min, purity 99%.

(S)-1,1,1-Trifluoropropan-2-yl ((2R,6S,13aS,14aR,16aS,Z)-2-((7-methoxy-3-methylquinoxalin-2-yl)oxy)-14a-(((1-methylcyclopropyl)sulfonyl)carbamoyl)-5,16-dioxo-1,2,3,5,6,7,8,9,10,11,13a,14,14a,15,16,16a-hexadecahydrocyclopropa[e]pyrrolo [1,2-a][1,4]diazacyclopentadecin-6-yl)carbamate (NR02-23)

1-Methylcyclopropyl ((2R,6S,13aS,14aR,16aS,Z)-2-((7-methoxy-3-methylquinoxalin-2-yl)oxy)-14a-(((1-methylcyclopropyl)sulfonyl)carbamoyl)-5,16-dioxo-1,2,3,5,6,7,8,9,10,11,13a,14,14a,15,16,16a-hexadecahydrocyclopropa[e]pyrrolo [1,2-a][1,4]diazacyclopentadecin-6-yl)carbamate (NR02-24)

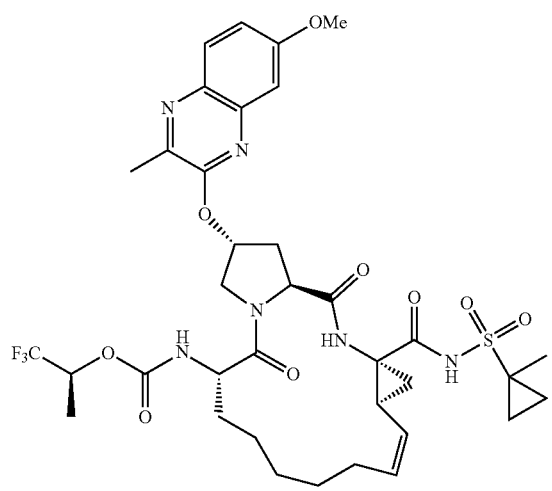 [SMILES: COc1ccc2nc(C)c(O[C@@H]3C[C@H]4C(=O)N[C@]5(C(=O)NS(=O)(=O)C6(C)CC6)C[C@H]5/C=C\CCCCC[C@H](NC(=O)O[C@@H](C)C(F)(F)F)C(=O)N4C3)nc2c1]

The same procedure was used as described above for compound AJ-71. A mixture of amine salt NR01-91 (0.2 g, 0.29 mmol) was treated with DIEA (0.354 mL, 2.02 mmol) and (S)-4-nitrophenyl (1,1,1-trifluoropropan-2-yl) carbonate (0.089 g, 0.32 mmol) to provide the target compound NR02-23 (0.2 g, 82%) as a white solid. $^1$H NMR (500 MHz, CDCl$_3$) δ 10.13 (s, 1H), 7.80 (d, J=9.5 Hz, 1H), 7.21-7.16 (m, 2H), 6.96 (s, 1H), 5.91 (br s, 1H), 5.70 (q, J=8.5 Hz, 1H), 5.61 (d, J=7.5 Hz, 1H), 5.02-4.94 (m, 2H), 4.63 (t, J=8.0 Hz, 1H), 4.39-4.31 (m, 2H), 4.06 (dd, J=11.5, 4.0 Hz, 1H), 3.95 (s, 3H), 2.71-2.60 (m, 2H), 2.55-2.48 (m, 4H), 2.29 (q, J=8.5 Hz, 1H), 1.97-1.82 (m, 2H), 1.80-1.58 (m, 4H), 1.52-1.34 (m, 10H), 1.29 (d, J=6.5 Hz, 3H), 0.86-0.80 (m, 2H) ppm; $^{13}$C NMR (125 MHz, CDCl$_3$) δ 177.17, 172.40, 167.08, 160.54, 155.39, 153.83, 144.47, 141.15, 136.34, 134.25, 128.90, 124.93, 124.18 (q, J=280.5 Hz), 119.14, 106.17, 74.93, 67.76 (q, J=33.7 Hz), 59.66, 55.87, 53.28, 52.59, 44.76, 38.75, 36.62, 34.78, 32.53, 29.77, 27.43, 27.12, 26.25, 22.18, 20.93, 19.80, 18.30, 14.65, 13.80, 12.68 ppm; $^{19}$F NMR (470 MHz, CDCl$_3$) δ −79.01 ppm; HRMS (ESI) m/z: [M+H]$^+$ calcd for C$_{36}$H$_{46}$F$_3$N$_6$O$_9$S, 795.2994; found 795.2961; Anal. HPLC: t$_R$ 11.17 min, purity 1000.

The same procedure was used as described above for compound AJ-71. A mixture of amine salt NR01-91 (0.2 g, 0.29 mmol) was treated with DIEA (0.354 mL, 2.02 mmol) and 1-methylcyclopropyl (4-nitrophenyl) carbonate (0.076 g, 0.32 mmol) to provide the target compound NR02-24 (0.190 g, 83N) as a white solid. $^1$H NMR (500 MHz, CDCl$_3$) δ 10.16 (s, 1H), 7.79 (d, J=9.5 Hz, 1H), 7.23-7.16 (m, 2H), 7.03 (s, 1H), 5.91 (br s, 1H), 5.68 (q, J=9.0 Hz, 1H), 5.29 (d, J=5.0 Hz, 1H), 4.98 (t, J=9.5 Hz, 1H), 4.61 (t, J=7.5 Hz, 1H), 4.46 (d, J=11.5 Hz, 1H), 4.31 (t, J=7.5 Hz, 1H), 4.06 (dd, J=11.5, 4.0 Hz, 1H), 3.94 (s, 3H), 2.70-2.52 (m, 6H), 2.30 (q, J=8.5 Hz, 1H), 1.94-1.71 (m, 5H), 1.62-1.53 (m, 1H), 1.50-1.25 (m, 13H), 0.85-0.79 (m, 2H), 0.76-0.69 (m, 2H), 0.56-0.46 (m, 2H) ppm; $^{13}$C NMR (125 MHz, CDCl$_3$) δ 177.30, 173.01, 167.15, 160.43, 155.52, 155.45, 144.68, 141.14, 136.30, 134.26, 128.90, 125.00, 118.97, 106.18, 74.88, 59.57, 56.76, 55.86, 53.17, 52.27, 44.79, 38.74, 36.60, 34.76, 32.75, 29.78, 27.31, 27.18, 26.25, 22.29, 21.47, 20.95, 19.71, 18.31, 14.62, 13.04, 12.90, 12.67 ppm; HRMS (ESI) m/z: [M+H]$^+$ calcd for C$_{37}$H$_{49}$N$_6$O$_9$S, 753.3276; found 753.3248; Anal. HPLC: t$_R$ 10.60 min, purity 99.4%.

101

(S)-1-Cyclopropylethyl ((2R,6S,13aS,14aR,16aS,Z)-2-((7-methoxy-3-methylquinoxalin-2-yl)oxy)-14a-(((1-methylcyclopropyl)sulfonyl)carbamoyl)-5,16-dioxo-1,2,3,5,6,7,8,9,10,11,13a,14,14a,15,16,16a-hexadecahydrocyclopropa[e]pyrrolo[1,2-a][1,4]diazacyclopentadecin-6-yl)carbamate (NR02-25)

102

(R)-1-Cyclopropylethyl ((2R,6S,13aS,14aR,16aS,Z)-2-((7-methoxy-3-methylquinoxalin-2-yl)oxy)-14a-(((1-methylcyclopropyl)sulfonyl)carbamoyl)-5,16-dioxo-1,2,3,5,6,7,8,9,10,11,13a,14,14a,15,16,16a-hexadecahydrocyclopropa[e]pyrrolo[1,2-a][1,4]diazacyclopentadecin-6-yl)carbamate (NR02-26)

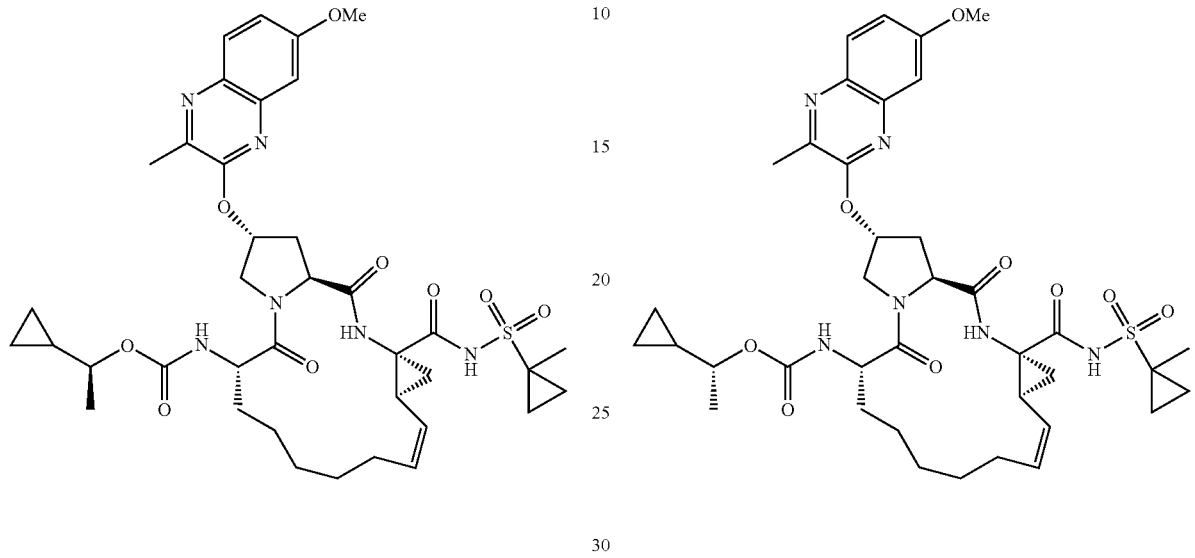

The same procedure was used as described above for compound AJ-71. A mixture of amine salt NR01-91 (0.2 g, 0.29 mmol) was treated with DIEA (0.354 mL, 2.02 mmol) and (S)-1-cyclopropylethyl (4-nitrophenyl) carbonate (0.080 g, 0.32 mmol) to provide the target compound NR02-25 (0.2 g, 86%) as a white solid. $^1$H NMR (500 MHz, CDCl$_3$) δ 10.19 (s, 1H), 7.79 (d, J=10.0 Hz, 1H), 7.22-7.16 (m, 2H), 7.07 (s, 1H), 5.90 (br s, 1H), 5.70 (q, J=8.5 Hz, 1H), 5.51 (d, J=8.0 Hz, 1H), 5.00 (t, J=9.5 Hz, 1H), 4.62 (t, J=7.5 Hz, 1H), 4.46 (d, J=11.0 Hz, 1H), 4.31 (t, J=8.0 Hz, 1H), 4.04 (dd, J=11.5, 4.0 Hz, 1H), 3.98-3.95 (m, 1H), 3.94 (s, 3H), 2.72-2.63 (m, 1H), 2.62-2.47 (m, 5H), 2.32 (q, J=8.5 Hz, 1H), 1.93-1.68 (m, 5H), 1.63-1.54 (m, 1H), 1.52-1.26 (m, 10H), 1.18 (d, J=6.5 Hz, 3H), 0.87-0.79 (m, 3H), 0.49-0.33 (m, 2H), 0.19-0.12 (m, 2H) ppm; $^{13}$C NMR (125 MHz, CDCl$_3$) δ 177.39, 173.13, 167.10, 160.42, 155.72, 155.46, 144.70, 141.12, 136.30, 134.33, 128.95, 125.05, 118.94, 106.15, 76.45, 74.91, 59.65, 55.85, 53.15, 52.41, 44.87, 38.75, 36.59, 34.71, 32.72, 29.77, 27.24, 26.26, 22.37, 20.95, 20.15, 19.88, 18.32, 16.58, 14.64, 12.68, 3.68, 2.64 ppm; HRMS (ESI) m/z: [M+H]$^+$ calcd for C$_{38}$H$_{51}$N$_6$O$_9$S, 767.3433; found 767.3408; Anal. HPLC: $t_R$ 11.37 min, purity 100%.

The same procedure was used as described above for compound AJ-71. A mixture of amine salt NR01-91 (0.2 g, 0.29 mmol) was treated with DIEA (0.354 mL, 2.02 mmol) and (R)-1-cyclopropylethyl (4-nitrophenyl) carbonate (0.080 g, 0.32 mmol) to provide the target compound NR02-25 (0.210 g, 90%) as a white solid. $^1$H NMR (500 MHz, CDCl$_3$) δ 10.14 (s, 1H), 7.80 (d, J=9.5 Hz, 1H), 7.22-7.16 (m, 2H), 6.97 (s, 1H), 5.91 (br s, 1H), 5.71 (q, J=8.0 Hz, 1H), 5.37 (d, J=7.5 Hz, 1H), 5.00 (t, J=9.0 Hz, 1H), 4.63 (t, J=7.5 Hz, 1H), 4.42 (d, J=11.5 Hz, 1H), 4.33 (t, J=7.5 Hz, 1H), 4.06 (dd, J=11.0, 3.5 Hz, 1H), 4.03-3.97 (m, 1H), 3.94 (s, 3H), 2.73-2.65 (m, 1H), 2.63-2.48 (m, 5H), 2.31 (q, J=8.5 Hz, 1H), 1.97-1.77 (m, 4H), 1.72-1.55 (m, 2H), 1.52-1.26 (m, 10H), 1.16 (d, J=6.0 Hz, 3H), 0.89-0.79 (m, 3H), 0.50-0.38 (m, 2H), 0.30-0.13 (m, 2H) ppm; $^{13}$C NMR (125 MHz, CDCl$_3$) δ 177.25, 173.05, 167.05, 160.45, 155.73, 155.46, 144.65, 141.14, 136.31, 134.33, 128.94, 125.04, 119.01, 106.17, 76.37, 74.91, 59.59, 55.87, 53.18, 52.40, 44.83, 38.75, 36.60, 34.73, 32.86, 29.81, 27.35, 27.19, 26.23, 22.38, 21.01, 20.03, 19.90, 18.34, 16.40, 14.64, 12.70, 3.55, 2.60 ppm; HRMS (ESI) m/z: [M+H]$^+$ calcd for C$_{38}$H$_{51}$N$_6$O$_9$S, 767.3433; found 767.3409; Anal. HPLC: $t_R$ 11.42 min, purity 100%.

103

(1-(Trifluoromethyl)cyclopropyl)methyl ((2R,6S, 13aS,14aR,16aS,Z)-2-((7-methoxy-3-methylquinoxalin-2-yl)oxy)-14a-(((1-methylcyclopropyl)sulfonyl)carbamoyl)-5,16-dioxo-1,2,3,5,6,7,8,9,10,11, 13a,14,14a,15,16,16a-hexadecahydrocyclopropa[e] pyrrolo[1,2-a][1,4]diazacyclopentadecin-6-yl) carbamate (NR02-49)

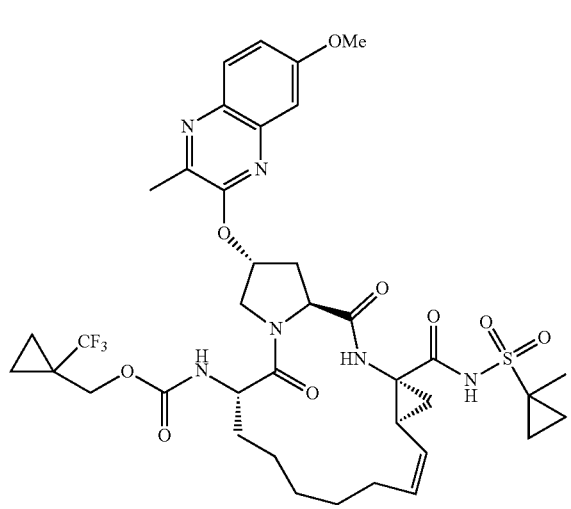 [SMILES: COc1ccc2nc(C)c(O[C@@H]3C[C@H]4C(=O)N[C@]5(C(=O)NS(=O)(=O)C6(C)CC6)C[C@H]5/C=C\CCCCC[C@H](NC(=O)OCC5(C(F)(F)F)CC5)C(=O)N4C3)nc2c1]

The same procedure was used as described above for compound AJ-71. A mixture of amine salt NR01-91 (0.150 g, 0.22 mmol) was treated with DIEA (0.266 mL, 1.52 mmol) and 4-nitrophenyl ((1-(trifluoromethyl) cyclopropyl) methyl) carbonate (0.073 g, 0.24 mmol) to provide the target compound NR02-49 (0.140 g, 75%) as a white solid. $^1$H NMR (500 MHz, CDCl$_3$) δ 10.15 (s, 1H), 7.81 (d, J=9.5 Hz, 1H), 7.21-7.16 (m, 2H), 7.01 (s, 1H), 5.90 (br s, 1H), 5.69 (q, J=8.5 Hz, 1H), 5.52 (d, J=7.5 Hz, 1H), 4.99 (t, J=9.0 Hz, 1H), 4.63 (t, J=7.5 Hz, 1H), 4.40 (d, J=11.0 Hz, 1H), 4.33-4.27 (m, 1H), 4.04 (dd, J=11.5, 4.0 Hz, 1H), 3.99 (d, J=10.5 Hz, 2H), 3.95 (s, 3H), 2.71-2.59 (m, 2H), 2.58-2.47 (m, 4H), 2.30 (q, J=8.5 Hz, 1H), 1.96-1.55 (m, 6H), 1.53-1.24 (m, 10H), 1.03-0.93 (m, 2H), 0.86-0.79 (m, 2H), 0.74-0.62 (m, 2H) ppm; $^{13}$C NMR (125 MHz, CDCl$_3$) δ 177.24, 172.77, 167.06, 160.48, 155.47, 144.70, 141.14, 136.31, 134.07, 128.89, 126.48 (q, J=272.5 Hz), 125.01, 119.04, 106.18, 74.94, 65.52, 59.65, 55.86, 53.23, 52.54, 44.82, 38.75, 36.61, 34.73, 32.63, 29.78, 27.35, 27.15, 26.22, 22.95 (q, J=33.0 Hz), 22.30, 20.98, 19.83, 18.32, 14.65, 12.70, 8.20 ppm; $^{19}$F NMR (470 MHz, CDCl$_3$) δ −69.68 ppm; HRMS (ESI) m/z: [M+H]$^+$ calcd for C$_{38}$H$_{48}$F$_3$N$_6$O$_9$S, 821.3150; found 821.3120; Anal. HPLC: $t_R$ 11.48 min, purity 99.5%.

104

1-(Trifluoromethyl)cyclobutyl ((2R,6S,13aS,14aR, 16aS,Z)-2-((7-methoxy-3-methylquinoxalin-2-yl) oxy)-14a-(((1-methylcyclopropyl)sulfonyl)carbamoyl)-5,16-dioxo-1,2,3,5,6,7,8,9,10,11,13a,14,14a,15, 16,16a-hexadecahydrocyclopropa[e]pyrrolo[1,2-a] [1,4]diazacyclopentadecin-6-yl)carbamate (NR02-58)

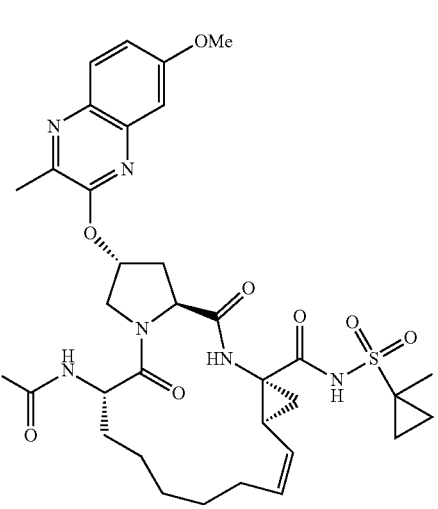

The same procedure was used as described above for compound AJ-71. A mixture of amine salt NR01-91 (0.150 g, 0.22 mmol) was treated with DIEA (0.266 mL, 1.52 mmol) and 4-nitrophenyl (1-(trifluoromethyl) cyclobutyl) carbonate (0.073 g, 0.24 mmol) to provide the target compound NR02-58 (0.145 g, 78%) as a white solid. $^1$H NMR (500 MHz, CDCl$_3$) δ 10.11 (s, 1H), 7.79 (d, J=10.0 Hz, 1H), 7.22-7.16 (m, 2H), 6.90 (s, 1H), 5.89 (br s, 1H), 5.70 (q, J=8.0 Hz, 1H), 5.55 (d, J=7.5 Hz, 1H), 5.00 (t, J=9.0 Hz, 1H), 4.61 (t, J=7.5 Hz, 1H), 4.44 (d, J=11.5 Hz, 1H), 4.33-4.26 (m, 1H), 4.05 (dd, J=11.5, 4.0 Hz, 1H), 3.95 (s, 3H), 2.72-2.63 (m, 2H), 2.58-2.50 (m, 6H), 2.43-2.33 (m, 2H), 2.31 (q, J=8.5 Hz, 1H), 1.94-1.72 (m, 6H), 1.64-1.56 (m, 1H), 1.54-1.25 (m, 11H), 0.86-0.79 (m, 2H) ppm; $^{13}$C NMR (125 MHz, CDCl$_3$) δ 177.19, 172.64, 167.06, 160.43, 155.38, 153.18, 144.63, 141.08, 136.37, 134.40, 129.01, 125.00 (q, J=282.0 Hz), 124.99, 118.98, 106.16, 78.83 (q, J=31.2 Hz), 74.92, 59.69, 55.85, 53.31, 52.29, 44.81, 38.75, 36.61, 34.82, 32.69, 29.72, 28.70, 27.31, 27.18, 26.27, 22.23, 21.00, 19.83, 18.31, 14.65, 13.21, 12.70 ppm; $^{19}$F NMR (470 MHz, CDCl$_3$) δ −82.93 ppm; HRMS (ESI) m/z: [M+H]$^+$ calcd for C$_{38}$H$_{48}$F$_3$N$_6$O$_9$S, 821.3150; found 821.3112; Anal. HPLC: $t_R$ 12.08 min, purity 100%.

105

1-(Trifluoromethyl)cyclopentyl ((2R,6S,13aS,14aR,16aS,Z)-2-((7-methoxy-3-methylquinoxalin-2-yl)oxy)-14a-(((1-methylcyclopropyl)sulfonyl)carbamoyl)-5,16-dioxo-1,2,3,5,6,7,8,9,10,11,13a,14,14a,15,16,16a-hexadecahydrocyclopropa[e]pyrrolo [1,2-a][1,4]diazacyclopentadecin-6-yl)carbamate (NR02-60)

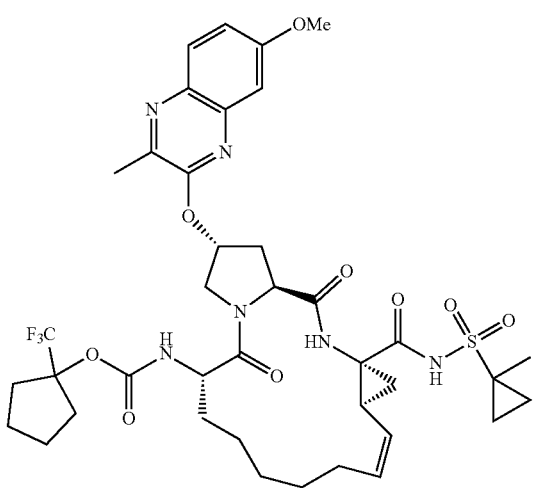 [SMILES: COc1ccc2nc(C)c(O[C@@H]3C[C@H]4C(=O)N[C@]5(C(=O)NS(=O)(=O)C6(C)CC6)C[C@H]5/C=C\CCCCC[C@H](NC(=O)OC5(C(F)(F)F)CCCC5)C(=O)N4C3)nc2c1]

The same procedure was used as described above for compound AJ-71. A mixture of amine salt NR01-91 (0.150 g, 0.22 mmol) was treated with DIEA (0.266 mL, 1.52 mmol) and 4-nitrophenyl (1-(trifluoromethyl) cyclopentyl) carbonate (0.076 g, 0.24 mmol) to provide the target compound NR02-60 (0.150 g, 79%) as a white solid. $^1$H NMR (500 MHz, CDCl$_3$) δ 10.10 (s, 1H), 7.80 (d, J=9.5 Hz, 1H), 7.22-7.16 (m, 2H), 6.85 (s, 1H), 5.88 (br s, 1H), 5.70 (q, J=8.5 Hz, 1H), 5.63 (d, J=8.0 Hz, 1H), 5.00 (t, J=9.5 Hz, 1H), 4.60 (t, J=8.0 Hz, 1H), 4.47 (d, J=11.5 Hz, 1H), 4.33-4.26 (m, 1H), 4.04 (dd, J=11.5, 4.0 Hz, 1H), 3.95 (s, 3H), 2.72-2.61 (m, 2H), 2.59-2.49 (m, 4H), 2.32 (q, J=8.5 Hz, 1H), 2.00-1.82 (m, 7H), 1.81-1.73 (m, 2H), 1.70-1.25 (m, 15H), 0.86-0.79 (m, 2H) ppm; $^{13}$C NMR (125 MHz, CDCl$_3$) δ 177.18, 172.77, 166.99, 160.46, 155.36, 153.25, 144.50, 141.09, 136.42, 134.45, 129.07, 125.82 (q, J=281.2 Hz), 124.97, 119.02, 106.16, 89.34 (q, J=28.7 Hz), 74.98, 59.72, 55.85, 53.39, 52.29, 44.85, 36.61, 34.84, 32.98, 32.90, 32.77, 29.69, 27.29, 27.20, 26.27, 25.69, 25.51, 22.25, 21.02, 19.82, 18.33, 14.66, 12.72 ppm; $^{19}$F NMR (470 MHz, CDCl$_3$) δ −80.56 ppm; HRMS (ESI) m/z: [M+H]$^+$ calcd for C$_{39}$H$_{50}$F$_3$N$_6$O$_9$S, 835.3307; found 835.3276; Anal. HPLC: t$_R$ 12.95 min, purity 100%.

106

1-Methylcyclobutyl ((2R,6S,13aS,14aR,16aS,Z)-2-((7-methoxy-3-methylquinoxalin-2-yl)oxy)-14a-(((1-methylcyclopropyl)sulfonyl)carbamoyl)-5,16-dioxo-1,2,3,5,6,7,8,9,10,11,13a,14,14a,15,16,16a-hexadecahydrocyclopropa[e]pyrrolo [1,2-a][1,4]diazacyclopentadecin-6-yl)carbamate (NR02-61)

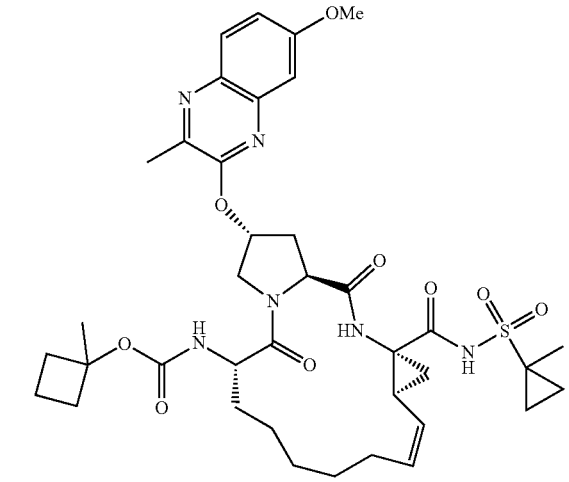 [SMILES: COc1ccc2nc(C)c(O[C@@H]3C[C@H]4C(=O)N[C@]5(C(=O)NS(=O)(=O)C6(C)CC6)C[C@H]5/C=C\CCCCC[C@H](NC(=O)OC5(C)CCC5)C(=O)N4C3)nc2c1]

The same procedure was used as described above for compound AJ-71. A mixture of amine salt NR01-91 (0.150 g, 0.22 mmol) was treated with DIEA (0.266 mL, 1.52 mmol) and 1-methylcyclobutyl (4-nitrophenyl) carbonate (0.060 g, 0.24 mmol) to provide the target compound NR02-61 (0.140 g, 80%) as a white solid. $^1$H NMR (500 MHz, CDCl$_3$) δ 10.13 (s, 1H), 7.80 (d, J=9.5 Hz, 1 H), 7.23-7.16 (m, 2H), 6.90 (s, 1H), 5.89 (br s, 1H), 5.70 (q, J=8.5 Hz, 1H), 5.21 (d, J=7.5 Hz, 1H), 5.00 (t, J=9.5 Hz, 1H), 4.61 (t, J=7.5 Hz, 1H), 4.46 (d, J=11.5 Hz, 1H), 4.28 (t, J=7.5 Hz, 1H), 4.04 (dd, J=11.0, 3.5 Hz, 1H), 3.94 (s, 3H), 2.73-2.64 (m, 1H), 2.62-2.49 (m, 5H), 2.31 (q, J=9.0 Hz, 1H), 2.15 (q, J=10.0 Hz, 2H), 1.98-1.75 (m, 6H), 1.73-1.25 (m, 17H), 0.86-0.78 (m, 2H) ppm; $^{13}$C NMR (125 MHz, CDCl$_3$) δ 177.22, 173.30, 167.03, 160.40, 155.42, 154.61, 144.69, 141.10, 136.33, 134.42, 129.01, 125.04, 118.94, 106.16, 79.63, 74.88, 59.58, 55.86, 53.23, 52.14, 44.86, 38.75, 36.60, 35.39, 34.74, 32.91, 29.85, 27.29, 27.18, 26.22, 23.58, 22.37, 21.07, 20.00, 18.34, 14.65, 13.69, 12.71 ppm; HRMS (ESI) m/z: [M+H]$^+$ calcd for C$_{38}$H$_{51}$N$_6$O$_9$S, 767.3433; found 767.3406; Anal. HPLC: t$_R$ 11.78 min, purity 98.8%.

107

Cyclohexyl ((2R,6S,13aS,14aR,16aS,Z)-2-((7-methoxy-3-methylquinoxalin-2-yl)oxy)-14a-(((1-methylcyclopropyl)sulfonyl)carbamoyl)-5,16-dioxo-1,2,3,5,6,7,8,9,10,11,13a,14,14a,15,16,16a-hexadecahydrocyclopropa[e]pyrrolo[1,2-a][1,4]diazacyclopentadecin-6-yl)carbamate (NR03-67)

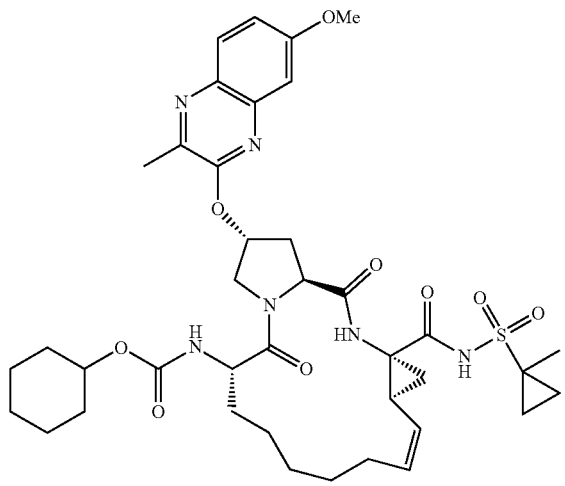 [SMILES: COc1ccc2nc(C)c(O[C@@H]3C[C@H]4C(=O)N[C@]5(C(=O)NS(=O)(=O)C6(C)CC6)C[C@H]5/C=C\CCCCC[C@H](NC(=O)OC5CCCCC5)C(=O)N4C3)nc2c1]

The same procedure was used as described above for compound AJ-71. A mixture of amine salt NR01-91 (0.100 g, 0.15 mmol) was treated with DIEA (0.2 mL, 1.02 mmol) and cyclohexyl (4-nitrophenyl) carbonate (0.043 g, 0.16 mmol) to provide the target compound NR03-67 (0.105 g, 88%) as a white solid. $^1$H NMR (500 MHz, CDCl$_3$) δ 10.13 (s, 1H), 7.80 (d, J=9.5 Hz, 1H), 7.22-7.16 (m, 2H), 6.86 (s, 1H), 5.91 (br s, 1H), 5.71 (q, J=8.5 Hz, 1H), 5.25 (d, J=7.5 Hz, 1H), 5.01 (t, J=9.5 Hz, 1H), 4.61 (t, J=7.5 Hz, 1H), 4.46 (d, J=11.0 Hz, 1H), 4.43-4.34 (m, 1H), 4.30 (t, J=7.5 Hz, 1H), 4.05 (dd, J=11.0, 4.0 Hz, 1H), 3.95 (s, 3H), 2.73-2.66 (m, 1H), 2.64-2.49 (m, 5H), 2.31 (q, J=8.5 Hz, 1H), 2.15 (q, J=9.0 Hz, 2H), 1.95-1.55 (m, 9H), 1.54-1.22 (m, 15H), 0.86-0.79 (m, 2H) ppm; $^{13}$C NMR (125 MHz, CDCl$_3$) δ 177.26, 173.27, 166.98, 160.40, 155.59, 155.48, 144.81, 141.11, 136.32, 134.45, 129.04, 125.05, 118.91, 106.17, 74.84, 73.83, 59.64, 55.86, 53.18, 52.41, 44.89, 38.76, 36.60, 34.67, 32.74, 32.10, 32.04, 29.86, 27.28, 27.17, 26.20, 25.43, 23.94, 22.41, 21.12, 19.94, 18.35, 14.64, 12.72 ppm; HRMS (ESI) m/z: [M+H]$^+$ calcd for C$_{39}$H$_{53}$N$_6$O$_9$S, 781.3589; found 781.3565; Anal. HPLC: t$_R$ 12.54 min, purity 98.9%.

108

(1R,3R,5S)-Bicyclo[3.1.0]hexan-3-yl ((2R,6S,13aS,14aR,16aS,Z)-2-((7-methoxy-3-methylquinoxalin-2-yl)oxy)-14a-(((1-methylcyclopropyl)sulfonyl)carbamoyl)-5,16-dioxo-1,2,3,5,6,7,8,9,10,11,13a,14,14a,15,16,16a-hexadecahydrocyclopropa[e]pyrrolo[1,2-a][1,4]diazacyclopentadecin-6-yl)carbamate (NR03-77)

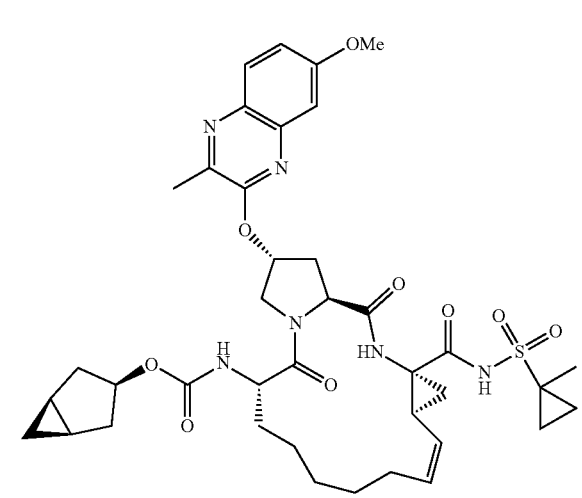 [SMILES: COc1ccc2nc(C)c(O[C@@H]3C[C@H]4C(=O)N[C@]5(C(=O)NS(=O)(=O)C6(C)CC6)C[C@H]5/C=C\CCCCC[C@H](NC(=O)O[C@@H]5C[C@@H]6C[C@@H]6C5)C(=O)N4C3)nc2c1]

The same procedure was used as described above for compound AJ-71. A mixture of amine salt NR01-91 (0.120 g, 0.174 mmol) was treated with DIEA (0.226 mL, 1.22 mmol) and (1R,3R,5S)-bicyclo [3.1.0] hexan-3-yl (4-nitrophenyl) carbonate (0.050 g, 0.192 mmol) to provide the target compound NR03-77 (0.120 g, 85%) as a white solid. $^1$H NMR (500 MHz, CDCl$_3$) δ 10.11 (s, 1H), 7.80 (d, J=10.0 Hz, 1H), 7.22-7.16 (m, 2H), 6.83 (s, 1H), 5.91 (br s, 1H), 5.70 (q, J=8.5 Hz, 1H), 5.14 (d, J=7.0 Hz, 1H), 5.00 (t, J=9.5 Hz, 1H), 4.93 (t, J=6.5 Hz, 1H), 4.61 (t, J=7.5 Hz, 1H), 4.41 (d, J=11.0 Hz, 1H), 4.29 (t, J=8.0 Hz, 1H), 4.04 (dd, J=11.0, 3.5 Hz, 1H), 3.95 (s, 3H), 2.77-2.53 (m, 1H), 2.52-2.48 (m, 5H), 2.30 (q, J=9.0 Hz, 1H), 2.10-1.72 (m, 6H), 1.71-1.20 (m, 16H), 0.87-0.79 (m, 2H), 0.42 (dd, J=12.5, 8.0 Hz, 1H), 0.26 (d, J=4.0 Hz, 1H) ppm; $^{13}$C NMR (125 MHz, CDCl$_3$). 177.21, 173.16, 167.01, 160.40, 155.46, 155.43, 144.82, 141.10, 136.31, 134.47, 129.02, 125.04, 118.93, 106.18, 74.81, 59.63, 55.85, 53.21, 52.36, 44.85, 36.60, 35.80, 34.69, 32.76, 29.84, 27.32, 27.14, 26.20, 22.36, 21.16, 19.99, 18.35, 16.83, 14.62, 12.71, 10.57 ppm; HRMS (ESI) m/z: [M+H]$^+$ calcd for C$_{39}$H$_{51}$N$_6$O$_9$S, 779.3433; found 779.3411; Anal. HPLC: t$_R$ 11.86 min, purity 97.7%.

Cyclobutyl ((2R,6S,13aS,14aR,16aS,Z)-2-((7-methoxy-3-(trifluoromethyl) quinoxalin-2-yl)oxy)-14a-(((1-methylcyclopropyl)sulfonyl)carbamoyl)-5,16-dioxo-1,2,3,5,6,7,8,9,10,11,13a,14,14a,15,16,16a-hexadecahydrocyclopropa[e]pyrrolo[1,2-a][1,4]diazacyclopentadecin-6-yl)carbamate (NR01-95)

(S)-3-Methylbutan-2-yl ((2R,6S,13aS,14aR,16aS,Z)-2-((7-methoxy-3-(trifluoromethyl)quinoxalin-2-yl)oxy)-14a-(((1-methylcyclopropyl)sulfonyl)carbamoyl)-5,16-dioxo-1,2,3,5,6,7,8,9,10,11,13a,14,14a,15,16,16a-hexadecahydrocyclopropa [e]pyrrolo[1,2-a][1,4]diazacyclopentadecin-6-yl)carbamate (NR01-101)

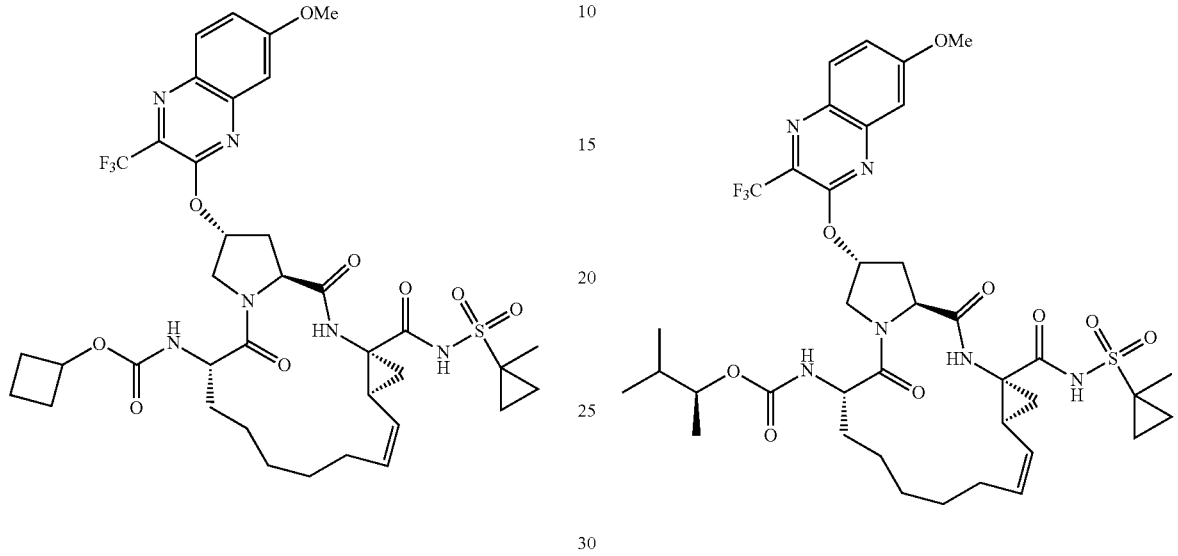

The same procedure was used as described above for compound AJ-71. A mixture of amine salt NR01-87 (0.2 g, 0.27 mmol) was treated with DIEA (0.340 mL, 1.90 mmol) and cyclobutyl (4-nitrophenyl) carbonate (0.066 g, 0.295 mmol) to provide the target compound NR01-95 (0.185 g, 82%) as a white solid. $^1$H NMR (500 MHz, CDCl$_3$) δ 10.16 (s, 1H), 7.83 (d, J=9.5 Hz, 1H), 7.48 (dd, J=9.0, 2.5 Hz, 1H), 7.44 (d, J=2.5 Hz, 1H), 6.93 (s, 1H), 5.95 (br s, 1H), 5.70 (q, J=9.0 Hz, 1H), 5.44 (d, J=8.0 Hz, 1H), 5.00 (t, J=10.0 Hz, 1H), 4.63-4.55 (m, 2H), 4.51 (d, J=11.5 Hz, 1H), 4.25-4.18 (m, 1H), 3.99 (dd, J=11.5, 3.5 Hz, 1H), 3.95 (s, 3H), 2.70-2.51 (m, 3H), 2.32 (q, J=8.5 Hz, 1H), 2.20-2.13 (m, 1H), 2.07-1.98 (m, 1H), 1.94-1.75 (m, 6H), 1.73-1.23 (m, 14H), 0.86-0.79 (m, 2H) ppm; $^{13}$C NMR (125 MHz, CDCl$_3$) δ 177.25, 173.00, 167.01, 159.64, 155.14, 151.96, 138.53, 137.17, 136.31, 134.69 (q, J=35.0 Hz), 128.16, 125.67, 125.10, 120.78 (d, J=272.5 Hz), 107.55, 75.61, 69.17, 59.65, 56.03, 52.81, 52.19, 44.96, 36.57, 34.65, 32.70, 30.68, 30.19, 29.74, 29.42, 27.20, 27.15, 26.22, 22.41, 21.05, 18.33, 14.65, 13.24, 12.70 ppm; $^{19}$F NMR (470 MHz, CDCl$_3$) δ -67.88 ppm; HRMS (ESI) m/z: [M+H]$^+$ calcd for C$_{37}$H$_{46}$F$_3$N$_6$O$_9$S, 807.2994; found 807.2966; Anal. HPLC: t$_R$ 12.45 min, purity 99.3%.

The same procedure was used as described above for compound AJ-71. A mixture of amine salt NR01-87 (0.2 g, 0.27 mmol) was treated with DIEA (0.340 mL, 1.90 mmol) and (S)-3-methylbutan-2-yl (4-nitrophenyl) carbonate (0.075 g, 0.295 mmol) to provide the target compound NR01-101 (0.190 g, 82%) as a white solid. $^1$H NMR (500 MHz, CDCl$_3$) δ 10.16 (s, 1H), 7.83 (d, J=9.0 Hz, 1H), 7.48 (dd, J=9.0, 2.5 Hz, 1H), 7.42 (d, J=2.5 Hz, 1H), 6.92 (s, 1H), 5.94 (br s, 1H), 5.70 (q, J=8.5 Hz, 1H), 5.19 (d, J=8.0 Hz, 1H), 5.01 (t, J=9.5 Hz, 1H), 4.62 (t, J=8.0 Hz, 1H), 4.57 (d, J=12.0 Hz, 1H), 4.26-4.18 (m, 2H), 3.99 (dd, J=11.5, 3.5 Hz, 1H), 3.94 (s, 3H), 2.70-2.52 (m, 3H), 2.31 (q, J=8.5 Hz, 1H), 1.94-1.77 (m, 4H), 1.61-1.23 (m, 13H), 1.01 (d, J=6.5 Hz, 3H), 0.85-0.79 (m, 2H), 0.76 (d, J=7.0 Hz, 3H), 0.73 (d, J=6.5 Hz, 3H) ppm; $^{13}$C NMR (125 MHz, CDCl$_3$) δ 177.23, 173.24, 167.08, 159.57, 155.83, 152.03, 138.45, 137.17, 136.33, 134.71 (q, J=36.5 Hz), 128.16, 125.61, 125.15, 120.78 (d, J=275.2 Hz), 107.57, 76.13, 75.67, 59.60, 55.99, 52.80, 52.32, 44.93, 36.58, 34.65, 32.84, 32.81, 29.78, 27.16, 26.19, 22.45, 21.14, 18.33, 18.11, 17.87, 16.59, 14.63, 12.69 ppm; $^{19}$F NMR (470 MHz, CDCl$_3$) δ -67.81 ppm; HRMS (ESI) m/z: [M+H]$^+$ calcd for C$_{38}$H$_{50}$F$_3$N$_6$O$_9$S, 823.3307; found 823.3279; Anal. HPLC: t$_R$ 13.69 min, purity 98.8%.

111

(1-Methylcyclopropyl)methyl ((2R,6S,13aS,14aR,16aS,Z)-2-((7-methoxy-3-(trifluoromethyl)quinoxalin-2-yl)oxy)-14a-(((1-methylcyclopropyl)sulfonyl)carbamoyl)-5,16-dioxo-1,2,3,5,6,7,8,9,10,11,13a,14,14a,15,16,16a-hexadecahydrocyclo propa[e]pyrrolo[1,2-a][1,4]diazacyclopentadecin-6-yl)carbamate (NR01-117)

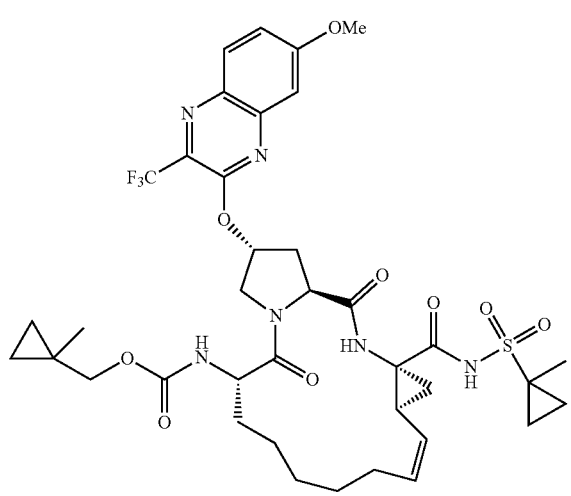 [SMILES: COc1ccc2nc(C(F)(F)F)c(O[C@@H]3C[C@H]4C(=O)N[C@]5(C(=O)NS(=O)(=O)C6(C)CC6)C[C@H]5/C=C\CCCCC[C@H](NC(=O)OCC5(C)CC5)C(=O)N4C3)nc2c1]

The same procedure was used as described above for compound AJ-71. A mixture of amine salt NR01-87 (0.2 g, 0.27 mmol) was treated with DIEA (0.340 mL, 1.90 mmol) and (1-methylcyclopropyl) methyl (4-nitrophenyl) carbonate (0.075 g, 0.295 mmol) to provide the target compound NR01-117 (0.170 g, 74N) as a white solid. $^1$H NMR (500 MHz, CDCl$_3$) δ 10.12 (s, 1H), 7.83 (d, J=9.0 Hz, 1H), 7.49 (dd, J=9.0, 3.0 Hz, 1H), 7.43 (d, J=2.5 Hz, 1H), 6.80 (s, 1H), 5.96 (br s, 1H), 5.70 (q, J=9.5 Hz, 1H), 5.36 (d, J=7.5 Hz, 1H), 5.00 (t, J=9.5 Hz, 1H), 4.60 (t, J=8.0 Hz, 1H), 4.54 (d, J=11.5 Hz, 1H), 4.27-4.21 (m, 1H), 4.00 (dd, J=11.5, 3.5 Hz, 1H), 3.95 (s, 3H), 3.56 (q, J=11.0 Hz, 2H), 2.73-2.52 (m, 3H), 2.31 (q, J=9.0 Hz, 1H), 1.95-1.74 (m, 4H), 1.60-1.25 (m, 12H), 1.00 (s, 3H), 0.86-0.78 (m, 2H), 0.38-0.22 (m, 4H) ppm; $^{13}$C NMR (125 MHz, CDCl$_3$) δ 177.34, 173.02, 167.12, 159.60, 156.12, 151.97, 138.46, 137.16, 136.30, 134.67 (q, J=36.5 Hz), 128.13, 125.65, 125.12, 120.76 (d, J=275.3 Hz), 107.56, 75.68, 73.03, 59.66, 56.00, 52.85, 52.32, 44.92, 36.56, 34.66, 32.66, 29.66, 27.23, 27.14, 26.24, 22.43, 20.97, 20.85, 18.31, 15.36, 14.63, 12.67, 11.42, 11.28 ppm; $^{19}$F NMR (470 MHz, CDCl$_3$) δ −67.82 ppm; HRMS (ESI) m/z: [M+H]$^+$ calcd for C$_{38}$H$_{48}$F$_3$N$_6$O$_9$S, 821.3150; found 821.3124; Anal. HPLC: t$_R$ 12.94 min, purity 99.7%.

112

(R)-3-Methylbutan-2-yl ((2R,6S,13aS,14aR,16aS,Z)-2-((7-methoxy-3-(trifluoromethyl)quinoxalin-2-yl)oxy)-14a-(((1-methylcyclopropyl)sulfonyl)carbamoyl)-5,16-dioxo-1,2,3,5,6,7,8,9,10,11,13a,14,14a,15,16,16a-hexadecahydrocyclopropa[e]pyrrolo[1,2-a][1,4]diazacyclopentadecin-6-yl)carbamate (NR01-121)

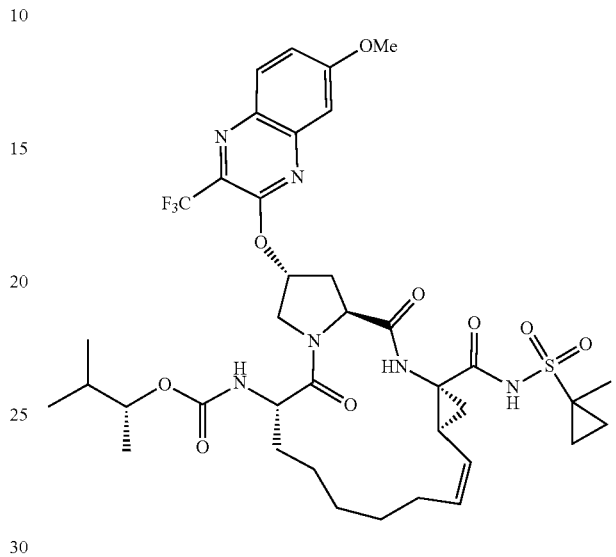

The same procedure was used as described above for compound AJ-71. A mixture of amine salt NR01-87 (0.2 g, 0.27 mmol) was treated with DIEA (0.340 mL, 1.90 mmol) and (R)-3-methylbutan-2-yl (4-nitrophenyl) carbonate (0.075 g, 0.295 mmol) to provide the target compound NR01-121 (0.180 g, 79%) as a white solid. $^1$H NMR (500 MHz, CDCl$_3$) δ 10.16 (s, 1H), 7.83 (d, J=9.0 Hz, 1H), 7.48 (dd, J=9.0, 2.5 Hz, 1H), 7.42 (d, J=2.5 Hz, 1H), 6.96 (s, 1H), 5.94 (br s, 1H), 5.69 (q, J=8.5 Hz, 1H), 5.27 (d, J=8.0 Hz, 1H), 5.01 (t, J=9.0 Hz, 1H), 4.61 (t, J=8.0 Hz, 1H), 4.56 (d, J=11.5 Hz, 1H), 4.28-4.19 (m, 2H), 4.00 (dd, J=11.5, 3.5 Hz, 1H), 3.94 (s, 3H), 2.70-2.52 (m, 3H), 2.30 (q, J=9.0 Hz, 1H), 1.93-1.76 (m, 4H), 1.65-1.24 (m, 13H), 0.93 (d, J=6.0 Hz, 3H), 0.86-0.78 (m, 8H) ppm; $^{13}$C NMR (125 MHz, CDCl$_3$) δ 177.21, 173.19, 167.14, 159.57, 155.80, 151.99, 138.47, 137.17, 136.36, 134.68 (q, J=35.5 Hz), 128.14, 125.60, 125.13, 120.78 (d, J=275.5 Hz), 107.59, 76.28, 75.68, 59.55, 56.00, 52.85, 52.29, 44.89, 36.57, 34.67, 32.91, 32.73, 29.72, 27.17, 26.19, 22.49, 21.05, 18.32, 17.99, 17.83, 16.68, 14.62, 12.69 ppm; $^{19}$F NMR (470 MHz, CDCl$_3$) δ −67.78 ppm; HRMS (ESI) m/z: [M+H]$^+$ calcd for C$_{38}$H$_{50}$F$_3$N$_6$O$_9$S, 823.3307; found 823.3282; Anal. HPLC: t$_R$ 13.51 min, purity 99.1%.

113

1,1,1-Trifluoro-2-methylpropan-2-yl ((2R,6S,13aS, 14aR,16aS,Z)-2-((7-methoxy-3-(trifluoromethyl) quinoxalin-2-yl)oxy)-14a-(((1-methylcyclopropyl) sulfonyl)carbamoyl)-5,16-dioxo-1,2,3,5,6,7,8,9,10, 11,13a,14,14a,15,16,16a-hexadecahydrocyclopropa [e]pyrrolo[1,2-a][1,4]diazacyclopentadecin-6-yl) carbamate (NR01-129)

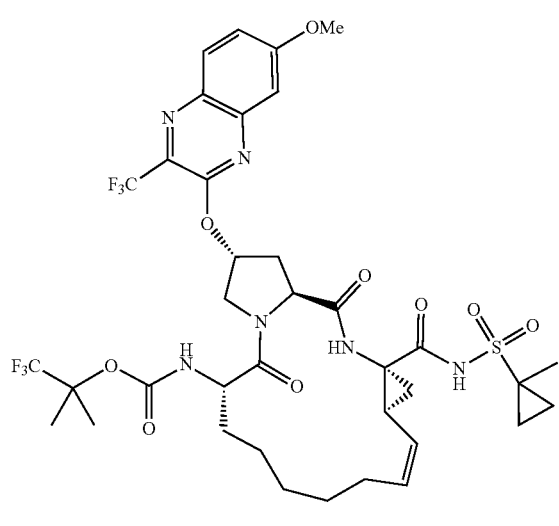 [SMILES: COc1ccc2nc(C(F)(F)F)c(O[C@@H]3C[C@H]4C(=O)N[C@]5(C(=O)NS(=O)(=O)C6(C)CC6)C[C@H]5/C=C\CCCCC[C@H](NC(=O)OC(C)(C)C(F)(F)F)C(=O)N4C3)nc2c1]

The same procedure was used as described above for compound AJ-71. A mixture of amine salt NR01-87 (0.2 g, 0.27 mmol) was treated with DIEA (0.340 mL, 1.90 mmol) and 4-nitrophenyl (1,1,1-trifluoro-2-methylpropan-2-yl) carbonate (0.087 g, 0.295 mmol) to provide the target compound NR01-129 (0.190 g, 79%) as a white solid. $^1$H NMR (500 MHz, CDCl$_3$) δ 10.13 (s, 1H), 7.83 (d, J=9.0 Hz, 1H), 7.49 (dd, J=9.5, 2.5 Hz, 1H), 7.43 (d, J=2.5 Hz, 1H), 6.96 (s, 1H), 5.91 (br s, 1H), 5.72-5.62 (m, 2H), 4.99 (t, J=9.0 Hz, 1H), 4.59 (t, J=8.0 Hz, 1H), 4.55 (d, J=11.5 Hz, 1H), 4.23-4.16 (m, 1H), 4.01 (dd, J=11.5, 3.5 Hz, 1H), 3.95 (s, 3H), 2.66 (dd, J=8.0, 2.5 Hz, 2H), 2.63-2.53 (m, 1H), 2.31 (q, J=8.5 Hz, 1H), 1.93-1.75 (m, 4H), 1.58-1.22 (m, 18H), 0.86-0.79 (m, 2H) ppm; $^{13}$C NMR (125 MHz, CDCl$_3$) δ 177.13, 172.78, 167.05, 159.67, 153.28, 151.91, 138.42, 137.11, 136.45, 134.56 (q, J=35.9 Hz), 128.13, 125.77, 125.05, 125.04 (q, J=282.7 Hz), 120.75 (d, J=275.2 Hz), 107.55, 79.79 (q, J=29.4 Hz), 75.80, 59.65, 56.04, 52.96, 52.21, 44.88, 36.58, 34.79, 32.81, 29.56, 27.20, 27.18, 26.27, 22.26, 20.97, 19.44, 19.20, 18.32, 14.64, 12.71 ppm; $^{19}$F NMR (470 MHz, CDCl$_3$) δ −67.81, −83.78 ppm; HRMS (ESI) m/z: [M+H]$^+$ calcd for C$_{37}$H$_{45}$F$_6$N$_6$O$_9$S, 863.2867; found 863.2844; Anal. HPLC: t$_R$ 13.41 min, purity 99.8%.

114

(R)-1,1,1-Trifluoropropan-2-yl ((2R,6S,13aS,14aR, 16aS,Z)-2-((7-methoxy-3-(trifluoromethyl)quinoxalin-2-yl)oxy)-14a-(((1-methylcyclopropyl)sulfonyl) carbamoyl)-5,16-dioxo-1,2,3,5,6,7,8,9,10,11,13a,14, 14a,15,16,16a-hexadecahydrocyclo propa[e]pyrrolo [1,2-a][1,4]diazacyclopentadecin-6-yl)carbamate (NR01-147)

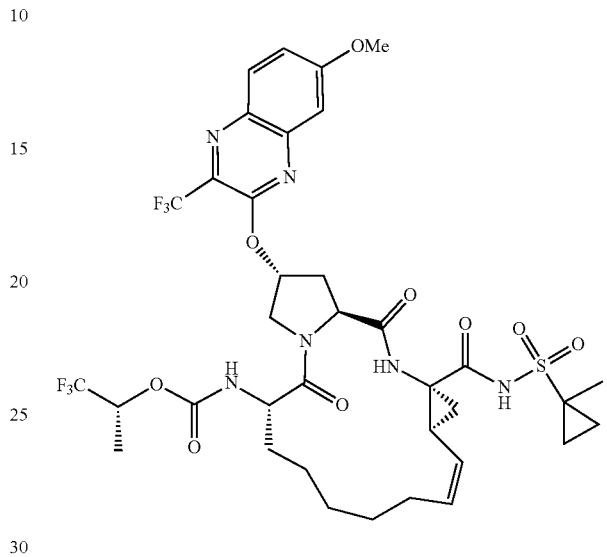

The same procedure was used as described above for compound AJ-71. A mixture of amine salt NR01-87 (0.2 g, 0.27 mmol) was treated with DIEA (0.340 mL, 1.90 mmol) and (R)-4-nitrophenyl (1,1,1-trifluoropropan-2-yl) carbonate (0.082 g, 0.295 mmol) to provide the target compound NR01-147 (0.2 g, 85%) as a white solid. $^1$H NMR (500 MHz, CDCl$_3$) δ 10.12 (s, 1H), 7.83 (d, J=9.5 Hz, 1H), 7.49 (dd, J=9.5, 3.0 Hz, 1H), 7.44 (d, J=3.0 Hz, 1H), 6.94 (s, 1H), 5.95 (br s, 1H), 5.70 (q, J=8.5 Hz, 1H), 5.64 (d, J=8.0 Hz, 1H), 5.00 (t, J=9.5 Hz, 1H), 4.87-4.78 (m, 1H), 4.62 (t, J=8.0 Hz, 1H), 4.47 (d, J=11.5 Hz, 1H), 4.29-4.23 (m, 1H), 4.01 (dd, J=11.5, 3.5 Hz, 1H), 3.95 (s, 3H), 2.71-2.62 (m, 2H), 2.59-2.50 (m, 1H), 2.28 (q, J=9.0 Hz, 1H), 1.93-1.75 (m, 4H), 1.58-1.24 (m, 12H), 1.21 (d, J=6.5 Hz, 3H), 0.86-0.79 (m, 2H) ppm; $^{13}$C NMR (125 MHz, CDCl$_3$) δ 177.16, 172.28, 167.33, 159.63, 153.88, 151.94, 138.49, 137.11, 136.31, 134.76 (q, J=36.1 Hz), 128.11, 125.66, 125.13 (q, J=280.4 Hz), 125.10, 120.68 (d, J=275.2 Hz), 107.52, 75.77, 67.96 (q, J=33.3 Hz), 59.57, 56.00, 52.93, 52.49, 44.70, 36.56, 34.63, 32.50, 29.43, 27.27, 27.13, 26.20, 22.33, 20.67, 18.27, 14.56, 13.77, 12.69 ppm; $^{19}$F NMR (470 MHz, CDCl$_3$) δ −68.04, −79.04 ppm; HRMS (ESI) m/z: [M+H]$^+$ calcd for C$_{36}$H$_{43}$F$_6$N$_6$O$_9$S, 849.2711; found 849.2683; Anal. HPLC: t$_R$ 12.61 min, purity 99.8%.

115

3,3-Difluorocyclobutyl ((2R,6S,13aS,14aR,16aS,Z)-2-((7-methoxy-3-(trifluoromethyl)quinoxalin-2-yl)oxy)-14a-(((1-methylcyclopropyl)sulfonyl)carbamoyl)-5,16-dioxo-1,2,3,5,6,7,8,9,10,11,13a,14,14a,15,16,16a-hexadecahydrocyclopropa[e]pyrrolo[1,2-a][1,4]diazacyclopentadecin-6-yl)carbamate (NR01-151)

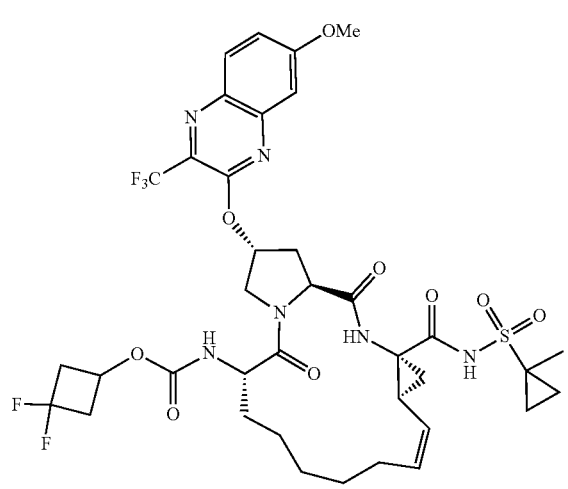 [SMILES: COc1ccc2nc(C(F)(F)F)c(O[C@@H]3C[C@H]4C(=O)N[C@]5(C(=O)NS(=O)(=O)C6(C)CC6)C[C@H]5/C=C\CCCCC[C@H](NC(=O)OC5CC(F)(F)C5)C(=O)N4C3)nc2c1]

The same procedure was used as described above for compound AJ-71. A mixture of amine salt NR01-87 (0.2 g, 0.27 mmol) was treated with DIEA (0.340 mL, 1.90 mmol) and 3,3-difluorocyclobutyl (4-nitrophenyl) carbonate (0.081 g, 0.295 mmol) to provide the target compound NR01-151 (0.190 g, 81%) as a white solid. H NMR (500 MHz, CDCl$_3$) δ 10.11 (s, 1H), 7.83 (d, J=9.0 Hz, 1H), 7.49 (dd, J=9.0, 2.5 Hz, 1H), 7.44 (d, J=2.5 Hz, 1H), 6.79 (s, 1H), 5.94 (br s, 1H), 5.71 (q, J=9.5 Hz, 1H), 5.23 (d, J=8.0 Hz, 1H), 5.00 (t, J=9.0 Hz, 1H), 4.61 (t, J=8.0 Hz, 1H), 4.55-4.46 (m, 2H), 4.20-4.13 (m, 1H), 3.97 (dd, J=11.5, 3.5 Hz, 1H), 3.95 (s, 3H), 2.95-2.84 (m, 1H), 2.71-2.61 (m, 3H), 2.60-2.46 (m, 2H), 2.45-2.34 (m, 1H), 2.28 (q, J=8.5 Hz, 1H), 1.93 (dd, J=8.0, 6.0 Hz, 1H), 1.90-1.76 (m, 3H), 1.58-1.24 (m, 12H), 0.86-0.79 (m, 2H) ppm; $^{13}$C NMR (125 MHz, CDCl$_3$) δ 177.19, 172.61, 167.18, 159.67, 154.75, 151.96, 138.50, 137.17, 136.30, 134.67 (q, J=34.3 Hz), 128.12, 125.75, 125.12, 120.77 (d, J=270.1 Hz), 118.17 (dd, J=283.1, 268.3 Hz), 107.48, 75.70, 59.64, 59.43 (dd, J=19.0, 9.0 Hz), 56.00, 52.84, 52.33, 44.85, 43.11 (dd, J=40.6, 23.4 Hz), 36.57, 34.66, 32.61, 29.73, 27.18, 27.12, 26.19, 22.38, 21.08, 18.29, 14.63, 12.64 ppm; $^{19}$F NMR (470 MHz, CDCl$_3$) δ -67.77, -85.01 (d, J=200.0 Hz), -97.19 (d, J=200.0 Hz) ppm; HRMS (ESI) m/z: [M+H]$^+$ calcd for C$_{37}$H$_{44}$F$_5$N$_6$O$_9$S, 843.2805; found 843.2773; Anal. HPLC: t$_R$ 11.98 mm, purity 99.4%.

116

(1R,2R)-2-Fluorocyclopentyl ((2R,6S,13aS,14aR,16aS,Z)-2-((7-methoxy-3-(trifluoromethyl)quinoxalin-2-yl)oxy)-14a-(((1-methylcyclopropyl)sulfonyl)carbamoyl)-5,16-dioxo-1,2,3,5,6,7,8,9,10,11,13a,14,14a,15,16,16a-hexadecahydrocyclopropa[e]pyrrolo[1,2-a][1,4]diazacyclopentadecin-6-yl)carbamate (NR02-09)

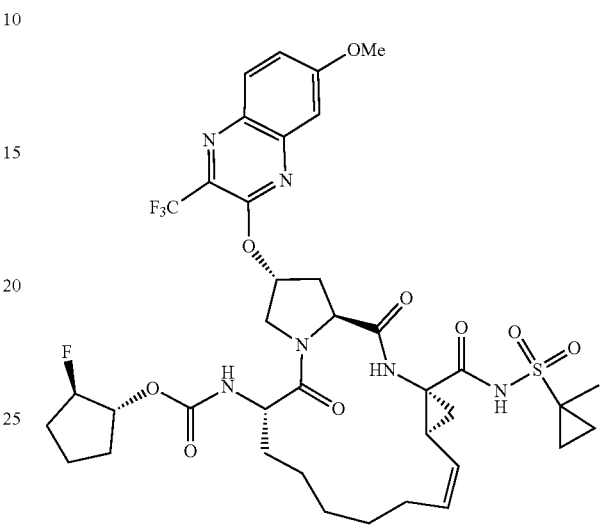

The same procedure was used as described above for compound AJ-71. A mixture of amine salt NR01-87 (0.2 g, 0.27 mmol) was treated with DIEA (0.340 mL, 1.90 mmol) and (1R,2R)-2-fluorocyclopentyl (4-nitrophenyl) carbonate (0.080 g, 0.295 mmol) to provide the target compound NR02-09 (0.190 g, 80%) as a white solid. $^1$H NMR (500 MHz, CDCl$_3$) δ 10.10 (s, 1H), 7.83 (d, J=9.0 Hz, 1H), 7.48 (dd, J=9.0, 2.5 Hz, 1H), 7.45 (d, J=2.5 Hz, 1H), 6.77 (s, 1H), 5.96 (br s, 1H), 5.72 (q, J=8.5 Hz, 1H), 5.15 (d, J=8.0 Hz, 1H), 5.02 (t, J=9.0 Hz, 1H), 4.86-4.71 (m, 2H), 4.61 (t, J=8.0 Hz, 1H), 4.46 (d, J=11.5 Hz, 1H), 4.29-4.21 (m, 1H), 4.01 (dd, J=12.0, 4.0 Hz, 1H), 3.94 (s, 3H), 2.72-2.60 (m, 2H), 2.59-2.40 (m, 1H), 2.29 (q, J=8.5 Hz, 1H), 1.96-1.63 (m, 8H), 1.58-1.23 (m, 14H), 0.86-0.79 (m, 2H) ppm; $^{13}$C NMR (125 MHz, CDCl$_3$) δ 177.10, 172.82, 167.00, 159.63, 154.83, 151.92, 138.57, 137.13, 136.31, 134.64 (q, J=35.9 Hz), 128.09, 125.72, 125.08, 120.79 (d, J=275.1 Hz), 107.66, 97.31 (d, J=176.3 Hz), 79.58 (d, J=30.6 Hz), 75.60, 60.55, 59.60, 56.03, 52.90, 52.36, 44.88, 36.59, 34.66, 32.78, 30.59 (d, J=21.7 Hz), 29.85 (d, J=15.6 Hz), 27.26, 27.12, 26.17, 22.39, 21.17 (d, J=5.3 Hz), 18.32, 14.64, 14.34, 12.70 ppm; $^{19}$F NMR (470 MHz, CDCl$_3$) δ -67.78, -181.12 ppm; HRMS (ESI) m/z: [M+H]$^+$ calcd for C$_{38}$H$_{47}$F$_4$N$_6$O$_9$S, 839.3056; found 839.3025; Anal. HPLC: t$_R$ 12.59 min, purity 98.6%.

117

1-Methylcyclopentyl ((2R,6S,13aS,14aR,16aS,Z)-2-((7-methoxy-3-(trifluoromethyl)quinoxalin-2-yl)oxy)-14a-(((1-methylcyclopropyl)sulfonyl)carbamoyl)-5,16-dioxo-1,2,3,5,6,7,8,9,10,11,13a,14,14a,15,16,16a-hexadecahydrocyclopropa[e]pyrrolo[1,2-a][1,4]diazacyclopentadecin-6-yl)carbamate (NR02-15)

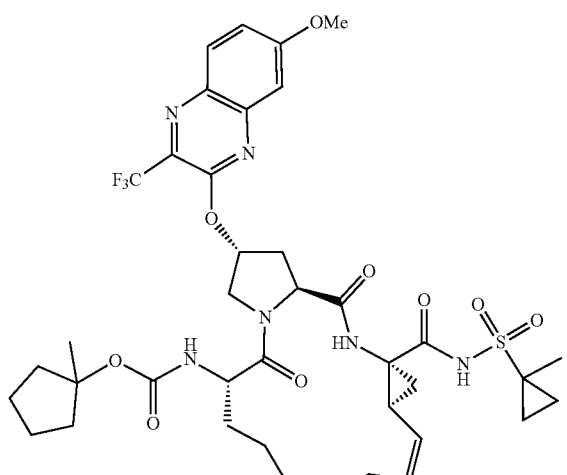

The same procedure was used as described above for compound AJ-71. A mixture of amine salt NR01-87 (0.2 g, 0.27 mmol) was treated with DIEA (0.330 mL, 1.90 mmol) and 1-methylcyclopentyl (4-nitrophenyl) carbonate (0.078 g, 0.295 mmol) to provide the target compound NR02-15 (0.2 g, 86%) as a white solid. $^1$H NMR (500 MHz, CDCl$_3$) δ 10.14 (s, 1H), 7.83 (d, J=9.0 Hz, 1H), 7.48 (dd, J=9.5, 3.0 Hz, 1H), 7.43 (d, J=2.5 Hz, 1H), 6.89 (s, 1H), 5.91 (br s, 1H), 5.70 (q, J=8.5 Hz, 1H), 5.14 (d, J=8.0 Hz, 1H), 5.00 (t, J=9.0 Hz, 1H), 4.63-4.55 (m, 2H), 4.26-4.19 (m, 1H), 4.02 (dd, J=11.5, 3.5 Hz, 1H), 3.94 (s, 3H), 2.70-2.52 (m, 3H), 2.33 (q, J=9.0 Hz, 1H), 1.94-1.75 (m, 6H), 1.58-1.23 (m, 18H), 1.25 (s, 3H), 0.86-0.79 (m, 2H) ppm; $^{13}$C NMR (125 MHz, CDCl$_3$) δ 177.19, 173.33, 167.08, 159.59, 155.23, 151.93, 138.43, 137.15, 136.38, 134.54 (q, J=35.9 Hz), 128.15, 125.66, 125.10, 120.76 (d, J=275.2 Hz), 107.58, 89.55, 75.72, 59.61, 56.02, 52.87, 52.05, 44.91, 39.39, 39.04, 36.58, 34.77, 33.00, 29.71, 27.22, 27.17, 26.24, 24.53, 23.85, 23.80, 22.40, 21.09, 18.33, 14.63, 12.70 ppm; $^{19}$F NMR (470 MHz, CDCl$_3$) δ −67.76 ppm; HRMS (ESI) m/z: [M+H]$^+$ calcd for C$_{39}$H$_{50}$F$_3$N$_6$O$_9$S, 835.3307; found 835.3282; Anal. HPLC: t$_R$ 13.99 min, purity 99.9%.

118

(2,2-Difluoro-1-methylcyclopropyl)methyl ((2R,6S,13aS,14aR,16aS,Z)-2-((7-methoxy-3-(trifluoromethyl)quinoxalin-2-yl)oxy)-14a-(((1-methylcyclopropyl)sulfonyl)carbamoyl)-5,16-dioxo-1,2,3,5,6,7,8,9,10,11,13a,14,14a,15,16,16a-hexadecahydrocyclopropa[e]pyrrolo[1,2-a][1,4]diazacyclopentadecin-6-yl)carbamate (NR02-56)

The same procedure was used as described above for compound AJ-71. A mixture of amine salt NR01-87 (0.2 g, 0.27 mmol) was treated with DIEA (0.330 mL, 1.90 mmol) and (2,2-difluoro-1-methylcyclopropyl) methyl (4-nitrophenyl) carbonate (0.085 g, 0.295 mmol) to provide the target compound NR02-56 (0.205 g, 85%) as a white solid. $^1$H NMR (500 MHz, CDCl$_3$) δ 10.16 (s, 0.5H), 10.15 (s, 0.5H), 7.83 (d, J=10.0 Hz, 0.5H), 7.82 (d, J=9.9 Hz, 0.5H), 7.48 (dt, J=9.2, 2.5 Hz, 1H), 7.42 (t, J=2.9 Hz, 1H), 6.96 (s, 0.5H), 6.94 (s, 0.5H), 5.95 (s, 0.5H), 5.94 (s, 0.5H), 5.75-5.65 (m, 1H), 5.59 (d, J=8.2 Hz, 0.5H), 5.54 (d, J=7.9 Hz, 0.5H), 5.04-4.96 (m, 1H), 4.61 (td, J=8.0, 2.8 Hz, 1H), 4.56-4.48 (m, 1H), 4.24 (ddd, J=19.9, 10.9, 2.9 Hz, 1H), 4.03-3.90 (m, 2H), 3.94 (s, 3H), 3.66 (d, J=11.7 Hz, 0.5H), 3.63 (d, J=11.4 Hz, 0.5H), 2.74-2.50 (m, 3H), 2.36-2.25 (m, 1H), 1.94-1.72 (m, 4H), 1.58-1.23 (m, 13H), 1.14 (d, J=14.4 Hz, 3H), 1.02 (ddd, J=28.0, 16.8, 7.7 Hz, 1H), 0.87-0.78 (m, 2H) ppm; $^{13}$C NMR (125 MHz, CDCl$_3$) δ 177.22 (177.19), 172.89, 167.03, 159.69 (159.64), 155.63 (155.53), 151.99 (151.92), 138.51, 137.18 (137.16), 136.35 (136.31), 134.59 (q, J=36.2 Hz), 128.14 (128.10), 125.76 (125.71), 125.12 (125.09), 120.80 (d, J=272.4 Hz) (120.67 (d, J=273.0 Hz)), 114.02 (d, J=287.7 Hz), 107.59 (107.55), 75.71 (75.69), 66.13 (d, J=21.3 Hz), 65.95 (d, J=21.2 Hz)), 59.68 (59.66), 53.57, 52.97, 52.87, 52.42 (52.39), 44.93 (44.92), 36.58, 34.67 (34.64), 32.76, 32.65, 29.72, 27.18 (27.15), 26.22 (26.19), 25.63 (t, J=8.1 Hz) (25.48 (t, J=8.3 Hz)), 22.43, 21.08, 20.99 (d, J=10.1 Hz), 18.32, 14.71 (d, J=4.2 Hz), 14.63, 14.57 (d, J=4.2 Hz), 12.70 ppm; $^{19}$F NMR (470 MHz, CDCl3) δ −67.74, −67.84, −138.58 (d, J=29.8 Hz), −138.82 (d, J=19.5 Hz) ppm; HRMS (ESI) m/z: [M+H]$^+$ calcd for C$_{38}$H$_4$F$_5$N$_6$O$_9$S, 857.2962; found 857.2922; Anal. HPLC: t$_R$ 13.57 min, purity 99%.

119

1-Methylcyclopropyl ((2R,6S,13aS,14aR,16aS,Z)-2-((7-methoxy-3-(trifluoromethyl)quinoxalin-2-yl)oxy)-14a-(((1-methylcyclopropyl)sulfonyl)carbamoyl)-5,16-dioxo-1,2,3,5,6,7,8,9,10,11,13a,14,14a,15,16,16a-hexadecahydrocyclopropa[e] pyrrolo[1,2-a][1,4]diazacyclopentadecin-6-yl)carbamate (NR02-31)

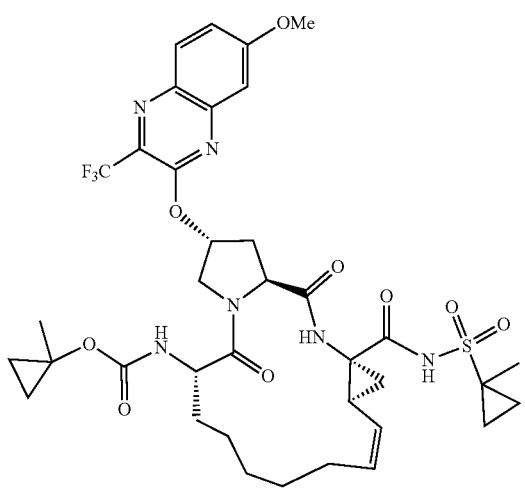 [SMILES: COc1ccc2nc(C(F)(F)F)c(O[C@@H]3C[C@H]4C(=O)N[C@]5(C(=O)NS(=O)(=O)C6(C)CC6)C[C@H]5/C=C\CCCCC[C@H](NC(=O)OC5(C)CC5)C(=O)N4C3)nc2c1]

The same procedure was used as described above for compound AJ-71. A mixture of amine salt NR01-87 (0.2 g, 0.27 mmol) was treated with DIEA (0.330 mL, 1.90 mmol) and 1-methylcyclopropyl (4-nitrophenyl) carbonate (0.078 g, 0.295 mmol) to provide the target compound NR02-31 (0.185 g, 82%) as a white solid. $^1$H NMR (500 MHz, CDCl$_3$) δ 10.10 (s, 1H), 7.83 (d, J=9.5 Hz, 1H), 7.48 (dd, J=9.0, 2.5 Hz, 1H), 7.43 (d, J=3.0 Hz, 1H), 6.80 (s, 1H), 5.95 (br s, 1H), 5.70 (q, J=8.5 Hz, 1H), 5.19 (d, J=7.5 Hz, 1H), 5.00 (t, J=9.0 Hz, 1H), 4.62-4.55 (m, 2H), 4.27-4.20 (m, 1H), 4.03 (dd, J=11.5, 4.0 Hz, 1H), 3.94 (s, 3H), 2.75-2.52 (m, 3H), 2.30 (q, J=9.0 Hz, 1H), 1.96-1.75 (m, 4H), 1.58-1.23 (m, 12H), 1.26 (s, 3H), 0.86-0.79 (m, 2H), 0.73-0.63 (m, 2H), 0.51-0.40 (m, 2H) ppm; $^{13}$C NMR (125 MHz, CDCl$_3$) δ 177.10, 173.20, 166.97, 159.61, 155.43, 151.95, 138.48, 137.15, 136.34, 134.57 (q, J=34.2 Hz), 128.14, 125.66, 125.09, 120.20 (d, J=274.6 Hz), 107.62, 75.61, 59.60, 56.69, 56.03, 52.87, 52.25, 44.94, 36.59, 34.77, 32.87, 29.73, 27.17, 27.14, 26.18, 22.39, 21.28, 21.00, 18.34, 14.64, 12.91, 12.83, 12.73 ppm; $^{19}$F NMR (470 MHz, CDCl$_3$) δ −67.65 ppm; HRMS (ESI) m/z: [M+H]$^+$ calcd for C$_{37}$H$_{46}$F$_3$N$_6$O$_9$S, 807.2994; found 807.2968; Anal. HPLC: t$_R$ 12.01 min, purity 99.8%.

120

(S)-1,1,1-Trifluoropropan-2-yl ((2R,6S,13aS,14aR,16aS,Z)-2-((7-methoxy-3-(trifluoromethyl)quinoxalin-2-yl)oxy)-14a-(((1-methylcyclopropyl)sulfonyl)carbamoyl)-5,16-dioxo-1,2,3,5,6,7,8,9,10,11,13a,14,14a,15,16,16a-hexadecahydrocyclopropa[e]pyrrolo[1,2-a][1,4]diazacyclopentadecin-6-yl)carbamate (NR02-32)

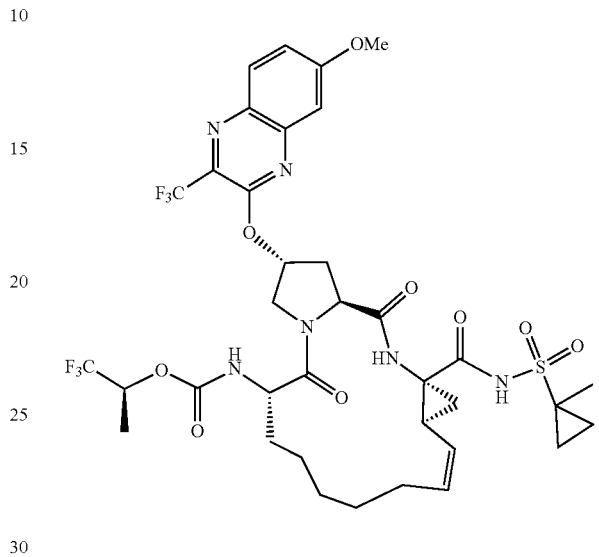

The same procedure was used as described above for compound AJ-71. A mixture of amine salt NR01-87 (0.2 g, 0.27 mmol) was treated with DIEA (0.330 mL, 1.90 mmol) and (S)-4-nitrophenyl (1,1,1-trifluoropropan-2-yl) carbonate (0.082 g, 0.295 mmol) to provide the target compound NR02-32 (0.190 g, 80%) as a white solid. $^1$H NMR (500 MHz, CDCl$_3$) δ 10.12 (s, 1H), 7.83 (d, J=9.0 Hz, 1H), 7.50 (dd, J=9.5, 3.0 Hz, 1H), 7.42 (d, J=3.0 Hz, 1H), 6.81 (s, 1H), 5.95 (br s, 1H), 5.85 (d, J=7.0 Hz, 1H), 5.69 (q, J=9.5 Hz, 1H), 4.99 (t, J=9.0 Hz, 1H), 4.81-4.75 (m, 1H), 4.60-4.53 (m, 2H), 4.23-4.17 (m, 1H), 3.97 (d, J=11.5, 3.5 Hz, 1H), 3.94 (s, 3H, overlapping), 2.66 (dd, J=8.5, 2.5 Hz, 2H), 2.63-2.54 (m, 1H), 2.30 (q, J=8.5 Hz, 1H), 1.92-1.77 (m, 4H), 1.57-1.31 (m, 12H), 1.29 (d, J=6.5 Hz, 3H), 0.86-0.79 (m, 2H) ppm; $^{13}$C NMR (125 MHz, CDCl$_3$) δ 177.13, 172.68, 166.91, 159.76, 153.86, 151.94, 138.55, 137.20, 136.38, 134.62 (q, J=35.7 Hz), 128.11, 125.87, 125.06, 124.15 (q, J=280.0 Hz), 120.85 (d, J=275.2 Hz), 107.43, 75.77, 67.57 (q, J=33.2 Hz), 59.79, 56.00, 52.89, 52.54, 44.97, 36.58, 34.73, 32.53, 29.62, 27.17, 27.08, 26.22, 22.32, 21.05, 18.32, 14.67, 13.44, 12.70 ppm; $^{19}$F NMR (470 MHz, CDCl$_3$) δ −67.81, −79.03 ppm; HRMS (ESI) m/z: [M+H]$^+$ calcd for C$_{36}$H$_{43}$F$_6$N$_6$O$_9$S, 849.2711; found 849.2684; Anal. HPLC: t$_R$ 12.58 min, purity 100%.

121

(S)-1-Cyclopropylethyl ((2R,6S,13aS,14aR,16aS,Z)-2-((7-methoxy-3-(trifluoromethyl)quinoxalin-2-yl)oxy)-14a-(((1-methylcyclopropyl)sulfonyl)carbamoyl)-5,16-dioxo-1,2,3,5,6,7,8,9,10,11,13a,14,14a,15,16,16a-hexadecahydrocyclopropa[e]pyrrolo[1,2-a][1,4]diazacyclopentadecin-6-yl)carbamate (NR02-33)

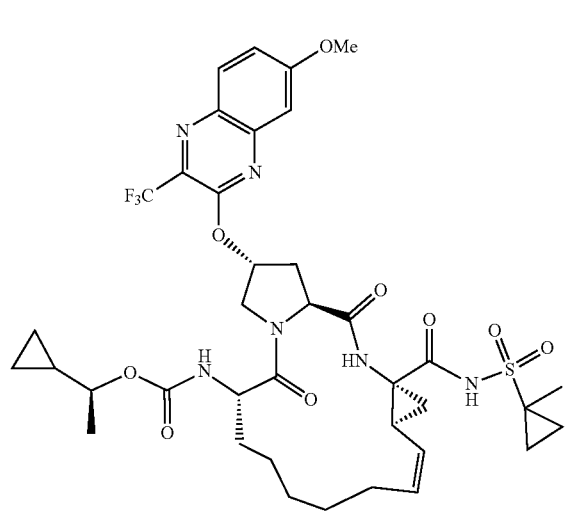 [SMILES: COc1ccc2nc(C(F)(F)F)c(O[C@@H]3C[C@H]4C(=O)N[C@]5(C(=O)NS(=O)(=O)C6(C)CC6)C[C@H]5/C=C\CCCCC[C@H](NC(=O)O[C@@H](C)C5CC5)C(=O)N4C3)nc2c1]

The same procedure was used as described above for compound AJ-71. A mixture of amine salt NR01-87 (0.2 g, 0.27 mmol) was treated with DIEA (0.330 mL, 1.90 mmol) and (S)-1-cyclopropylethyl (4-nitrophenyl) carbonate (0.080 g, 0.295 mmol) to provide the target compound NR02-33 (0.2 g, 87%) as a white solid. $^1$H NMR (500 MHz, CDCl$_3$) δ 10.20 (s, 1H), 7.83 (d, J=9.5 Hz, 1H), 7.48 (dd, J=9.0, 2.5 Hz, 1H), 7.42 (d, J=3.0 Hz, 1H), 6.93 (s, 1H), 5.93 (br s, 1H), 5.70 (q, J=9.0 Hz, 1H), 5.60 (d, J=8.0 Hz, 1H), 5.00 (t, J=9.0 Hz, 1H), 4.64 (d, J=11.5 Hz, 1H), 4.59 (t, J=8.0 Hz, 1H), 4.23-4.17 (m, 1H), 3.98 (dd, J=11.5, 3.5 Hz, 1H), 3.95 (s, 3H, overlapping), 3.76-3.69 (m, 1H), 2.71-2.54 (m, 3H), 2.33 (q, J=8.5 Hz, 1H), 1.91-1.77 (m, 4H), 1.58-1.21 (m, 12H), 1.16 (d, J=6.5 Hz, 3H), 0.86-0.79 (m, 2H), 0.78-0.72 (m, 1H), 0.53-0.25 (m, 2H), 0.11-0.08 (m, 2H) ppm; $^{13}$C NMR (125 MHz, CDCl$_3$) δ 177.39, 173.25, 166.97, 159.58, 155.68, 152.05, 138.41, 137.16, 136.33, 134.77 (q, J=35.4 Hz), 128.14, 125.64, 125.17, 120.77 (d, J=275.3 Hz), 107.52, 76.46, 75.74, 59.76, 56.01, 52.74, 52.30, 45.08, 36.57, 34.67, 32.63, 29.70, 27.28, 26.95, 26.24, 22.48, 21.02, 19.86, 18.34, 16.62, 14.67, 12.68, 3.72, 2.59 ppm; $^{19}$F NMR (470 MHz, CDCl$_3$) δ −67.97 ppm; HRMS (ESI) m/z: [M+H]$^+$ calcd for C$_{38}$H$_{48}$F$_3$N$_6$O$_9$S, 821.3150; found 821.3124; Anal. HPLC: t$_R$ 12.79 min, purity 100%.

122

(R)-1-Cyclopropylethyl ((2R,6S,13aS,14aR,16aS,Z)-2-((7-methoxy-3-(trifluoromethyl)quinoxalin-2-yl)oxy)-14a-(((1-methylcyclopropyl)sulfonyl)carbamoyl)-5,16-dioxo-1,2,3,5,6,7,8,9,10,11,13a,14,14a,15,16,16a-hexadecahydrocyclopropa[e]pyrrolo[1,2-a][1,4]diazacyclopentadecin-6-yl)carbamate (NR02-34)

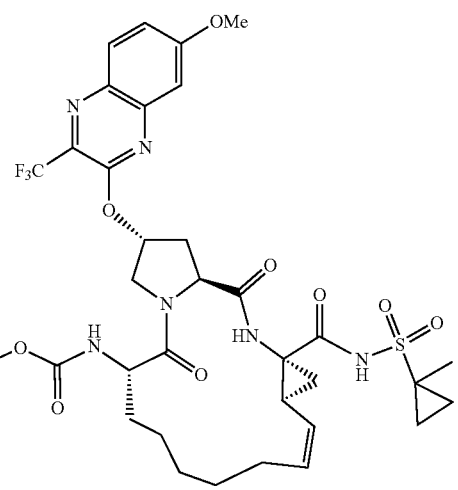

The same procedure was used as described above for compound AJ-71. A mixture of amine salt NR01-87 (0.2 g, 0.27 mmol) was treated with DIEA (0.330 mL, 1.90 mmol) and (R)-1-cyclopropylethyl (4-nitrophenyl) carbonate (0.080 g, 0.295 mmol) to provide the target compound NR02-34 (0.195 g, 85%) as a white solid. $^1$H NMR (500 MHz, CDCl$_3$) δ 10.18 (s, 1H), 7.83 (d, J=9.0 Hz, 1H), 7.48 (dd, J=9.0, 2.5 Hz, 1H), 7.41 (d, J=3.0 Hz, 1H), 7.02 (s, 1H), 5.94 (br s, 1H), 5.69 (q, J=8.5 Hz, 1H), 5.46 (d, J=8.0 Hz, 1H), 5.00 (t, J=9.5 Hz, 1H), 4.62 (t, J=7.5 Hz, 1H), 4.55 (d, J=11.5 Hz, 1H), 4.23 (t, J=8.0 Hz, 1H), 4.00 (dd, J=11.5, 3.5 Hz, 1H), 3.94 (s, 3H), 3.85-3.79 (m, 1H), 2.73-2.51 (m, 3H), 2.31 (q, J=9.0 Hz, 1H), 1.91-1.77 (m, 4H), 1.58-1.23 (m, 12H), 1.06 (d, J=6.5 Hz, 3H), 0.88-0.77 (m, 3H), 0.50-0.37 (m, 2H), 0.30-0.16 (m, 2H) ppm; $^{13}$C NMR (125 MHz, CDCl$_3$) δ 177.25, 173.08, 167.06, 159.59, 155.67, 152.00, 138.48, 137.16, 136.31, 134.67 (q, J=36.2 Hz), 128.14, 125.63, 125.15, 120.77 (d, J=275.4 Hz), 107.58, 76.50, 75.71, 59.59, 56.02, 52.80, 52.31, 44.94, 36.57, 34.69, 32.84, 29.71, 27.20, 27.15, 26.20, 22.47, 21.00, 19.92, 18.33, 16.23, 14.64, 12.70, 3.31, 2.56 ppm; $^{19}$F NMR (470 MHz, CDCl$_3$) δ −67.78 ppm; HRMS (ESI) m/z: [M+H]$^+$ calcd for C$_{38}$H$_{48}$F$_3$N$_6$O$_9$S, 821.3150; found 821.3130; Anal. HPLC: t$_R$ 12.94 min, purity 99.8%.

123

Isobutyl ((2R,6S,13aS,14aR,16aS,Z)-2-((7-methoxy-3-(trifluoromethyl)quinoxalin-2-yl)oxy)-14a-(((1-methylcyclopropyl)sulfonyl)carbamoyl)-5,16-dioxo-1,2,3,5,6,7,8,9,10,11,13a,14,14a,15,16,16a-hexadecahydrocyclopropa[e]pyrrolo[1,2-a][1,4]diazacyclopentadecin-6-yl)carbamate (NR02-41)

124

Cyclopropyl ((2R,6S,13aS,14aR,16aS,Z)-2-((7-methoxy-3-(trifluoromethyl)quinoxalin-2-yl)oxy)-14a-(((1-methylcyclopropyl)sulfonyl)carbamoyl)-5,16-dioxo-1,2,3,5,6,7,8,9,10,11,13a,14,14a,15,16,16a-hexadecahydrocyclopropa[e]pyrrolo[1,2-a][1,4]diazacyclopentadecin-6-yl)carbamate (NR02-46)

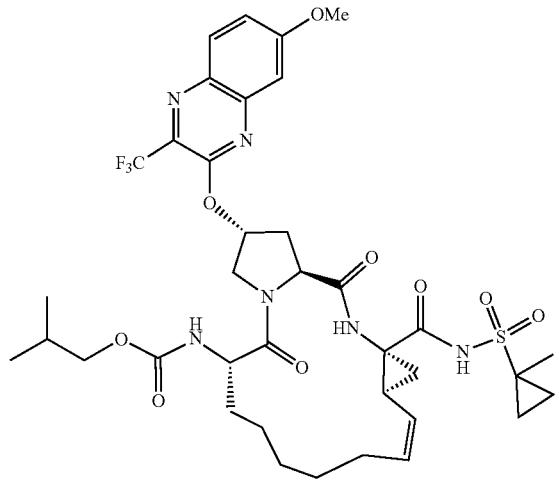 [SMILES: COc1ccc2nc(C(F)(F)F)c(O[C@@H]3C[C@H]4C(=O)N[C@]5(C(=O)NS(=O)(=O)C6(C)CC6)C[C@H]5/C=C\CCCCC[C@H](NC(=O)OCC(C)C)C(=O)N4C3)nc2c1]

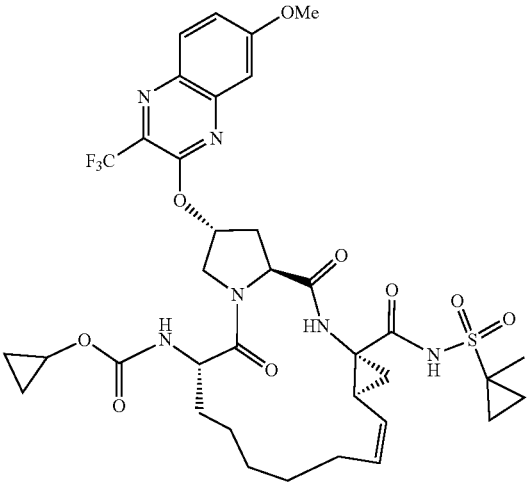 [SMILES: COc1ccc2nc(C(F)(F)F)c(O[C@@H]3C[C@H]4C(=O)N[C@]5(C(=O)NS(=O)(=O)C6(C)CC6)C[C@H]5/C=C\CCCCC[C@H](NC(=O)OC5CC5)C(=O)N4C3)nc2c1]

The same procedure was used as described above for compound AJ-71. A mixture of amine salt NR01-87 (0.2 g, 0.27 mmol) was treated with TEA (0.235 mL, 1.60 mmol) and isobutyl chloroformate (0.077 g, 0.56 mmol) in dichloromethane (12 mL) for 12 hours to provide the target compound NR02-41 (0.150 g, 67%) as a white solid. $^1$H NMR (500 MHz, CDCl$_3$) δ 10.12 (s, 1H), 7.83 (d, J=9.0 Hz, 1H), 7.48 (dd, J=9.0, 2.5 Hz, 1H), 7.42 (d, J=3.0 Hz, 1H), 6.78 (s, 1H), 5.96 (br s, 1H), 5.71 (q, J=8.5 Hz, 1H), 5.19 (d, J=8.0 Hz, 1H), 5.02 (t, J=9.0 Hz, 1H), 4.61 (t, J=8.0 Hz, 1H), 4.52 (d, J=11.5 Hz, 1H), 4.27-4.21 (m, 1H), 4.00 (dd, J=11.5, 3.5 Hz, 1H), 3.94 (s, 3H), 3.58-3.51 (m, 2H), 2.73-2.51 (m, 3H), 2.31 (q, J=9.0 Hz, 1H), 1.97-1.70 (m, 5H), 1.58-1.23 (m, 12H), 0.86-0.72 (m, 8H) ppm; $^{13}$C NMR (125 MHz, CDCl$_3$) δ 177.20, 173.12, 167.04, 159.61, 156.05, 151.98, 138.49, 137.16, 136.32, 134.68 (q, J=36.3 Hz), 128.15, 125.65, 125.12, 120.78 (d, J=274.8 Hz), 107.59, 75.63, 71.29, 59.61, 56.00, 52.87, 52.34, 44.92, 36.58, 34.65, 32.75, 29.76, 27.94, 27.19, 27.16, 26.18, 22.47, 21.11, 19.04, 19.00, 18.33, 14.64, 12.70 ppm; $^{19}$F NMR (470 MHz, CDCl$_3$) δ −67.80 ppm; HRMS (ESI) m/z: [M+H]$^+$ calcd for C$_{37}$H$_{48}$F$_3$N$_6$O$_9$S, 809.3150; found 809.3121; Anal. HPLC: t$_R$ 13.11 min, purity 99.3%.

The same procedure was used as described above for compound AJ-71. A mixture of amine salt NR01-87 (0.2 g, 0.27 mmol) was treated with DIEA (0.330 mL, 1.90 mmol) and cyclopropyl (4-nitrophenyl) carbonate (0.066 g, 0.295 mmol) to provide the target compound NR02-46 (0.180 g, 81%) as a white solid. $^1$H NMR (500 MHz, CDCl$_3$) δ 10.17 (s, 1H), 7.83 (d, J=9.0 Hz, 1H), 7.48 (dd, J=9.5, 3.0 Hz, 1H), 7.42 (d, J=2.5 Hz, 1H), 7.01 (s, 1H), 5.97 (br s, 1H), 5.69 (q, J=8.5 Hz, 1H), 5.43 (d, J=8.0 Hz, 1H), 4.98 (t, J=9.0 Hz, 1H), 4.61 (t, J=8.0 Hz, 1H), 4.51 (d, J=11.5 Hz, 1H), 4.30-4.23 (m, 1H), 4.02 (dd, J=11.5, 3.5 Hz, 1H), 3.94 (s, 3H), 3.78-3.72 (m, 1H), 2.70-2.51 (m, 3H), 2.30 (q, J=9.0 Hz, 1H), 1.92-1.77 (m, 4H), 1.59-1.23 (m, 12H), 0.87-0.79 (m, 2H), 0.60-0.47 (m, 4H) ppm; $^{13}$C NMR (125 MHz, CDCl$_3$) δ 177.22, 172.87, 167.07, 159.63, 156.21, 151.96, 138.52, 137.15, 136.29, 134.64 (q, J=35.5 Hz), 128.15, 125.66, 125.08, 120.79 (d, J=275.0 Hz), 107.58, 75.57, 59.61, 56.02, 52.88, 52.31, 49.41, 44.89, 36.58, 34.67, 32.65, 29.72, 27.21, 27.17, 26.21, 22.38, 20.99, 18.32, 14.63, 12.69, 5.03, 4.98 ppm; $^{19}$F NMR (470 MHz, CDCl$_3$) δ −67.75 ppm; HRMS (ESI) m/z: [M+H]$^+$ calcd for C$_{36}$H$_{44}$F$_3$N$_6$O$_9$S, 793.2837; found 793.2809; Anal. HPLC: t$_R$ 11.45 min, purity 100%.

125 tert-Pentyl ((2R,6S,13aS,14aR,16aS,Z)-2-((7-methoxy-3-(trifluoromethyl) quinoxalin-2-yl)oxy)-14a-(((1-methylcyclopropyl)sulfonyl)carbamoyl)-5,16-dioxo-1,2,3,5,6,7,8,9,10,11,13a,14,14a,15,16,16a-hexadecahydrocyclopropa[e]pyrrolo[1,2-a][1,4]diazacyclopentadecin-6-yl)carbamate (NR02-47)

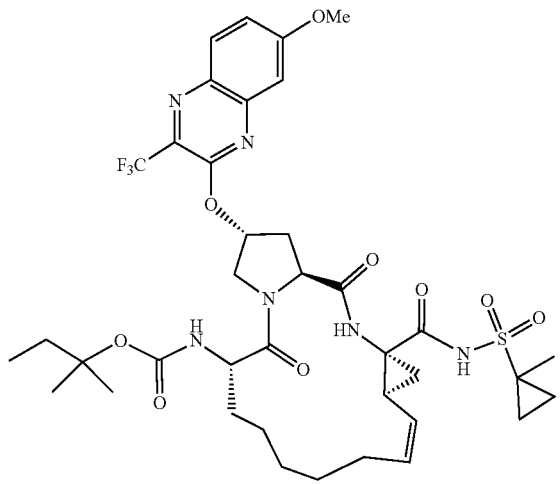 [SMILES: CCC(C)(C)OC(=O)N[C@H]1CCCCC/C=C\[C@@H]2C[C@@]2(C(=O)NS(=O)(=O)C2(C)CC2)NC(=O)[C@@H]2C[C@@H](Oc3nc4cc(OC)ccc4nc3C(F)(F)F)CN2C1=O]

The same procedure was used as described above for compound AJ-71. A mixture of amine salt NR01-87 (0.2 g, 0.27 mmol) was treated with DIEA (0.330 mL, 1.90 mmol) and 4-nitrophenyl tert-pentyl carbonate (0.075 g, 0.295 mmol) to provide the target compound NR02-47 (0.190 g, 83%) as a white solid. $^1$H NMR (500 MHz, CDCl$_3$) δ 10.13 (s, 1H), 7.83 (d, J=9.5 Hz, 1H), 7.48 (dd, J=9.5, 3.0 Hz, 1H), 7.43 (d, J=3.0 Hz, 1H), 6.91 (s, 1H), 5.91 (br s, 1H), 5.69 (q, J=9.0 Hz, 1H), 5.13 (d, J=8.0 Hz, 1H), 4.99 (t, J=9.5 Hz, 1H), 4.63-4.57 (m, 2H), 4.25-4.18 (m, 1H), 4.02 (dd, J=11.5, 3.5 Hz, 1H), 3.94 (s, 3H), 2.71-2.52 (m, 3H), 2.32 (q, J=8.5 Hz, 1H), 1.93-1.76 (m, 4H), 1.58-1.23 (m, 14H), 1.15 (s, 6H), 0.86-0.79 (m, 2H), 0.75 (t, J=7.5 Hz, 3H) ppm; $^{13}$C NMR (125 MHz, CDCl$_3$). 177.16, 173.46, 167.02, 159.60, 155.08, 151.94, 138.43, 137.14, 136.38, 134.48 (q, J=36.8 Hz), 128.15, 125.67, 125.11, 120.70 (d, J=275.7 Hz), 107.60, 82.31, 75.75, 59.61, 56.02, 52.89, 52.06, 44.95, 36.58, 34.78, 33.58, 33.03, 29.73, 27.21, 27.15, 26.22, 25.65, 25.51, 22.43, 21.11, 18.34, 14.65, 12.71, 8.28 ppm; $^{19}$F NMR (470 MHz, CDCl$_3$) δ −67.76 ppm; HRMS (ESI) m/z: [M+H]$^+$ calcd for C$_{38}$H$_{50}$F$_3$N$_6$O$_9$S, 823.3307; found 823.3279; Anal. HPLC: t$_R$ 13.54 min, purity 98.9%.

126

(1-(Trifluoromethyl)cyclopropyl)methyl ((2R,6S,13aS,14aR,16aS,Z)-2-((7-methoxy-3-(trifluoromethyl)quinoxalin-2-yl)oxy)-14a-(((1-methylcyclopropyl)sulfonyl)carbamoyl)-5,16-dioxo-1,2,3,5,6,7,8,9,10,11,13a,14,14a,15,16,16a-hexadecahydrocyclopropa[e]pyrrolo[1,2-a][1,4]diazacyclopentadecin-6-yl)carbamate (NR02-50)

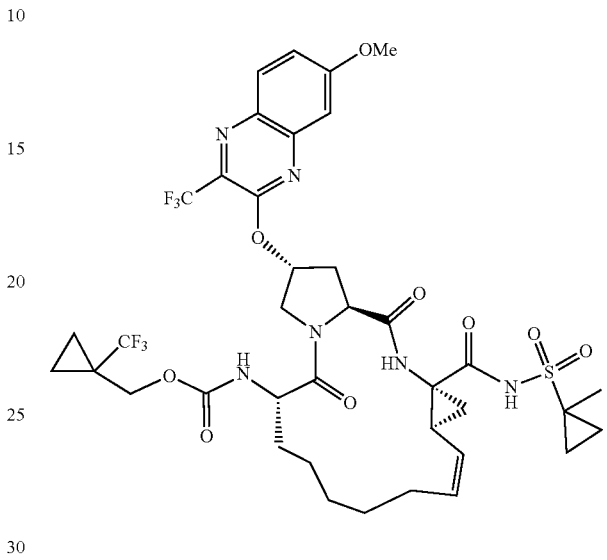

The same procedure was used as described above for compound AJ-71. A mixture of amine salt NR01-87 (0.2 g, 0.27 mmol) was treated with DIEA (0.330 mL, 1.90 mmol) and 4-nitrophenyl ((1-(trifluoromethyl) cyclopropyl) methyl) carbonate (0.083 g, 0.295 mmol) to provide the target compound NR02-50 (0.2 g, 82%) as a white solid. $^1$H NMR (500 MHz, CDCl$_3$) δ 10.17 (s, 1H), 7.83 (d, J=9.5 Hz, 1H), 7.49 (dd, J=9.0, 3.0 Hz, 1H), 7.42 (d, J=2.5 Hz, 1H), 6.93 (s, 1H), 5.93 (br s, 1H), 5.75-5.65 (m, 2H), 5.00 (t, J=9.0 Hz, 1H), 4.60 (t, J=8.0 Hz, 1H), 4.56 (d, J=11.5 Hz, 1H), 4.23-4.17 (m, 1H), 3.98 (dd, J=11.5, 3.5 Hz, 1H), 3.95 (s, 3H, overlapping), 3.87 (q, J=12.5 Hz, 2H), 2.74-2.51 (m, 3H), 2.31 (q, J=8.5 Hz, 1H), 1.94-1.77 (m, 4H), 1.59-1.23 (m, 12H), 1.02-0.90 (m, 2H), 0.86-0.78 (m, 2H), 0.72-0.53 (m, 2H) ppm; $^{13}$C NMR (125 MHz, CDCl$_3$) δ 177.26, 172.88, 167.00, 159.66, 155.54, 152.01, 138.43, 137.16, 136.34, 134.71 (q, J=35.8 Hz), 128.16, 126.78 (q, J=211.4 Hz), 125.71, 125.09, 120.79 (d, J=275.2 Hz), 107.51, 75.77, 65.28, 59.72, 56.01, 52.84, 52.44, 44.97, 36.57, 34.64, 32.52, 29.65, 27.19, 27.10, 26.21, 22.91 (q, J=33.0 Hz), 22.39, 21.04, 18.32, 14.65, 12.69, 8.21, 8.00 ppm; $^{19}$F NMR (470 MHz, CDCl$_3$) δ −67.86, −69.67 ppm; HRMS (ESI) m/z: [M+H]$^+$ calcd for C$_{38}$H$_{45}$F$_6$N$_6$O$_9$S, 875.2867; found 875.2839; Anal. HPLC: t$_R$ 12.82 min, purity 99.5%.

127

Neopentyl ((2R,6S,13aS,14aR,16aS,Z)-2-((7-methoxy-3-(trifluoromethyl)quinoxalin-2-yl)oxy)-14a-(((1-methylcyclopropyl)sulfonyl)carbamoyl)-5,16-dioxo-1,2,3,5,6,7,8,9,10,11,13a,14,14a,15,16,16a-hexadecahydrocyclopropa[e]pyrrolo[1,2-a][1,4]diazacyclopentadecin-6-yl)carbamate (NR02-48)

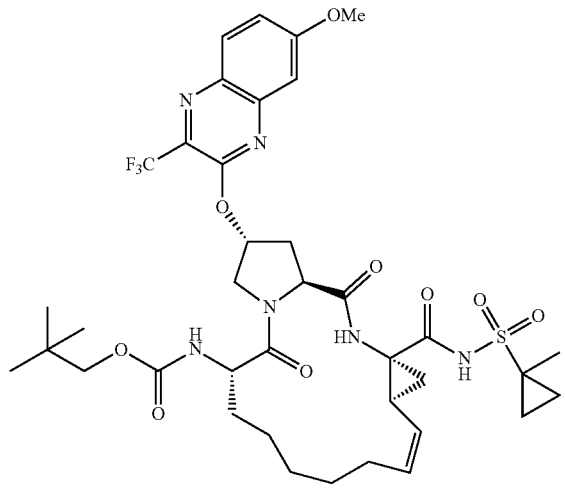 [SMILES: COc1ccc2nc(C(F)(F)F)c(O[C@@H]3C[C@H]4C(=O)N[C@]5(C(=O)NS(=O)(=O)C6(C)CC6)C[C@H]5/C=C\CCCCC[C@H](NC(=O)OCC(C)(C)C)C(=O)N4C3)nc2c1]

The same procedure was used as described above for compound AJ-71. A mixture of amine salt NR01-87 (0.2 g, 0.27 mmol) was treated with TEA (0.235 mL, 1.60 mmol) and neopentyl chloroformate (0.077 g, 0.56 mmol) in dichloromethane (12 mL) for 12 hours to provide the target compound NR02-48 (0.120 g, 53%) as a white solid. $^1$H NMR (500 MHz, CDCl$_3$) δ 10.14 (s, 1H), 7.83 (d, J=9.0 Hz, 1H), 7.48 (dd, J=9.0, 2.5 Hz, 1H), 7.42 (d, J=2.5 Hz, 1H), 6.87 (s, 1H), 5.95 (br s, 1H), 5.70 (q, J=9.0 Hz, 1H), 5.23 (d, J=8.5 Hz, 1H), 5.01 (t, J=9.0 Hz, 1H), 4.62 (t, J=8.0 Hz, 1H), 4.52 (d, J=11.5 Hz, 1H), 4.28-4.22 (m, 1H), 4.00 (dd, J=11.5, 3.5 Hz, 1H), 3.94 (s, 3H), 3.47-3.42 (m, 2H), 2.70-2.51 (m, 3H), 2.32 (q, J=8.5 Hz, 1H), 1.95-1.77 (m, 4H), 1.59-1.24 (m, 12H), 0.86-0.79 (m, 11H) ppm; $^{13}$C NMR (125 MHz, CDCl$_3$) δ 177.20, 173.11, 167.06, 159.61, 156.16, 151.98, 138.49, 137.18, 136.34, 134.69 (q, J=35.7 Hz), 128.15, 125.65, 125.11, 120.78 (d, J=275.2 Hz), 107.58, 75.63, 74.49, 59.59, 55.99, 52.87, 52.36, 44.90, 36.58, 34.66, 32.79, 31.40, 29.79, 27.22, 27.14, 26.37, 26.19, 22.46, 21.13, 18.32, 14.64, 12.70 ppm; $^{19}$F NMR (470 MHz, CDCl$_3$) δ −67.77 ppm; HRMS (ESI) m/z: [M+H]$^+$ calcd for C$_{38}$H$_{50}$F$_3$N$_6$O$_9$S, 823.3307; found 823.3283; Anal. HPLC: t$_R$ 13.75 min, purity 97.9%.

128

Pentan-3-yl ((2R,6S,13aS,14aR,16aS,Z)-2-((7-methoxy-3-(trifluoromethyl)quinoxalin-2-yl)oxy)-14a-(((1-methylcyclopropyl)sulfonyl)carbamoyl)-5,16-dioxo-1,2,3,5,6,7,8,9,10,11,13a,14,14a,15,16,16a-hexadecahydrocyclopropa[e]pyrrolo[1,2-a][1,4]diazacyclopentadecin-6-yl)carbamate (NR02-52)

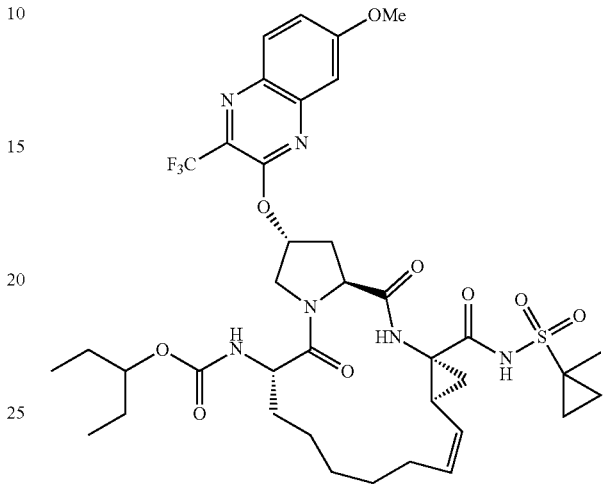

The same procedure was used as described above for compound AJ-71. A mixture of amine salt NR01-87 (0.2 g, 0.27 mmol) was treated with DIEA (0.330 mL, 1.90 mmol) and 4-nitrophenyl pentan-3-yl carbonate (0.083 g, 0.295 mmol) to provide the target compound NR02-52 (0.185 g, 80%) as a white solid. $^1$H NMR (500 MHz, CDCl$_3$) δ 10.16 (s, 1H), 7.83 (d, J=9.0 Hz, 1H), 7.48 (dd, J=9.0, 2.5 Hz, 1H), 7.42 (d, J=3.0 Hz, 1H), 7.00 (s, 1H), 5.94 (br s, 1H), 5.69 (q, J=9.0 Hz, 1H), 5.32 (d, J=8.5 Hz, 1H), 4.99 (t, J=9.0 Hz, 1H), 4.61 (t, J=8.0 Hz, 1H), 4.56 (d, J=11.5 Hz, 1H), 4.29-4.19 (m, 2H), 4.01 (dd, J=11.5, 3.5 Hz, 1H), 3.94 (s, 3H), 2.71-2.51 (m, 3H), 2.30 (q, J=9.0 Hz, 1H), 1.94-1.77 (m, 4H), 1.58-1.23 (m, 16H), 0.86-0.77 (m, 5H), 0.71 (t, J=7.5 Hz, 3H) ppm; $^{13}$C NMR (125 MHz, CDCl$_3$) δ 177.18, 173.25, 167.06, 159.58, 156.07, 151.99, 138.46, 137.17, 136.34, 134.68 (q, J=35.8 Hz), 128.16, 125.62, 125.14, 120.78 (d, J=275.4 Hz), 107.58, 77.81, 75.68, 59.57, 56.01, 52.86, 52.33, 44.93, 36.58, 34.67, 32.91, 29.74, 27.16, 26.57, 26.50, 26.17, 22.48, 21.07, 18.33, 14.63, 12.70, 9.52, 9.42 ppm; $^{19}$F NMR (470 MHz, CDCl$_3$) δ −67.78 ppm; HRMS (ESI) m/z: [M+H]$^+$ calcd for C$_{38}$H$_{50}$F$_3$N$_6$O$_9$S, 823.3307; found 823.3281; Anal. HPLC: t$_R$ 13.56 min, purity 99.5%.

129

1-(Trifluoromethyl)cyclobutyl ((2R,6S,13aS,14aR,16aS,Z)-2-((7-methoxy-3-(trifluoromethyl)quinoxalin-2-yl)oxy)-14a-(((1-methylcyclopropyl)sulfonyl)carbamoyl)-5,16-dioxo-1,2,3,5,6,7,8,9,10,11,13a,14,14a,15,16,16a-hexadecahydrocyclopropa[e]pyrrolo[1,2-a][1,4]diazacyclopentadecin-6-yl)carbamate (NR02-59)

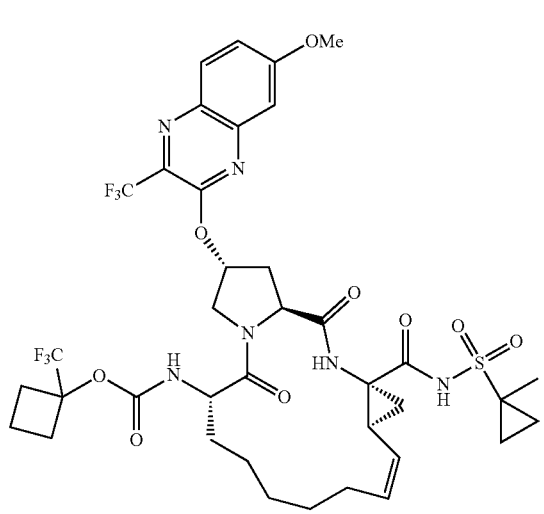 [SMILES: COc1ccc2nc(C(F)(F)F)c(O[C@@H]3C[C@H]4C(=O)N[C@]5(C(=O)NS(=O)(=O)C6(C)CC6)C[C@H]5/C=C\CCCCC[C@H](NC(=O)OC5(C(F)(F)F)CCC5)C(=O)N4C3)nc2c1]

The same procedure was used as described above for compound AJ-71. A mixture of amine salt NR01-87 (0.2 g, 0.27 mmol) was treated with DIEA (0.330 mL, 1.90 mmol) and 4-nitrophenyl (1-(trifluoromethyl) cyclobutyl) carbonate (0.090 g, 0.295 mmol) to provide the target compound NR02-59 (0.210 g, 86%) as a white solid. $^1$H NMR (500 MHz, CDCl$_3$) δ 10.13 (s, 1H), 7.83 (d, J=9.0 Hz, 1H), 7.48 (dd, J=9.5, 3.0 Hz, 1H), 7.42 (d, J=3.0 Hz, 1H), 6.96 (s, 1H), 5.93 (br s, 1H), 5.69 (q, J=8.5 Hz, 1H), 5.58 (d, J=8.0 Hz, 1H), 5.00 (t, J=9.5 Hz, 1H), 4.60 (t, J=8.0 Hz, 1H), 4.50 (d, J=11.5 Hz, 1H), 4.28-4.22 (m, 1H), 4.03 (dd, J=11.5, 4.0 Hz, 1H), 3.94 (s, 3H), 2.65 (dd, J=8.0, 3.0 Hz, 2H), 2.60-2.45 (m, 3H), 2.37-2.29 (m, 3H), 1.92-1.70 (m, 6H), 1.58-1.23 (m, 12H), 0.86-0.79 (m, 2H) ppm; $^{13}$C NMR (125 MHz, CDCl$_3$) δ 177.11, 172.59, 167.14, 159.67, 153.07, 151.85, 138.46, 137.10, 136.40, 134.45 (q, J=36.1 Hz), 128.12, 125.76, 125.04, 124.95 (q, J=282.1 Hz), 120.76 (d, J=275.2 Hz), 107.55, 78.75 (q, J=31.9 Hz), 75.71, 59.67, 56.03, 53.01, 52.21, 44.82, 36.58, 34.79, 32.77, 29.60, 28.64, 28.51, 27.24, 27.19, 26.28, 22.24, 20.95, 18.31, 14.62, 13.13, 12.69 ppm; $^{19}$F NMR (470 MHz, CDCl$_3$) δ −67.85, −83.02 ppm; HRMS (ESI) m/z: [M+H]$^+$ calcd for C$_{38}$H$_{45}$F$_6$N$_6$O$_9$S, 875.2867; found 875.2840; Anal. HPLC: t$_R$ 13.33 min, purity 100%.

130

1-Methylcyclobutyl ((2R,6S,13aS,14aR,16aS,Z)-2-((7-methoxy-3-(trifluoromethyl)quinoxalin-2-yl)oxy)-14a-(((1-methylcyclopropyl)sulfonyl)carbamoyl)-5,16-dioxo-1,2,3,5,6,7,8,9,10,11,13a,14,14a,15,16,16a-hexadecahydrocyclopropa[e] pyrrolo[1,2-a][1,4]diazacyclopentadecin-6-yl)carbamate (NR02-62)

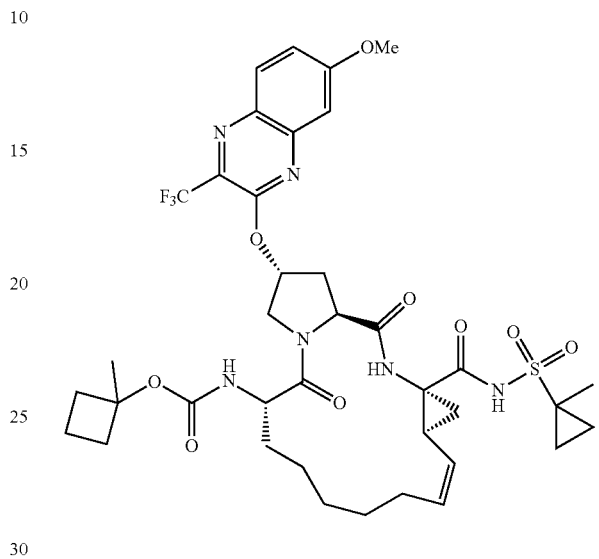

The same procedure was used as described above for compound AJ-71. A mixture of amine salt NR01-87 (0.2 g, 0.27 mmol) was treated with DIEA (0.330 mL, 1.90 mmol) and 1-methylcyclobutyl (4-nitrophenyl) carbonate (0.074 g, 0.295 mmol) to provide the target compound NR02-62 (0.190 g, 83%) as a white solid. $^1$H NMR (500 MHz, CDCl$_3$) δ 10.16 (s, 1H), 7.82 (d, J=9.5 Hz, 1H), 7.48 (dd, J=9.0, 2.5 Hz, 1H), 7.43 (d, J=3.0 Hz, 1H), 6.99 (s, 1H), 5.92 (br s, 1H), 5.70 (q, J=9.0 Hz, 1H), 5.34 (d, J=8.0 Hz, 1H), 5.00 (t, J=9.5 Hz, 1H), 4.60 (t, J=7.5 Hz, 1H), 4.52 (d, J=11.5 Hz, 1H), 4.28-4.22 (m, 1H), 4.03 (dd, J=11.5, 3.5 Hz, 1H), 3.94 (s, 3H), 2.70-2.52 (m, 3H), 2.33 (q, J=9.0 Hz, 1H), 2.14-2.04 (m, 2H), 1.93-1.75 (m, 6H), 1.58-1.31 (m, 14H), 1.28 (s, 3H, overlapping), 0.86-0.79 (m, 2H) ppm; $^{13}$C NMR (125 MHz, CDCl$_3$) δ 177.18, 173.15, 167.07, 159.62, 154.51, 151.89, 138.44, 137.13, 136.35, 134.52 (q, J=35.7 Hz), 128.15, 125.69, 125.10, 120.75 (d, J=276.3 Hz), 107.58, 79.54, 75.66, 59.59, 56.03, 52.89, 52.01, 44.91, 36.58, 35.33, 35.24, 34.75, 32.99, 29.71, 27.23, 27.19, 26.26, 23.39, 22.38, 21.02, 18.33, 14.64, 13.66, 12.70 ppm; $^{19}$F NMR (470 MHz, CDCl$_3$) δ −67.75 ppm; HRMS (ESI) m/z: [M+H]$^+$ calcd for C$_{38}$H$_{48}$F$_3$N$_6$O$_9$S, 821.3150; found 821.3126; Anal. HPLC: t$_R$ 13.04 min, purity 99.8%.

131

1-(Trifluoromethyl)cyclopentyl ((2R,6S,13aS,14aR, 16aS,Z)-2-((7-methoxy-3-(trifluoromethyl)quinoxalin-2-yl)oxy)-14a-(((1-methylcyclopropyl)sulfonyl)carbamoyl)-5,16-dioxo-1,2,3,5,6,7,8,9,10,11,13a,14, 14a,15,16,16a-hexadecahydrocyclopropa[e]pyrrolo[1,2-a][1,4]diazacyclopentadecin-6-yl)carbamate (NR04-01)

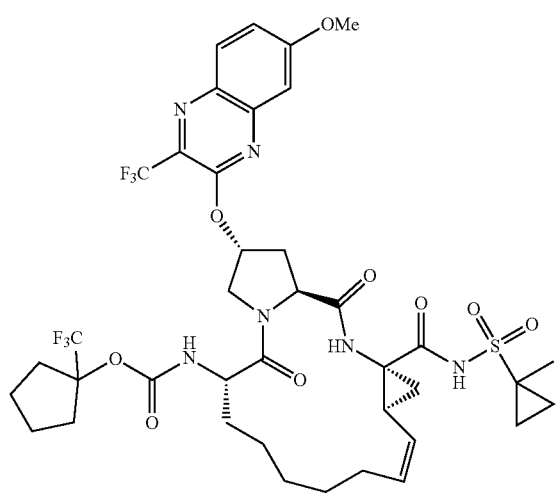 [SMILES: COc1ccc2nc(C(F)(F)F)c(O[C@@H]3C[C@H]4C(=O)N[C@]5(C(=O)NS(=O)(=O)C6(C)CC6)C[C@H]5/C=C\CCCCC[C@H](NC(=O)OC5(C(F)(F)F)CCCC5)C(=O)N4C3)nc2c1]

The same procedure was used as described above for compound AJ-71. A mixture of amine salt NR01-87 (0.2 g, 0.27 mmol) was treated with DIEA (0.330 mL, 1.90 mmol) and 4-nitrophenyl (1-(trifluoromethyl)cyclopentyl) carbonate (0.094 g, 0.293 mmol) to provide the target compound NR04-01 (0.180 g, 76%) as a white solid. $^1$H NMR (500 MHz, CDCl$_3$) δ 10.11 (s, 1H), 7.83 (d, J=9.0 Hz, 1H), 7.49 (dd, J=9.0, 2.5 Hz, 1H), 7.43 (d, J=2.5 Hz, 1H), 6.86 (s, 1H), 5.91 (br s, 1H), 5.69 (q, J=9.0 Hz, 1H), 5.64 (d, J=7.5 Hz, 1H), 4.99 (t, J=9.0 Hz, 1H), 4.60 (t, J=8.0 Hz, 1H), 4.53 (d, J=11.5 Hz, 1H), 4.27-4.21 (m, 1H), 4.03 (dd, J=11.5, 3.5 Hz, 1H), 3.95 (s, 3H), 2.66 (dd, J=8.0, 2.5 Hz, 2H), 2.63-2.52 (m, 1H), 2.33 (q, J=8.5 Hz, 1H), 2.05-1.76 (m, 8H), 1.73-1.23 (m, 16H), 0.86-0.79 (m, 2H) ppm; $^{13}$C NMR (125 MHz, CDCl$_3$) δ 177.12, 172.75, 167.02, 159.69, 153.20, 151.85, 138.49, 137.10, 136.45, 134.56 (q, J=35.9 Hz), 128.15, 125.79, 125.04 (q, J=282.7 Hz), 125.02, 120.75 (d, J=275.2 Hz), 107.59, 89.24 (q, J=29.4 Hz), 75.77, 59.73, 56.04, 53.11, 52.19, 44.88, 36.58, 34.82, 32.88, 32.84, 32.76, 29.54, 27.22, 27.19, 26.30, 25.56, 25.47, 22.26, 21.01, 18.32, 14.64, 12.71 ppm; $^{19}$F NMR (470 MHz, CDCl$_3$) δ −67.89, −80.60 ppm; HRMS (ESI) m/z: [M+H]$^+$ calcd for C$_{39}$H$_{47}$F$_6$N$_6$O$_9$S, 889.3024; found 889.3030; Anal. HPLC: t$_R$ 14.21 min, purity 99.3%.

132

(1R,3R,5S)-Bicyclo[3.1.0]hexan-3-yl ((2R,6S,13aS, 14aR,16aS,Z)-2-((7-methoxy-3-(trifluoromethyl)quinoxalin-2-yl)oxy)-14a-(((1-methylcyclopropyl)sulfonyl)carbamoyl)-5,16-dioxo-1,2,3,5,6,7,8,9,10, 11,13a,14,14a,15,16,16a-hexadecahydrocyclopropa[e]pyrrolo[1,2-a][1,4]diazacyclopentadecin-6-yl) carbamate (NR04-49)

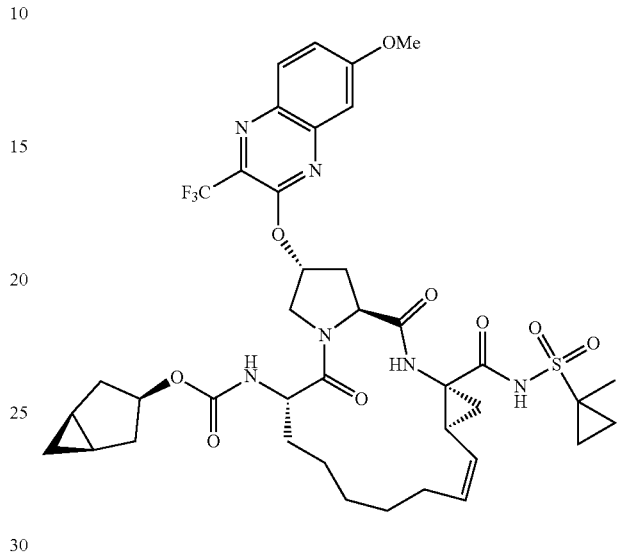

The same procedure was used as described above for compound AJ-71. A mixture of amine salt NR01-87 (0.2 g, 0.27 mmol) was treated with DIEA (0.330 mL, 1.90 mmol) and (1R,3R,5S)-bicyclo [3.1.0] hexan-3-yl (4-nitrophenyl) carbonate (0.078 g, 0.293 mmol) to provide the target compound NR04-49 (0.190 g, 85N) as a white solid. $^1$H NMR (500 MHz, CDCl$_3$) δ 10.14 (s, 1H), 7.82 (d, J=9.0 Hz, 1H), 7.48 (dd, J=9.0, 2.5 Hz, 1H), 7.43 (d, J=3.0 Hz, 1H), 6.89 (s, 1H), 5.94 (br s, 1H), 5.69 (q, J=8.5 Hz, 1H), 5.10 (d, J=8.0 Hz, 1H), 5.00 (t, J=9.5 Hz, 1H), 4.79 (t, J=7.0 Hz, 1H), 4.61 (t, J=7.5 Hz, 1H), 4.51 (d, J=11.5 Hz, 1H), 4.24-4.17 (m, 1H), 4.00 (dd, J=12.0, 4.0 Hz, 1H), 3.94 (s, 3H), 2.74-2.49 (m, 3H), 2.30 (q, J=9.0 Hz, 1H), 2.08-2.01 (m, 1H), 2.00-1.74 (m, 6H), 1.70-1.16 (m, 15H), 0.86-0.79 (m, 2H), 0.40 (dd, J=13.0, 8.0 Hz, 1H), 0.23 (q, J=4.0 Hz, 1H) ppm; $^{13}$C NMR (125 MHz, CDCl$_3$) δ 177.18, 173.17, 167.02, 159.61, 155.36, 151.99, 138.49, 137.15, 136.34, 134.69 (q, J=36.3 Hz), 128.15, 125.63, 125.11, 120.77 (d, J=273.8 Hz), 107.57, 75.63, 59.62, 56.03, 52.83, 52.28, 44.93, 36.58, 35.81, 35.60, 34.64, 32.75, 29.77, 27.17, 26.18, 22.45, 21.15, 18.33, 16.84, 16.75, 14.64, 12.71, 10.53 ppm; $^{19}$F NMR (470 MHz, CDCl$_3$) δ −67.76 ppm; HRMS (ESI) m/z: [M+H]$^+$ calcd for C$_{39}$H$_{48}$F$_3$N$_6$O$_9$S, 833.3150; found 833.3158; Anal. HPLC: t$_R$ 13.39 min, purity 97.1%.

Applicant's disclosure is described herein in preferred embodiments with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of Applicant's disclosure may be combined in any suitable manner in one or more embodiments. In the description, herein, numerous specific details are recited to provide a thorough understanding of embodiments of the invention. One skilled in the relevant art will recognize, however, that Applicant's composition and/or method may be practiced without one or more of the specific details, or with other methods, components, materials, and so forth. In other instances, well-known structures, materials, or operations are not shown or described in detail to avoid obscuring aspects of the disclosure.

In this specification and the appended claims, the singular forms "a," "an," and "the" include plural reference, unless the context clearly dictates otherwise.

Unless defined otherwise, all technical and scientific terms used herein have the same meaning as commonly understood by one of ordinary skill in the art. Although any methods and materials similar or equivalent to those described herein can also be used in the practice or testing of the present disclosure, the preferred methods and materials are now described. Methods recited herein may be carried out in any order that is logically possible, in addition to a particular order disclosed.

INCORPORATION BY REFERENCE

References and citations to other documents, such as patents, patent applications, patent publications, journals, books, papers, web contents, have been made in this disclosure. All such documents are hereby incorporated herein by reference in their entirety for all purposes. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

EQUIVALENTS

The representative examples are intended to help illustrate the invention, and are not intended to, nor should they be construed to, limit the scope of the invention. Indeed, various modifications of the invention and many further embodiments thereof, in addition to those shown and described herein, will become apparent to those skilled in the art from the full contents of this document, including the examples and the references to the scientific and patent literature included herein. The examples contain important additional information, exemplification and guidance that can be adapted to the practice of this invention in its various embodiments and equivalents thereof.

What is claimed is:

1. A compound having the structural formula ($I_a$),

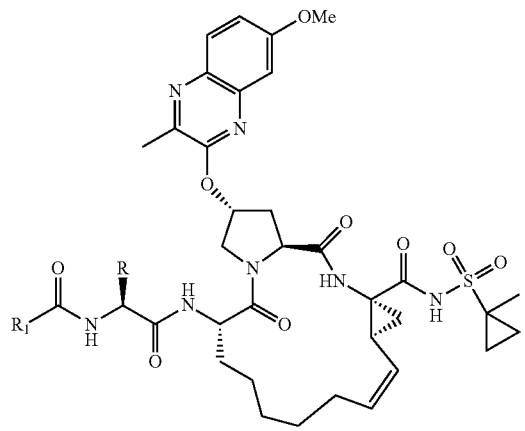

wherein
$R_1$ is R';
R is a $C_3$-$C_6$ cyclic alkyl group; and
R' is a $C_1$-$C_3$ alkyl.

2. The compound of claim 1, wherein $R_1$ is methyl.

3. A compound having the structural formula (I),

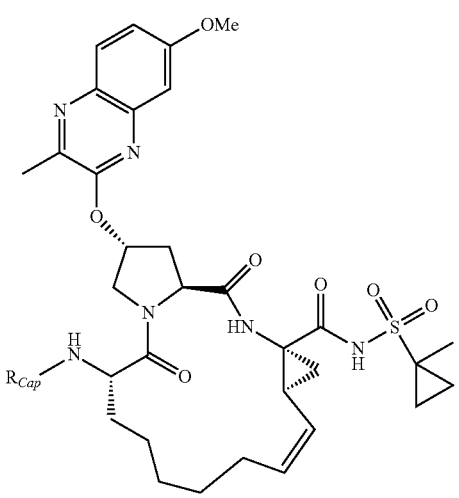

wherein $R_{cap}$ is selected from:

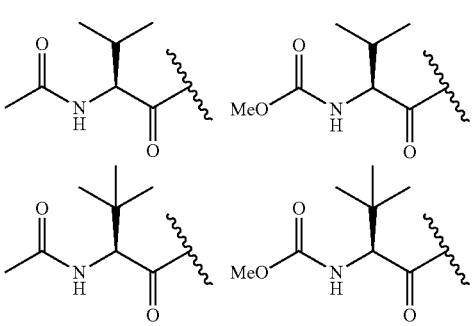

-continued
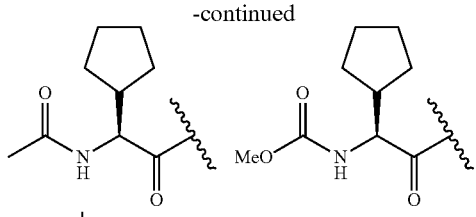
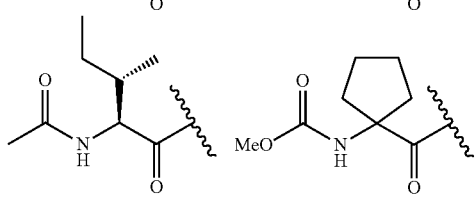
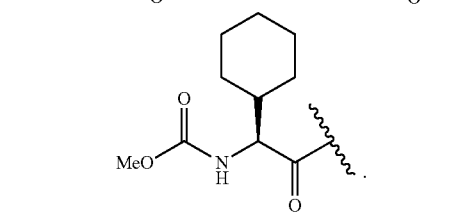
4. A pharmaceutical composition comprising a compound of claim 1.
5. A pharmaceutical composition comprising the compound of claim 3.
* * * * *